US012801044B2

(12) United States Patent
Ikami et al.

(10) Patent No.: US 12,801,044 B2
(45) Date of Patent: Nov. 17, 2026

(54) IMAGE FORMING APPARATUS AND PROCESS CARTRIDGE

(71) Applicant: CANON KABUSHIKI KAISHA, Tokyo (JP)

(72) Inventors: Yasukazu Ikami, Tokyo (JP); Akihisa Matsukawa, Tokyo (JP); Naoya Sawamura, Kanagawa (JP); Katsuichi Abe, Kanagawa (JP); Hiroki Tanaka, Kanagawa (JP); Shuntaro Watanabe, Kanagawa (JP); Yoshiaki Shiotari, Shizuoka (JP); Masaki Shimomura, Shizuoka (JP); Takashi Kenmoku, Shizuoka (JP); Nobuhiro Nakamura, Shizuoka (JP); Takashi Koyanagi, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/216,876

(22) Filed: May 23, 2025

(65) Prior Publication Data

US 2025/0328090 A1 Oct. 23, 2025

Related U.S. Application Data

(63) Continuation of application No. PCT/JP2023/040694, filed on Nov. 13, 2023.

(30) Foreign Application Priority Data

Dec. 9, 2022 (JP) ................................ 2022-196835
Dec. 9, 2022 (JP) ................................ 2022-196836
(Continued)

(51) Int. Cl.
*G03G 21/16* (2006.01)
*G01N 23/06* (2018.01)
(Continued)

(52) U.S. Cl.
CPC .......... *G03G 9/0827* (2013.01); *G01N 23/06* (2013.01); *G03G 9/0819* (2013.01);
(Continued)

(58) Field of Classification Search
CPC ............ G03G 9/0819; G03G 15/0808; G03G 15/0812; G03G 15/0848; G03G 21/1814; G01N 23/06
(Continued)

(56) References Cited

U.S. PATENT DOCUMENTS 8,455,170 B2 6/2013 Nakamura et al.
8,655,222 B2 2/2014 Nakamura et al.
(Continued)

FOREIGN PATENT DOCUMENTS

CN 115390392 A2 * 11/2022
JP 2006-259154 A 9/2006
(Continued)

*Primary Examiner* — Hoan H Tran
(74) *Attorney, Agent, or Firm* — VENABLE LLP

(57) ABSTRACT

Used is an image forming apparatus including an image carrier and a developer carrier, in which a toner particle of the developer includes convex portions on a surface of a toner base particle, in a horizontal image converted from a cross-sectional image of the toner particle with STEM, when a convex maximum length D and a convex height H are equal to each other, and convex portions having a convex height H of 20 nm or more are defined as convex portions Y, a number-based average of convex widths W in the convex portions Y is at least 40 nm and not more than 200 nm, when a width of the horizontal image is defined as a circumferential length L, and a total of the convex widths W of the convex portions Y is indicated by ΣW, ΣW/L is 0.5 or more.

42 Claims, 49 Drawing Sheets

(30) Foreign Application Priority Data

| | | | |
|---|---|---|---|
| Dec. 9, 2022 | (JP) | ................................ | 2022-197135 |
| Oct. 12, 2023 | (JP) | ................................ | 2023-176929 |
| Oct. 18, 2023 | (JP) | ................................ | 2023-179321 |
| Oct. 18, 2023 | (JP) | ................................ | 2023-179427 |

(51) Int. Cl.

| | |
|---|---|
| ***G03G 9/08*** | (2006.01) |
| ***G03G 15/08*** | (2006.01) |
| ***G03G 21/18*** | (2006.01) |

(52) U.S. Cl.

CPC ..... *G03G 15/0808* (2013.01); *G03G 15/0812* (2013.01); *G03G 15/0848* (2013.01); *G03G 21/1814* (2013.01); *G03G 2215/0604* (2013.01)

(58) Field of Classification Search

USPC ........................................................ 399/111

See application file for complete search history.

(56) References Cited

U.S. PATENT DOCUMENTS

| | | | | |
|---|---|---|---|---|
| 8,768,226 | B2 | 7/2014 | Koyanagi et al. | |
| 8,798,508 | B2 | 8/2014 | Yamada et al. | |
| 9,029,054 | B2 | 5/2015 | Okuda et al. | |
| 9,040,214 | B2 | 5/2015 | Fujii et al. | |
| 9,046,797 | B2 | 6/2015 | Fujii et al. | |
| 9,063,505 | B2 | 6/2015 | Sekiya et al. | |
| 9,069,267 | B2 | 6/2015 | Kaku et al. | |
| 9,256,145 | B2 | 2/2016 | Fujii et al. | |
| 9,372,417 | B2 | 6/2016 | Fujii et al. | |
| 9,372,418 | B2 | 6/2016 | Shida et al. | |
| 9,372,419 | B2 | 6/2016 | Tsuji et al. | |
| 9,535,346 | B2 | 1/2017 | Sekiya et al. | |
| 9,599,917 | B2 | 3/2017 | Okuda et al. | |
| 9,625,854 | B2 | 4/2017 | Koyanagi et al. | |
| 9,726,992 | B2 | 8/2017 | Sakuma et al. | |
| 9,977,359 | B2 | 5/2018 | Koyanagi et al. | |
| 10,073,362 | B2 | 9/2018 | Fujii et al. | |
| 10,331,054 | B2 | 6/2019 | Urushihara et al. | |
| 10,539,892 | B2 | 1/2020 | Nishida et al. | |
| 10,558,132 | B2 | 2/2020 | Ishiduka et al. | |
| 10,558,133 | B2 | 2/2020 | Nakamura et al. | |
| 10,642,177 | B2 | 5/2020 | Nakamura et al. | |
| 10,691,033 | B2 | 6/2020 | Nishida et al. | |
| 10,747,130 | B2 | 8/2020 | Okuda et al. | |
| 10,747,131 | B2 | 8/2020 | Watanabe et al. | |
| 10,831,118 | B2 | 11/2020 | Watanabe et al. | |
| 10,831,125 | B2 | 11/2020 | Ito et al. | |
| 10,838,315 | B2 | 11/2020 | Shimozawa et al. | |
| 11,003,102 | B2 | 5/2021 | Ishiduka et al. | |
| 11,156,935 | B2 | 10/2021 | Koyanagi et al. | |
| 11,256,186 | B2 | 2/2022 | Shimozawa et al. | |
| 11,320,754 | B2 | 5/2022 | Noguchi et al. | |
| 11,366,402 | B2 | 6/2022 | Ishiduka et al. | |
| 11,392,050 | B2 | 7/2022 | Nishida et al. | |
| 11,392,074 | B2 | 7/2022 | Ishida et al. | |
| 11,573,499 | B2 | 2/2023 | Murakami et al. | |
| 11,782,353 | B2 | 10/2023 | Nakamura et al. | |
| 11,960,242 | B2 * | 4/2024 | Yamawaki ........... | G03G 9/0825 |
| 11,966,174 | B2 | 4/2024 | Koyanagi et al. | |
| 12,045,006 | B2 | 7/2024 | Iwasaki et al. | |
| 12,153,370 | B2 | 11/2024 | Ishida et al. | |
| 12,153,376 | B2 | 11/2024 | Watanabe et al. | |
| 12,429,785 | B2 | 9/2025 | Watanabe et al. | |
| 2006/0008717 | A1 | 1/2006 | Uematsu et al. | |
| 2012/0264048 | A1 | 10/2012 | Ishikawa et al. | |
| 2013/0316277 | A1 | 11/2013 | Konishi et al. | |
| 2017/0285496 | A1 | 10/2017 | Maeda et al. | |
| 2019/0101850 | A1 | 4/2019 | Shindo et al. | |
| 2019/0121255 | A1 | 4/2019 | Mitsui et al. | |
| 2020/0142344 | A1 | 5/2020 | Ikeda et al. | |
| 2020/0209804 | A1 | 7/2020 | Kawakami et al. | |
| 2020/0257213 | A1 | 8/2020 | Sakimura et al. | |
| 2023/0124743 | A1 | 4/2023 | Nakamura et al. | |
| 2024/0004322 | A1 | 1/2024 | Makisumi et al. | |
| 2024/0168398 | A1 | 5/2024 | Yamaai et al. | |
| 2024/0402626 | A1 | 12/2024 | Nakamura et al. | |
| 2025/0231522 | A1 | 7/2025 | Koyanagi et al. | |
| 2025/0284237 | A1 | 9/2025 | Saito et al. | |
| 2026/0050231 | A1 | 2/2026 | Hiramatsu et al. | |
| 2026/0064023 | A1 | 3/2026 | Shiotari et al. | |
| 2026/0064035 | A1 | 3/2026 | Shiotari et al. | |
| 2026/0064037 | A1 | 3/2026 | Katsura et al. | |
| 2026/0093190 | A1 | 4/2026 | Sato et al. | |

FOREIGN PATENT DOCUMENTS

| | | | |
|---|---|---|---|
| JP | 4027407 | B2 | 12/2007 |
| JP | 2013-182240 | A | 9/2013 |
| JP | 2013-224975 | A | 10/2013 |
| JP | 2014-2364 | A | 1/2014 |
| JP | 2015-84078 | A | 4/2015 |
| JP | 2017-187602 | A | 10/2017 |
| JP | 2019-78881 | A | 5/2019 |
| JP | 2020-52099 | A | 4/2020 |
| JP | 2020-71423 | A | 5/2020 |
| JP | 2020-106703 | A | 7/2020 |
| JP | 2020-129072 | A | 8/2020 |
| JP | 2020-154292 | A | 9/2020 |
| JP | 6929182 | B2 | 9/2021 |

* cited by examiner

COMPARATIVE EXAMPLE

EXAMPLE

IMAGE FORMING APPARATUS AND PROCESS CARTRIDGE

CROSS-REFERENCE TO RELATED APPLICATIONS

This application is a Continuation of International Patent Application No. PCT/JP2023/040694, filed Nov. 13, 2023, which claims the benefit of Japanese Patent Application No. 2022-196835, filed Dec. 9, 2022, Japanese Patent Application No. 2022-196836, filed Dec. 9, 2022, Japanese Patent Application No. 2022-197135, filed Dec. 9, 2022, Japanese Patent Application No. 2023-176929, filed Oct. 12, 2023, Japanese Patent Application No. 2023-179321, filed Oct. 18, 2023, and, Japanese Patent Application No. 2023-179427, filed Oct. 18, 2023, which are hereby incorporated by reference herein in their entirety.

BACKGROUND OF THE INVENTION

Field of the Invention

The present invention relates to an image forming apparatus and a process cartridge.

Background Art

Conventionally, as image forming apparatuses for which an electrophotographic method is used, such as laser printers, copiers, and facsimile machines, image forming apparatuses in which an electrostatic latent image formed on an image bearing member, such as a photosensitive drum represented by an electrophotographic photosensitive member, is visualized with a developer (toner) have been in general use.

However, in a developing portion where a developer carrier and the photosensitive drum are brought close to and into contact with each other via the toner, there are some cases where the charge amount of the toner is insufficient, and the amount of a poorly charged toner or reverse-polarity toner becomes large. This poorly charged toner or reverse-polarity toner is developed in a background area where the toner did not adhere originally, and an image defect, such as so-called image fogging, is likely to be generated.

As a method for imparting charges to a toner, there is a method in which the toner is passed between a regulating member provided to be in contact with a developer carrier and the developer carrier or a method in which the toner is mixed with carrier particles. Here, if it is possible to carry charges to the toner even in the developing portion, it is possible to suppress an image problem, such as image fogging, even in a case where the quantity of charges imparted to the toner is insufficient in the regulating unit or the mixing unit. PTL 1 (Japanese Patent Application Publication No. 2019-078881) discloses a technique for triboelectrification of a toner in a developing nip using a photosensitive drum containing an acrylic resin provided in a surface layer.

Conventionally, in image forming apparatuses for which an electrophotographic method is used, a contact development method in which an electrostatic latent image formed on a photosensitive drum is developed in a state where the photosensitive drum and a developer carrier (a developing roller) of a developing apparatus are in contact with each other is used at the time of developing the electrostatic latent image with a developer (toner).

In a developing apparatus in which a developing roller is disposed in an opening portion of a toner container, a toner is sealed at an end portion in a rotation axis direction (longitudinal direction). As a general sealing method, there is a developing roller circumferential surface sealing method in which a toner seal member is pasted to a developing apparatus frame so as to face the circumferential surfaces of both end portions of the developing roller. In this method, the toner seal member is pressed against the circumferential surfaces of the developing roller to seal the toner. Therefore, on the circumferential surfaces of the developing roller, a toner coated region where a toner is carried and a toner non-coated region where no toners are carried at both end portions are formed.

Here, in the contact developing type developing apparatus, the amount of heat generated by friction between the photosensitive drum and the developing roller is large particularly at the end portion of the developing roller, and the temperature is likely to increase. This is because the toner acts as a lubricant between the photosensitive drum and the developing roller, sliding is thus more difficult in the toner non-coated region than in the toner coated region, and the frictional force is higher. Therefore, in the contact developing type developing apparatus, a problem such as breakage of the end portion of the developing roller or fusion of the toner arising from an increase in the temperature at the end portion of the developing roller may be generated. Therefore, there is a concern that such a problem may hinder the extended service life or speeding up of process cartridges, which has come to be required in recent years.

Regarding such a problem, PTL 2 (Japanese Patent No. 6929182) or PTL 3 (Japanese Patent No. 4027407) has been proposed as a configuration for suppressing the frictional force between a photosensitive drum and a developing roller. PTL 2 (Japanese Patent No. 6929182) is a configuration in which a lubricant having a first average particle diameter smaller than the surface roughness Ra of a developing roller is applied to a toner non-coated region.

PTL 3 (Japanese Patent No. 4027407) is a configuration in which 20 to 1000 grooves with a width of 0.5 to 40 μm are formed per a width of 1000 μm in the longitudinal direction on the circumferential surface of a photosensitive drum.

Conventionally, image forming apparatuses that form images using an electrophotographic process, such as copiers or laser printers, have been known. In this image forming apparatus, in a transfer step, a toner image formed on the surface of a photosensitive drum is electrostatically transferred onto an intermediate transfer body or a recording material by applying a voltage from a voltage power source to a transfer member disposed in a portion facing the photosensitive drum as an image bearing member. In the case of forming a multicolored toner image, this transfer step is repeatedly performed with respect to the multicolored toner image, thereby forming the multicolored toner image on the surface of the intermediate transfer body or the recording material. The toner that is not transferred from the photosensitive drum to the intermediate transfer body or the recording material is removed from the photosensitive drum with a cleaning member and is contained as waste toner in a waste toner containing portion in a cleaning unit.

Recently, a cleaner-free system has been proposed in which a cleaning system for the surface of a photosensitive drum is not provided for the purpose of reducing the size of the device. In order to realize the cleaner-free system, it is required to improve the transfer efficiency of a toner image from the photosensitive drum to the intermediate transfer body, thereby reducing the amount of a transfer residual toner remaining on the surface of the photosensitive drum after the transfer of the toner image with the transfer member.

PTL 4 (Japanese Patent Application Publication No. 2014-002364) has proposed a configuration in which, in order to realize the cleaner-free system, particles are contained on the surface of a photosensitive drum to form convex shapes to bring a toner and the surface of the photosensitive drum into point contact with each other, thereby reducing the adhesive force between the photosensitive drum and the toner and improving the transfer efficiency.

However, in PTL 1 (Japanese Patent Application Publication No. 2019-078881), charges are imparted to the toner by the rolling of the toner in the developing portion. PTL 1 (Japanese Patent Application Publication No. 2019-078881) discloses that the rolling of the toner is promoted by increasing the difference in circumferential speed between the developer carrier and the photosensitive drum. However, other conditions for promoting the rolling of the toner have not yet been clarified, and there has been a concern that it may not be possible to stably impart charges to the toner in the developing portion.

An object of the present invention is to provide an image forming apparatus and a process cartridge that are capable of suppressing the generation of an image defect due to insufficient charging of a toner.

However, in the configuration of PTL 2 (Japanese Patent No. 6929182), along with the extended service life or speeding up of process cartridges, the effect of suppressing an increase in temperature becomes weak in some cases due to depletion of the lubricant in the end portion of the developing roller. In addition, in the configuration of PTL 3 (Japanese Patent No. 4027407), when the widths, number, or the like of the grooves are increased too much to further suppress an increase in temperature, images may be affected (such as deterioration of halftone uniformity).

In view of the above-described problems, an object of the present invention is to provide a technique for suppressing an increase in temperature in an end portion of a developing roller in a developing apparatus while suppressing the influence on an image in a contact developing type image forming apparatus.

However, when the adhesive force between the photosensitive drum and the toner is reduced, the adhesive forces between the other members and the toner become relatively large, which may cause a problem. For example, in a configuration in which a charging roller that rotates in contact with the photosensitive drum is provided as charging means for charging the surface of the photosensitive drum to an arbitrary potential, the transfer residual toner is likely to adhere to the charging roller. Therefore, there are cases where the charging roller is covered with the toner and a charging defect may be thus generated. Conventionally, when nipped between the photosensitive drum and the charging roller, the transfer residual toner is peeled off from the charging roller due to an electrical force, most of the toner thus adheres to the photosensitive drum, and the adhesion of the toner to the charging roller is suppressed. However, when the adhesive force between the photosensitive drum and the transfer residual toner is reduced, and the adhesive force between the charging roller and the transfer residual toner becomes relatively large, the transfer residual toner is not peeled off from the charging roller only due to the electrical force, the transfer residual toner adheres to the charging roller, and a charging defect is caused.

The present invention has been made in view of the above-described problems, and an object of the present invention is to reduce the adhesive force between a photosensitive drum and a toner to improve transfer efficiency and suppress adhesion of the toner to other members that come into contact with the photosensitive drum in a cleaner-free image forming apparatus.

CITATION LIST

Patent Literature

PTL 1: Japanese Patent Application Publication No. 2019-078881

PTL 2: Japanese Patent No. 6929182

PTL 3: Japanese Patent No. 4027407

PTL 4: Japanese Patent Application Publication No. 2014-002364

SUMMARY OF THE INVENTION

The present invention employs the following configuration. That is, an image forming apparatus, including:

an image bearing member in which an electrostatic latent image is formed on a surface, and a developer carrier that carries a developer and comes into contact with the image bearing member to supply the developer to develop the electrostatic latent image, wherein the developer contains a toner particle having a toner base particle and convex portions provided on a surface of the toner base particle, in an image obtained by cross-sectional observation of the toner particle with a scanning transmission electron microscope (STEM), a line is drawn along a circumference of the surface of the toner base particle, in a horizontal image converted on the basis of the line along the circumference, when a length of the line along the circumference in a portion where the convex portion is present on the line that is formed by the circumference of the surface of the toner base particle is defined as a convex width W, a maximum length of the convex portion in a normal direction to the convex width W is defined as a convex maximum length D, a length from an apex of the convex portion to the line along the circumference in a line segment that forms the convex maximum length D is defined as a convex height H, and the convex portion where the convex maximum length D and the convex height H are equal to each other and the convex height H is 20 nm or more is defined as a convex portion Y, a number-based average of the convex widths W in the convex portions Y is at least 40 nm and not more than 200 nm, when a width of the horizontal image based on the cross-sectional observation of the toner particle with the scanning transmission electron microscope (STEM) is defined as a circumferential length L, and a total of the convex widths W of the convex portions Y is indicated by ΣW, ΣW/L is 0.5 or more, the image bearing member has image bearing member convex portions, which are a plurality of convex portions, on a surface layer, and when among the image bearing member convex portions, a convex portion having a height of 10 nm or more is defined as a convex portion CA, and the surface layer of the image bearing member is viewed from above, an average value of distances between centers of gravity of the convex portions CA is at least 150 nm and not more than 500 nm, and a number-based average of the convex widths W of the convex portions Y on the surface of the toner particle in the developer is smaller than an average distance between the centers of gravity of the convex portions CA of the image bearing member.

The present invention also employs the following configuration. That is, a process cartridge, including:

an image bearing member in which an electrostatic latent image is formed on a surface, and a developer carrier that carries a developer and comes into contact with the image bearing member to supply the developer to develop the electrostatic latent image, wherein the developer contains a toner particle each having a toner base particle and convex portions provided on a surface of the toner base particle, in an image obtained by cross-sectional observation of the toner particle with a scanning transmission electron microscope (STEM), a line is drawn along a circumference of the surface of the toner base particle, in a horizontal image converted on the basis of the line along the circumference, when a length of the line along the circumference in a portion where the convex portion is present on the line that is formed by the circumference of the surface of the toner base particle is defined as a convex width W, a maximum length of the convex portion in a normal direction to the convex width W is defined as a convex maximum length D, a length from an apex of the convex portion to the line along the circumference in a line segment that forms the convex maximum length D is defined as a convex height H, and the convex portion where the convex maximum length D and the convex height H are equal to each other and the convex height H is 20 nm or more is defined as a convex portion Y, a number-based average of the convex widths W in the convex portions Y is at least 40 nm and not more than 200 nm, when a width of the horizontal image based on the cross-sectional observation of the toner particle with the scanning transmission electron microscope (STEM) is defined as a circumferential length L, and a total of the convex widths W of the convex portions Y is indicated by $\Sigma W$, $\Sigma W/L$ is 0.5 or more, the image bearing member has image bearing member convex portions, which are a plurality of convex portions, on a surface layer, and when among the image bearing member convex portions, a convex portion having a height of 10 nm or more is defined as a convex portion CA, and the surface layer of the image bearing member is viewed from above, an average value of distances between centers of gravity of the convex portions CA is at least 150 nm and not more than 500 nm, and a number-based average of the convex widths W of the convex portions Y on the surfaces of the toner base particles in the developer is smaller than an average distance between the centers of gravity of the convex portions CA of the image bearing member.

The present invention employs the following configuration. That is, a process cartridge including:

an image bearing member on which an electrostatic latent image is formed, and a developing apparatus having a developer carrier that carries a developer and supplies the developer to the image bearing member while coming into contact with the image bearing member to develop the electrostatic latent image, a frame body that supports an end portion of the developer carrier in a longitudinal direction so as to be capable of rotating, a developer container that contains the developer, and a seal member that seals the developer between the end portion of the developer carrier and the frame body, wherein a surface of the developer carrier includes a first region that are positioned on both end sides in the longitudinal direction and include a range in which the developer carrier is in contact with the seal member and a second region that is positioned inside the first region in the longitudinal direction and is not in contact with the seal member, and a relationship between a maximum height difference $Rz1$ on the surface of the image bearing member facing the first region and a maximum height difference $Rz2$ on the surface of the image bearing member facing the second region is $Rz1>Rz2$.

The present invention also employs the following configuration. That is, an image forming apparatus to which a process cartridge can be attached, the image forming apparatus including:

an image bearing member on which an electrostatic latent image is formed, and a developing apparatus having a developer carrier that carries a developer and supplies the developer to the image bearing member while coming into contact with the image bearing member to develop the electrostatic latent image, a frame body that supports an end portion of the developer carrier in a longitudinal direction so as to be capable of rotating, a developer container that contains the developer, and a seal member that seals the developer between the end portion of the developer carrier and the frame body, wherein a surface of the developer carrier includes a first region that are positioned on both end sides in the longitudinal direction and include a range in which the developer carrier is in contact with the seal member and a second region that is positioned inside the first region in the longitudinal direction and is not in contact with the seal member, and a relationship between a maximum height difference $Rz1$ on the surface of the image bearing member facing the first region and a maximum height difference $Rz2$ on the surface of the image bearing member facing the second region is $Rz1>Rz2$.

The present invention employs the following configuration. That is, an image forming apparatus capable of containing a developer, the image forming apparatus having:

an image bearing member; and a charging member that comes into contact with the image bearing member and charges the image bearing member to a predetermined potential, wherein the developer is composed of a toner particle and transfer accelerating particles that adhere to a surface of the toner particle, the transfer accelerating particles have an average particle diameter of at least 30 nm and not more than 1000 nm, the image bearing member has a surface layer containing particles and a binder resin, the particles that are contained in the surface layer have a plurality of peaks in a number-based particle size distribution, when among peaks having a peak top of 20 nm or more in the particle size distribution out of the plurality of peaks, a peak having a maximum peak top frequency is defined as a first peak, and a peak having a second maximum peak top frequency after the first peak is defined as a second peak, a particle diameter DA for a peak top having a larger value of particle diameter for the peak top between the first peak and the second peak is at least 80 nm and not more than 300 nm, when among the particles that are contained in the surface layer, particles having a particle diameter within a range of DA±20 nm are defined as particles PAA, and convex portions that are derived from the particles PAA and have a height of at least 10 nm and not more than 300 nm are defined as convex portions CA, the convex portions CA are disposed on a surface of the surface layer, and when the surface layer is viewed from above, an average value of distances between centers of gravity of the convex portions CA is at least 150 nm and not more than 500 nm, and a standard deviation of the distances between the centers of gravity of the convex portions CA is 250 nm or less.

The present invention also uses the following configuration. That is, a process cartridge having:

an image bearing member; and a charging member that comes into contact with the image bearing member and charges the image bearing member to a predetermined potential, the process cartridge being capable of containing a developer, wherein the developer is composed of a toner particle and transfer accelerating particles that adhere to a surface of the toner particle, the transfer accelerating particles have an average particle diameter of at least 30 nm and not more than 1000 nm, the image bearing member has a surface layer containing particles and a binder resin, the particles that are contained in the surface layer have a plurality of peaks in a number-based particle size distribution, when among peaks having a peak top of 20 nm or more in the particle size distribution out of the plurality of peaks, a peak having a maximum peak top frequency is defined as a first peak, and a peak having a second maximum peak after the first peak top frequency is defined as a second peak, a particle diameter DA for a peak top having a larger value of particle diameter for the peak top between the first peak and the second peak is at least 80 nm and not more than 300 nm, when among the particles that are contained in the surface layer, particles having a particle diameter within a range of DA±20 nm are defined as particles PAA, and convex portions that are derived from the particles PAA and have a height of at least 10 nm and not more than 300 nm are defined as convex portions CA, the convex portions CA are disposed on a surface of the surface layer, and when the surface layer is viewed from above, an average value of distances between centers of gravity of the convex portions CA is at least 150 nm and not more than 500 nm, and a standard deviation of the distances between the centers of gravity of the convex portions is 250 nm or less.

Further features of the present invention will become apparent from the following description of exemplary embodiments with reference to the attached drawings.

DESCRIPTION OF THE EMBODIMENTS

Hereinafter, suitable examples of the present invention will be illustratively described in detail with reference to the accompanying drawings.

Here, the dimensions, materials, and shapes of components to be described in the following examples, relative dispositions thereof, and the like should be changed as appropriate depending on the configurations of devices to which the present invention is applied or a variety of conditions.

Therefore, unless particularly specified, the dimensions, materials, and shapes of components to be described in the following examples, relative disposition thereof, and the like are not intended to limit the scope of the present invention.

A plurality of features will be described in examples, but all of the plurality of features are not necessarily essential to the invention, and the plurality of features may be optionally combined.

Example 1

1. Image Forming Apparatus

Figure 13:
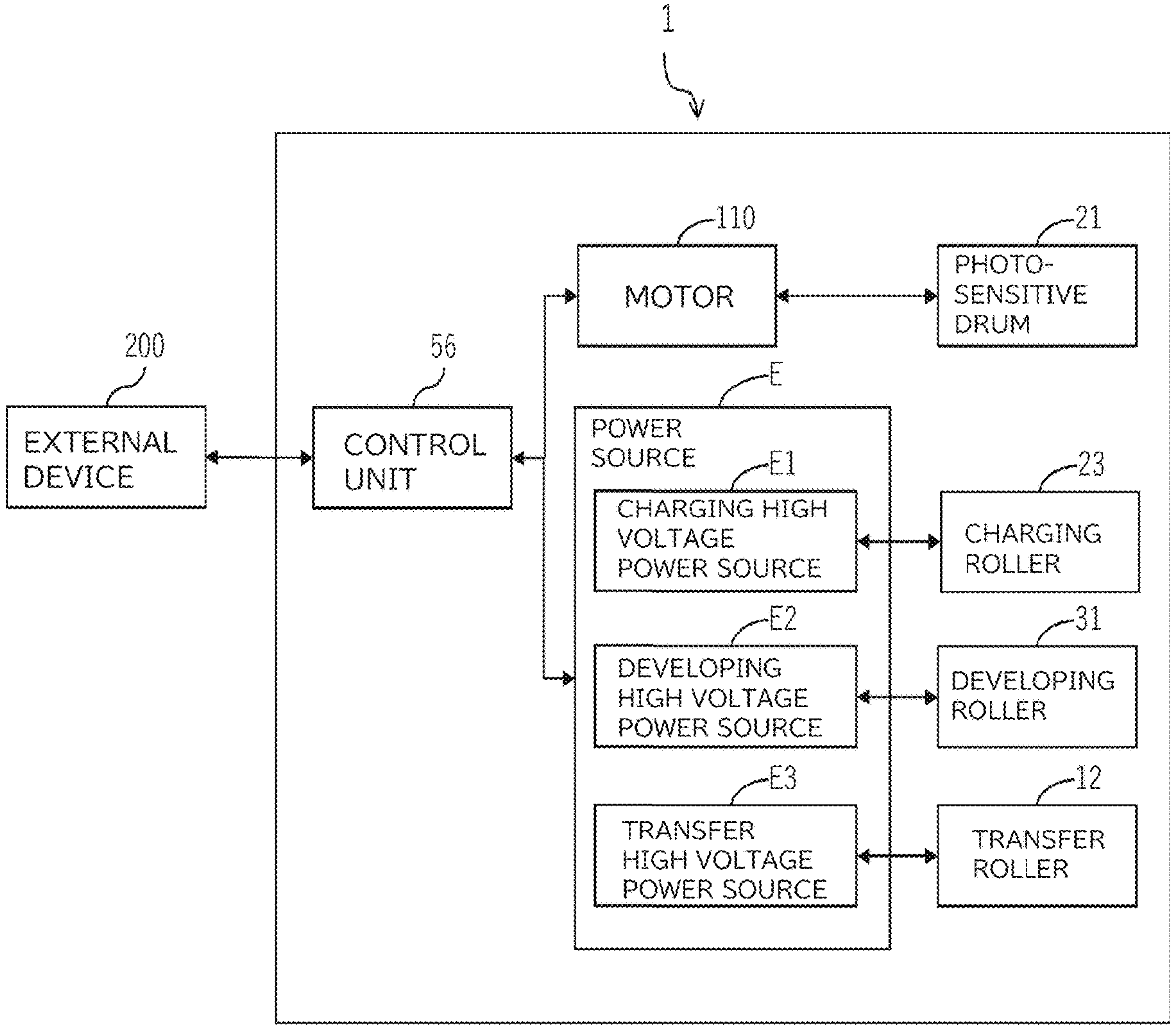
FIG. 13 is a block diagram showing the functional configuration of the image forming apparatus in the present invention.

FIG. 1 is a schematic view showing the configuration of an image forming apparatus 1 according to Example 1. FIG. 13 is a block diagram showing the functional configuration of the image forming apparatus 1. The image forming apparatus 1 is a monochrome printer that forms an image on a recording material P based on image information that is input from an external device 200. Examples of the recording material P include papers such as plain paper and cardboard, plastic films such as overhead projector sheets, sheets having a special shape such as envelopes and index paper, and a variety of sheet materials having different paper qualities such as cloth.

Figure 1A:
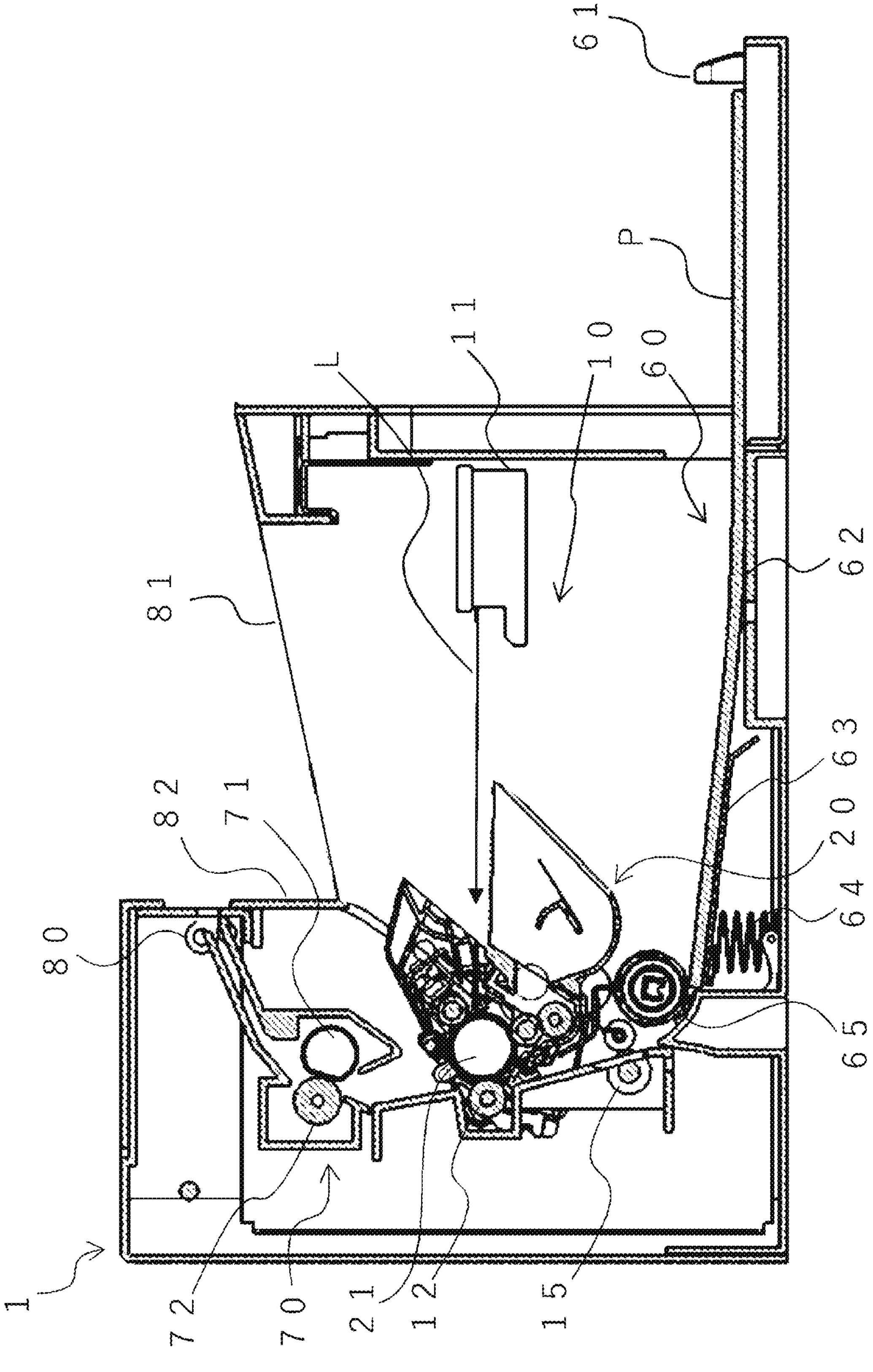
FIG. 1A is a schematic view of a cross section of an image forming apparatus in the present invention.

As shown in FIG. 1A, the image forming apparatus 1 has an image forming unit 10 that forms a toner image on the recording material P, a feeding unit 60 that feeds the recording material P to the image forming unit 10, a fixing unit 70 that fixes the toner image formed by the image forming unit 10 to the recording material P, and a pair of discharge rollers 80.

Figure 1B:
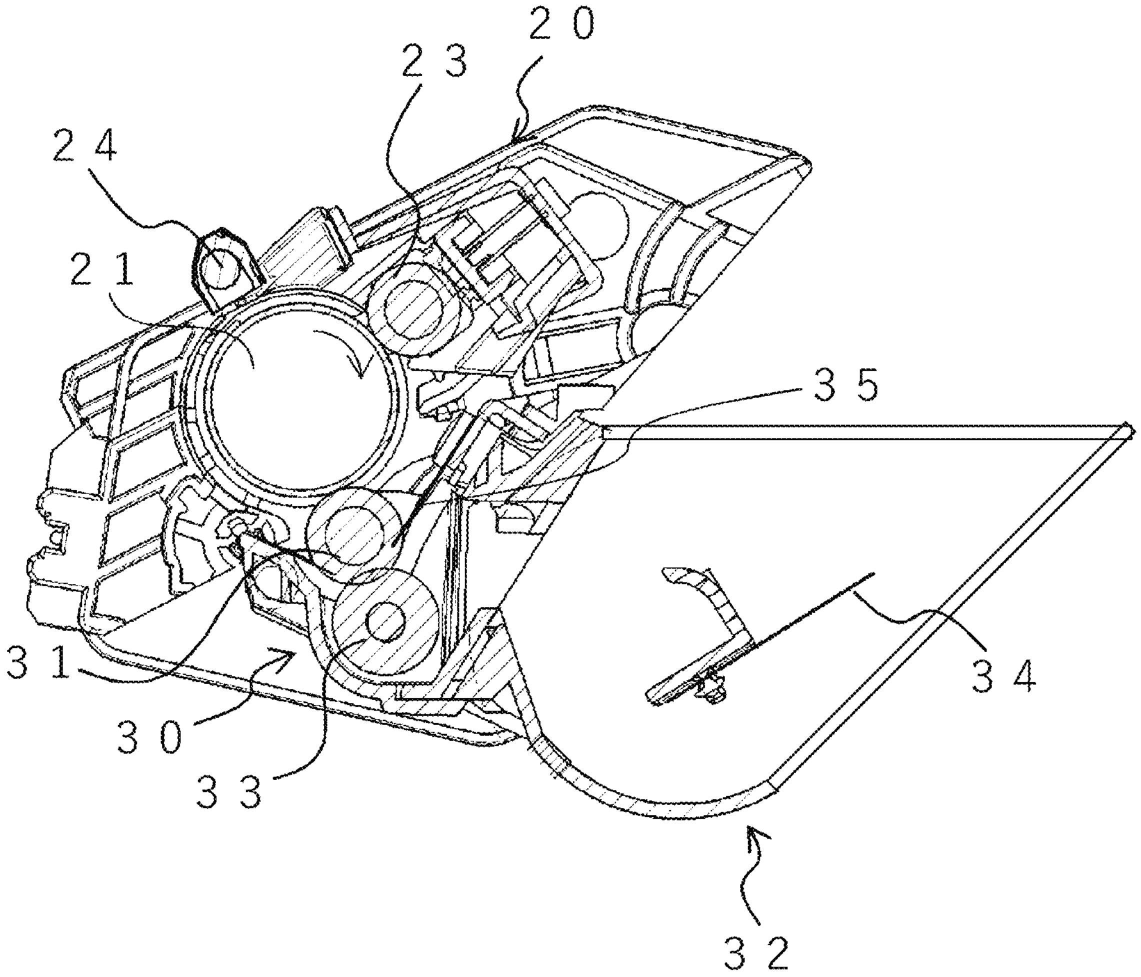
FIG. 1B is a schematic view of a cross section of a process cartridge in the present invention.

The image forming unit 10 has a scanner unit 11, an electrophotographic process cartridge 20, and a transfer roller 12 that transfers the toner image formed on a photosensitive drum 21 in the process cartridge 20 to the recording material P. A detailed view of the process cartridge 20 is shown in FIG. 1B. The process cartridge 20 has the photosensitive drum 21, a charging roller 23 disposed on the circumference of the photosensitive drum 21, a pre-exposure device 24, and a developing apparatus 30 including a developing roller 31. When an image forming command is input to the image forming apparatus 1, an image forming process by the image forming unit 10 is started on the basis of image information input from an external computer connected to the image forming apparatus 1.

The photosensitive drum 21 as an image bearing member is driven to rotate in a predetermined direction (clockwise direction in FIG. 1B) at a predetermined process speed by a motor 110 controlled by a control unit 56. The control unit 56 is composed of an information processing device such as a control circuit or a computer and controls each component by sending and receiving information to and from the external device 200 or communicating with each component of the image forming apparatus 1.

The charging roller 23 comes into contact with the photosensitive drum 21 with a predetermined pressure force and uniformly charges the surface of the photosensitive drum 21 to a predetermined potential when a desired charging voltage is applied thereto by a charging high voltage power source E1. In the present example, the surface of the photosensitive drum 21 is charged to −600 V by the charging roller 23. The pre-exposure device 24 neutralizes the surface potential of the photosensitive drum 21 that is to enter a charging portion for stable charging by the charging roller 23. The charging high voltage power source E1 may be included in the configuration of a power source E together with a developing high voltage power source E2 or a transfer high voltage power source E3 as shown in FIG. 13 or the power sources may be each composed of a separate power source device.

The scanner unit 11, which is an exposure unit, irradiates the photosensitive drum 21 with a laser beam LX using a polygon mirror based on the input image information to scan and expose the photosensitive drum, thereby forming an electrostatic latent image on the photosensitive drum 21. The scanner unit 11 is not limited to a laser scanner, and for example, an LED exposure device having an LED array in which a plurality of LEDs are arranged along the longitudinal direction of the photosensitive drum 21 may be employed.

The electrostatic latent image formed on the photosensitive drum 21 is developed by the developing apparatus 30, and a toner image is formed on the photosensitive drum 21.

Subsequently, the process cartridge 20 will be described. The process cartridge 20 shown in detail in FIG. 1B has the developing apparatus 30. In detail, the developing apparatus 30 includes the developing roller 31 as a developer carrier that carries a toner as a developer, a developer container 32 that serves as the frame of the developing apparatus 30, and a supply roller 33 capable of supplying the toner to the developing roller 31. The developing roller 31 and the supply roller 33 are supported by the developer container 32 so as to be capable of rotating. In addition, the developing roller 31 is disposed in an opening portion of the developer container 32 so as to face the photosensitive drum 21. The supply roller 33 is in contact with the developing roller 31 so as to be capable of rolling, and the toner that is contained in the developer container 32 as the developer is applied by the supply roller 33 to the surface of the developing roller 31.

A stirring member 34 is provided in the developer container 32 as stirring means. The stirring member 34 is driven to be rotated, whereby the toner in the developer container 32 is stirred, and the toner is fed toward the developing roller 31 and the supply roller 33. In addition, the stirring member 34 plays a role of circulating the toner that has not been used for development and has been stripped from the developing roller 31 in the developer container and making the toner in the developer container uniform.

In addition, a developing blade 35 made of an SUS plate that regulates the amount of the toner carried on the developing roller 31 is disposed in the opening portion of the developer container 32 in which the developing roller 31 is disposed. It is also possible to apply a voltage different from that for the developing roller 31 to the developing blade 35. The toner supplied to the surface of the developing roller 31 passes through a portion facing the developing blade 35 in association with the rotation of the developing roller 31, whereby the toner uniformly forms a thin layer.

In the developing apparatus 30 of the present example, a contact developing method is used as a developing method. That is, the toner layer carried on the developing roller 31 comes into contact with the photosensitive drum 21 in the developing portion (developing region) where the photosensitive drum 21 and the developing roller 31 face each other. In the present example, the photosensitive drum 21 is rotated at a surface speed of 150 mm/sec, and the difference in the surface speed of the developing roller 31 relative to the surface speed of the photosensitive drum 21 (hereinafter, referred to as the development circumferential speed difference) is 40%. That is, the developing roller 31 is rotating at 150×1.4=210 mm/sec. This makes the photosensitive drum 21 and the developing roller 31 come into contact with each other at a speed difference of 60 mm/s. A developing voltage is applied to the developing roller 31 by the developing high voltage power source E2, which is a developing voltage application portion. Under a condition where the developing voltage is being applied, the toner carried on the developing roller 31 spreads from the developing roller 31 to the surface of the photosensitive drum 21 according to the potential distribution on the surface of the photosensitive drum 21, whereby the electrostatic latent image is developed into a toner image. In the present example, a developing voltage of −400 V is applied to the developing roller 31. A back contrast Vback, which is the absolute value of a potential difference between the surface of the photosensitive drum 21 and the developing roller 31 in a non-exposed portion Vd before the developing region is passed, is 200 V. In the present embodiment, a reversal developing method is employed. That is, the toner adheres to the surface region of the photosensitive drum 21 where the quantity of charges has been decreased due to charging in the charging step and then exposure in the exposure step, whereby a toner image is formed.

In parallel with the above-described image forming process, the recording material P contained in the feeding unit 60 is fed out in accordance with the transfer timing of the toner image. The feeding unit 60 has a front door 61 that is supported by the image forming apparatus 1 to be opened and closed, a loading tray 62, an intermediate plate 63, a tray spring 64, and a pick-up roller 65. The loading tray 62 configures the bottom surface of a containing space of the recording material P that appears when the front door 61 is opened, and the intermediate plate 63 is supported by the loading tray 62 to be raised and lowered. The tray spring 64 urges the intermediate plate 63 upward and presses the recording material P loaded on the intermediate plate 63 against the pick-up roller 65. A recording material P conveyance step will be described. First, the pick-up roller 65 in the feeding unit 60 feeds out the recording material P supported by the front door 61, the loading tray 62, and the intermediate plate 63. Next, the recording material P is fed to a pair of registration rollers 15 by the pick-up roller 65 and made to run into the nip between the pair of registration rollers 15, whereby skewed movement is corrected. In addition, the pair of registration rollers 15 is driven in accordance with the transfer timing of the toner image and conveys the recording material P toward a transfer nip that is formed by the transfer roller 12 and the photosensitive drum 21.

A transfer voltage is applied to the transfer roller 12 as transfer means from the transfer high voltage power source E3, and the toner image that is carried on the photosensitive drum 21 is transferred to the recording material P that is conveyed by the pair of registration rollers 15.

The recording material P to which the toner image has been transferred is conveyed to the fixing unit 70, and the toner image is heated and pressurized when passing through a nip portion between a fixing film 71 and a pressure roller 72 in the fixing unit 70. This makes the toner particle melted and then fixed, whereby the toner image is fixed to the recording material P.

Here, the fixing unit 70 is of a heat fixation type unit that fixes an image by heating and melting the toner on the recording material. The fixing unit 70 includes the fixing film 71, a fixing heater that heats the fixing film 71, such as a ceramic heater, a thermistor that measures the temperature of the fixing heater, and the pressure roller 72 that is brought into pressure contact with the fixing film 71.

The recording material P that has passed through the fixing unit 70 is discharged to the outside of the image forming apparatus 1 by the pair of discharge rollers 80 and is loaded on a discharge tray 81. The discharge tray 81 is inclined upward downstream in the discharge direction of the recording material, and the recording material discharged to the discharge tray 81 slides down on the discharge tray 81, whereby the rear end is aligned by a regulation surface 82.

In the present example, the process cartridge 20 that has been made detachable from the main body of the image forming apparatus 1 is used, but the configuration is not limited thereto as long as a predetermined image forming process can be performed. For example, a developing cartridge from which the developing apparatus 30 is detachable, a drum cartridge from which a drum unit is detachable, a toner cartridge that supplies a toner to the developing apparatus 30 from the outside, or a detachable cartridge may not be used. In addition, the image forming apparatus may be provided with a plurality of process cartridges 20 so as to be capable of forming color images.

In the present example, the surface of the photosensitive drum 21 is charged by the charging roller 23, but the configuration is not limited thereto. A charging member simply needs to be capable of charging the surface of the photosensitive drum, and, for example, a conductive brush may be used as the charging member.

In the present example, a so-called cleaner-free method in which a cleaning member that collects the toner on the photosensitive drum 21 that has not been transferred to the recording material P in the transfer process is not provided is used, but the configuration is not limited thereto, and a cleaning member may be provided.

2. Photosensitive Drum

The photosensitive drum 21 which is an image bearing member of the present invention has a surface layer.

Here, the surface layer is a layer that is located on the outermost surface of a photosensitive member and means a layer in contact with the charging member or the toner.

Figure 2:
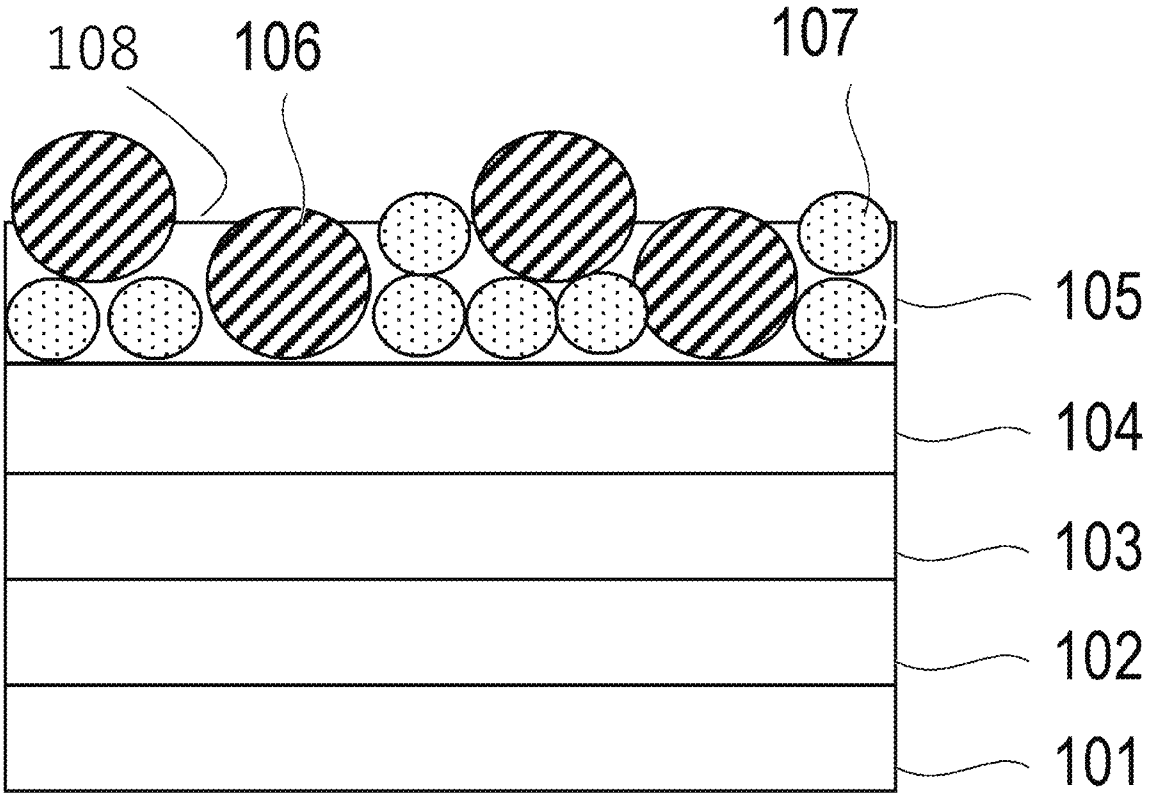
FIG. 2 is a schematic view showing the layer configuration of a photosensitive drum in the present invention.
Figure 3:
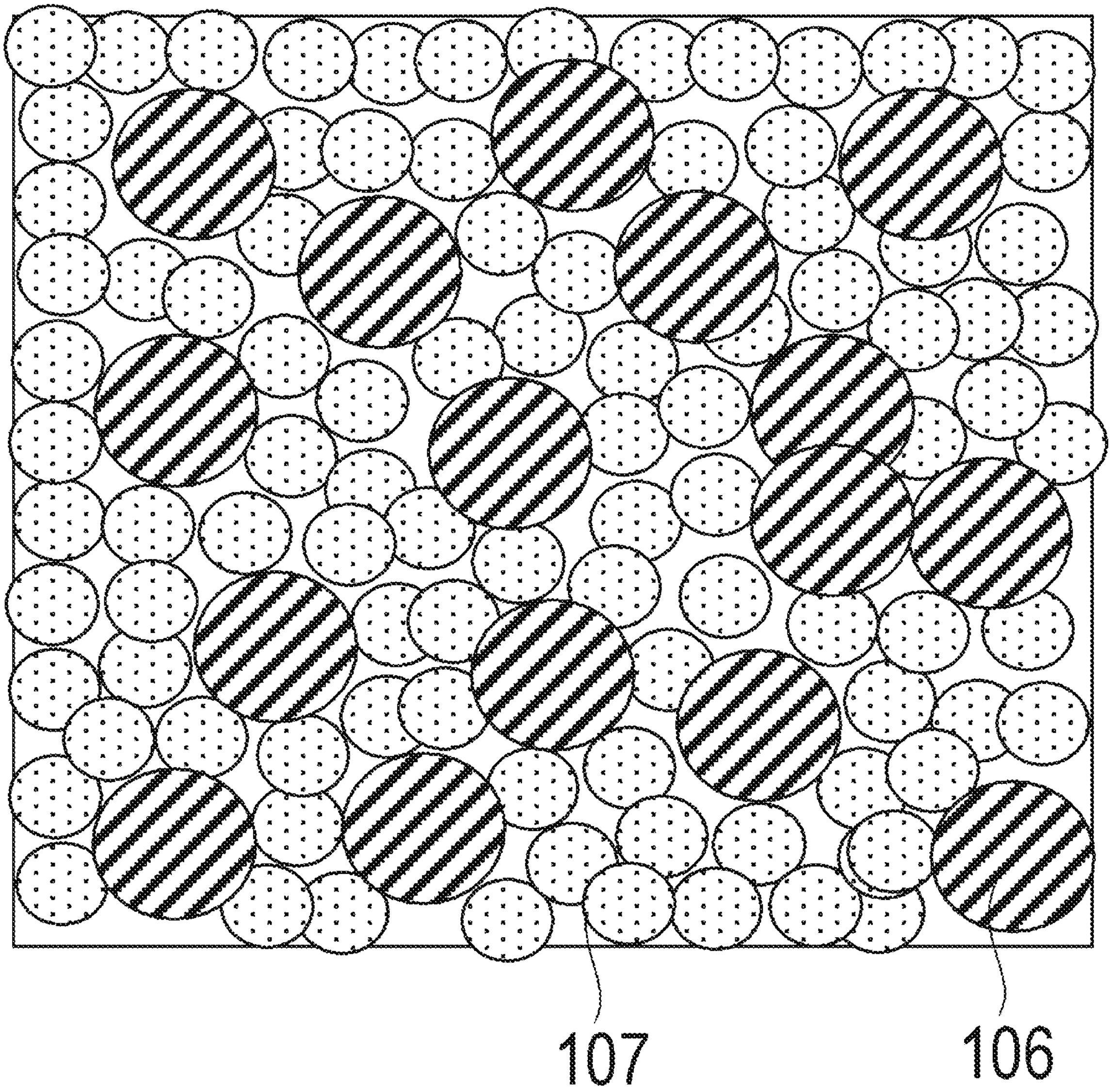
FIG. 3 is a schematic view showing the appearance of the photosensitive drum in the present invention as viewed from above.

FIG. 2 and FIG. 3 are views showing one example of the layer configuration of the photosensitive drum 21 according to the present example. FIG. 2 is a schematic cross-sectional view, and FIG. 3 is a schematic top view. In FIG. 2 and FIG. 3, reference sign 101 is a support, reference sign 102 is an undercoating layer, reference sign 103 is a charge generation layer, and reference sign 104 is a charge transport layer. Reference sign 105 is a surface layer according to the present invention, and in the present example, particles PAA 106 and particles 107 other than the particles PAA are present in the surface layer.

Examples of a method for manufacturing an electrophotographic photosensitive member of the present invention include methods in which a coating liquid for each layer to be described below is prepared, applied in desired layer order, and dried. At this time, examples of a method for applying the coating liquid include dip coating, spray coating, inkjet coating, roll coating, die coating, blade coating, curtain coating, wire bar coating, ring coating, dispense coating, and the like. Among these, dip coating is preferable from the viewpoint of efficiency and productivity.

Hereinafter, each layer will be described.

As a result of the present inventor's studies, in the image bearing member of the present invention, the image bearing member has a plurality of convex portions on a surface layer, when convex portions having a height of 10 nm or more among the convex portions are defined as convex portions CA, and the surface layer is viewed from above, the average value of the distances between the centers of gravity of the convex portions CA is at least 150 nm and not more than 500 nm, when in an observation image including the convex portions CA on the surface that is obtained by cross-sectional observation of the toner particle with a scanning transmission electron microscope (STEM) of a toner that is a developer to be described below, a line is drawn along the circumference of the surface of the toner base particle, in a horizontal image converted on the basis of the line along the circumference, the length of the line along the circumference in a portion where the convex portion is present on the line that is formed by the circumference of the toner base particle is defined as a convex width W, the maximum length of the convex portion in a normal direction to the convex width W is indicated by D, the length from the apex of the convex portion to the line along the circumference in a line segment that forms the D is indicated by H, and a convex portion having a convex height H of 20 nm or more is defined as a convex portion Y, the average value of the distances between the centers of gravity of the convex portion CA needs to be larger than the number average value of the convex widths W of the convex portion Y on the surface.

The present inventors consider the reason for the photosensitive drum 21 having the above-described convex shapes on the surface layer exhibiting a fogging suppression effect when combined with a toner having convex shapes on the surface as described below.

In the contact developing method in which the developing roller 31, which is a developer carrier, and the photosensitive drum 21 come into contact with each other in the developing portion, the toner rolls in the developing portion, whereby it is possible to impart charges to the toner. In a case where the surface speed of the developing roller 31 is faster than that of the photosensitive drum 21 as shown in the present example, the toner conveyed to the developing roller 31 receives a force in a direction opposite to the conveyance direction from the photosensitive drum 21 in the developing portion, and a rolling force is generated on the toner. In a case where the surface speed of the photosensitive drum 21 is faster than that of the developing roller 31, the toner receives a force in the conveyance direction in the developing portion.

Figure 4A:
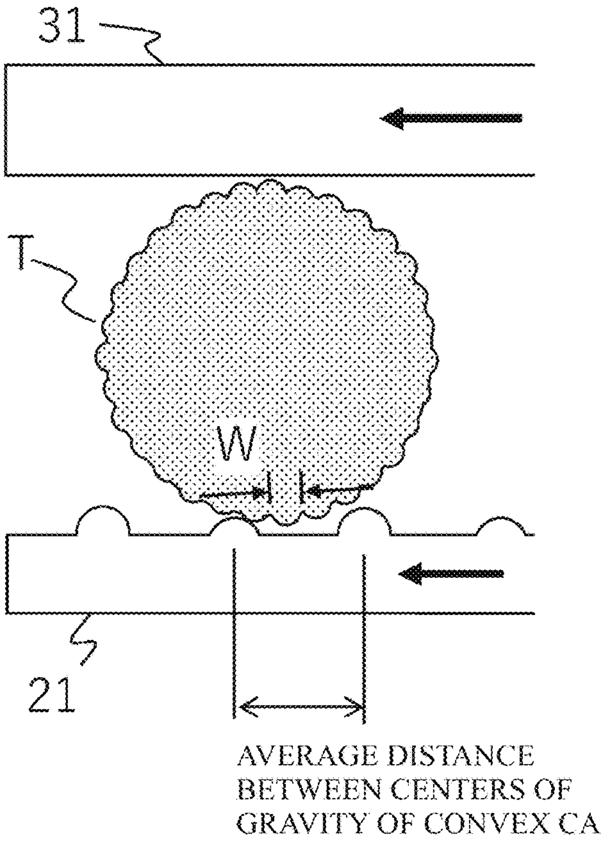
FIGS. 4A and 4B are schematic views showing a rolling promotion effect in a developing portion in the present invention.
Figure 4B:
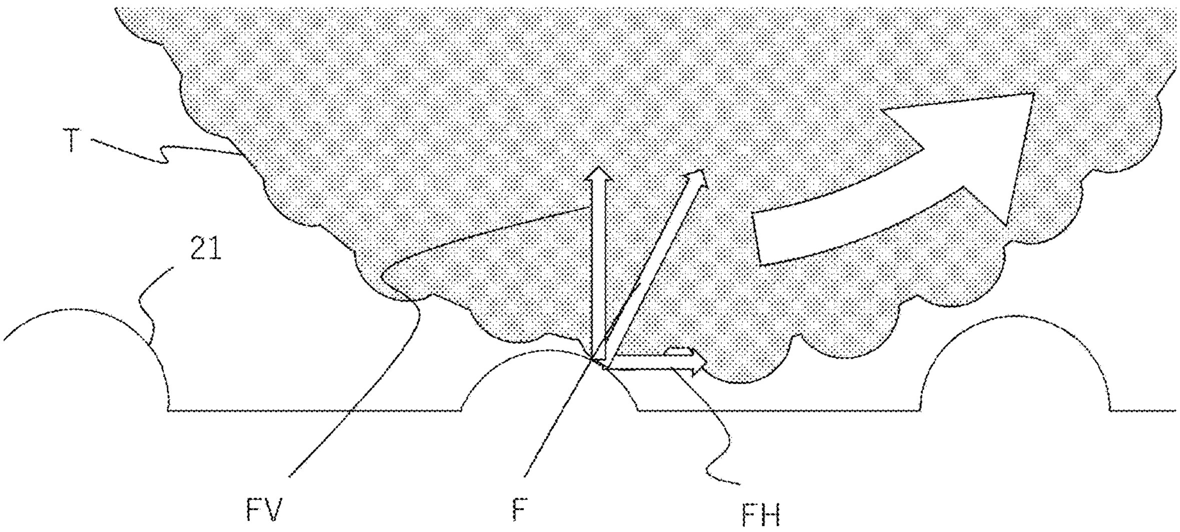

Here, when the surface of the photosensitive drum 21 and the surface of the toner base particle have convex shapes as shown in FIG. 4A, a contact force F as shown in FIG. 4B is generated at the contact portion between a convex portion on the photosensitive drum surface layer (image bearing member convex portion) and a convex portion on the toner base particle surface. The convex portions on the photosensitive drum surface and the toner base particle surface are smaller than the diameter of the photosensitive drum or the volume average particle diameter of the toner by one order of magnitude or more and thus have a small curvature and are likely to have a contact force in the tangential direction.

FIG. 4A schematically shows an appearance in which the number average of the convex widths W in a plurality of the convex portions Y present on the surface of the toner base particle of the toner, which is a developer to be described below, is smaller than the average distance between the centers of gravity of the convex portions CA on a surface layer 105 of the photosensitive drum 21 to be described below in FIG. 6. In this case, the apexes of the convex portions Y on the toner base particle surface enter a recessed portion formed between the convex portions CA on the surface of the photosensitive drum 21, which is a disposition in which the force that rolls the toner becomes large due to the contact between the convex portions of the photosensitive drum 21 and the toner.

FIG. 4B shows a relationship among contact forces at this time in an enlarged manner. A contact force F can be divided into a force FH in the tangential direction and a force FV that presses the toner against the developing roller 31. In the present example, the force FH in the tangential direction is the force that rolls the toner. When the rolling force FH is large, it is considered that a force that peels off the toner from the surface of the developing roller 31 and rolls the toner in the developing portion is more effectively exerted and the rolling of the toner can be promoted.

When a convex portion having a height of 10 nm or more among the convex portions present on the surface layer 105 of the photosensitive drum 21 is defined as the convex portion CA, if the average distance between the centers of gravity of the convex portions CA on the surface of the photosensitive drum 21 is shorter than 150 nm, the convex portions of the toner hardly enter a recessed portion between the convex portions CA of the photosensitive drum 21. At this time, the photosensitive drum 21 and the convex portions on the surface of the toner base particle in the toner are likely to come into contact with each other at the apexes. As a result, the component of the force FV in FIG. 4B becomes large, and a sufficient rolling force FH cannot be obtained. In addition, when the average distance between the centers of gravity of the convex portions CA on the surface of the photosensitive drum 21 is larger than 500 nm, it is considered that a toner having a volume average particle diameter of 3.0 μm to 10.0 μm, which is used in the present invention, is stuck between the convex portions of the photosensitive drum 21 and less likely to move and the toner does not sufficiently roll. Therefore, when the distance between the centers of gravity is in a range of at least 150 nm and not more than 500 nm, the convex portions on the surface of the toner base particle in the toner and the convex portions of the convex CA portions on the surface of the photosensitive drum 21, which are present in the developing portion, are disposed to be in contact with each other such that the rolling force FH is sufficiently generated, and it is possible to promote the rolling.

The distance between the centers of gravity in the present invention is more preferably at least 150 nm and not more than 450 nm and still more preferably at least 150 nm and not more than 400 nm.

In addition, it is considered that as the standard deviation of the distances between the centers of gravity of the convex CA portions on the surface becomes smaller, the unevenness in the distances between the centers of gravity of the convex CA portions becomes smaller, the rolling promoting action occurs more uniformly, and charges are more stably imparted to the toner by rolling. In a case where the average of the distances between the centers of gravity of the convex CA portions is 500 nm, the standard deviation of the distances between the centers of gravity is preferably 250 nm or less.

When the above-described relationship is satisfied, it is considered that the rolling of the toner in the developing portion is effectively promoted, whereby imparting of charges to the toner is promoted, and fogging can be suppressed.

The photosensitive drum 21 of the present invention preferably has the following features. The surface layer 105 of the photosensitive drum 21 has a surface layer 105 containing particles and a binder resin as shown in FIG. 2 and FIG. 3, and there are a plurality of peaks in the number-based particle size distribution of the particles. A peak having the maximum peak top frequency among the plurality of peaks is defined as a first peak. Furthermore, a peak having the second maximum peak top frequency is defined as a second peak. The first peak and the second peak are compared with each other, and the peak having a larger value of particle diameter for the peak top is defined as a peak PEA. In the present invention, the particle diameter DA for the peak top of the peak PEA is preferably in a range of 80 nm to 300 nm. The particle diameter is more preferably in a range of 90 nm to 250 nm and still more preferably in a range of 100 nm to 250 nm. Within this range, it becomes easy to obtain the above-described rolling promotion effect.

At this time, the particle diameter DA for the peak top of the PEA represents the particle diameter of the particle showing the peak having a larger value of particle diameter on the surface layer 105. When the particle diameter DA is less than 80 nm, the height of the convex portion derived from the particle included in the surface layer 105 of the photosensitive drum 21 becomes low. As a result, it is estimated that the direction of a force that is generated when the photosensitive drum comes into contact with a convex portion on the surface of the toner base particle does not become sufficiently large in a direction in which the toner is rolled, and the fogging suppression effect is less likely to exhibited.

In addition, when the particle diameter DA exceeds 300 nm, it is considered that the depth of surface unevenness of the photosensitive drum 21 inevitably becomes large and a substance derived from the toner, the recording material, or the like is likely to be deposited in the recess portions due to durable use. As a result, it is considered that a difference is generated in the rolling promotion effect between at the initial use and after durable use and a stable fogging suppression effect cannot be obtained.

Next, particles having a particle diameter in a range of DA±20 nm that are contained in the surface layer 105 of the electrophotographic photosensitive member of the present invention are defined as particles PAA. In addition, in the present invention, the convex portion CA having a height of at least 10 nm and not more than 300 nm in the surface layer 105 is preferably derived from the particle PAA. Since the particle diameter DA is at least 80 nm and not more than 300 nm, the height of the convex portion is 300 nm or less. When the height of the convex portion CA is less than 10 nm, the height of the convex portion CA becomes too low, the rolling of the toner is thus not promoted during contact between the electrophotographic photosensitive member and the toner, and the charge imparting effect is small. In a case where the height of the convex portion CA exceeds 300 nm, the recessed portions on the surface layer 105 of the electrophotographic photosensitive member become large, a substance derived from the toner, the recording material, or the like may be deposited in the recessed portions throughout durable use, and it may not be possible to maintain the rolling promotion effect for a long period of time.

As a result of the authors' studies, it has been also found that when a plurality of particles having different particle diameters are present in a mixed form in the surface layer, it becomes easy to control the heights of the convex portions CA. This makes spaces between the particles PAA filled with more of the particles, whereby tightness between the particles increases, and detachment of the particles from the surface layer 105 of the photosensitive drum 21 due to rubbing with the charging member or a developing member and a transfer member, which come into contact with the photosensitive drum 21, is also suppressed.

Hereinafter, in a cross section of the surface layer 105 of the photosensitive drum 21, a peak having the maximum peak top frequency is defined as a first peak, and a peak having the second maximum peak top frequency is defined as a second peak. Furthermore, when the first peak and the second peak are compared with each other, and a peak having a smaller value of particle diameter for the peak top is defined as a peak PEB, the particle diameter for the peak top of the peak PEB is indicated by DB. When particles having a particle diameter in a range of DB±20 nm among all of the particles that are contained in the surface layer 105 are defined as particles PAB, a particle that configures PEB will be described as PAB.

Figure 14A:
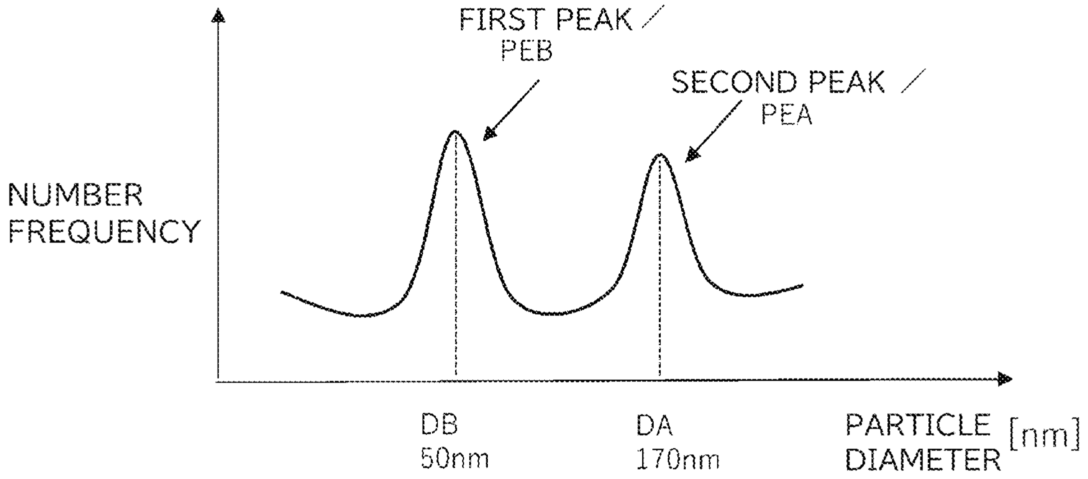
FIGS. 14A and 14B are number-based particle size distribution of particles.

Here, the first peak and the second peak are preferably selected from peaks for which the particle size corresponding to the peak top is in a range of 20 nm or more. That is, it is preferable that among peaks having a peak top of 20 nm or more out of a plurality of peaks, a peak having the maximum peak top frequency is defined as a first peak, and a peak having the second maximum peak top frequency is defined as a second peak. FIG. 14A shows one example of a number-based particle size distribution of particles, where the first peak is present at a particle diameter of 50 nm and the second peak is present at a particle diameter of 170 nm. In this case, the second peak having a larger particle diameter becomes the peak PEA, and the particle diameter DA thereof is 170 nm. Therefore, the condition of 80 nm≤DA is satisfied. In addition, since the particle diameter of the first peak is 50 nm, the condition of the particle diameter for the peak top being 20 nm or more is satisfied.

Figure 14B:
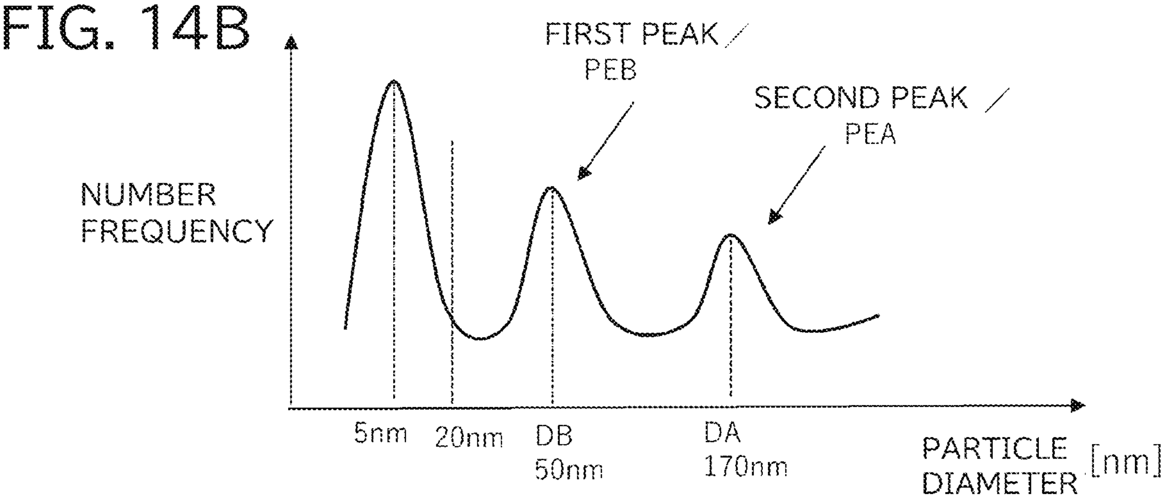

FIG. 14B shows another example of the particle size distribution. There is a peak at a particle diameter of 5 nm, but the particle diameter for the peak top is less than 20 nm, and this peak is thus not included in the first peak and the second peak. Therefore, as in FIG. 14A, the peak at a particle diameter of 50 nm becomes the first peak, and the peak at a particle diameter of 170 nm becomes the second peak. The reason for selecting the peaks as described above will be described. Here, even when a large number of very small particles are contained in the surface layer 105, the effect of the present invention can be obtained. Therefore, the effect of the present invention can be stably obtained by selecting the first peak and the second peak from peaks having a particle diameter of 20 nm or more.

The particles PAA form the convex portions CA, and the particles PAB fill the spaces between the particles PAA, whereby it becomes possible to control the average value and standard deviation of the distances between centers of gravity of the convex portions CA.

In addition, a maximum height difference Rz of the surface of the surface layer 105 of the photosensitive drum 21 in the present example is preferably at least 100 nm and not more than 400 nm. When the maximum height difference Rz of the surface of the surface layer 105 becomes less than 100 nm, even in a case where the surface layer 105 comes into contact with the convex portions on the surface of the toner, a force in a direction in which the toner is rolled is not sufficiently generated, rolling is not promoted, and the fogging suppression effect lacks. In addition, when the maximum height difference Rz of the surface of the surface layer 105 exceeds 400 nm, deposition of a substance derived from the toner or other member in the recessed portions is likely to progress, and it is thus difficult to maintain the charge imparting property in the developing portion for a long period of time. More preferably, the maximum height difference Rz is preferably at least 200 nm and not more than 375 nm.

As a method for measuring the maximum height difference Rz, the shapes of the 3 μm square photosensitive member surfaces were measured at a total of 12 sites, one site in each sample of the photosensitive drum 21, using an SPM (scanning probe microscope "JSPM-5200," manufactured by JEOL Ltd.), which will be described below. In an analysis image of a surface shape obtained by performing a flattening process that corrects a first-order linear slope on the entire image, the difference between a maximum value Zmax and a minimum value Zmin of a height z was defined as the maximum height difference Rz.

Examples of suitable particles PAA and PAB for realizing the surface layer 105 of the photosensitive drum 21 of the present invention include organic resin particles such as acrylic resin particles and inorganic particles such as silica.

An acrylic particle contains a polymer of an acrylate ester or a methacrylate ester. Among them, a styrene acrylic particle is more preferable. The degrees of polymerization of an acrylic resin and a styrene acrylic resin or whether the resin is thermoplastic or thermosetting is not particularly limited. Examples of the organic resin particles include crosslinked polystyrene, a crosslinked acrylic resin, a phenolic resin, a melamine resin, polyethylene, polypropylene, acrylic particles, polytetrafluoroethylene particles, and silicone particles.

Examples of the inorganic particles include silica particles, metal oxide particles, metal particles, and the like. As the particles that are contained in the surface layer 105 of the electrophotographic photosensitive member of the present invention, it is preferable to use inorganic particles having low elasticity and being advantageous in promoting point contact between the toner and the photosensitive member.

In the case of using the inorganic particles, among these, silica particles are preferable. Since the silica particles have a larger average circularity than other insulating particles, an effect of making contact between the toner and the photosensitive drum uniform and exhibiting stable rolling promotion is expected.

Known silica fine particles can be used as the silica particles, and any of dry silica fine particles or wet silica fine particles may be used. Preferably, fine particles of wet silica obtained by a sol-gel method (hereinafter also referred to as sol-gel silica) are preferable.

The sol-gel silica that is used as the particles that are contained in the surface layer 105 of the electrophotographic photosensitive member of the present invention may be hydrophilic or may have hydrophobic surfaces.

Examples of a method for the hydrophobic treatment include a sol-gel method in which a solvent is removed from a silica sol suspension, and the silica sol suspension is dried and then treated with a hydrophobic treatment agent and a method in which a hydrophobic treatment agent is directly added to a silica sol suspension and the silica sol suspension is dried and treated at the same time. From the viewpoint of controlling the half width of the particle size distribution and controlling the saturated moisture adsorption amount, the method in which a hydrophobic treatment agent is directly added to a silica sol suspension is preferable.

Examples of the hydrophobic treatment agent include: chlorosilanes such as methyltrichlorosilane, dimethyldichlorosilane, trimethylchlorosilane, phenyltrichlorosilane, diphenyldichlorosilane, t-butyldimethylchlorosilane, and vinyltrichlorosilane;

alkoxysilanes such as tetramethoxysilane, methyltrimethoxysilane, dimethyldimethoxysilane, phenyltrimethoxysilane, diphenyldimethoxysilane, o-methylphenyltrimethoxysilane, p-methylphenyltrimethoxysilane, n-butyltrimethoxysilane, i-butyltrimethoxysilane, hexyltrimethoxysilane, octyltrimethoxysilane, decyltrimethoxysilane, dodecyltrimethoxysilane, tetraethoxysilane, methyltriethoxysilane, dimethyldiethoxysilane, phenyltriethoxysilane, diphenyldiethoxysilane, i-butyltriethoxysilane, decyltriethoxysilane, vinyltriethoxysilane, γ-methacryloxypropyltrimethoxysilane, γ-glycidoxypropyltrimethoxysilane, γ-glycidoxypropylmethyldimethoxysilane, γ-mercaptopropyltrimethoxysilane, γ-chloropropyltrimethoxysilane, γ-aminopropyltrimethoxysilane, γ-aminopropyltriethoxysilane, 7-(2-aminoethyl)aminopropyltrimethoxysilane, and 7-(2-aminoethyl)aminopropylmethyldimethoxysilane;

silazanes such as hexamethyldisilazane, hexaethyldisilazane, hexapypropyldisilazane, hexabutyldisilazane, hexapentyldisilazane, hexahexyldisilazane, hexacyclohexyldisilazane, hexaphenyldisilazane, divinyltetramethyldisilazane, and dimethyltetravinyldisilazane;

silicone oils such as dimethyl silicone oil, methyl hydrogen silicone oil, methylphenyl silicone oil, alkyl-modified silicone oil, chloroalkyl-modified silicone oil, chlorophenyl-modified silicone oil, fatty acid-modified silicone oil, polyether-modified silicone oil, alkoxy-modified silicone oil, carbinol-modified silicone oil, amino-modified silicone oil, fluorine-modified silicone oil, and terminal reactive silicone oil;

siloxanes such as hexamethylcyclotrisiloxane, octamethylcyclotetrasiloxane, decamethylcyclopentasiloxane, hexamethyldisiloxane, and octamethyltrisiloxane;

as fatty acids and metal salts thereof, long chain fatty acids such as undecylic acid, lauric acid, tridecylic acid, dodecyl acid, myristic acid, palmitic acid, pentadecylic acid, stearic acid, heptadecylic acid, arachidic acid, montanic acid, oleic acid, linolic acid, and arachidonic acid and salts of the fatty acid and a metal such as zinc, iron, magnesium, aluminum, calcium, sodium, or lithium.

Among these, alkoxysilanes, silazanes, and silicone oils make the hydrophobic treatment easy to perform and are thus preferably used. These hydrophobic treatment agents may be used singly or two or more thereof may be jointly used.

The surface layer 105 in the present invention may contain an additive such as an antioxidant, an ultraviolet absorber, a plasticizer, a leveling agent, a slip-imparting agent, or a wear resistance improver. Specific examples thereof include a hindered phenolic compound, a hindered amine compound, a sulfur compound, a phosphorus compound, a benzophenone compound, a siloxane-modified resin, a silicone oil, and the like.

The surface layer 105 of the present invention can be formed by preparing a coating liquid for the surface layer containing each of the above-described materials and a solvent, forming a coating film thereof, and drying and/or curing the coating film. Examples of the solvent that is used in the coating liquid include an alcoholic solvent, a ketone-based solvent, an ether-based solvent, a sulfoxide-based solvent, an ester-based solvent, an aromatic hydrocarbon-based solvent.

In the surface layer 105 of the present invention, the proportion of the volume of the particles is preferably 40% by volume to 90% by volume of the total volume of the surface layer 105. Furthermore, the proportion is more preferably 45% by volume to 85% by volume and still more preferably 50% by volume to 80% by volume. Within this range, it is possible to reliably form the above-described convex portions on the surface layer 105. When the proportion is 30% by volume or less, since the height of the convex portion becomes low, it becomes difficult to obtain a sufficient rolling promotion effect, and it is difficult to obtain the fogging suppression effect. In addition, when the proportion becomes 90% by volume or more, since the particles vigorously detach, when a durability test is performed, the rolling promotion effect disappears, and it becomes difficult to obtain the fogging suppression effect.

The binder resin according to the present invention includes the following forms. Here, the surface layer 105 preferably contains a charge transport substance.

Examples of the binder resin include a polyester resin, an acrylic resin, a phenoxy resin, a polycarbonate resin, a polystyrene resin, a phenolic resin, a melamine resin, an epoxy resin, and the like. Among these, a polycarbonate resin, a polyester resin, and an acrylic resin are preferable. In addition, The surface layer 105 of the present invention may be formed as a cured film by polymerizing a composition containing a monomer having a polymerizable functional group. Examples of a reaction at that time include a thermal polymerization reaction, a photopolymerization reaction, a radiation polymerization reaction, and the like. Examples of the polymerizable functional group in the monomer having a polymerizable functional group include an acrylic group, a methacrylic group, and the like. As the monomer having a polymerizable functional group, a material having a charge transport capability may be used.

A compound having a polymerizable functional group may have a charge-transporting structure and a chain-polymerizable functional group at the same time. As the charge-transporting structure, a triarylamine structure is preferable from the viewpoint of charge transport. As the chain-polymerizable functional group, an acryloyl group or a methacryloyl group is preferable. The number of the functional groups may be one or more. In particular, when a cured film containing a compound having a plurality of functional groups and a compound having one functional group is formed, it is easy to eliminate strain generated by the polymerization of the plurality of functional groups, which is particularly preferable.

Examples of the compound having one functional group will be shown in (2-1) to (2-6).

[Chem. 1]

(2-1)

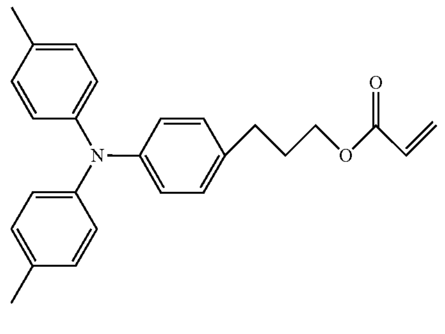

-continued
(2-2)
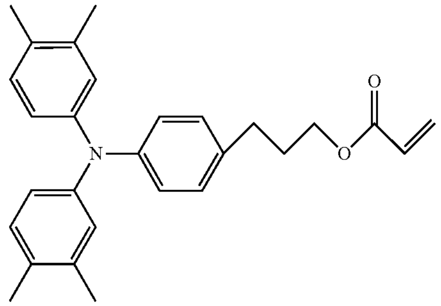
(2-3)
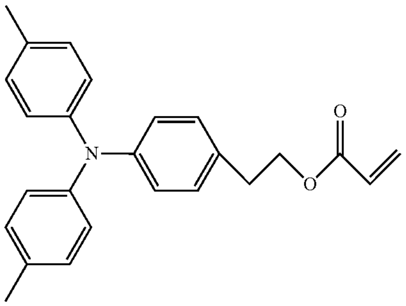
(2-4)
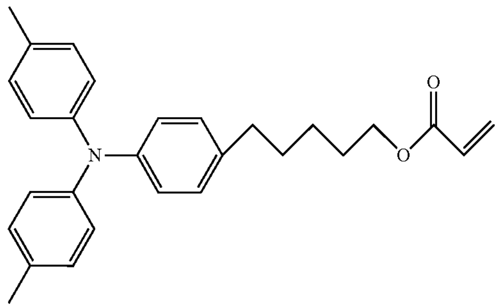
(2-5)
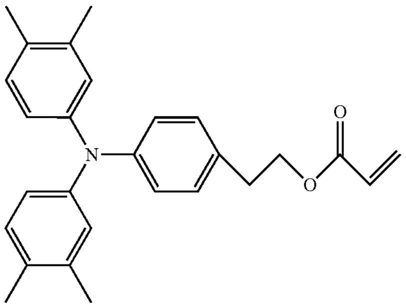
(2-6)
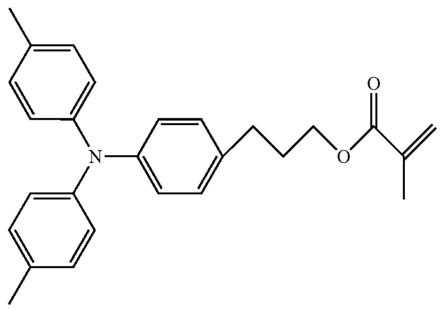
Examples of the compound having a plurality of functional groups will be shown in (3-1) to (3-6).
[Chem. 2]
(3-1)
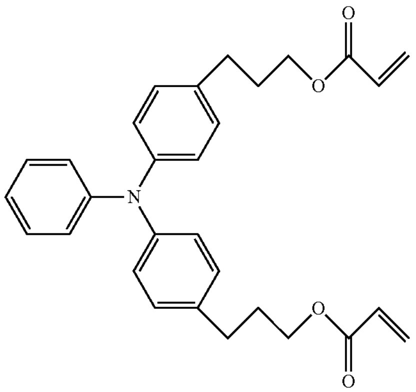
(3-2)
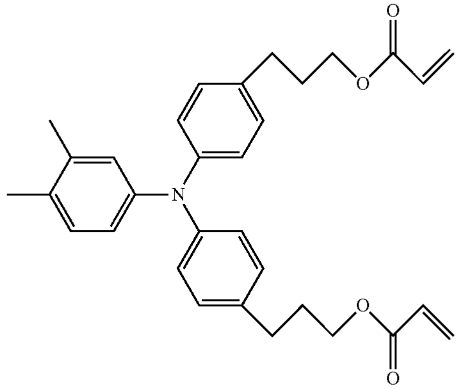
(3-3)
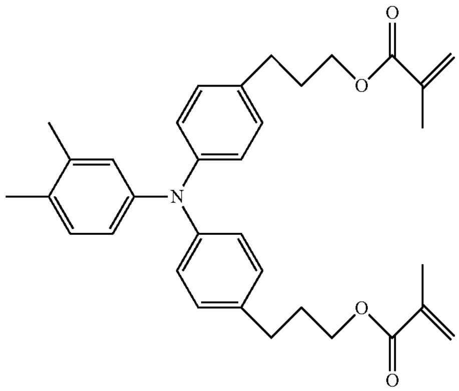
(3-4)
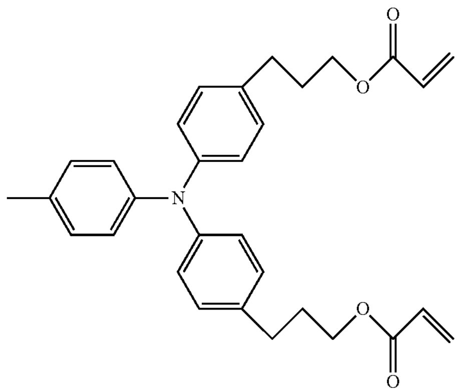

-continued (3-5)

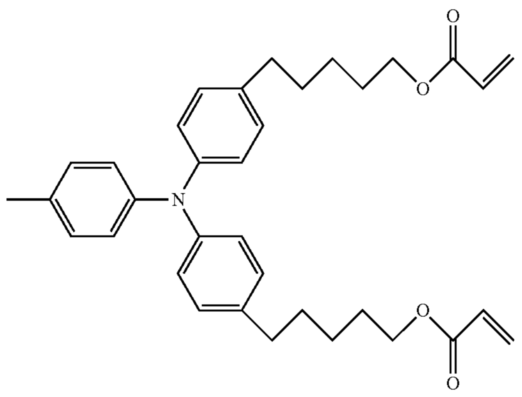

(3-6)

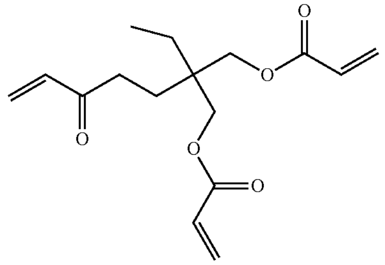

<Support>

In the present invention, the electrophotographic photosensitive member preferably has a support. In the present invention, the support is preferably a conductive support having conductivity. In addition, examples of the shape of the support include a cylindrical shape, a belt shape, a sheet shape, and the like. Among these, a cylindrical support is preferable. In addition, an electrochemical treatment such as anodic oxidation, a blast treatment, a cutting treatment, or the like may be performed on the surface of the support.

As the material of the support, a metal, a resin, glass, or the like is preferable. Examples of the metal include aluminum, iron, nickel, copper, gold, stainless steel, alloys thereof, and the like. Among these, an aluminum support for which aluminum is used is preferable.

In addition, conductivity may be imparted to resins or glass by a treatment, such as mixing or coating with a conductive material.

<Conductive Layer>

In the present invention, a conductive layer may be provided on the support. When the conductive layer is provided, it is possible to conceal scratches or unevenness on the surface of the support or to control reflection of light on the surface of the support. The conductive layer preferably contains conductive particles and a resin.

Examples of the material of the conductive particles include a metal oxide, a metal, carbon black, and the like.

Examples of the metal oxide include zinc oxide, aluminum oxide, indium oxide, silicon oxide, zirconium oxide, tin oxide, titanium oxide, magnesium oxide, antimony oxide, bismuth oxide, and the like. Examples of the metal include aluminum, nickel, iron, nichrome, copper, zinc, silver, and the like.

Among these, as the conductive particles, a metal oxide is preferably used, and in particular, titanium oxide, tin oxide, or zinc oxide is more preferably used.

In the case of using a metal oxide as the conductive particles, the surface of the metal oxide may be treated with a silane coupling agent or the like, or an element such as phosphorus or aluminum or an oxide thereof may be doped into the metal oxide.

In addition, the conductive particles may be provided with a laminated configuration in which pre-coated particles of titanium oxide, barium sulfate, zinc oxide, or the like are coated with a metal oxide having a different composition from the pre-coated particles. Examples of a coating include metal oxides such as tin oxide.

In addition, in the case of using a metal oxide as the conductive particles, the average primary particle diameter is preferably at least 1 nm and not more than 500 nm and more preferably at least 3 nm and not more than 400 nm.

Examples of the resin include a polyester resin, a polycarbonate resin, a polyvinyl acetal resin, an acrylic resin, a silicone resin, an epoxy resin, a melamine resin, a polyurethane resin, a phenolic resin, an alkyd resin, and the like.

The conductive layer may further contain a masking agent such as a silicone oil, resin particles, or titanium oxide.

The average film thickness of the conductive layer is preferably at least 1 μm and not more than 50 μm and particularly preferably at least 3 μm and not more than 40 μm.

The conductive layer can be formed by preparing a coating liquid for the conductive layer containing each of the above-described materials and a solvent, forming a coating film thereof, and drying the coating film. Examples of the solvent that is used in the coating liquid include an alcoholic solvent, a sulfoxide-based solvent, a ketone-based solvent, an ether-based solvent, an ester-based solvent, an aromatic hydrocarbon-based solvent, and the like. Examples of a dispersion method for dispersing the conductive particles in the coating liquid for the conductive layer include methods in which a paint shaker, a sand mill, a ball mill, or a liquid collision type high-speed disperser is used.

<Undercoating Layer>

In the present invention, an undercoating layer may be provided on the support or the conductive layer.

The average film thickness of the undercoating layer is preferably at least 0.1 m and not more than 50 μm, more preferably at least 0.2 μm and not more than 40 μm, and particularly preferably at least 0.3 μm and not more than 30 μm.

Examples of a resin in this undercoating layer include a polyacrylic acid resin, a polyvinyl alcohol resin, a polyvinyl acetal resin, a polyethylene oxide resin, a polypropylene oxide resin, an ethyl cellulose resin, a methyl cellulose resin, a polyamide resin, a polyamide acid resin, a polyurethane resin, a polyimide resin, a polyamide-imide resin, a polyvinyl phenolic resin, a melamine resin, a phenolic resin, an epoxy resin, and an alkyd resin.

In addition, the resin may have a structure in which a resin having a polymerizable functional group and a monomer having a polymerizable functional group are crosslinked with each other.

In addition, the undercoating layer may contain an inorganic compound or an organic compound aside from the resin.

Examples of the inorganic compound include a metal, an oxide, and a salt.

Examples of the metal include gold, silver, aluminum, and the like. Examples of the oxide include zinc oxide, lead white, aluminum oxide, indium oxide, silicon oxide, zirconium oxide, tin oxide, titanium oxide, magnesium oxide, antimony oxide, bismuth oxide, indium oxide, tin oxide, zirconium oxide, and the like. Examples of the salt include barium sulfate and strontium titanate.

These inorganic compounds may be present in the film in a particulate state.

The number average particle diameter of the particles is preferably at least 1 nm and not more than 500 nm and more preferably at least 3 nm and not more than 400 nm.

These inorganic compounds may be provided with a laminated configuration having core particles and coating layers that coat the particles.

The surfaces of these inorganic compounds may be treated with a silicone oil, a silane compound, a silane coupling agent, a different organic silicon compound, an organic titanium compound, or the like. In addition, an element such as tin, phosphorus, aluminum, or niobium may be doped thereinto.

Examples of the organic compound include an electron transport compound or a conductive polymer.

Examples of the conductive polymer include polythiophene, polyaniline, polyacetylene, polyphenylene, and polyethylene dioxythiophene.

Examples of an electron transport substance include a quinone compound, an imide compound, a benzimidazole compound, a cyclopentadienylidene compound, a fluorenone compound, a xanthone compound, a benzophenone compound, a cyanovinyl compound, an aryl halide compound, a silole compound, and a boron-containing compound.

The electron transport substance has a polymerizable functional group and may be crosslinked with a resin having a functional group capable of reacting with the functional group. Examples of the polymerizable functional group include a hydroxy group, a thiol group, an amino group, a carboxyl group, a vinyl group, an acryloyl group, a methacryloyl group, an epoxy group, and the like.

These organic compounds may be present in the film in a particulate state or may be surface-treated.

To the undercoating layer, a variety of additives such as a leveling agent such as a silicone oil, a plasticizer, and a thickener may be added.

The undercoating layer is obtained by preparing a coating liquid for the undercoating layer containing the above-described materials, applying the coating liquid on the support or the conductive layer, and then drying or curing the coating film.

Examples of a solvents used to prepare the coating liquid include an alcoholic solvent, a ketone-based solvent, an ether-based solvent, an ester-based solvent, an aromatic hydrocarbon-based solvent, and the like.

Examples of a dispersion method for dispersing the particles in the coating liquid include methods in which a paint shaker, a sand mill, a ball mill, or a liquid collision type high-speed disperser is used.

<Photosensitive Layer>

A photosensitive layer in the electrophotographic photosensitive member is mainly classified into (1) a stacked photosensitive layer and (2) a single-layer photosensitive layer. (1) The stacked photosensitive layer is a photosensitive layer having a charge generation layer containing a charge generating substance and a charge transport layer containing a charge transport substance. (2) The single-layer photosensitive layer is a photosensitive layer containing both a charge generating substance and a charge transport substance.

(1) Stacked Photosensitive Layer

The stacked photosensitive layer has a charge generation layer and a charge transport layer.

(1-1) Charge Generation Layer

The charge generation layer preferably contains a charge generating substance and a resin.

Examples of the charge generating substance include azo pigments, perylene pigments, polycyclic quinone pigments, indigo pigments, phthalocyanine pigments, and the like. Among these, azo pigments and phthalocyanine pigments are preferable. Among the phthalocyanine pigments, an oxytitanium phthalocyanine pigment, a chlorogallium phthalocyanine pigment, and a hydroxygallium phthalocyanine pigment are preferable.

The content of the charge generating substance in the charge generation layer is preferably at least 40% by mass and not more than 85% by mass and more preferably at least 60% by mass and not more than 80% by mass relative to the total mass of the charge generation layer.

Examples of the resin include a polyester resin, a polycarbonate resin, a polyvinyl acetal resin, a polyvinyl butyral resin, an acrylic resin, a silicone resin, an epoxy resin, a melamine resin, a polyurethane resin, a phenolic resin, a polyvinyl alcohol resin, a cellulose resin, a polystyrene resin, a polyvinyl acetate resin, a polyvinyl chloride resin, and the like. Among these, a polyvinyl butyral resin is more preferable.

In addition, the charge generation layer may further contain an additive such as an antioxidant or an ultraviolet absorber. Specific examples thereof include a hindered phenolic compound, a hindered amine compound, a sulfur compound, a phosphorus compound, a benzophenone compound, and the like.

The charge generation layer can be formed by preparing a coating liquid for the charge generation layer containing each of the above-described materials and a solvent, forming a coating film thereof on the undercoating layer, and drying the coating film. Examples of the solvent that is used in the coating liquid include an alcoholic solvent, a sulfoxide-based solvent, a ketone-based solvent, an ether-based solvent, an ester-based solvent, an aromatic hydrocarbon-based solvent, and the like.

The film thickness of the charge generation layer is preferably at least 0.1 μm and not more than 1.5 μm and more preferably at least 0.15 μm and not more than 1.0 μm.

(1-2) Charge Transport Layer

The charge transport layer preferably contains a charge transport substance and a resin.

Examples of the charge transport substance include a polycyclic aromatic compound, a heterocyclic compound, a hydrazone compound, a styryl compound, an enamine compound, a benzidine compound, a triarylamine compound, resins having a group derived from these substances, and the like. Among these, a triarylamine compound and a benzidine compound are preferable.

The content of the charge transport substance in the charge transport layer is preferably at least 25% by mass and not more than 70% by mass and more preferably at least 30% by mass and not more than 55% by mass relative to the total mass of the charge transport layer.

Examples of the resin include a polyester resin, a polycarbonate resin, an acrylic resin, a polystyrene resin, and the like. Among these, a polycarbonate resin and a polyester resin are preferable. As the polyester resin, a polyarylate resin is particularly preferable.

The content ratio (mass ratio) between the charge transport substance and the resin is preferably 4:10 to 20:10 and more preferably 5:10 to 12:10.

In addition, the charge transport layer may also contain an additive such as an antioxidant, an ultraviolet absorber, a plasticizer, a leveling agent, a slip-imparting agent, or a wear resistance improver. Specific examples thereof include a hindered phenolic compound, a hindered amine compound, a sulfur compound, a phosphorus compound, a benzophenone compound, a siloxane-modified resin, a silicone oil, fluorine resin particles, polystyrene resin particles, polyethylene resin particles, silica particles, alumina particles, boron nitride particles, and the like.

The charge transport layer can be formed by preparing a coating liquid for the charge transport layer containing each of the above-described materials and a solvent, forming a coating film thereof on the charge generation layer, and drying the coating film. Examples of the solvent that is used in the coating liquid include an alcoholic solvent, a ketone-based solvent, an ether-based solvent, an ester-based solvent, and an aromatic hydrocarbon-based solvent. Among these solvents, an ether-based solvent or an aromatic hydrocarbon-based solvent is preferable.

The film thickness of the charge transport layer is preferably at least 3 μm and not more than 50 μm, more preferably at least 5 μm and not more than 40 μm, and particularly preferably at least 10 μm and not more than 30 μm.

(2) Single-Layer Photosensitive Layer

The single-layer photosensitive layer can be formed by preparing a coating liquid for the photosensitive layer containing a charge generating substance, a charge transport substance, a resin, and a solvent, forming a coating film thereof on the undercoating layer, and drying the coating film. The charge generating substance, the charge transport substance, and the resin are the same as the examples of the materials in the above-described "(1) stacked photosensitive layer."

The film thickness of the single-layer photosensitive layer is preferably at least 10 μm and not more than 45 μm and more preferably at least 25 μm and not more than 35 μm.

Hereinafter, a method for measuring each physical property of the photosensitive drum 21 or each particle according to the present invention will be described.

<Measurement of Physical Properties of Photosensitive Drum>

<Method for Measuring Number-Based Average Particle Diameter of Particles of Present Invention>

The number average particle diameter is measured using a ZETASIZER Nano-ZS (manufactured by Malvern Panalytical). The device is capable of measuring particle diameters by a dynamic light scattering method. First, a sample of a measurement object is diluted so that the solid-liquid ratio is adjusted to 0.10% by mass (±0.02% by mass), collected in a quartz cell, and put into a measuring unit. As a dispersion medium, water or a methyl ethyl ketone/methanol mixed solvent is used in a case where the sample is inorganic fine particles, and water is used in a case where the sample is resin particles or an external additive for the toner. As measurement conditions, the index of refraction of the sample, the index of refraction, viscosity, and temperature of a dispersion solvent are input, and the number average particle diameter is measured with control software Zetasizer software 6.30. Dn is employed as the number average particle diameter.

The index of refraction of the particles is employed from "index of refraction of solids" described in Page 517 of Handbook of Chemistry: Pure Chemistry, Vol. II, 4th Edition (The Chemical Society of Japan, Maruzen Publishing Co., Ltd.). As the index of reflection of the resin particles, the index of reflection that is stored in the control software as the index of reflection of a resin that is used for the resin particles is employed. However, in a case where there is no stored index of refraction, a value described in the polymer database of National Institute for Materials Science is used. The index of refraction of the external additive for the toner is calculated by taking the weight average from the index of refraction of the inorganic fine particles and the index of refraction of the resin that is used for the resin particles. As the index of refraction, viscosity, and temperature of the dispersion solvent, the numerical values stored in the control software are selected. In the case of the mixed solvent, the weight average of the dispersion media mixed is taken.

<Method for Measuring Maximum Height Difference Rz on Surface of Surface Layer of Photosensitive Drum>

The surface of the photosensitive drum 21 prepared in the example was observed. As samples on which the surface observation was performed, the photosensitive drum 21 was equally divided into four portions in the longitudinal direction, and 5 mm square sample pieces were cut out from the photosensitive drum at positions ¼, ½, and ¾ of the length apart from an end portion, respectively, and every 120° in the circumferential direction. The sample pieces were fixed to a sample holder so that it was possible to observe the surface layer of the photosensitive drum. For the sample pieces fixed to the sample holder, a 3 μm square surface shape on the surface of the surface layer of the photosensitive drum was measured at one site of each sample using a scanning probe microscope SPM. This measurement was performed at 9 points in the sample pieces, respectively, and the average value of the maximum height differences Rz at these 9 sites was regarded as the maximum height difference Rz of the photosensitive drum of the present invention.

As SPM, it is possible to use a scanning probe microscope "JSPM-5200" (manufactured by JEOL Ltd.), a scanning probe microscope "E-sweep" (manufactured by Hitachi High-Tech Corporation), and a medium-sized probe microscope system AFM5500M (manufactured by Hitachi High-Tech Corporation).

A measurement method in which the scanning probe microscope "JSPM-5200" (manufactured by JEOL Ltd.) is used is performed as described below. A scan operation was performed through WinSPM Scanning, and a data analysis image of the surface shape was output. The maximum height difference Rz on the surface of the surface layer of the photosensitive drum of the present invention was measured under the following "JSPM-5200" observation conditions.

"JSPM-5200" Observation Conditions
Scanner: 4
SPM scan: All SPM mode
Cantilever: SI-DF3P2 (manufactured by Hitachi High-Tech Fielding Corporation)
Resonance frequency detection:
(START) 1.00 kHz
(Stop) 100 kHz (in the case of f=67 kHz, depending on cantilever type)
Cantilever autotune: Normal approach
Acquisition: 2 Inputs (512)
Scan mode: Normal
STM/AFM: AC-AFM
Clock: 833.33 μs
Scan size: 3000 nm
Offset: 0
Bias [V]: 0
References/V: Unaltered (calibration value input)
Filter: 1.4 Hz
Loop gain: 16

The image of the surface shape and the surface height data attached to the image were analyzed through WinSPM Scanning, and the difference between the maximum value Zmax and the minimum value Zmin of the height z for the flattened image was obtained as the maximum height difference Rz.

In addition, a measurement method in which the scanning probe microscope “E-sweep” (manufactured by Hitachi High-Tech Corporation) is used is performed as described below. A data analysis image of the surface shape of the electrophotographic photosensitive member can be output by performing a scanning operation.

“E-Sweep” Observation Conditions

Cantilever: SI-DF20 (with back AL) K-A102002771 (manufactured by Hitachi High-Tech Fielding Corporation)

Scanning probe microscope: Manufactured by Hitachi High-Tech Science Corporation Measurement unit: E-sweep Measurement mode: DFM (resonance mode) shape image Resolution: The number of X data: 512, the number of Y data: 512

Measurement frequency: 127 Hz

Q curve measurement magnification, excitation voltage, low-pass filter, high-pass filter, and the like are adjusted so that the resonance state of the cantilever can be optimized.

The image of the surface shape and the surface height data attached to the image are analyzed using attached software, whereby the difference between the maximum value Zmax and the minimum value Zmin of the height z can be obtained as the maximum height difference (maximum height) Rz based on JIS B0601:2001 for the flattened image.

After the measurement, the measurement position in the sample was marked, and the measurement of <calculation of proportion of volume of particles in total volume of surface layer 105 of photosensitive drum, particle size distribution of particles, and height of convex portion CA>, which will be described below, was performed for each sample.

<Calculation of Proportion of Volume of Particles in Total Volume of Surface Layer of Photosensitive Drum, Particle Size Distribution of Particles, and Height of Convex Portion CA>

The proportion of the volume of the particles in the total volume of the surface layer 105 was calculated from the amounts added, densities, and true specific gravity of the monomer having a polymerizable functional group and the particles that were used in the coating liquid for the surface layer. Regarding the specific gravity of the monomer having a polymerizable functional group and the particles, values published by the manufacturer of each material can be referred to.

In the case of being obtained from the electrophotographic photosensitive member, for example, the following method is used.

A cross section of the electrophotographic photosensitive member prepared in the example was observed. Samples on which cross-sectional observation was performed were collected by equally dividing the photosensitive member into four portions in the longitudinal direction and shifting the photosensitive member by 120° in the circumferential direction at positions ¼, ½, and ¾ length apart from an end portion. 5 mm square sample pieces were cut out from the photosensitive member, respectively, and the surface layer 105 was transformed into a 2 μm×2 μm×2 μm three dimensional structure with Slice & View of FIB-SEM.

Slice & View conditions were set as described below.

Analytical specimen processing: FIB method

Processing and observation device: NVision 40 manufactured by SII/Zeiss

Slice interval: 10 nm (Observation Conditions)

Accelerating voltage: 1.0 kV

Specimen slope: 540

WD: 5 mm

Detector: BSE detector

Aperture: 60 μm, high current

ABC: ON

Image resolution: 1.25 nm/pixel

The measurement environment is a temperature of 23° C. and a pressure of $1\times10^{-4}$ Pa. As the processing and observation device, it is also possible to use Strata 400S (specimen slope: 52°) manufactured by FEI.

Analysis is performed on an analysis region that is 2 μm in length and 2 μm in width, information of each cross section is integrated, and a volume V per 2 μm in length, 2 μm in width, and 2 μm in thickness (8 $\mu m^3$) on the surface of the surface layer 105 is obtained. In addition, image analysis was performed on each cross section using image processing software: Image-Pro Plus manufactured by Media Cybernetics, Inc.

From a difference in contrast of Slice & View of FIB-SEM, the content of the particles in the total volume of the surface layer 105 was calculated. In addition, based on information obtained from the image analysis, in each of the four sample pieces, the volume V of the particles of the invention in a volume of 2 μm×2 μm×2 μm (unit volume: 8 $\mu m^3$) is obtained, and the content [% by volume] of the particles (=V $\mu m^3$/8 $\mu m^3\times100$) was calculated. The average value of the value of the content of the particles in each sample piece was regarded as the content [% by volume] of each particle of the present invention in the surface layer relative to the total volume of the surface layer 105. The composition of the particle was determined using a SEM-EDX function.

It is confirmed whether or not there are a plurality of peaks in a particle size distribution Ain which the horizontal axis represents the particle diameters of the particles contained in the surface of the surface layer 105 and the vertical axis represents the number-based frequency of each particle diameter.

In the particle distribution A, a peak having the maximum peak top frequency is defined as a first peak. Next, a peak having the second maximum peak top frequency is defined as a second peak. Furthermore, the first peak and the second peak were compared with each other, and the peak having a larger value of particle diameter for the peak top was defined as a peak PEA.

Figure 5:
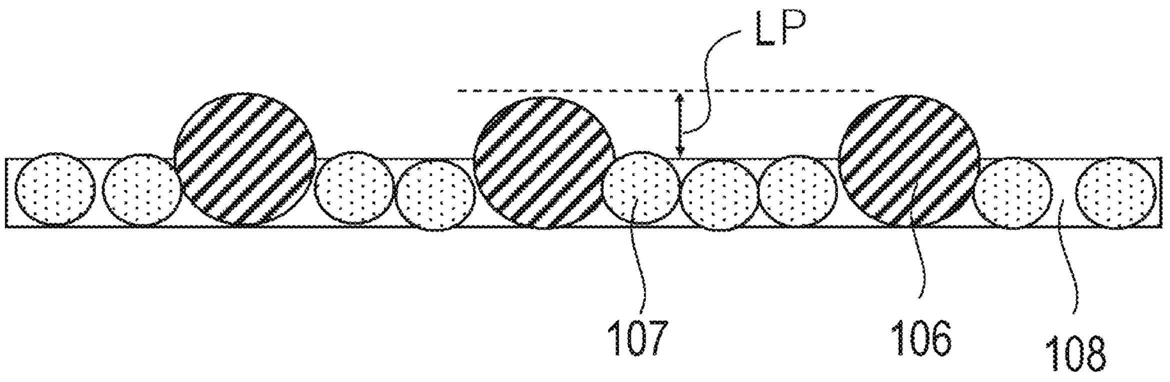
FIG. 5 is a schematic view showing the convex height on a surface of the photosensitive drum in the present invention.

In addition, the particle diameter for the peak top of the peak PEA in the particle size distribution A is represented by DA. Particles having a particle diameter in a range of DA±20 nm among all of the particles that are contained in the surface layer 105 are defined as particles PAA. When convex portions that are derived from the particles PAA and have a height of at least 10 nm and not more than 300 nm are defined as convex portions CA, a height LP of the convex portion CA is shown in FIG. 5. In a case where there were particles with different compositions, the particles were determined in a mapping image by EDS. In addition, regarding the heights LP, an average value LPV was calculated. Next, in the particle size distribution A, the peak having the maximum peak top frequency is defined as the first peak, the peak having the second maximum peak top frequency is defined as the second peak, the first peak and the second peak were compared with each other, and the peak having a smaller value of particle diameter for the peak top was defined as a peak PEB. A particle diameter DB for the peak top of the peak PEB is calculated.

<Method for Measuring Average Value and Standard Deviation of Distances Between Centers of Gravity of Particles on Surface of Surface Layer of Photosensitive Drum>

The average value and standard deviation of the distances between the centers of gravity of the convex portions CA derived from the particles PAA on the surface layer 105 viewed from above in the photosensitive drum 21 of the present example can be calculated as described below.

The surface of the surface layer 105 of the photosensitive drum 21 was photographed using a scanning electron microscope (SEM) ("S-4800," manufactured by JEOL Ltd.) at an accelerating voltage of 10 kV. A photographic image of the surface layer 105 of the photosensitive drum 21 of the present invention, magnified 30000 times, was captured by a scanner at three locations 50 mm from each end of the photosensitive drum 21 in the longitudinal direction and in the center, and at four locations 90 degrees each in the circumferential direction, for a total of 12 locations. The particles PAA in the photographic images were binarized using an image processing analyzer ("LUZEX AP," manufactured by NIRECO Corporation).

Figure 6:
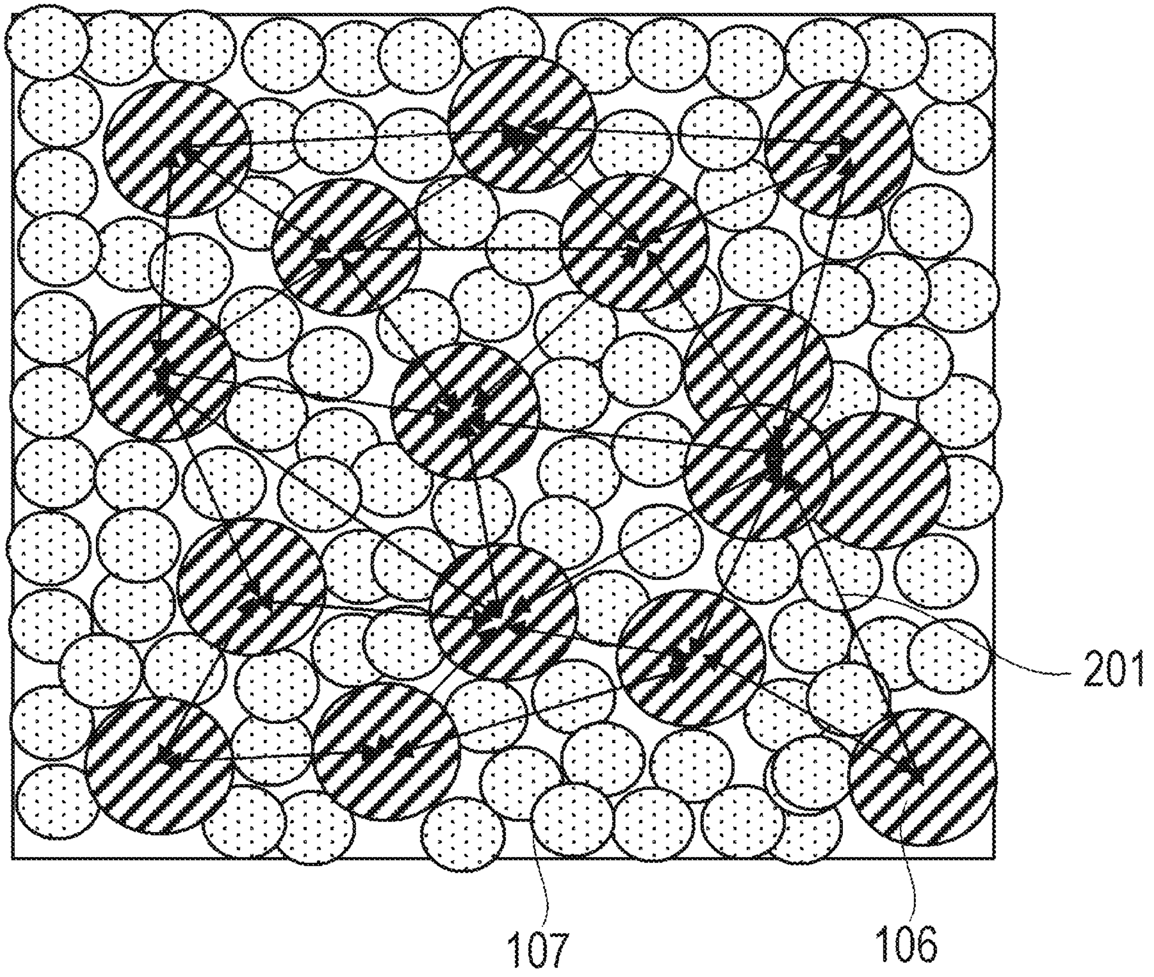
FIG. 6 is a schematic view showing the distances between the centers of gravity of convex CA portions on the surface of the photosensitive drum in the present invention.

The distances between the centers of gravity 201 of the particles PAA adjacent to each other as shown in FIG. 6 are measured in a mode of the distance between adjacent centers of gravity of the particles PAA, and the average value of the distances between the centers of gravity is calculated. At this time, the distance between the centers of gravity is calculated from each center of gravity of the particle PAA by Voronoi tessellation. The distances between the centers of gravity and the standard deviations are calculated for a total of 10 fields of view, and the resultant average value and standard deviation of the distances between the centers of gravity are regarded as the average value and standard deviation of the distances between the centers of gravity of the particles on the surface layer 105 of the photosensitive drum 21.

<Manufacture of Photosensitive Drum>

The support, the conductive layer, the undercoating layer, the charge generation layer, the charge transport layer, and the surface layer were produced by the following method.

<Preparation of Coating Liquid 1 for Conductive Layer>

Anatase-type titanium oxide having an average primary particle diameter of 200 nm was used as a substrate, and a titanium niobium sulfate solution containing 33.7 parts of titanium in terms of $TiO_2$ and 2.9 parts of niobium in terms of $Nb_2O_5$ was prepared. 100 parts of the substrate was dispersed in pure water to produce 1000 parts of a suspension, and the suspension was heated to 60° C. The titanium niobium sulfate solution and 10 mol/L sodium hydroxide were added dropwise for three hours so that the pH of the suspension reached 2 to 3. After the total amount was added dropwise, the pH was adjusted to near neutral, and a polyacrylamide-based coagulant was added thereto to precipitate the solid content. The supernatant was removed, and the solid content was filtered, washed, and dried at 110° C., thereby obtaining an intermediate containing 0.1 wt % of an organic substance derived from the coagulant in terms of C. This intermediate was fired at 750° C. in nitrogen for one hour and then fired at 450° C. in the air, thereby producing titanium oxide particles. The resultant particles had an average primary particle diameter of 220 nm, which was measured by the above-described particle diameter measurement method in which a scanning electron microscope was used.

Subsequently, 50 parts of a phenolic resin (monomer/oligomer of a phenolic resin) as a binding material (trade name: Plyophen J-325, manufactured by DIC Corporation, resin solid content: 60%, density after curing: 1.3 g/cm$^2$) was dissolved in 35 parts of 1-methoxy-2-propanol as a solvent to obtain a solution.

60 Parts of titanium oxide particles 1 were added to this solution, the mixture was put into a vertical sand mill in which 120 parts of glass beads having a number-average primary particle diameter of 1.0 mm were used as a dispersion medium, and a dispersion treatment was performed for four hours under conditions of a dispersion liquid temperature of 23±3° C. and a rotation speed of 1500 rpm (circumferential speed of 5.5 m/s), thereby obtaining a dispersion. The glass beads were removed from this dispersion with a mesh. 0.01 parts of a silicone oil (trade name: SH28 PAINT ADDITIVE, manufactured by Dow Corning Toray Co., Ltd.) as a leveling agent, and 8 parts of silicone resin particles (trade name: KMP-590, manufactured by Shin-Etsu Chemical Co., Ltd., average primary particle diameter: 2 μm, density: 1.3 g/cm$^3$) as a surface roughness-imparting agent were added to the dispersion from which the glass beads had been removed, stirred, and pressure-filtered using PTFE filter paper (trade name: PF060, manufactured by Advantec Toyo Kaisha, Ltd.), thereby preparing a coating liquid 1 for the conductive layer.

<Preparation of Coating Liquid 1 for Undercoating Layer>

100 Parts of rutile-type titanium oxide particles (average primary particle diameter: 50 nm, manufactured by TAYCA Co., Ltd.) were stirred and mixed with 500 parts of toluene, 3.5 parts of vinyltrimethoxysilane (trade name: KBM-1003, manufactured by Shin-Etsu Chemical Co., Ltd.) were added thereto, and the mixture was dispersed for eight hours in a vertical sand mill in which glass beads having a diameter of 1.0 mm were used. After the glass beads were removed, the toluene was distilled away by vacuum distillation, and the remaining components were dried for three hours at 120° C., thereby obtaining rutile-type titanium oxide particles surface-treated with an organic silicon compound. When the volume of the resultant titanium oxide particles was represented by a, and the average primary particle diameter of the titanium oxide particles was represented by b [μm], a/b was 15.6. The value of a was obtained from a microscope image of a cross section of an electrophotographic photosensitive member photographed using a field emission scanning electron microscope (FE-SEM, trade name: 5-4800, manufactured by Hitachi High-Tech Corporation) after the production of the electrophotographic photosensitive member.

18.0 Parts of the rutile-type titanium oxide particles surface-treated with an organosilicon compound, 4.5 parts of N-methoxymethylated nylon (trade name: TORESIN EF-30T, Nagase ChemteX Corporation), 1.5 parts of a copolymerized nylon resin (trade name: AMILAN CM8000, manufactured by Toray Industries, Inc.) were added to a mixed solvent of 90 parts of methanol and 60 parts of 1-butanol to prepare a dispersion.

This dispersion was dispersed for five hours in a vertical sand mill using glass beads having a diameter of 1.0 mm, and the glass beads were removed, thereby preparing a coating liquid 1 for the undercoating layer.

<Synthesis of Phthalocyanine Pigment>

Synthesis Example 1

100 g of gallium trichloride and 291 g of ortho-phthalonitrile were added to 1000 mL of α-chloronaphthalene under an atmosphere of a nitrogen flow and reacted at 200°

C. for 24 hours, and the product was then filtered. The resultant wet cake was heated and stirred at a temperature of 150° C. for 30 min using N,N-dimethylformamide and then filtered. The resultant filtrate was washed with methanol and then dried, thereby obtaining a chlorogallium phthalocyanine pigment with a yield of 83%.

20 g of the chlorogallium phthalocyanine pigment obtained by the above-described method was dissolved in 500 mL of concentrated sulfuric acid, stirred for two hours, then, added dropwise to a mixed solution of 1700 mL of distilled water and 660 mL of concentrated aqueous ammonia that had been ice-cooled, and precipitated again. The precipitate was sufficiently washed with distilled water and dried, thereby obtaining a hydroxygallium phthalocyanine pigment.

<Preparation of Coating Liquid 1 for Charge Generation Layer>

0.5 parts of the hydroxygallium phthalocyanine pigment obtained in Synthesis Example 1, 7.5 parts of N,N-dimethylformamide (product code: D0722, manufactured by Tokyo Chemical Industry Co., Ltd.), and 29 parts of glass beads having a diameter of 0.9 mm were subjected to a milling treatment using a sand mill (BSG-20, manufactured by AIMEX Co., Ltd.) at a temperature of 25° C. for 24 hours. At this time, the disc was rotated 1500 times per minute as a condition. The liquid thus treated was filtered with a filter (product No.: N-NO.125T, pore diameter: 133 μm, manufactured by NBC Meshtec Inc.) to remove the glass beads. 30 Parts of N,N-dimethylformamide was added to this liquid, the liquid was then filtered, and the filtrate on the filter was sufficiently washed with n-butyl acetate. In addition, the washed filtrate was then dried in a vacuum to obtain 0.45 parts of the hydroxygallium phthalocyanine pigment. The resultant pigment contained N,N-dimethylformamide.

Subsequently, 20 parts of the hydroxygallium phthalocyanine pigment obtained by the milling treatment, 10 parts of polyvinyl butyral (trade name: S-LEC BX-1, manufactured by Sekisui Chemical Co., Ltd.), 190 parts of cyclohexanone, and 482 parts of glass beads having a diameter of 0.9 mm were dispersed for four hours under a cooling water temperature of 18° C. using a sand mill (K-800, manufactured by the former Igarashi Machine Production Co., Ltd. (AIMEX Co., Ltd.), disc diameter: 70 mm, the number of discs: five). At this time, the disc was rotated 1800 times per minute as a condition. The glass beads were removed from this dispersion, and 444 parts of cyclohexanone and 634 parts of ethyl acetate were added thereto, thereby preparing a coating liquid 1 for the charge generation layer.

<Preparation of Coating Liquid 1 for Charge Transport Layer>

Production Example of Charge Transport Layer 1

Next, the following materials were prepared to produce a mixed solvent.

Ortho-xylene: 25 parts by mass
Methyl benzoate: 25 parts by mass
Dimethoxymethane: 25 parts by mass Furthermore, the following materials were dissolved in the mixed solvent to prepare a coating liquid 1 for the charge transport layer.

Charge transport substance represented by the following structural formula (C-1) (hole transporting substance): 5 parts by mass Charge transport substance represented by the following structural formula (C-2) (hole transporting substance): 5 parts by mass Polycarbonate (trade name: IUPILON Z400, manufactured by Mitsubishi Engineering-Plastics Corporation): 10 parts by mass A coating film was formed by dip coating of this coating liquid 1 for the charge transport layer on the charge generation layer 1, and the coating film was dried at a drying temperature of 40° C. for five minutes, thereby forming a charge transport layer 1 having a film thickness of 15 μm.

[Chem. 3]

[C-1]

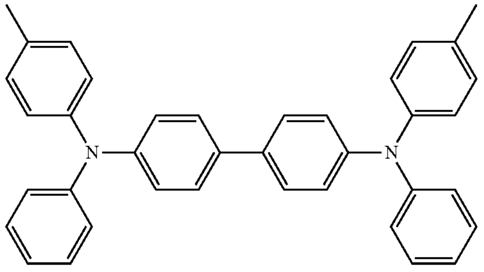

(CTM-1)

[C-2]

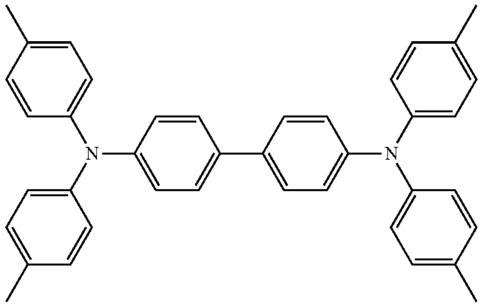

(CTM-2)

Production Example 1 of Surface Layer Containing Particles

The materials in Table 1 that served as particles A and particles B were prepared.

TABLE 1

| Particle | Product name | Manufacturer | Average primary particle size [nm] |
|---|---|---|---|
| 1 | QSG-170 | Shin-Etsu Chemical Co., Ltd. | 170 |
| 2 | QSG-80 | Shin-Etsu Chemical Co., Ltd. | 80 |
| 3 | QSG-30 | Shin-Etsu Chemical Co., Ltd. | 30 |
| 4 | QSG-100 | Shin-Etsu Chemical Co., Ltd. | 100 |
| 5 | QSG-10 | Shin-Etsu Chemical Co., Ltd. | 10 |
| 6 | KE-P30 | NIPPON SHOKUBAI CO., LTD. | 300 |
| 7 | KE-P50 | NIPPON SHOKUBAI CO., LTD. | 500 |

<Preparation of Coating Liquid 1 for Surface Layer>

Particles A: Silica particles ("QSG-170," manufactured by Shin-Etsu Chemical Co., Ltd.): 8.4 parts by mass, Particles B: Silica particles ("QSG-80," manufactured by Shin-Etsu Chemical Co., Ltd.): 1.6 parts by mass, A monomer 1 having a polymerizable functional group (structural formula (2-1)): 1.28 parts by mass, A monomer 2 having a polymerizable functional group (structural formula (3-1)): 1.28 parts by mass, A siloxane-modified acrylic compound (trade name: SYMAC US270, manufactured by Toagosei Co., Ltd.): 0.1 parts by mass, 1-propanol: 100.0 parts by mass, and Cyclohexane: 100.0 parts by mass were mixed together and stirred for six hours with a stirring device to prepare a coating liquid 1 for the surface layer.

<Preparation of Coating Liquids 2 to 7 for Surface Layer>

Coating liquids 2 to 7 for the surface layer were adjusted in the same manner as in the preparation of the coating liquid 1 for the surface layer except that the types and amounts added of the particles A and the particles B were changed as shown in Table 2.

(Surface Layer)

A coating film was formed by dip coating of the coating liquid 1 for the surface layer on the charge transport layer, and the coating film was warmed at a temperature of 50° C. for five minutes. The coating film was then irradiated with an electron beam for 2.0 seconds while the support (object to be irradiated) was rotated at a speed of 300 rpm under a nitrogen atmosphere under conditions of an accelerating voltage of 65 kV and a beam current of 5.0 mA. The dose was 15 kGy. After that, the temperature of the coating film was raised to 120° C. under a nitrogen atmosphere. The oxygen concentration from the electron beam irradiation to the subsequent heating treatment was 10 ppm.

TABLE 2

| | Monomer 1 | | Monomer 2 | | Particle A | | | Particle B | | |
|---|---|---|---|---|---|---|---|---|---|---|
| Coating liquid | Density [g/cm3] | Amount added | Density [g/cm3] | Amount added | Kind of particle | True specific gravity | Amount added | Kind of particle | True specific gravity | Amount added |
| 1 | 0.8 | 1.28 | 0.8 | 1.28 | 1 | 1.8 | 8.4 | 2 | 1.8 | 1.6 |
| 2 | 0.8 | 0.64 | 0.8 | 0.64 | 1 | 1.8 | 2.5 | 3 | 1.8 | 2.5 |
| 3 | 0.8 | 1.28 | 0.8 | 1.28 | 4 | 1.8 | 10.0 | 3 | 1.8 | 5.0 |
| 4 | 0.8 | 1.28 | 0.8 | 1.28 | 6 | 1.8 | 5.0 | 5 | 1.8 | 5.0 |
| 5 | 0.8 | 1.28 | 0.8 | 1.28 | 1 | 1.8 | 8.0 | 2 | 1.8 | 8.0 |
| 6 | 0.8 | 0.64 | 0.8 | 0.64 | 7 | 1.8 | 5.0 | 2 | 1.8 | 5.0 |
| 7 | 0.8 | 0.64 | 0.8 | 0.64 | 1 | 1.8 | 0.4 | 2 | 1.8 | 4.6 |

In the table, "Monomer 1" means "Monomer 1 having polymerizable functional group". "Monomer 2" means "Monomer 2 having polymerizable functional group". "Coating liquid" means "Coating liquid for surface layer".

Production Example of Photosensitive Drum 1

(Support)

An aluminum cylinder having a diameter of 24 mm and a length of 257 mm was used as a support (cylindrical support).

(Conductive Layer)

A coating film was formed by dip coating of the coating liquid 1 for the conductive layer on the above-described support, and the coating film was heated and cured at 150° C. for 30 minutes, thereby forming a conductive layer having a film thickness of 22 μm.

(Undercoating Layer)

A coating film was formed by dip coating of the coating liquid 1 for the undercoating layer on the above-described conductive layer, and the coating film was heated and cured at 100° C. for 10 minutes, thereby forming an undercoating layer having a film thickness of 1.8 μm.

(Charge Generation Layer)

A coating film was formed by dip coating of the coating liquid 1 for the charge generation layer on the above-described undercoating layer, and the coating film was heated and dried at a temperature of 100° C. for 10 minutes, thereby forming a charge generation layer having a film thickness of 0.20 μm.

(Charge Transport Layer)

A coating film was formed by dip coating of the coating liquid 1 for the charge transport layer on the above-described charge generation layer, and the coating film was heated and dried at a temperature of 120° C. for 30 minutes, thereby forming a charge transport layer having a film thickness of 21 μm.

Next, the coating film was naturally cooled in the atmosphere until the temperature reached 25° C. and then heated for 30 minutes under a condition that the temperature of the coating film reached 120° C. to form a surface layer having a film thickness of 1.0 μm. The physical properties of the resultant photosensitive drum are shown in Table 3.

Production Examples of Photosensitive Drums 2 to 7

Photosensitive drums 2 to 7 were produced in the same manner as in the production of the photosensitive drum 1 except that the coating liquid 1 for the surface layer was changed as shown in Table 2 in the production of the photosensitive drum 1. The physical properties of the resultant photosensitive drums 1 to 7 are shown in Table 3.

Production Example of Photosensitive Drum 8

A photosensitive drum 8 was produced in the same manner as in the production of the photosensitive drum 1 until the formation of (the charge transport layer), but the coating liquid for the surface was not applied, and the charge transport layer was the outermost layer. The physical properties of the resultant photosensitive drum 8 are shown in Table 3.

TABLE 3

| EP No. | Coating liquid | DA [nm] | Average distance [nm] | Standard deviation [nm] | DB [nm] | RZ [nm] | Proportion [% by volume] |
|---|---|---|---|---|---|---|---|
| 1 | 1 | 170 | 170 | 51 | 80 | 261 | 65 |
| 2 | 2 | 170 | 220 | 55 | 30 | 276 | 65 |
| 3 | 3 | 100 | 250 | 75 | 30 | 215 | 74 |
| 4 | 4 | 300 | 350 | 122.5 | 10 | 445 | 65 |
| 5 | 5 | 170 | 470 | 141 | 80 | 351 | 75 |

TABLE 3-continued

| EP No. | Coating liquid | DA [nm] | Average distance [nm] | Standard deviation [nm] | DB [nm] | RZ [nm] | Proportion [% by volume] |
|---|---|---|---|---|---|---|---|
| 6 | 6 | 500 | 550 | 275 | 80 | 705 | 85 |
| 7 | 7 | 170 | 550 | 247.5 | 80 | 375 | 65 |
| 8 | — | — | — | — | — | 55 | — |

In the table, "EP No." means "Electrophotographic photosensitive member". "Coating liquid" means "Surface layer coating liquid used for production". "DA" means "Particle diameter DA for peak top of PAA". "DB" means "Particle diameter DB for peak top of PAB". "Average distance" means "Average value of distances between centers of gravity of convex portions CA". "Standard deviation" means "Standard deviation of distances between centers of gravity of convex portions CA". "Rz" means "Maximum height Rz on surface". "Proportion" means "Proportion of volume of particles in total volume of surface layer [% by volume]".

3. Toner

A toner of the present example has a plurality of convex portions on the surface of a toner base particle. In order to stably generate the rolling promotion effect in the developing portion, it is preferable that the convex shapes are uniformly present on the surface. As a method for forming a surface layer having a homogeneous shape, it is suitable to produce a toner containing an organosilicon polymer as shown below.

The toner contains a toner particle having a toner base particle and a convex portion on the surface of the toner base particle, by cross-sectional observation of the toner particle with a scanning transmission electron microscope (STEM), a line is drawn along the circumference of the surface of the toner base particle, in a horizontal image converted on the basis of the line along the circumference, the length of the line along the circumference in a portion where the convex portion is present on the line that is formed by the circumference of the toner base particle is defined as a convex width W, the maximum length of the convex portion in the normal direction to the convex width W is indicated by D, the length from the apex of the convex portion to the line along the circumference in a line segment that forms the D is indicated by H, and a convex portion for which the D is the same as the H and the H is 20 nm or more is defined as a convex portion Y, the number-based average of the convex width W in the convex portion Y is at least 40 nm and not more than 200 nm, in the cross-sectional observation of the toner particle with the scanning transmission electron microscope STEM, when the width of the horizontal image is defined as a circumferential length L, and the total of the W of the convex portions Y is indicated by ΣW, ΣW/L is 0.5 or more, and the number average value of the convex widths W of the surface convex portions Y needs to be smaller than the above-described average distance between the centers of gravity of the convex portions CA on the surface of the photosensitive drum.

Figure 7:
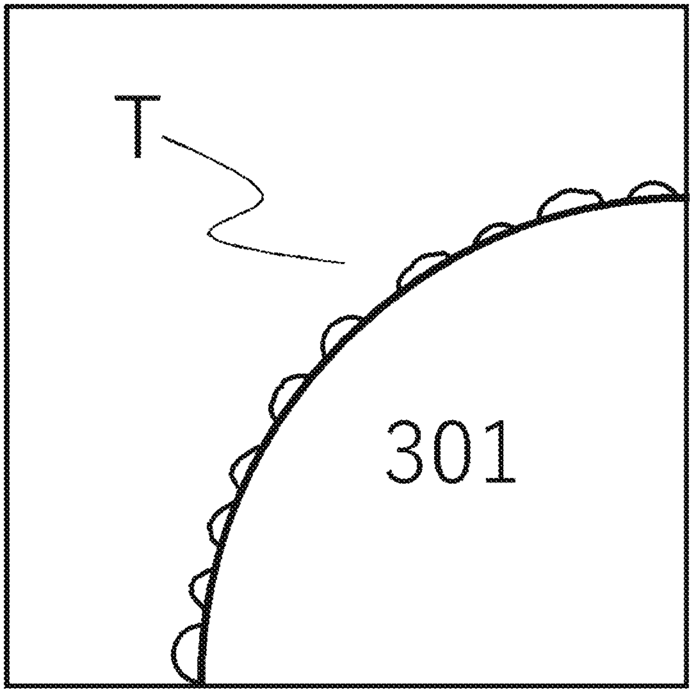
FIG. 7 is a schematic view showing a TEM image of a developer (toner) in the present invention.
Figures 8A, 8B, 8C:
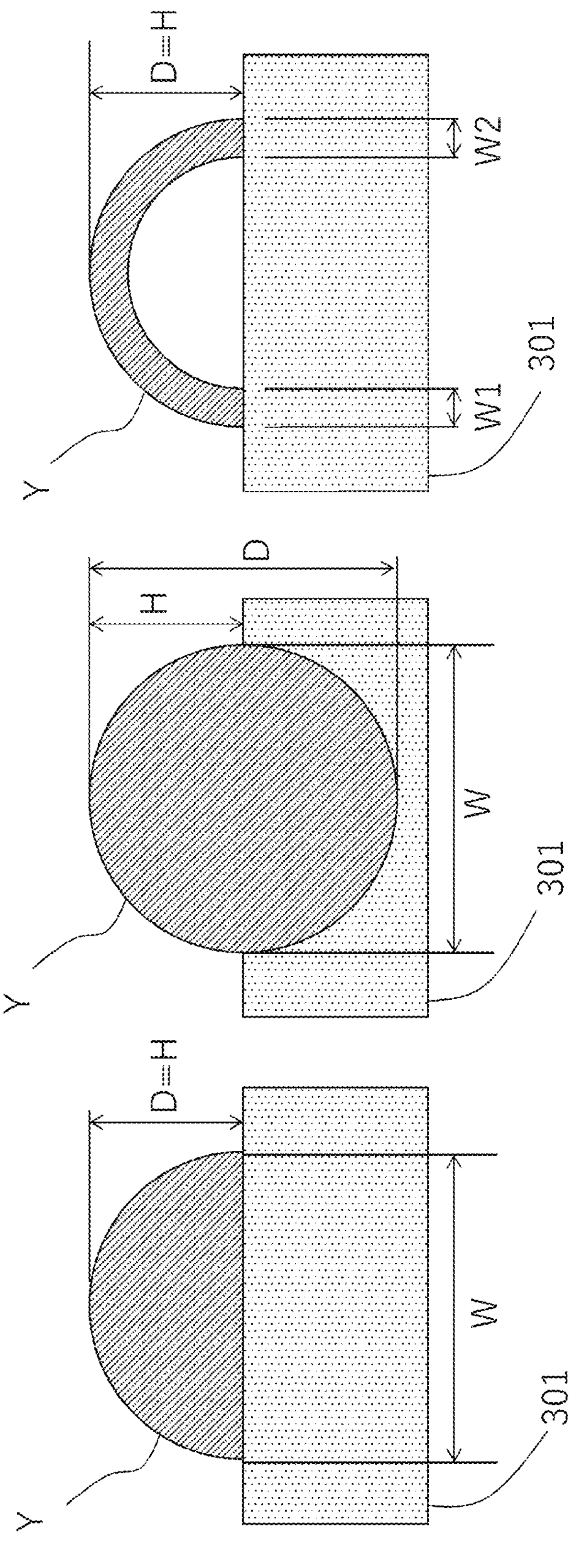
FIGS. 8A to 8C are schematic views for describing the convex shape of the convex portion on the surface of the developer.
Figure 9:
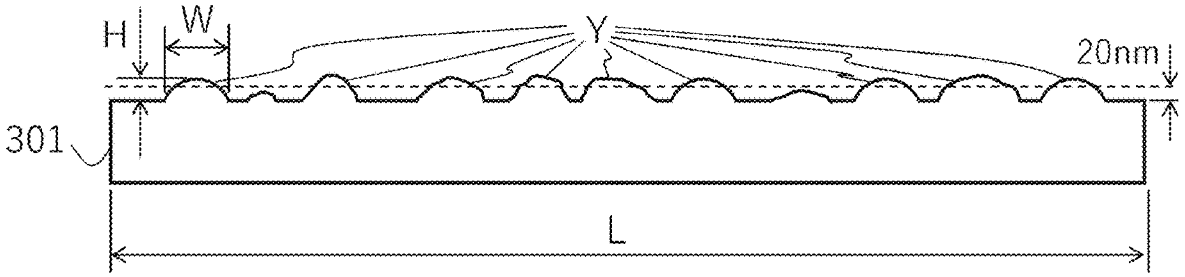
FIG. 9 is a schematic view of obtaining the shape of a convex portion Y from the TEM image of the developer in the present invention.

FIG. 7 to FIG. 9 show schematic diagrams of the cross-sectional observation of the toner particle with STEM and schematic diagrams of the convex width W and convex height H of the convex portion. FIG. 7 schematically shows a STEM image of a toner particle having convex portions on the surface of a toner base particle.

FIGS. 8A to 8C schematically show the width W of the convex portion, the maximum length D of the convex portion in the normal direction to W (convex maximum length D), and the convex height H that is the length from the apex portion of the convex portion projecting from the base particle to a straight line based on the circumference of the base particle when the resultant STEM image of the toner particle is connected with a polyline along the circumference of the toner base particle 301 and the polyline is linearly extended. FIGS. 8A to 8C show, as the convex portion, the convex portion Y having a height of 20 nm or more as an example, but it is also possible to determine D, H, and W in the same manner for convex portions having a height of 20 nm or less.

In the surface convex portion derived from the organosilicon polymer shown in this example, the maximum length D and the height H are equal to each other as shown in FIG. 8A. FIG. 8B shows a state in which a particle of an external additive or the like is attached to the toner base particles in a subsequent step and a part of the particle is embedded in the toner base particle. Furthermore, FIG. 8C shows a case where the convex portion on the surface of the toner base particle is hollow. In this case, the total of the widths W1 and W2 on both sides in the cross-sectional observation of the circumference of the toner base particle and the hollow convex portion is regarded as W.

In addition, FIG. 9 schematically shows an appearance in which convex portions having a convex height H of 20 nm or more among all convex portions in the cross-sectional observation image are treated as the convex portions Y In FIG. 9, the convex portions of the toner particle in the present example are smaller relative to the contour of the entire toner but are schematically shown for easy illustration.

The present inventors consider the reason for the fogging suppression effect being exhibited by the combination of the toner having the above-described convex shapes on the surface with the photosensitive drum having convex portions on the surface as described below.

When the number-based average of the widths W of the convex portions having a height of 20 nm or more on the surface of the toner base particle is smaller than the average distance between the centers of gravity of the convex CA portions on the surface of the photosensitive drum, the convex portions of the toner are likely to enter between the convex portions CA on the surface of the photosensitive drum. At this time, the convex portions CA on the surface of the photosensitive drum push the toner convex portions in a direction opposite to the movement direction of the surface of the developing roller, whereby the toner receives a force of rolling on the contact point with the developing roller as a rolling fulcrum.

Figure 10:
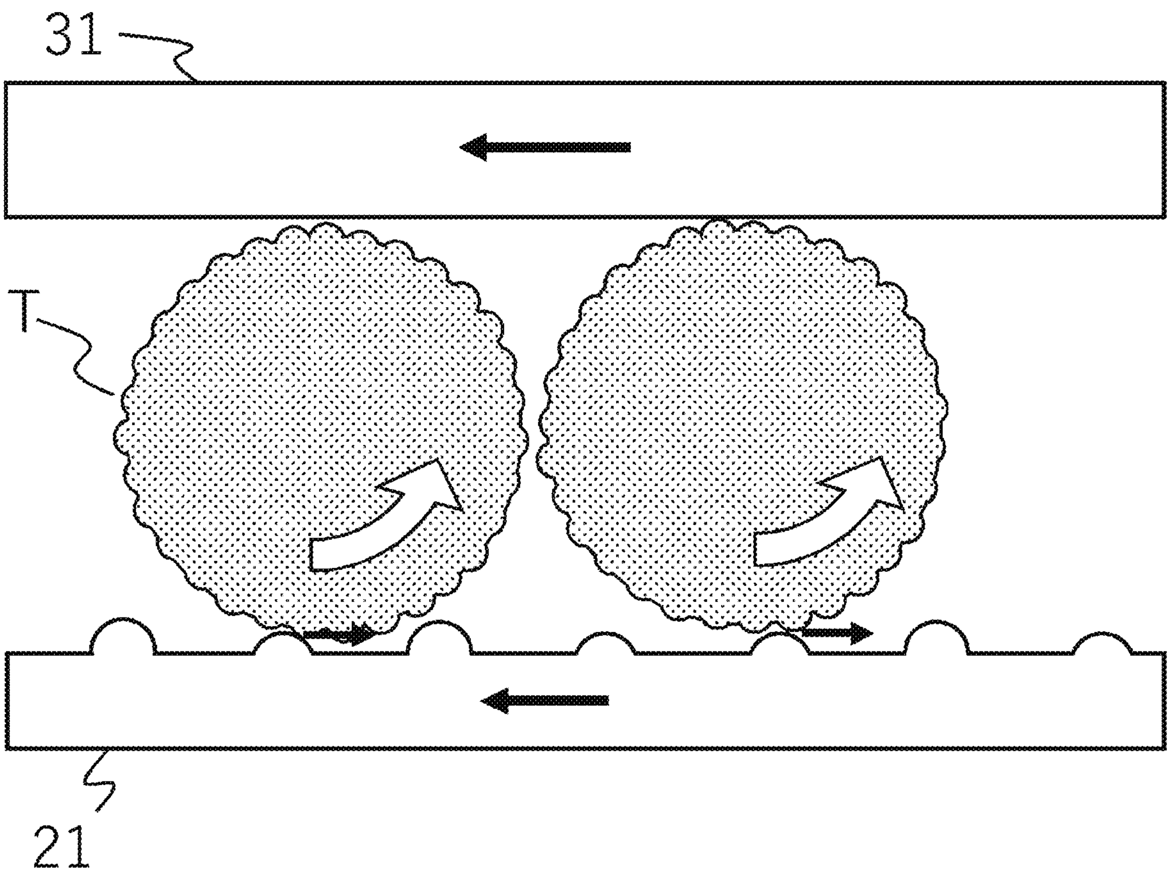
FIG. 10 is another schematic view showing the rolling promotion effect in the developing portion in the present invention.
Figure 11:
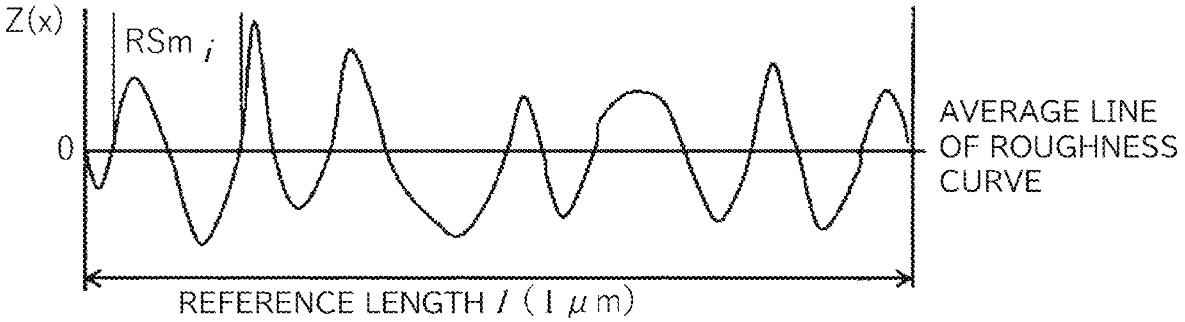
FIG. 11 is a schematic view of obtaining a roughness element length Rsm_t from the roughness curve of the convex portions on the surface of the developer.

At this time, when ΣW/L is 0.50 or more as shown in FIG. 10, the recessed portion that is formed between the adjacent convex portions on the surface of the toner base particle is narrower on average than the width W of the adjacent convex portion Y of the toner in the developing portion. Therefore, it is considered that the convex portions are less likely to be stuck between the adjacent toners, and charges are effectively imparted to the toner without hindering the rolling force generated at the convex portions of the photosensitive drum.

In addition, when the number average of the widths W of the convex portions Y on the surface of the toner base particle is less than 40 nm under the condition that the ΣW/L is 0.50 or more, small convex portions are densely present on the surface of the toner base particle. At this time, the toner and the photosensitive drum 21 come into contact with each other at near the apexes of the toner convex portions, and it is not possible to sufficiently obtain the rolling promotion effect. In addition, when the number average of the widths W of the convex portions Y is larger than 200 nm, the curvature of the convex portion Y on the surface of the toner base particle becomes large, and the rolling force FH does not become sufficiently large when the toner comes into contact with the convex portions CA on the surface of the photosensitive drum 21.

In addition, the convex portions formed of the organosilicon polymer as shown in the present example are almost hemispherical, and the toners are thus less likely to engage with each other, which is suitable.

In addition, when the convex portions Y are determined by the above-described method by the cross-sectional observation of the toner with STEM, and the convex widths W and the convex heights H are determined, it is preferable that the number average of the convex heights H is 120 nm or less, and the number proportion P(D/W) of the convex portions for which the ratio D/W of the convex maximum length D to the convex width W is at least 0.33 and not more than 0.60 is 70% by number or more.

Why fogging can be suppressed in the combination of the toner having the convex portions in the above-described range and the photosensitive drum 21 is considered as described below.

The height of the convex portion Y on the surface of the toner base particle is 20 nm or more. A convex portion smaller than 20 nm is not capable of providing a sufficient rolling force between the surface of the photosensitive drum and the convex portion. In addition, when the number average value of the heights H of the convex portions Y exceeds 120 nm, the convex portions Y are likely to fall off along with durable use, and ΣW/L becomes small, and it may not be possible to promote rolling throughout durable use.

In addition, since the maximum length D and convex height of the convex portion are equal to each other, D/W becomes the ratio of the height of the convex portion Y from the toner base particle to the convex width W. When the ratio D/W of the height to width of the surface convex portion Y is smaller than 0.33, the slope of the convex portion Y is small as a whole, and a sufficient rolling force is less likely to be generated when the toner comes into contact with the convex portions CA of the photosensitive drum 21. In addition, when D/W is larger than 0.60, the rolling force acting on the convex portions due to contact with the convex portions on the surface of the photosensitive drum 21 becomes large, but the convex portions on the toner surface are likely to fall off due to repeated contact. Therefore, ΣW/L may become small and it may not be possible to promote the rolling throughout durable use. From such facts, it was found that when the number proportion P(D/W) of D/W being at least 0.33 and not more than 0.60 is 70% by number or more in the convex portion Y having a height of 20 nm or more, the fog suppression effect can be maintained throughout durable use.

In addition, in order to maintain the toner rolling promotion effect and fogging suppression according to the present invention for a long period of time, it is necessary that the convex shapes on the surface of the toner base particle are less likely to change throughout durable use.

In the case of a toner having the organosilicon polymer shown in this example on the surface of the toner base particle, the adhesion rate of the organosilicon polymer of the toner is preferably 80% by mass or more. When the adhesion rate is 80% by mass or more, the surface shape can be maintained throughout durable use, and it is thus possible to sustain the fogging suppression effect throughout durable use. The adhesion rate is more preferably 90% by mass or more and still more preferably 95% by mass or more. In the above-described range, the toner surface shape is less likely to change throughout durable use, and fogging can be suppressed by the stable rolling promotion effect.

As a method for forming the convex portions on the surface layer of the toner base particle, the convex portions can be formed by adding an external additive to the toner base particle or the like; however, in this case, it is necessary to suppress the detachment or embedding of the external additive. In addition, particles that are externally added need to be in contact with the convex portions on the surface of the photosensitive drum and not change in shape due to wear or deformation within a short period of time.

Furthermore, the circularity of the toner is preferably 0.95 or more. When the circularity is 0.95 or more, the toner is likely to actually roll when receiving a rolling force from the photosensitive drum 21 in the developing portion.

In addition, it is preferable that the convex portions present on the surface layer of the toner base particle are uniformly present across the front surface of the toner base particle. In a case where the convex portions are uniformly present on the surface of the toner base particle, the rolling promotion effect can be stably exhibited even when any portion of the surface of the toner base particle comes into contact with the convex portion on the surface of the photosensitive drum 21, which is preferable.

As a preferable method for forming the above-described specific convex shapes on the surface of the toner base particle, it is preferable to obtain a toner particle dispersion by adding an organic silicon compound to a toner base particle dispersion obtained by dispersing the toner base particles in an aqueous medium to form the convex shape. The solid content concentration of the toner base particle dispersion is preferably adjusted to at least 25% by mass and not more than 50% by mass. In addition, the temperature of the toner base particle dispersion is preferably adjusted to 35° C. or higher. In addition, the pH of the toner base particle dispersion is preferably adjusted to a pH at which condensation of the organic silicon compound is less likely to proceed. Since the pH at which condensation of the organosilicon polymer is less likely to proceed differs depending on substances, it is preferable that the pH is within ±0.5 from a pH at which the reaction is least likely to proceed.

The organosilicon polymer is represented by the following formula (1).

$$R—SiO3/2 \qquad (1)$$

(R is an alkyl group having at least 1 and not more than 6 carbon atoms or a phenyl group.)

In the partial structure of the organosilicon polymer represented by the formula (1), one of the four valences of a Si atom is bonded to an organic group represented by R and the rest three are bonded to an O atom. The O atom configures a state where the two valences are both bonded to Si, that is a siloxane bond (Si—O—Si). When considered in terms of Si atoms and O atoms, the organosilicon polymer has two Si atoms and three O atoms and is thus expressed as —SiO3/2.

An organic silicon compound for producing the organosilicon polymer in the present invention specifically include the following compounds. Examples thereof include methyltrimethoxysilane, methyltriethoxysilane, methyltrichlorosilane, ethyltrimethoxysilane, ethyltriethoxysilane, ethyltrichlorosilane, ethyltriacetoxysilane, propyltrimethoxysilane, propyltriethoxysilane, propyltrichlorosilane, butyltrimethoxysilane, butyltriethoxysilane, butyltrichlorosilane, butylmethoxydichlorosilane, butylethoxydichlorosilane, hexyltrimethoxysilane, hexyltriethoxysilane, phenyltrimethoxysilane, phenyltriethoxysilane, and the like. The organic silicon compound may be used singly or two or more organic silicon compounds may be used in combination.

In addition, it is preferable to use an organic silicon compound that has been hydrolyzed. For example, as a pretreatment, the organic silicon compound is hydrolyzed in a separate container. When the amount of the organic silicon compound is 100 parts by mass, the feed ratio for the hydrolysis of water from which an ionic component has been removed, such as ion exchanged water or RO water, is preferably at least 40 parts by mass and not more than 500 parts by mass and more preferably at least 100 parts by mass and not more than 400 parts by mass. As the conditions for the hydrolysis, it is preferable that the pH is at least 2 and not more than 7, the temperature is at least 15° C. and not more than 80° C., and the time is at least 30 minutes and not more than 600 minutes.

The resultant hydrolysis solution and the toner particle dispersion are mixed together to be adjusted to a pH suitable for condensation (preferably at least 6 and not more than 11 or at least 1 and not more than 3, and more preferably at least 8 and not more than 11). The amount of the hydrolysis solution is adjusted so that at least 5.0 parts by mass and not more than 30.0 parts by mass of the organic silicon compound is contained relative to 100 parts by mass of the toner base particle, whereby formation of the convex shapes becomes easy. The temperature and time for the formation and condensation of the convex shapes are preferably 35° C. or higher and 60 minutes or longer.

In addition, upon controlling the convex shapes on the surface of the toner base particle, it is preferable to adjust the pH in two separate stages. The convex shapes on the surface of the toner base particle can be controlled by appropriately adjusting the holding time before adjustment of the pH and the holding time before adjustment of the pH in the second stage and condensing the organic silicon compound. In addition, the convex shapes can also be controlled by adjusting the condensation temperature of the organic compound within a range of at least 35° C. and not more than 80° C.

Hereinafter, a specific method for manufacturing the toner in the present example will be described, but is not limited thereto.

For the toner of the present invention, it is preferable that the toner base particles are manufactured in an aqueous medium and convex portions containing the organosilicon polymer are formed on the surfaces of the toner base particles.

Among the above-described manufacturing methods, a suspension polymerization method, a dissolution suspension method, and an emulsion aggregation method are preferable as a method for manufacturing the toner particle, and a suspension polymerization method is particularly preferable. In the suspension polymerization method, the organosilicon polymer is likely to be uniformly precipitated on the surfaces of the toner base particles, the adhesion between the organosilicon polymer and the surfaces of the toner base particles is excellent, and environmental stability, an effect of suppressing a charge amount reversal component, and durability sustainability thereof become favorable. Hereinafter, the suspension polymerization method will be further described.

To the above-described polymerizable monomer composition, a release agent or other resins may be added, if necessary. In addition, after the end of a polymerization step, the generated particles are washed, collected by filtration, and dried to obtain a toner particle. The temperature may be raised in the latter half of the polymerization step. Furthermore, in order to remove an unreacted polymerizable monomer or a by-product, it is also possible to distill away a part of the dispersion medium from the reaction system after the latter half of the polymerization step or the end of the polymerization step.

Examples of the release agent include petroleum-based waxes such as paraffin waxes, microcrystalline waxes, petrolatum and derivatives thereof, montan waxes and derivatives thereof, hydrocarbon waxes and derivatives thereof by the Fischer-Tropsch method, polyolefin waxes such as polyethylene, polypropylene and derivatives thereof, natural waxes such as carnauba waxes and candelilla waxes and derivatives thereof, higher aliphatic alcohols, fatty acids such as stearic acid and palmitic acid, or compounds thereof, acid amide waxes, ester waxes, ketones, hydrogenated castor oils, and derivatives thereof, vegetable waxes, animal waxes, and silicone resins. The derivatives include oxides, block copolymers with a vinyl-based monomer, and graft-modified products. These release agents can be used singly or in a mixture form.

As the other resins, it is possible to use the following resins to an extent that the effect of the present invention is not affected. Single polymers of styrene such as polystyrene or polyvinyl toluene and a substituted body thereof, styrene-based copolymers such as a styrene-propylene copolymer, a styrene-vinyltoluene copolymer, a styrene-vinylnaphthaline copolymer, a styrene-methyl acrylate copolymer, a styrene-ethyl acrylate copolymer, a styrene-butyl acrylate copolymer, a styrene-octyl acrylate copolymer, a styrene-dimethylaminoethyl acrylate copolymer, a styrene-methyl methacrylate copolymer, a styrene-ethyl methacrylate copolymer, a styrene-butyl methacrylate copolymer, a styrene-dimethylaminoethyl methacrylate copolymer, a styrene-vinyl methyl ether copolymer, a styrene-vinyl ethyl ether copolymer, a styrene-vinyl methyl ketone copolymer, a styrene-butadiene copolymer, a styrene-isoprene copolymer, a styrene-maleic acid copolymer, and a styrene-maleic acid ester copolymer; poly(methyl methacrylate), poly(butyl methacrylate), poly(vinyl acetate), polyethylene, polypropylene, polyvinyl butyral, silicone resins, polyester resins, polyamide resins, epoxy resins, polyacrylic resins, rosins, modified rosins, terpene resins, phenolic resins, aliphatic or alicyclic hydrocarbon resins, and aromatic petroleum resins. These resins can be used singly or in a mixture form.

As a polymerizable monomer in the suspension polymerization method, the following vinyl-based polymerizable monomers can be suitably exemplified. Styrene; styrene derivatives such as α-methylstyrene, β-methylstyrene, o-methylstyrene, m-methylstyrene, p-methylstyrene, 2,4-dimethylstyrene, p-n-butylstyrene, p-tert-butylstyrene, p-n-hexylstyrene, p-n-octyl, p-n-nonylstyrene, p-n-decylstyrene, p-n-dodecylstyrene, p-methoxystyrene, and p-phenylstyrene; acrylic polymerizable monomers such as methyl acrylate, ethyl acrylate, n-propyl acrylate, iso-propyl acrylate, n-butyl acrylate, iso-butyl acrylate, tert-butyl acrylate, n-amyl acrylate, n-hexyl acrylate, 2-ethylhexyl acrylate, n-octyl acrylate, n-nonyl acrylate, cyclohexyl acrylate, benzyl acrylate, dimethyl phosphate ethyl acrylate, diethyl phosphate ethyl acrylate, dibutylphosphate ethyl acrylate, and 2-benzoyloxy ethyl acrylate; methacrylic polymerizable monomers such as methyl methacrylate, ethyl methacrylate, n-propyl methacrylate, iso-propyl methacrylate, n-butyl methacrylate, iso-butyl methacrylate, tert-butyl methacrylate, n-amyl methacrylate, n-hexyl methacrylate, 2-ethylhexyl methacrylate, n-octyl methacrylate, n-nonyl methacrylate, diethylphosphate ethyl methacrylate, and dibutylphosphate ethyl methacrylate; methylene aliphatic mono carboxylic acid esters; vinyl esters such as vinyl acetate, vinyl propionate, vinyl benzoate, vinyl butyrate, vinyl benzoate, and vinyl formate; vinyl ethers such as vinyl methyl ether, vinyl ethyl ether, and vinyl isobutyl ether; and vinyl methyl ketone, vinyl hexyl ketone, and vinyl isopropyl ketone.

Among these vinyl polymers, a styrene polymer, a styrene-acrylic copolymer, or a styrene-methacrylic copolymer is preferable.

In addition, a polymerization initiator may be added upon the polymerization of the polymerizable monomer. Examples of the polymerization initiator includes the following: azo-based or diazo-based polymerization initiators such as 2,2'-azobis-(2,4-divaleronitrile), 2,2'-azobisisobutyronitrile, 1,1'-azobis(cyclohexane-1-carbonitrile), 2,2'-azobis-4-methoxy-2,4-dimethylvalenitrile, and azobisisobutyronitrile; and peroxide-based polymerization initiators such as benzoyl peroxide, methyl ethyl ketone peroxide, diisopropyloxy carbonate, cumene hydroperoxide, 2,4-dichlorobenzoyl peroxide, and lauroyl peroxide. These polymerization initiators are preferably added in an amount of at least 0.5% by mass and not more than 30.0% by mass relative to the polymerizable monomer and may be used singly or jointly.

In addition, to control the molecular weight of the binder resin that configures the toner base particle, a chain transfer agent may be added upon the polymerization of the polymerizable monomer. The preferable amount added is at least 0.001% by mass and not more than 15.000% by mass of the polymerizable monomer.

Incidentally, in order to control the molecular weight of the binder resin that configures the toner base particle, a cross-linking agent may be added upon the polymerization of the polymerizable monomer. Examples of a cross-linkable monomer include the following: diacrylates such as divinylbenzene, bis(4-acryloxypolyethoxyphenyl)propane, ethylene glycol diacrylate, 1,3-butyleneglycol diacrylate, 1,4-butanediol diacrylate, 1,5-pentanediol diacrylate, 1,6-hexanediol diacrylate, neopentyl glycol diacrylate, diethylene glycol diacrylate, triethylene glycol diacrylate, tetraethylene glycol diacrylate, and polyethylene glycol #200, #400, #600, dipropylene glycol diacrylate, polypropylene glycol diacrylate, polyester-type diacrylate (MANDA, Nippon Kayaku Co., Ltd.), and methacrylates obtained by changing the above acrylates.

Examples of a polyfunctional cross-linkable monomer include the following: pentaerythritol triacrylate, trimethylolethane triacrylate, trimethylolpropane triacrylate, tetramethylolmethane tetraacrylate, oligoester acrylate and methacrylate thereof, 2,2-bis(4-methacryloxy/polyethoxyphenyl)propane, diacrylic phthalate, triallyl cyanurate, triallyl isocyanurate, triallyl trimelitate, and diaryl chlorendate. The preferable amount added is at least 0.001% by mass and not more than 15.000% by mass relative to the polymerizable monomer.

In a case where a medium that is used upon the suspension polymerization is an aqueous medium, the following can be used as a dispersion stabilizer for the particles of the polymerizable monomer composition: Tricalcium phosphate, magnesium phosphate, zinc phosphate, aluminum phosphate, calcium carbonate, magnesium carbonate, calcium hydroxide, magnesium hydroxide, aluminum hydroxide, calcium metasilicate, calcium sulfate, barium sulfate, bentonite, silica, and alumina. In addition, examples of an organic dispersant include the following: polyvinyl alcohol, gelatin, methyl cellulose, methyl hydroxypropyl cellulose, ethyl cellulose, sodium salt of carboxymethyl cellulose, and starch.

In addition, it is also possible to use commercially available nonionic, anionic, or cationic surfactants. Examples of such surfactants include the following: sodium dodecyl sulfate, sodium tetradecyl sulfate, sodium pentadecyl sulfate, sodium octyl sulfate, sodium oleate, sodium laurate, and potassium stearate.

A colorant that is used in the toner of the present invention is not particularly limited, and known colorants can be used.

The content of the colorant is preferably at least 3.0 parts by mass and not more than 15.0 parts by mass relative to 100 parts by mass of the binder resin or the polymerizable monomer.

In the toner of the present invention, a charge control agent can be used during the manufacture of the toner particle, and known charge control agents can be used. The amount of the charge control agent added is preferably at least 0.01 parts by mass and not more than 10.00 parts by mass relative to 100 parts by mass of the binder resin or the polymerizable monomer.

In the toner of the present invention, various organic or inorganic fine powders may be externally added to the toner particle, if necessary. The organic or inorganic fine powders preferably have a particle diameter that is 1/10 or less of the weight average particle diameter of the toner particle from the viewpoint of durability when added to the toner particle.

As the organic or inorganic fine powders, for example, the following fine powders are used.

(1) Fluidity-imparting agent: Silica, alumina, titanium oxide, carbon black, and carbon fluoride.
(2) Abrasive: Metal oxides (for example, strontium titanate, cerium oxide, alumina, magnesium oxide, and chromium oxide), nitrides (for example, silicon nitride), carbides (for example, silicon carbide), metal salts (for example, calcium sulfate, barium sulfate, and calcium carbonate).
(3) Lubricant: Fluorine-based resin powders (for example, vinylidene fluoride and polytetrafluoroethylene), fatty acid metal salts (for example, zinc stearate and calcium stearate).
(4) Charge-controllable particles: Metal oxides (for example, tin oxide, titanium oxide, zinc oxide, silica, and alumina) and carbon black.

The organic or inorganic fine powders are also capable of treating the surface of the toner particle for improvement in toner fluidity and uniform charging of the toner particle. Examples of a treatment agent for the hydrophobic treatment of the organic or inorganic fine powders include unmodified silicone varnishes, various modified silicone varnishes, unmodified silicone oils, various modified silicone oils, silane compounds, silane coupling agents, other organic silicon compounds, and organic titanium compounds. These treatment agents may be used singly or jointly.

Hereinafter, various measurement methods relating to the toner of the present example will be described.

<Method for Calculating Average Particle Diameter of Convex Portions in Scanning Electron Microscope (SEM)>

The SEM observation method is as described below. An image photographed with Hitachi ultra-high resolution field emission scanning electron microscope S-4800 (Hitachi High-Tech Corporation) was used. The image photographing conditions of S-4800 are as described below.

(1) Specimen Production

A conductive paste (TED PELLA, Inc., Product No. 16053, PELCO Colloidal Graphite, isopropanol base) was thinly applied onto a sample table (aluminum specimen table: 15 mm×6 mm), and the toner is sprayed thereon. Furthermore, excess fine particles are removed from the specimen table by blowing an air, and platinum is then deposited at 15 mA for 15 seconds. The specimen table is set in the specimen holder, and the specimen table height is adjusted to 30 mm with the specimen height gauge.

(2) Setting of S-4800 Observation Conditions

Liquid nitrogen is injected into the anti-contamination trap attached to the housing of S-4800 until the liquid nitrogen overflows and left to stand for 30 minutes. The "PC-SEM" of S-4800 is activated, and flushing (cleaning of an FE chip, which is an electron source) is performed. The accelerating voltage display portion of the control panel on the screen is clicked, and the [flushing] button is pressed to open the flushing execution dialog. It is confirmed that the flushing intensity is 2, and flushing is executed. It is confirmed that the emission current due to flushing is 20 to 40 μA. The specimen holder is inserted into the specimen chamber of the S-4800 housing. The [origin] on the control panel is pressed to move the specimen holder to the observation position.

The accelerating voltage display portion is clicked to open the HV setting dialog, the accelerating voltage is set to [2.0 kV], and the emission current is set to [10 μA]. In the [basic] tab of the operation panel, the signal selection is installed at [SE], and the SE detector is put into the mode of observing a reflected electron image by selecting [low (L)]. Similarly, in the [basic] tab of the operation panel, the probe current of the electro-optical system condition block is set to [Normal], the focus mode is set to [UHR], and the WD is set to [8.0 mm]. The [ON] button in the accelerating voltage display portion of the control panel is pressed to apply the accelerating voltage.

(3) Focus Adjustment

The inside of the magnification display portion of the control panel is dragged to set the magnification to 5000 (5 k) times. The focus knob [COARSE] of the operation panel is rotated to adjust the aperture alignment to a place where the S-4800 is somewhat in focus. The [Align] in the control panel is clicked, the alignment dialog is displayed, and the [beam] is selected. The STIGMA/ALIGNMENT knob (X, Y) of the operation panel is rotated to move the beam to be displayed to the center of the concentric circle.

Next, the [aperture] is selected, and the STIGMA/ALIGNMENT knob (X, Y) is rotated one by one so that the movement of the image is stopped or minimized. The aperture dialog is closed, and the 5-4800 is brought into focus by auto-focus. This operation is further repeated twice to bring the 5-4800 into focus. The inside of the magnification display portion of the control panel is dragged in a state where the middle point of the maximum diameter of the observation particles is aligned with the center of the measurement screen to set the magnification to 10,000 (10 k) times. The focus knob [COARSE] of the operation panel is rotated to adjust the aperture alignment to a place where the 5-4800 is somewhat in focus. The [Align] in the control panel is clicked, the alignment dialog is displayed, and the [beam] is selected. The STIGMA/ALIGNMENT knob (X, Y) of the operation panel is rotated to move the beam to be displayed to the center of the concentric circle.

Next, the [aperture] is selected, and the STIGMA/ALIGNMENT knob (X, Y) is rotated one by one so that the movement of the image is stopped or minimized. The aperture dialog is closed, and the S-4800 is brought into focus by auto-focus. After that, the magnification is set to 50000 (50 k) times, the focus is adjusted using the focus knob, the STIGMA/ALIGNMENT knob, in the same manner as described above, and the S-4800 is brought into focus again by auto-focus. This operation is repeated again to bring the S-4800 into focus.

(4) Image Storage

Brightness is adjusted in the ABC mode, and a photograph is photographed in size of 640×480 pixels and stored.

From the resultant SEM observation results, the number-average diameter (D1) of 500 convex portions of 20 nm or more present on the toner surface was calculated by image processing software (ImageJ). The measurement method is as described below.

Measurement of Number Average Particle Diameter of Convex Portions of Organosilicon Polymer The convex portions and the toner particle in the image are binarized and classified by color by particle analysis. Next, the maximum length of the selected shape is selected from the measurement commands, and the convex diameter of one convex portion is measured. This operation is performed a plurality of times, and the average value at 500 sites is obtained, thereby calculating the number average particle diameter of the convex portions.

<Method for Observing Cross Section of Toner in Scanning Transmission Electron Microscope (STEM)>

A cross section of the toner to be observed with the scanning transmission electron microscope (STEM) is produced as described below.

Hereinafter, the procedure for producing the cross section of the toner will be described.

First, a single layer of the toner is sprayed onto a cover glass (Matsunami Glass Ind., Ltd., square cover glass, square No. 1), and an Os film (5 nm) and a naphthalene film (20 nm) are applied to the toner as protective films using an osmium plasma coater (Filgen, Inc., OPC80T).

Next, a PTFE tube (Φ1.5 mm×Φ3 mm×3 mm) is filled with a photocurable resin D800 (JEOL Ltd.), and the cover glass is quietly placed on the tube so that the toner comes into contact with the photocurable resin D800. The resin is cured by irradiation with light in this state, and the cover glass and the tube are then removed, thereby forming a cylindrical resin with the toner embedded on the outermost surface.

The cylindrical resin was cut from the outermost surface as long as half the diameter of the toner (for example 4.0 μm in a case where the weight average particle diameter (D4) is 8.0 μm) with an ultrasonic ultra-microtome (Leica Microsystems, UC7) at a cutting speed of 0.6 mm/s to make the cross section of the central part of the toner appear.

Next, the resin is cut so that the film thickness reaches 100 nm to produce a thin sample of the cross section of the toner. The cross section of the central part of the toner can be obtained by cutting the resin by such a method.

The probe size of STEM was 1 nm, and an image was acquired in an image size of 1024×1024 pixels. In addition, for a bright field image, the Contrast was adjusted to 1425, and the Brightness was adjusted to 3750 in the Detector Control panel, and the Contrast was adjusted to 0.0, the Brightness was adjusted to 0.5, and the Gamma was adjusted to 1.00 in the Image Control panel, and an image was acquired. The image magnification was 100,000 times, and the image was acquired such that about ¼ to ½ of the circumference in the cross section in one toner particle was included as shown in FIG. 7.

Image analysis is performed on the resultant image using image processing software (ImageJ (available at https://imagej.nih.gov/ij/)), and the convex portions containing the organosilicon polymer are measured. The image analysis is performed on 30 STEM images.

First, a line is drawn along the circumference of the toner base particle with a line drawing tool ("Segmented line" in the Straght tab is selected). For parts where the convex portions of the organosilicon polymer are embedded in the toner base particle, the line is smoothly connected as if the convex portions are not embedded.

The image is converted into a horizontal image based on the line ("Selection" in the Edit tab is selected, the line width is changed to 500 pixels in the properties, "Selection" in the Edit tab is then selected, and Straghtener is performed). For each convex portion containing the organosilicon polymer in the horizontal image, the convex width W, the convex diameter D, and the convex height H are measured by the above-described methods. P(D/W) is calculated from the measurement results of 30 STEM images. In addition, the total value of the convex widths W of the convex portions having a convex height H of 20 nm or more that are present in the horizontal image used for the image analysis is indicated by ΣW, and the width of the horizontal image used for the image analysis is defined as the circumferential length L. The width of the horizontal image corresponds to the length of the surface of the toner base particle in the STEM image. Σw/L is calculated from one image, and the arithmetic average value of 30 STEM images is employed.

In detail, the convex portions are measured as described above and in FIGS. 7 to 9. The measurement is performed after the Straight Line of the Straight tab is overlapped on the scale on the image with ImageJ, and the length of the scale on the image is set with the Set Scale in the Analyze tab. A line segment corresponding to the convex width W or the convex height H can be drawn with the Straight Line of the Straight tab and measured with the Measure in the Analyze tab.

<Method for Measuring Adhesion Rate of Organosilicon Polymer>

160 g of sucrose (manufactured by Kishida Chemical Co., Ltd.) is added to 100 mL of ion exchanged water and dissolved in hot water to prepare a sucrose concentrate. 31 g of the sucrose concentrate and 6 mL of CONTAMINON N (a 10% by mass aqueous solution of a neutral detergent for washing a precision measuring instrument having a pH of 7 composed of a nonionic surfactant, an anionic surfactant, and an organic builder, manufactured by Wako Pure Chemical Industries, Ltd.) are put into a centrifuge tube (capacity: 50 mL) to produce a dispersion. 1.0 g of the toner is added to this dispersion, and massing of the toner is loosened with a spatula or the like.

The centrifuge tube is shaken with a shaker at 350 spm (strokes per min.) for 20 minutes. After the shaking, the solution is put into a different glass tube for a swing rotor (capacity: 50 mL) and separated with a centrifuge (H-9R manufactured by Kokusan Co., Ltd.) under conditions of 3500 rpm and 30 minutes. Sufficient separation of the toner and the aqueous solution is visually confirmed, and the toner separated into the uppermost layer is collected with the spatula or the like. The collected aqueous solution containing the toner is filtered with a vacuum filter and then dried with a drier for one hour or longer. The dried product is broken with the spatula, and the amount of silicon is measured with fluorescent X-rays. The adhesion rate (%) is calculated from the ratio of the amounts of elements that are measurement objects in the toner after water washing and the initial toner.

Each element is measured with fluorescent X-rays according to JIS K 0119-1969 and specifically measured as described below.

As the measuring instrument, a wavelength dispersion type fluorescent X-ray analyzer "Axios" (manufactured by Malvern Panalytical Ltd.) and an attached dedicated software "SuperQ ver. 4.0F" (manufactured by Malvern Panalytical Ltd.) for setting measurement conditions and analyzing measurement data are used. Rh is used as the anode of the X-ray tube, the measuring atmosphere is set to a vacuum, the measuring diameter (collimator mask diameter) is set to 10 mm, and the measuring time is set to 10 seconds. In addition, detection is performed with a proportional counter (PC) in the case of measuring a light element and with a scintillation counter (SC) in the case of measuring a heavy element.

As a measurement sample, about 1 g of the toner washed with water and the initial toner are put into a dedicated aluminum ring for pressing having a diameter of 10 mm, flattened, pressurized at 20 MPa for 60 seconds using a tablet molding compressor "BRE-32" (manufactured by Maekawa Testing Machine Mfg. Co., Ltd.), and molded to pellets having a thickness of about 2 mm, and the pellets are used.

Measurement is performed under the above-described conditions, elements are identified on the basis of the resultant peak positions of the X-ray, and the concentrations thereof are calculated from the count rate (unit: cps) that is the number of X-ray photons per unit time.

As a method for determining the amount of silicon in the toner, for example, a silica (SiO2) fine powder is added so that the content thereof reaches 0.5 parts by mass relative to 100 parts by mass of the toner particle, and the mixture is sufficiently mixed using a coffee mill. The silica fine powder is mixed with the toner particle so that the content thereof reaches 2.0 parts by mass and 5.0 parts by mass, respectively, in the same manner, and these are used as specimens for a calibration curve.

For each specimen, pellets of the specimen for a calibration curve are produced as described above using the tablet molding compressor, and the count rate (unit: cps) of a Si-Kα ray that is observed at a diffraction angle (2θ) =109.08° at the time of using PET as a spectroscopic crystal is measured. At this time, the accelerating voltage and the current value of the X-ray generator are set to 24 kV and 100 mA, respectively. A calibration curve of a linear function is obtained with the resultant count rate of the X-ray indicated along the vertical axis and the amount of SiO2 added in each specimen for a calibration curve indicated along the horizontal axis.

Next, the toner, which is the analysis object, is made into pellets using the tablet molding compressor as described above, and the count rate of the Si-Kα rays is measured. In addition, the content of the organosilicon polymer in the toner is obtained from the above-described calibration curve. The ratio of the amount of the element in the toner washed with water to the amount of the element in the initial toner calculated by the above-described method was obtained and regarded as the adhesion rate (%).

<Method for Measuring Average Circularity of Toner>

The average circularity of the toner is measured with a flow-type particle image analyzer "FPIA-3000" (manufactured by Sysmex Corporation) under the measurement and analysis conditions during a calibration operation.

A specific measurement method is as described below. First, 20 mL of ion exchanged water from which an impurity solid content or the like has been removed in advance is put into a glass container. 0.2 mL of a diluted solution obtained by diluting "CONTAMINON N" (a 10% by mass aqueous solution of a neutral detergent for washing a precision measuring instrument having a pH of 7 composed of a nonionic surfactant, an anionic surfactant, and an organic builder, manufactured by Wako Pure Chemical Industries, Ltd.) with ion exchange water to 3 parts by mass is added thereto as a dispersant.

Furthermore, 0.02 g of the measurement specimen is added thereto, and a dispersion treatment is performed for two minutes using an ultrasonic disperser to produce a dispersion for measurement. At this time, the dispersion is appropriately cooled so that the temperature thereof reaches at least 10° C. and not more than 40° C. As the ultrasonic disperser, a desktop ultrasonic washer/disperser (for example, "VS-150" manufactured by Velvo-Clear) having an oscillation frequency of 50 kHz and an electrical output of 150 W is used, a predetermined amount of ion exchanged water is put in a water tank, and 2 mL of the CONTAMINON N is added into the water tank. For the measurement, the flow-type particle image analyzer equipped with "LUCPLFLN" (magnification: 20 times, numerical aperture: 0.40) as the objective lens was used, and particle sheath "PSE-900A" (manufactured by Sysmex Corporation) was used as a sheath solution. The dispersion prepared according to the above-described procedure is introduced into the flow-type particle image analyzer, and 3000 toner particles are measured in an HPF measurement mode and in a total count mode. In addition, the binarization threshold value upon particle analysis is set to 85%, the analyzed particle diameter is limited to a circle equivalent diameter of 1.985 μm or more and less than 39.69 μm, and the average circularity of the toner particle is obtained.

Upon the measurement, automatic focus adjustment is performed using standard latex particles (for example, "RESEARCH AND TEST PARTICLES Latex Microsphere Suspensions 5200A" manufactured by Duke Scientific Corp. is diluted with ion exchanged water) before the start of the measurement. After that, it is preferable to perform focus adjustment every two hours from the start of the measurement.

In the present invention, a flow-type particle image measuring instrument for which Sysmex Corporation has performed the calibration operation and Sysmex Corporation has issued a calibration certificate is used. The measurement is performed under measurement and analysis conditions at the time of receiving the calibration certificate except that the analyzed particle diameter is limited to a circle equivalent diameter of 1.985 μm or more and less than 39.69 μm.

The measurement principle of the flow-type particle image measuring instrument "FPIA-3000" (manufactured by Sysmex Corporation) is that flowing particles are photographed as a still image and image analysis is performed. A specimen added to the specimen chamber is fed into a flat sheath flow cell with a specimen suction syringe. The specimen fed into the flat sheath flow is caught in a sheath fluid to form a flat flow.

The specimen that passing through the inside of the flat sheath flow cell is irradiated with strobe light at intervals of 1/60 seconds, and it is possible to photograph the flowing particles as a still image. In addition, the flowing particles are a flat flow and thus photographed in focus. The particle image is photographed with a CCD camera, the photographed image is processed at an image processing resolution of 512×512 pixels (0.37×0.37 μm per pixel), the contour of each particle image is extracted, and the projected area S, circumferential length PM, or the like in the particle image is measured.

Next, the circle equivalent diameter and the circularity are obtained using the area S and the circumferential length PM. The circle equivalent diameter refers to the diameter of a circle having the same area as the projected area of the particle image, and the circularity Circ is defined as a value obtained by dividing the circumferential length of the circle obtained from the circle equivalent diameter by the circumferential length of the particle projected image and is calculated by the following formula.

$$Circ = 2\sqrt{\pi S}/PM \quad \text{[Math. 1]}$$

When the particle image is circular, the circularity becomes 1.000, and the larger the degree of unevenness on the outer circumference of the particle image, the smaller the circularity becomes. After the calculation of the circularity of each particle, a circularity range of 0.200 to 1.000 is divided into 800 ranges, the arithmetic average value of the resultant circularities is calculated, and the value is regarded as the average circularity.

<Method for Measuring Weight Average Particle Diameter (D4) and Number Average Particle Diameter (D1) of Toner Particle>

The weight average particle diameter (D4) and the number average particle diameter (D1) of the toner particle are measured from 25,000 effective measurement channels using a precision particle size distribution measuring instrument "Coulter Counter Multisizer 3" (registered trademark, manufactured by Beckman Coulter, Inc.) in which a 100 μm aperture tube is provided and a pore electrical resistance method is used and the attached dedicated software "Beckman Coulter Multisizer 3 Version 3.51" (manufactured by Beckman Coulter, Inc.) for setting measurement conditions and analyzing measurement data and calculated by analyzing the measurement data. As an electrolyte aqueous solution that is used for the measurement, it is possible to use an aqueous solution obtained by dissolving special grade sodium chloride in ion exchanged water so that the concentration reaches about 1% by mass, for example, "ISOTON II" (manufactured by Beckman Coulter, Inc.).

Before the measurement and the analysis, the dedicated software is set as described below.

On the "standard measurement method (SOM) change screen" of the dedicated software, the total count number in the control mode is set to 50,000 particles, the number of times of measurements is set to one, and the Kd value is set to a value obtained using "standard particle 10.0 μm" (manufactured by Beckman Coulter, Inc.). The threshold value and the noise level are automatically set by pressing the threshold value/noise level measurement button. In addition, the current is set to 1600 μA, the gain is set to two, the electrolytic solution is set to ISOTON II, and the flushing of the aperture tube after measurement is checked.

On the "conversion setting screen from pulse to particle diameter" of the dedicated software, the bin interval is set to a logarithmic particle diameter, the particle diameter bin is set to 256 particle diameter bins, and the particle diameter range is set to at least 2 μm and not more than 60 μm.

A specific measurement method is as described below.

(1) About 200 mL of the electrolyte aqueous solution is put into a 250 mL round bottom glass beaker dedicated to the Multisizer 3 and set in a sample stand, and a stirrer rod is stirred counterclockwise at 24 rotations/second. In addition, contaminations and air bubbles in the aperture tube are removed by the "flushing of aperture" function of analysis software.

(2) About 30 mL of the electrolyte aqueous solution is put into a 100 mL flat-bottom glass beaker, and about 0.3 mL of a diluted solution obtained by diluting "CONTAMINON (registered trademark) N" (a 10% by mass aqueous solution of a neutral detergent for washing a precision measuring instrument having a pH of 7 composed of a nonionic surfactant, an anionic surfactant, and an organic builder, manufactured by Wako Pure Chemical Industries, Ltd.) with ion exchange water to 3 parts by mass is added thereto as a dispersant.

(3) Two oscillators having an oscillation frequency of 50 kHz are incorporated with the phases shifted by 180 degrees, a predetermined amount of ion exchanged water is put in a water tank of an ultrasonic disperser "Ultrasonic Dispersion System Tetora 150" (manufactured by Nikkaki Bios Co., Ltd.) having an electrical output of 120 W, and about 2 mL of the CONTAMINON N is added into this water tank.

(4) The beaker in (2) is set in a beaker fixing hole of the ultrasonic disperser, and the ultrasonic disperser is operated. In addition, the height position of the beaker is adjusted so that the resonance state of the liquid level of the electrolyte aqueous solution in the beaker is maximized.

(5) In a state where the electrolyte aqueous solution in the beaker in (4) has been irradiated with ultrasonic waves, about 10 mg of the toner particle is added little by little to the electrolyte aqueous solution and dispersed. In addition, an ultrasonic dispersion treatment is further continued for 60 seconds. Upon the ultrasonic dispersion, the water temperature in the water tank is appropriately adjusted to at least 10° C. and not more than 40° C.

(6) The electrolyte aqueous solution in (5) in which the toner particle has been dispersed is added dropwise to the round bottom beaker in (1) installed in the sample stand using a pipette, and the measurement concentration is adjusted to about 5%. In addition, the measurement is performed until the number of measurement particles reaches 50,000.

(7) The measurement data is analyzed with the dedicated software attached to the device to calculate the weight average particle diameter (D4). The "average diameter" on the analysis/volume statistical value (arithmetic average) screen at the time of setting graph/% by volume with the dedicated software is the weight average particle diameter (D4), and the "average diameter" on the "analysis/number statistical value (arithmetic average)" screen at the time of setting graph/% by number with the dedicated software is the number average particle diameter (D1).

Hereinafter, "parts" means "parts by mass."

Manufacture Example of Toner 1

(Preparation Step of Aqueous Medium 1)

In a reaction vessel equipped with a stirrer, a thermometer, and a return tube, 14.0 parts of sodium phosphate (dodecahydrate, manufactured by RASA Industries, Ltd.) was injected into 650.0 parts of ion exchanged water kept warm at 65° C. for 1.0 hour under nitrogen purge.

A calcium chloride aqueous solution containing 9.2 parts of calcium chloride (dihydrate) dissolved in 10.0 parts of ion exchanged water was collectively injected while being stirred at 15000 rpm using a T.K.homomixer (manufactured by Tokushu Kika Kogyo Co., Ltd.), and an aqueous medium containing a dispersion stabilizer was prepared. Furthermore, 10% by mass of hydrochloric acid was injected into the aqueous medium, and the pH was adjusted to 5.0, thereby obtaining an aqueous medium 1.

(Preparation Step of Polymerizable Monomer Composition)

Styrene: 60.0 parts

C.I. pigment Blue 15:3:6.5 parts

The materials were injected into an attritor (manufactured by Mitsui Miike Machinery Company, Limited) and further dispersed at 220 rpm for 5.0 hours using zirconia particles having a diameter of 1.7 mm, thereby preparing a pigment dispersion. The following materials were added to the pigment dispersion.

Styrene: 20.0 parts n-butyl acrylate: 20.0 parts

Cross-linking agent (divinylbenzene): 0.3 parts

Saturated polyester resin: 5.0 parts (a polycondensate of propylene oxide-modified bisphenol A (2 mol adduct) and terephthalic acid (molar ratio=10:12), glass transition temperature Tg=68° C., weight-average molecular weight Mw=10,000, molecular weight distribution Mw/Mn=5.12)

Fischer-Tropsch wax (melting point 78° C.): 7.0 parts

These were kept warm at 65° C. and uniformly dissolved and dispersed at 500 rpm using a T.K.homomixer (manufactured by Tokushu Kika Kogyo Co., Ltd.) to prepare a polymerizable monomer composition.

(Granulation Step)

The polymerizable monomer composition was injected into the aqueous medium 1 while the temperature of the aqueous medium 1 was maintained at 70° C. and the rotation speed of the T.K.homomixer was maintained at 15000 rpm, and 10.0 parts of t-butyl peroxypivalate as a polymerization initiator were added thereto. While the rotation speed was maintained as it was at 15000 rpm in the stirring device, the polymerizable monomer composition was granulated for 10 minutes.

(Polymerization/Distillation Step)

After the granulation step, the stirrer was replaced with a propeller stirring blade, the polymerizable monomer composition was held at 70° C. while being stirred at 150 rpm, polymerized for 5.0 hours, and heated for 2.0 hours at a temperature raised to 85° C., thereby performing a polymerization reaction.

After that, the return tube of the reaction vessel was replaced with a cooling tube, and the slurry was heated up to 100° C., whereby distillation was performed for six hours to distill away an unreacted polymerizable monomer, and a toner base particle dispersion was obtained.

(Polymerization of Organic Silicon Compound)

In a reaction vessel equipped with a stirrer and a thermometer, 60.0 parts of ion exchanged water was weighed, and the pH was adjusted to 4.0 using 10% by mass of hydrochloric acid. The ion exchanged water was heated with being stirred, and the temperature was raised to 40° C. After that, 40.0 parts of methyltriethoxysilane, which is an organic silicon compound, was added thereto, and the resultant product was stirred for two hours or longer to hydrolyze the product. The end point of the hydrolysis was visually confirmed from the fact that the oil and water did not separate but formed a single layer, and the product was cooled to obtain a hydrolysis solution of the organic silicon compound.

After the temperature of the toner base particle dispersion was cooled to 55° C., 25.0 parts of the hydrolysis solution of the organic silicon compound was added thereto to start the polymerization of the organic silicon compound. After the polymerization was held as it was for 15 minutes, the pH was adjusted to 5.5 with a 3.0% sodium bicarbonate aqueous solution. After the polymerization was held for 60 minutes while being continuously stirring at 55° C., the pH was adjusted to 9.5 using a 3.0% sodium bicarbonate aqueous solution, and the polymerization was further held for 240 minutes to obtain a toner particle dispersion.

(Washing and Drying Step)

After the polymerization step, the toner particle dispersion was cooled, hydrochloric acid was added to the toner particle dispersion, the pH was adjusted to 1.5 or lower, and the toner particle dispersion was stirred and left to stand for one hour and then centrifuged with a pressure filter, thereby obtaining a toner cake. The toner cake was made into a slurry again with ion exchanged water to produce a dispersion again, and the dispersion was then centrifuged with the above-described filter, thereby obtaining a toner cake.

The resultant toner cake was dried and classified in a constant temperature bath at 40° C. over 72 hours, thereby obtaining a toner particle 1. Table 4 shows the manufacturing conditions of the toner particle 1, and Table 5 shows each analysis result.

[Manufacture Methods of Toner Particles 2 to 4] Toner particles 2 to 4 were obtained in the same manner as the toner particle 1 except that the conditions were changed as shown in Table 4 regarding the polymerization of the organic silicon compound. Table 4 shows the manufacturing conditions of the toner particles 2 to 4, and Table 5 shows each analysis result.

[Manufacture Methods of Toner Particle 5]

A toner particle 5 was obtained without performing the polymerization of the organic silicon compound in the manufacture example of the toner particle 1. Table 4 shows the manufacturing conditions of the toner particle 5, and Table 5 shows each analysis result.

TABLE 4

| Toner Particle | Organic silicon | Amount added | Holding time(hr) | Condensation reaction 1 pH | Condensation reaction 1 Time (hr) | Condensation reaction 2 pH | Condensation reaction 2 Time (hr) | Temperature (° C.) | Note |
|---|---|---|---|---|---|---|---|---|---|
| 1 | Methyltriethoxysilane | 5 | 0.25 | 6 | 0.25 | 9.5 | 240 | 55 | |
| 2 | Methyltriethoxysilane | 6 | 0.25 | 6 | 0.25 | 9.5 | 240 | 55 | |
| 3 | Methyltriethoxysilane | 8 | 0.25 | 6 | 0.05 | 9.5 | 240 | 55 | |
| 4 | Methyltriethoxysilane | 4 | 0.25 | 6 | 0.25 | 9.5 | 240 | 55 | |
| 5 | Not used | — | — | — | — | — | — | — | Note (*)1 |

In the table, "Toner Particle" means "Manufacture Example of toner particle".
"Organic silicon" means "Kind of organic silicon compound".
"Note
(*)1" means "Organic silicon compound not added".

TABLE 5

| Toner | TEM image analysis result average widths | TEM image analysis result average heights | Σ (W/L) | P(D/W) % by number | X-ray Adhesion rate % | Weight average |
|---|---|---|---|---|---|---|
| 1 | 45 | 30 | 0.61 | 89 | 99 | 6.9 |
| 2 | 60 | 35 | 0.83 | 95 | 84 | 6.9 |
| 3 | 100 | 50 | 0.91 | 85 | 94 | 6.9 |
| 4 | 30 | 20 | 0.33 | 79 | 99 | 6.9 |
| 5 | 180 | 90 | 0.20 | 40 | 68 | 6.9 |

In the table, "average width" means "Number average of widths W of convex portions Y". "Average heights" means "Number average of heights H of convex portions Y". "X-ray" means "Fluorescent X-ray analysis result". "Adhesion rate" means "Adhesion rate % by mass". "Weight average" means "Weight average particle diameter (D4) um".

Production of Toners 1 to 4

The toner particles 1 to 4 were used as toners 1 to 4 as they were.

Production of Toner 5

First, an organic silicon fine particles A were synthesized as described below.

500 g of ion exchanged water was charged into a reaction vessel, and 0.2 g of a 48% sodium hydroxide aqueous solution was added thereto to produce an aqueous solution. 65 g of methyltrimethoxysilane and 50 g of tetraethoxysilane were added to this aqueous solution, a hydrolysis reaction was performed for one hour while the temperature was maintained at 13° C. to 15° C., and 2.5 g of a 20% sodium dodecyl benzenesulfonate aqueous solution was further added thereto, and a hydrolysis reaction was performed at the same temperature for three hours. A transparent reactant containing a silanol compound was obtained in about four hours. Next, a condensation reaction was performed for five hours while the temperature of the resultant reactant was held at 70° C. to obtain an aqueous suspension containing fine particles composed of the organic silicon compound. This aqueous suspension was filtered through a membrane filter, and the passed liquid portion was subjected to a centrifuge to separate white fine particles. The separated white fine particles were washed with water and dried with a hot air at 150° C. for five hours, thereby obtaining organic silicon fine particles A.

3.0 parts of the organic silicon fine particles A were added to 100 parts of the comparative toner particle 3, mixed with a Henschel mixer at a peripheral speed of 20 m/s of the stirring blades, and then 1.5 parts of hexamethyldisilazane-treated hydrophobic silica having an average particle diameter of 12 nm were mixed with a Henschel mixer at a peripheral speed of 20 m/s of the stirring blades to prepare a toner 5.

4. Fog Image Evaluation

A fog image was evaluated using an image forming apparatus 1 that included the photosensitive drum 1 and the toner 1 and was placed still for 24 hours or longer under an environment of 23.0° C. in temperature and 50% in relative humidity.

The image fog density was measured from a non-image portion with a reflection densitometer manufactured by Tokyo Denshoku Co., Ltd. In addition, the density of the non-image portion and the density of a portion that was prevented from passing through a transfer portion by masking a part of the paper (reference density) were measured. A difference between the density of the non-image portion and the reference density (hereinafter referred to as the image fog density) being 1% or less of the fog density was evaluated as A, more than 1% and 2% or less of the fog density was evaluated as B, more than 2% and 3.5% or less of the fog density was evaluated as C, and more than 3.5% D of the fog density was evaluated as D.

The results are regarded as the initial evaluation of the fog image.

A fog image after 5000 sheets were printed with the image forming apparatus of Example 1 was evaluated in the same manner. The results are regarded as the durable evaluation of the fog image.

In the initial evaluation of the fog image of Example 1, the image fog density was 1.2%, and the durable fog density was 1.8%, which were favorable.

Examples 2 to 7 and Comparative Examples 1 to 6

Similarly, the combinations of the photosensitive drum and the toner shown in Table 6 were regarded as Examples 2 to 7 and Comparative Examples 1 to 6, and the same image evaluation as in Example 1 was performed. Table 6 shows the results together with the results of Example 1.

Relationship Between Examples 1 and 2 and Comparative Example 5

In Examples 1 and 2, the number average of the widths W of the convex portions Y on the toner surface is smaller than the average distance between the centers of gravity of the convex portions CA of the photosensitive drum, and the convex portions Y on the toner surface are dense such that ΣW/L is larger than 0.5. Therefore, it is considered that the toner was likely to roll, charges were imparted to the toner, and fogging became favorable.

On the other hand, in Comparative Example 5, the convex widths W of the convex portions Y on the toner surface are larger than the average distance between the centers of gravity of the convex CA portions of the photosensitive drum and ΣW/L of the convex portions Y on the toner surface is also small, the toner is thus less likely to receive a force of being rolled from the photosensitive drum. Therefore, charges were not sufficiently imparted to the toner in the developing portion, and fogging occurred.

From what has been described above, the effect of the relationship between the average distance between the centers of gravity of the convex portions CA on the surface of the photosensitive drum and the number average of the widths W of the convex portions Y on the toner surface has been clarified.

Relationship Between Examples 3 to 7 and Comparative Examples 1 and 2

In Comparative Examples 1 and 2, the average distances between the centers of gravity of the convex portions CA on the surfaces of the photosensitive drums are large. Therefore, it is considered that the toner was stuck in the recessed portions formed between the convex portions CA on the surface of the photosensitive drum, the toner was not sufficiently rolled in the developing portion, and a part of the toner that could not be imparted with charges thus appeared as a fog image.

In Comparative Example 1, because the maximum height difference Rz on the surface was large, a substance derived from the toner, the printing paper, or the like adhered to the

TABLE 6

| | | | | Fogg- | PD properties | | | Toner characteristics | | | |
|---|---|---|---|---|---|---|---|---|---|---|---|
| Example | PD | Toner | Fogging | ing after durable | Average distance [nm] | Standard deviation [nm] | Rz [nm | Number average [nm] | Σ W/L | P(D/w) [%] | Adhesion rate % |
| E1 | 1 | 1 | B | B | 170 | 51 | 261 | 45 | 0.61 | 89 | 99 |
| E2 | 1 | 2 | A | B | 170 | 51 | 261 | 60 | 0.83 | 95 | 84 |
| E3 | 1 | 3 | A | A | 170 | 51 | 261 | 65 | 0.91 | 85 | 94 |
| E4 | 2 | 3 | A | A | 220 | 55 | 276 | 65 | 0.91 | 85 | 94 |
| E5 | 3 | 3 | A | A | 250 | 75 | 215 | 65 | 0.91 | 85 | 94 |
| E6 | 4 | 3 | B | C | 350 | 122.5 | 445 | 65 | 0.91 | 85 | 94 |
| E7 | 5 | 3 | B | B | 470 | 141 | 351 | 65 | 0.91 | 85 | 94 |
| CE1 | 6 | 3 | C | D | 550 | 275 | 705 | 65 | 0.91 | 85 | 94 |
| CE2 | 7 | 3 | C | C | 550 | 247.5 | 375 | 65 | 0.91 | 85 | 94 |
| CE3 | 8 | 3 | C | C | — | — | 55 | 65 | 0.91 | 85 | 94 |
| CE4 | 1 | 4 | C | C | 170 | 51 | 261 | 30 | 0.33 | 79 | 99 |
| CE5 | 1 | 5 | C | D | 170 | 51 | 261 | 180 | 0.2 | 40 | 68 |
| CE6 | 3 | 5 | C | C | 250 | 75 | 215 | 180 | 0.2 | 40 | 68 |

In the table, "E1" to "E7" means "Example 1" to "Example 7" and "CE1" to "CE6" means "Comparative Example 1" to "Comparative Example 6". "PD" means "Photosensitive drum". "PD properties" means "Physical properties of photosensitive drum surface". "Toner characteristics" means "Characteristics of toner convex surface". "Average distance" means "Average distance between centers of gravity of convex CA portions". "Standard deviation" means "Standard deviation of distances between centers of gravity of convex CA portions". "Rz" means "Photosensitive drum Rz". "Number average" means "Number average of widths W of convex portions Y". "Σ W/L" means "Σ W/L of convex portions Y". "P(D/w)" means "P(D/w) of convex portions Y". "Adhesion rate" means "Adhesion rate % by mass".

recessed portions between the convex portions CA of the photosensitive drum during durable use, and it was not possible to maintain a shape necessary for rolling, and it is thus considered that a fog image deteriorated due to durable use.

In Comparative Example 2, the standard deviation of the distances between the centers of gravity of the convex portions CA on the drum surface is also large. Therefore, it is considered that a part of the toner could not have a positional relationship in which the toner was not sufficiently rolled in the developing portion, and the part of the toner that could not be imparted with charges appeared as a fog image.

In addition, in Examples 3 to 7, the smaller the average value of the distances between the centers of gravity of the convex portions CA on the photosensitive drum or the standard deviation thereof, the more effectively fogging could be suppressed.

From what has been described above, the importance of the average distance between the centers of gravity of the convex CA portions on the surface of the photosensitive drum and the standard deviation thereof has been clarified.

Relationship Between Example 3 and Comparative Example 3

In Comparative Example 3, since no particles were contained in the surface layer of the photosensitive drum, and the force that rolls the toner was not sufficiently generated, and it is thus considered that the fog image suppression effect was small even though the toner had convex portions.

Relationship Between Examples 1 to 3 and Comparative Examples 4 and 6

Comparative Examples 4 and 6 had shapes in which $\Sigma W/L$ of the convex portions Y was small, and the adjacent convex portions of the toner were likely to be stuck in the recessed portions that were formed between the convex portions Y on the toner surface. Therefore, even though the toner received a rolling force from the drum in the developing portion, the rotation of the toner was canceled, and sufficient rolling could not be obtained, and as a result, it is considered that a fog image was generated. In addition, in Comparative Example 4, the convex widths W were also small in the convex portions Y the toner surface, and sufficient rolling promotion could not be obtained. In addition, in Examples 1 to 3, the larger the $\Sigma W/L$ and the higher the adhesion rate, the more favorable the initial fog image and the fog image after durable use were evaluated to be, and it has been clarified that the toner surface shape to which dense convex portions firmly adhere is preferable.

From what has been described above, the importance of the proportion of the widths of the convex portions Y in the convex portions Y on the toner surface has been clarified.

In Examples 1 to 7, the convex portions on the surface layer of the photosensitive drum are formed throughout the entire contact region between the developing roller 31 and the photosensitive drum. This is because on the surface of the developing roller 31 on which the toner is not carried, the developing roller 31 and the photosensitive drum come into contact with each other without the toner therebetween, and there is thus no effect of the toner functioning as a lubricant, the contact area between the photosensitive drum and the developing roller 31 (a microscopic contact area where the photosensitive drum and the developing roller come into contact with each other in the nip) becomes large, and the frictional force becomes large. Therefore, an uneven rotational speed of the developing roller 31 or the photosensitive drum or the like may be caused. Since the uneven rotational speed of the developing roller 31 or the photosensitive drum may affect the rolling of the toner, there is a possibility that charges may be unevenly imparted to the toner and fogging may be affected.

Therefore, in order to more stably roll the toner and stably impart charges, there is a need to reduce the contact area between the developing roller 31 and the photosensitive drum, and it is desirable to form convex portions on the surface layer of the photosensitive drum throughout the entire contact region. That is, it is desirable that a region in the photosensitive drum where a plurality of the convex portions are provided is in contact with both the surface where the toner is carried (developer carrying region) and the surface where the toner is not carried (developer non-carrying region) in the developing roller 31.

Example 8

In an eighth example, a toner to which an external additive has been added is used, and the longitudinal width of the surface layer 105 of the photosensitive drum is made shorter than the longitudinal width of the supply roller 33. Since the other configurations are the same as those in Example 1, detailed description thereof will be omitted.

Figure 12:
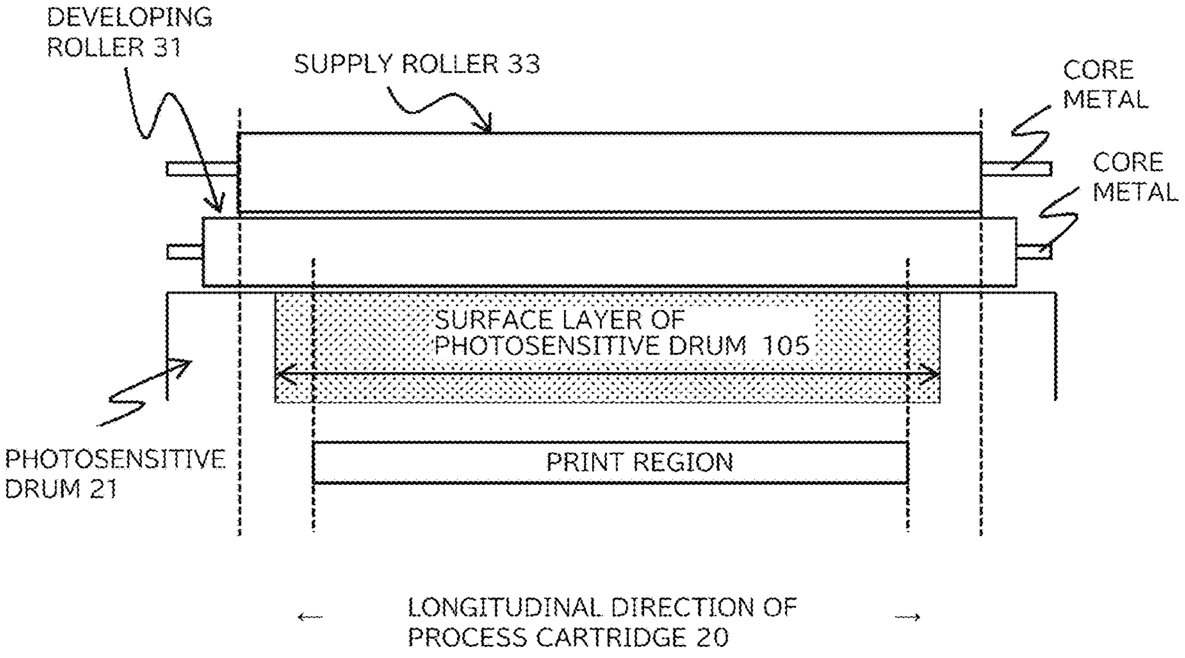
FIG. 12 is a view showing the positional relationship among individual members in Example 8.

FIG. 12 shows the positional relationship among the surface layer of the image bearing member, a scraping member, and the developer carrier. As shown in FIG. 12, in the present example, the width of the surface layer 105 of the photosensitive drum 21 is longer than the width of a region that is used for printing an image or a character (hereinafter referred to as a printed region) and is shorter than the width of a portion of the supply roller 33 in contact with the developing roller 31.

The supply roller 33 plays a role of supplying the toner to the developing roller 31 and plays a role of a scraping member that scrapes off the toner remaining unused for development and carried on the developing roller 31 (hereinafter referred to as residual toner after development). However, in the portions outside of the longitudinal width of the supply roller 33 at the end portions of the developing roller 31, since the residual toner after development cannot be scraped off, a small amount of the toner repeatedly comes into contact with other members in the regulating member or the developing portion, and a phenomenon that the quantity of charges imparted to the toner increases is likely to occur.

TABLE 7

| Configuration | Toner | Longitudinal width | Unsatisfactory regulation |
|---|---|---|---|
| Example 1 | 1 | Longer | ○ |
| Example 8 | 7 | Shorter | ○ |
| Comparative Example 7 | 7 | Longer | x |

In the table, "Longitudinal width" means "Longitudinal width of surface layer 105 of photosensitive drum". "Unsatisfactory regulation" means "Unsatisfactory regulation of end portion". "Longer" means "Longer than width where supply roller 33 comes into contact with developing roller 31". "Shorter" means "Shorter than width where supply roller 33 comes into contact with developing roller 31".

In Comparative Example 7 shown in Table 7, the surface layer 105 of the photosensitive drum 21 is disposed even outside of the longitudinal width of the supply roller 33 as in Example 1. On the other hand, unlike in Example 1, a toner to which an external additive such as hydrotalcite has been added is used. Such an external additive has a role of increasing the quantity of charges that are imparted to the toner and is added in some cases the purpose of stabilizing the imparting of charges to the toner even when the temperature or the humidity varies. Here, 0.2 parts of fine particles of a hydrotalcite compound having a number average particle diameter of 0.17 μm were externally added to and mixed with 100 parts of the toner particle of Example 1 with an external addition device FM10C (manufactured by Nippon Coke & Engineering Co., Ltd.) to prepare a toner 7.

The physical properties of the hydrotalcite used in the present example are as described in (Equation 2).

[Math. 2]

$$Mg^{2+}_{0.692}Al^{3+}_{0.308}(OH)^{-}_{2.000} * 0.150CO_3^{2-} \cdot 0.555\, H_2O \qquad (2)$$

In this configuration, charges are imparted by the rolling of the toner in the developing nip by the same mechanism as in Examples 1 to 7, but the supply roller 33 does not scrape off the residual toner after development outside of the axial direction region where the supply roller 33 comes into contact with the developing roller 31, and the quantity of charges in the toner thus continues to increase, and particularly under a low-temperature and low-humidity environment, regulation of the toner may not be satisfactory.

Therefore, in the present example, the longitudinal width of the surface layer 105 of the photosensitive drum 21 is shorter than the longitudinal width of the portion of the supply roller 33 that comes into contact with the developing roller 31, whereby imparting of charges to the toner carried on the developing roller 31 is suppressed outside of the portion with which the supply roller 33 comes into contact. Here, when the width of the printed region is set to 210 mm, and the longitudinal width of the portion of the supply roller 33 that comes into contact with the developing roller 31 is set to 220 mm, the longitudinal width of the surface layer 105 of the photosensitive drum 21 is set to 215 mm. The photosensitive drum was produced in the same manner as the photosensitive drum 21 of Example 1 until the formation of the photosensitive layer, and the surface layer 105 was formed by masking both end portions. That is, in the present configuration, the convex portions on the surface layer of the photosensitive drum 21 are formed inside both ends of the region in the longitudinal direction (axial direction) that comes into contact with the supply roller 33, which is the scraping member.

This configuration suppresses the continuous increase in the quantity of charges in the toner carried on the developing roller 31 in the portions of the developing roller 31 at both ends outside of the portion with which the supply roller 33 comes into contact and makes it possible to reduce the occurrence of unsatisfactory regulation of the toner.

In the present example, both end portions of the photosensitive drum 21 are masked, and the longitudinal width of the surface layer 105 is made shorter than the width of the portion of the supply roller 33 that comes into contact with the developing roller 31, but the configuration may be as described below.

On the surface of the photosensitive drum 21 outside of the portion where the supply roller 33 comes into contact with the developing roller 31, a layer in which the maximum height difference Rz of the convex portions is smaller than that of the surface layer 105 of the photosensitive drum 21 or the density of the convex portions is low is formed by changing the manufacture conditions of the surface layer. In such a case, the toner rolling promotion effect by the surface layer of the photosensitive drum 21 is reduced outside of the portion where the developing roller 31 and the supply roller 33 come into contact with each other. Even in this configuration, it is possible to suppress the continuous increase in the quantity of charges in the toner carried on the developing roller 31 and to reduce the occurrence of unsatisfactory regulation of the toner.

Hereinafter, embodiments for carrying out this invention will be illustratively described in detail with reference to the accompanying drawings. However, the dimensions, materials, shapes, relative disposition, and the like of the components to be described in the following embodiments are not intended to limit the scope of this invention thereto unless particularly otherwise specified. A plurality of features will be described in examples, but all of the plurality of features are not necessarily essential to the invention, and the plurality of features may be optionally combined.

EXAMPLES

Figure 15A:
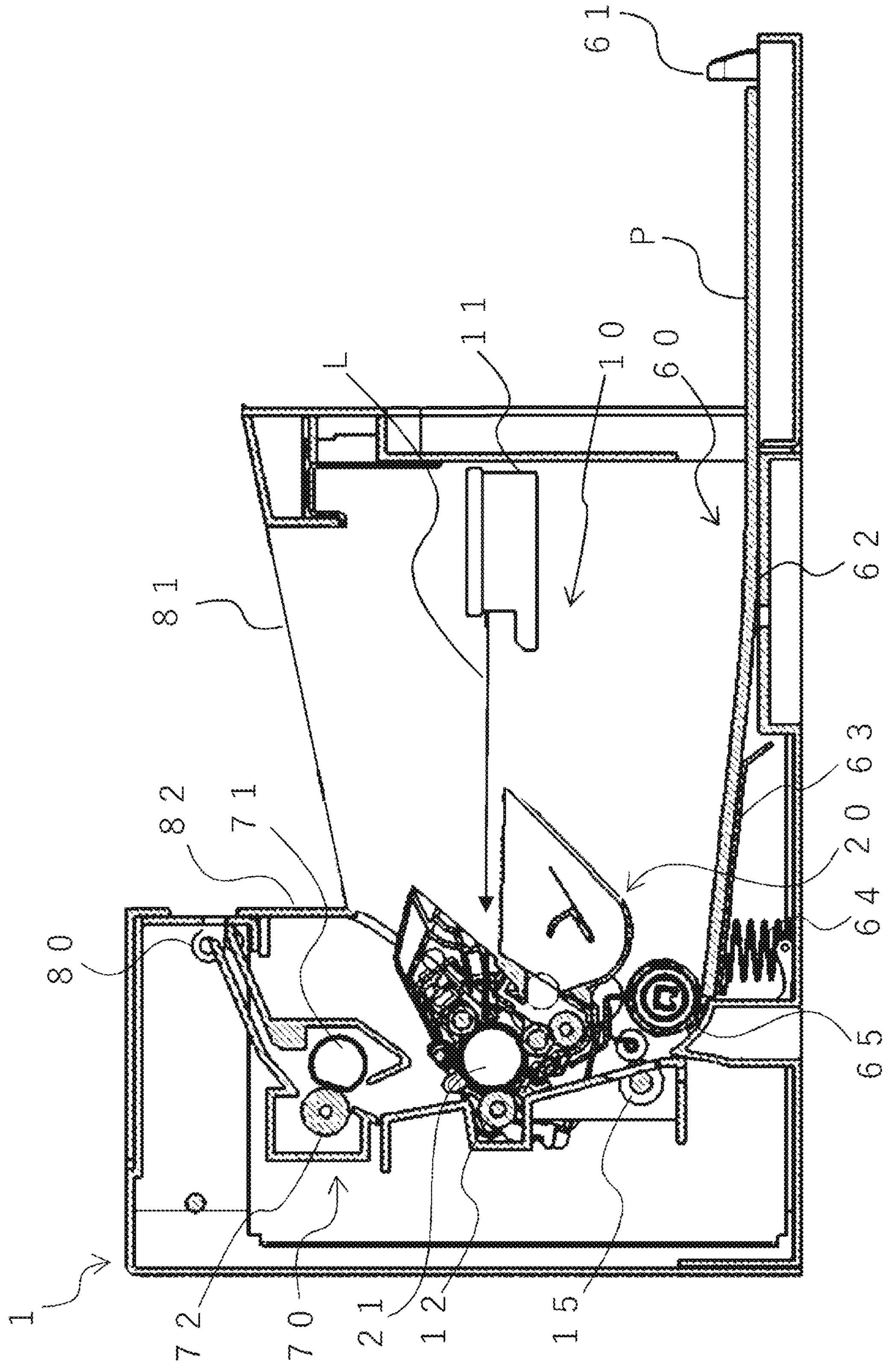
FIG. 15A is a schematic view of a cross section of an image forming apparatus in the present example.

FIG. 15A is a schematic view showing the configuration of the image forming apparatus 1 according to Example 1. The image forming apparatus 1 is a monochrome printer that is a modified LaserJet M209 manufactured by Hewlett-Packard Company and forms an image on the recording material P based on image information that is input from an external device. Examples of the recording material P include paper such as plain paper and thick paper, plastic films such as a sheet for an overhead projector, sheets with a special shape such as an envelope or an index paper, and various sheet materials having different paper properties such as cloth.

[Image Forming Apparatus]

As shown in FIG. 15A, the image forming apparatus 1 has an image forming unit 10 that forms a toner image on the recording material P, a feeding unit 60 that feeds the recording material P to the image forming unit 10, a fixing unit 70 that fixes the toner image formed by the image forming unit 10 to the recording material P, and a pair of discharge rollers 80.

Figure 15B:
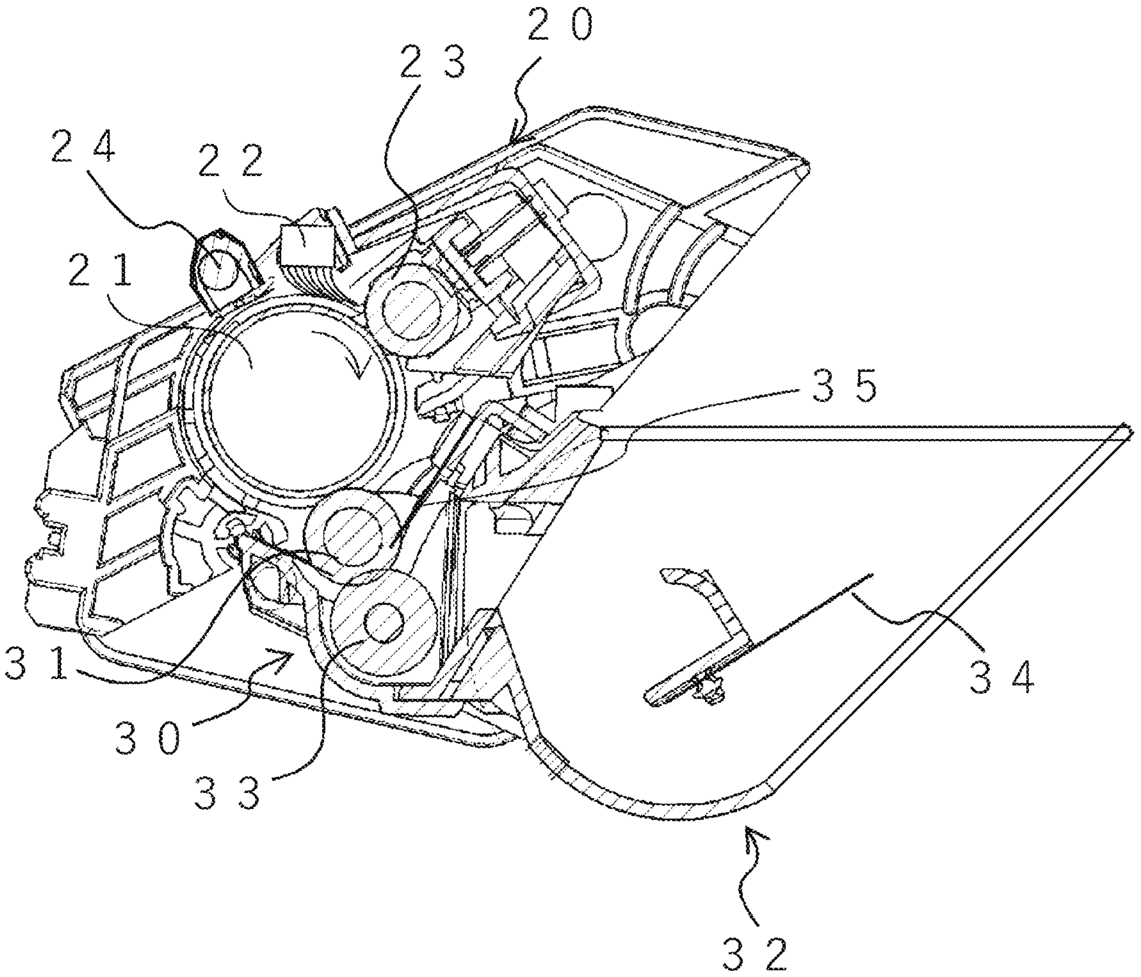
FIG. 15B is a schematic view of a cross section of a cartridge in the present example.

The image forming unit 10 has a scanner unit 11, an electrophotographic process cartridge 20, and a transfer roller 12 that transfers the toner image formed on a photosensitive drum 21 in the process cartridge 20 to the recording material P. A detailed view of the process cartridge 20 is shown in FIG. 15B. The process cartridge 20 has the photosensitive drum 21, a drum unit 20 including a charging brush 22 and a charging roller 23 disposed on the circumference of the photosensitive drum 21, and a developing apparatus 30 including a pre-exposure device 24 and a developing roller 31. The process cartridge 20 can be attached to the main body of the image forming apparatus.

When an image forming command is input to the image forming apparatus 1, an image forming process by the image forming unit 10 is started on the basis of image information input from an external computer connected to the image forming apparatus 1.

The photosensitive drum 21 as an image bearing member is driven to rotate in a predetermined direction (clockwise direction in the drawing) at a predetermined process speed by a motor.

The charging brush 22 and the charging roller 23 each come into contact with the photosensitive drum 21 with a predetermined pressure force and uniformly charge the surface of the photosensitive drum 21 to a predetermined potential when a desired charging voltage is applied thereto by a charging high voltage power source (not shown). In the present example, the surface of the photosensitive drum 21 is charged to −600 V by applying a voltage of −500 V to the charging brush 22 and a voltage of −1150 V to the charging roller 23, respectively. The pre-exposure device 24 neutralizes the surface of the photosensitive drum 21 that is to enter the charging portion for stable charging by the charging brush 22 and the charging roller 23.

The scanner unit 11 irradiates the photosensitive drum 21 with a laser beam using a polygon mirror based on the input image information to scan and expose the photosensitive drum, thereby forming an electrostatic latent image on the photosensitive drum 21. The scanner unit 11 is not limited to a laser scanner, and for example, an LED exposure device having an LED array in which a plurality of LEDs are arranged along the longitudinal direction of the photosensitive drum 21 may be employed.

The electrostatic latent image formed on the photosensitive drum 21 is developed by the developing apparatus 30, and a toner image is formed on the photosensitive drum 21.

The developing apparatus 30 will be described in detail using FIG. 15B. The developing apparatus 30 includes the developing roller 31 as a developer carrier that carries a developer, a developer container 32 that serves as the frame of the developing apparatus 30, and a supply roller 33 capable of supplying the developer to the developing roller 31. The developing roller 31 and the supply roller 33 are supported by the developer container 32 so as to be capable of rotating. In addition, the developing roller 31 is disposed in an opening portion of the developer container 32 so as to face the photosensitive drum 21. The supply roller 33 is in contact with the developing roller 31 so as to be capable of rolling, and the toner that is contained in the developer container 32 as the developer is applied by the supply roller 33 to the surface of the developing roller 31.

A stirring member 34 is provided in the developer container 32 as stirring means. The stirring member 34 is driven to be rotated, whereby the toner in the developer container 32 is stirred, and the toner is fed toward the developing roller 31 and the supply roller 33. In addition, the stirring member 34 plays a role of making the toner that has not been used for development and has been stripped from the developing roller 31 uniform in the developer container 32 by circulating the toner in the developer container 32.

In addition, a developing blade 35 made of an SUS plate that regulates the amount of the toner carried on the developing roller 31 is disposed in the opening portion of the developer container 32 in which the developing roller 31 is disposed. It is also possible to apply a voltage different from that for the developing roller 31 to the developing blade 35.

The toner supplied to the surface of the developing roller 31 passes through a portion facing the developing blade 35 in association with the rotation of the developing roller 31, whereby the toner uniformly forms a thin layer.

In the developing apparatus 30 of the present embodiment, a contact developing method is used as a developing method. That is, the toner layer carried on the developing roller 31 comes into contact with the photosensitive drum 21 in the developing portion (developing region) where the photosensitive drum 21 and the developing roller 31 face each other. In the present example, the photosensitive drum 21 is rotated at a surface speed of 300 mm/sec, and regarding the difference in the surface speed of the developing roller 31 relative to the surface speed of the photosensitive drum 21 (development circumferential speed difference), the photosensitive drum 21 is rotated at a speed that is faster by 40%. This makes the photosensitive drum 21 and the developing roller 31 come into contact with each other at a circumferential speed difference of 120 mm/s. A developing voltage is applied to the developing roller 31 by the developing high voltage power source (not shown). Under the developing voltage, the toner carried on the developing roller 31 spreads from the developing roller 31 to the surface of the photosensitive drum 21 according to the potential distribution on the surface of the photosensitive drum 21, whereby the electrostatic latent image is developed into a toner image. In the present example, a developing voltage of −400 V is applied to the developing roller 31. The absolute value Vback of a potential difference between the surface of the photosensitive drum 21 and the developing roller 31 in a non-exposed portion before the developing region is passed, is 200 V. In the present embodiment, a reversal developing method is employed. That is, the toner adheres to the surface region of the photosensitive drum 21 where the quantity of charges has been decreased due to charging in the charging step and then exposure in the exposure step, whereby a toner image is formed.

In parallel with the above-described image forming process, the recording material P contained in the feeding unit 60 is fed out in accordance with the transfer timing of the toner image. The feeding unit 60 has a front door 61 that is supported by the image forming apparatus 1 to be opened and closed, a loading tray 62, an intermediate plate 63, a tray spring 64, and a pick-up roller 65. The loading tray 62 configures the bottom surface of a recording material containing space that appears when the front door 61 is opened, and the intermediate plate 63 is supported by the loading tray 62 to be raised and lowered. The tray spring 64 urges the intermediate plate 63 upward and presses the recording material P loaded on the intermediate plate 63 against the pick-up roller 65. The front door 61 closes the recording material containing space in a state of being closed with respect to the image forming apparatus 1 and supports the recording material P together with the loading tray 62 and the intermediate plate 63 in a state of being opened with respect to the image forming apparatus 1. A recording material P conveyance step will be described. First, the pick-up roller 65 in the feeding unit 60 feeds out the recording material P supported by the front door 61, the loading tray 62, and the intermediate plate 63. Next, the recording material P is fed to a pair of registration rollers 15 by the pick-up roller 65 and made to run into the nip between the pair of registration rollers 15, whereby skewed movement is corrected. In addition, the pair of registration rollers 15 is driven in accordance with the transfer timing of the toner image and conveys the recording material P toward a transfer nip that is formed by the transfer roller 12 and the photosensitive drum 21.

A transfer voltage is applied to the transfer roller 12 as transfer means from the transfer high voltage power source (not shown), and the toner image that is carried on the photosensitive drum 21 is transferred to the recording material P that is conveyed by the pair of registration rollers 15.

The recording material P to which the toner image has been transferred is conveyed to the fixing unit 70, and the toner image is heated and pressurized when passing through a nip portion between a fixing film 71 and a pressure roller 72 in the fixing unit 70. This makes the toner particle melted and then fixed, whereby the toner image is fixed to the recording material P.

Here, the fixing unit 70 is of a heat fixation type unit that fixes an image by heating and melting the toner on the recording material P. The fixing unit 70 includes the fixing film 71, a fixing heater that heats the fixing film 71, such as a ceramic heater, a thermistor that measures the temperature of the fixing heater, and the pressure roller 72 that is brought into pressure contact with the fixing film 71.

The recording material P that has passed through the fixing unit 70 is discharged to the outside of the image forming apparatus 1 by the pair of discharge rollers 80 and is loaded on a discharge tray 81. The discharge tray 81 is inclined upward downstream in the discharge direction of the recording material P, and the recording material P discharged to the discharge tray 81 slides down on the discharge tray 81, whereby the rear end is aligned by a regulation surface 82.

In the present example, the process cartridge that has been made detachable from the main body of the image forming apparatus 1 is used, but the configuration is not limited. As long as a predetermined image forming process can be performed, for example, a developing cartridge from which the developing apparatus is detachable, a drum cartridge from which a drum unit is detachable, or a toner cartridge that supplies a toner to the developing apparatus from the outside may be used, or a detachable cartridge may not be used.

In the present example, the surface of the photosensitive drum 21 is charged by the charging brush 22 and the charging roller 23, but the configuration is not limited thereto. Any charging member capable of charging the surface of the photosensitive drum 21 may be used, and for example, the surface of the photosensitive drum 21 may be charged with the charging roller 23 alone.

The present example relates to a so-called cleaner-free method in which a cleaning member that collects the toner on the photosensitive drum that has not been transferred to the recording material P in the transfer process is not provided. However, the present invention is not limited thereto, and a cleaning member may be provided.

[Configuration of Toner Seal Portion]

Figure 16:
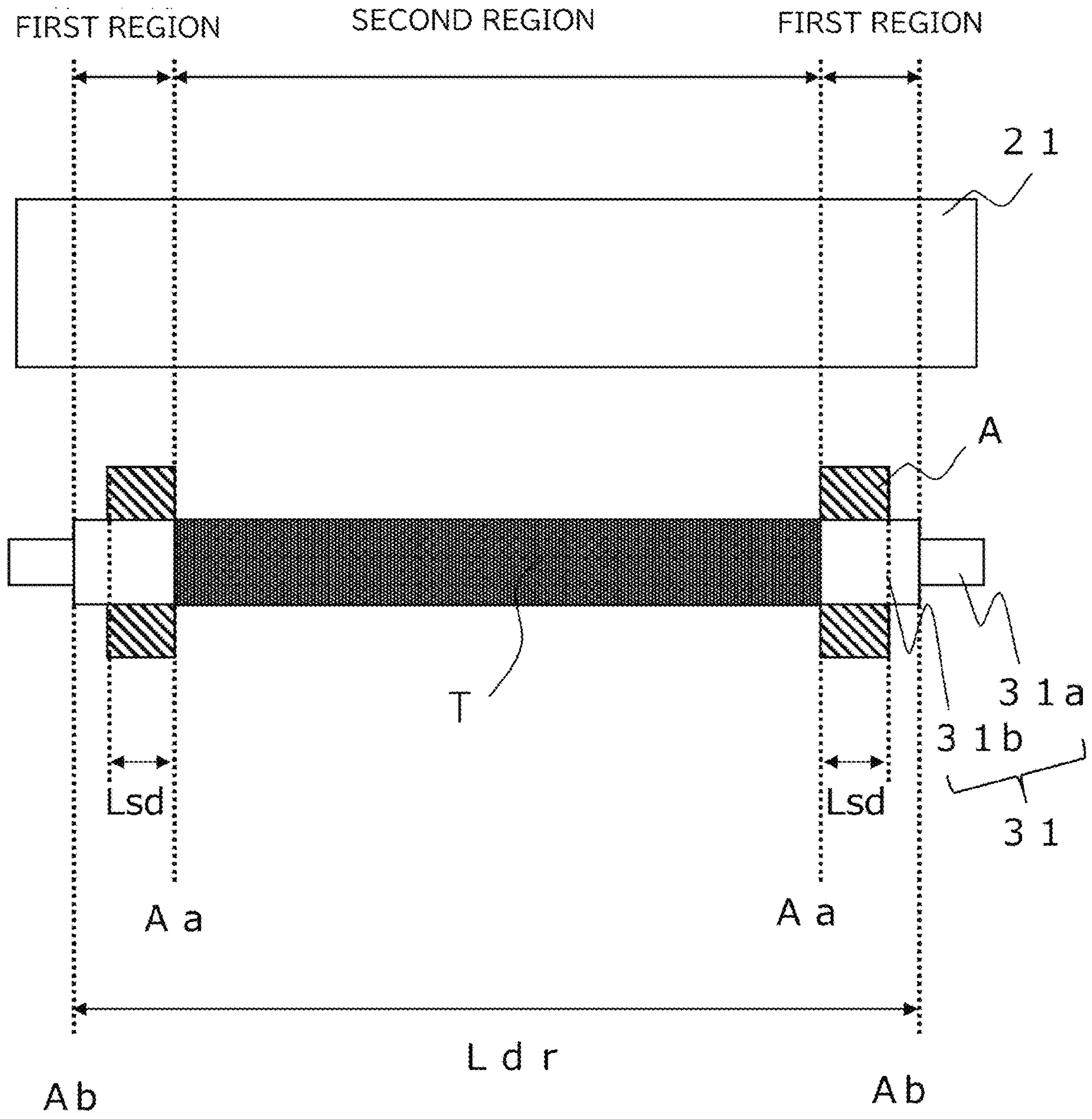
FIG. 16 is a view showing the disposition relationship of the members in a toner coated region and toner non-coated regions.
Figure 17A:
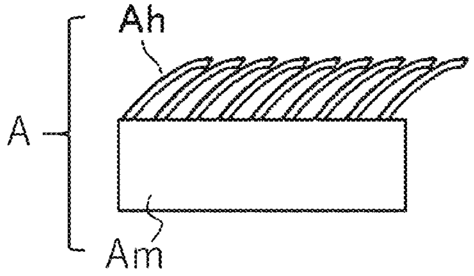
FIGS. 17A to 17C are schematic views of a toner seal member in the present example.
Figure 17B:
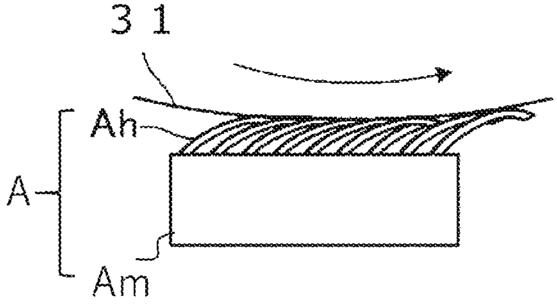
Figure 17C:
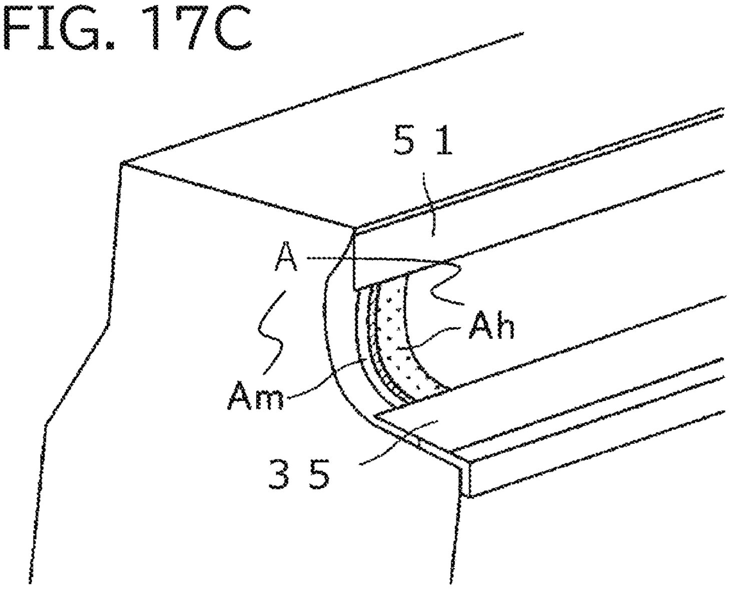

FIG. 16 is a relationship diagram of the disposition of the process cartridge in the longitudinal direction. FIG. 17A is a cross-sectional view of a developer seal member A. FIG. 17B is a cross-sectional view of the contact portion between the developer seal member A and the developing roller 31. FIG. 17C is a perspective cross-sectional view of the vicinity of the developer seal member with the developing roller 31 removed. Here, the longitudinal direction is the rotation axis direction of a rotating body or a direction parallel thereto. The developing roller 31 has a conductive elastic body 31*b* as the surface layer so as to have an outer diameter of 11.5 mm on the outer circumferential surface of a core metal 31*a* as the substrate for which SUS (stainless steel) having an outer diameter of 6 mm is used, and the longitudinal length Ldr of the elastic body 31*b* is 240 mm as shown in FIG. 16. Although not shown, the core metal 31*a* at both end portions are supported by the developer container 32 so as to be capable of rotating. In addition, the developing roller 31 is disposed in parallel with the photosensitive drum 21, and the developing roller 31 is pressed against the photosensitive drum 21 with a predetermined pressing force.

In order to suppress toner leakage (developer leakage) from both end portions of the developer container 32 in the longitudinal direction, the developer seal members A are disposed at both end portions of the elastic body 31*b*. The seal members A are disposed so as to be in contact with the outer circumferential surface of the elastic body 31*b*, and a raised layer Ah is provided on a surface that is in contact with the outer circumferential surface of the elastic body 31*b* as shown in FIGS. 17A to 17C. The raised layer Ah is composed of, for example, a flocking material, a pile fabric, a felt, a rayon, or the like and is made to adhere to a substrate Am composed of a foam material such as MOLTOPREN (registered trademark). In the present example, a raised layer Ah of a nylon pile (diameter: 25 μm, length: 1.5 mm) has been made to adhere to MOLTOPREN. The raised layer deforms in the contact portion with the developing roller 31, and a hair falling direction thereof is the same direction as the rotating direction of the developing roller 31 (in the arrow direction in the drawing). This is to prevent the toner from entering the inside of the raised layer Ah at the boundary between the toner coated region and the toner non-coated region. When the toner enters the inside of the raised layer Ah, the toner is fixed to the contact portion of the raised layer Ah, which causes toner leakage. In order to suppress toner leakage from both end portions in the longitudinal direction, the longitudinal length Lsd of the developer seal member A was set to 5 mm as shown in FIG. 16.

Toner leakage in the lateral direction, which is perpendicular to the longitudinal direction, is suppressed by disposing the developing blade 35 and a blowout prevention sheet 51 to generate a pressure against the developing roller 31 as shown in FIG. 17C. The developing blade 35 is fixed by welding an 80 μm SUS sheet to an L-shaped sheet metal with a YAG laser and fastening the L-shaped sheet metal to the developer container 32 with screws. The blowout prevention sheet 51 is fixed by sticking 50 μm PET to the developer container 32 with double-sided tape.

When the developing roller 31, the developing blade 35, the blowout prevention sheet 51, and the developer seal member A are disposed as described above, the circumferential surface of the developing roller 31 is coated with the toner T in a relationship shown in FIG. 16. Here, the longitudinal inside end of the developer seal member A is indicated by Aa, and the longitudinal outside end of the elastic body 31*b* of the developing roller 31 is indicated by Ab. On the circumferential surface of the developing roller 31, a region where the toner is not applied between Aa and Ab is formed at each of both ends in the longitudinal direction, and a region where the toner is applied is formed between both inside ends Aa of the developer seal member A at both end portions. In the present invention, the region where the toner is not applied is defined as a first region, and the region where the toner is applied is defined as a second region. In addition, these regions are not limited to the circumferential surface of the developing roller 31, and such regions are also given the same notations on the surface of the facing photosensitive drum 21. That is, the surface of the photosensitive drum 21 facing the first region on the circumferential surface of the developing roller 31 is also referred to as the surface of the photosensitive drum 21 in the first region, and the surface of the photosensitive drum 21 facing the second region of the circumferential surface of the developing roller 31 is also referred to as the surface of the photosensitive drum 21 in the second region.

[Contact Portion Between Surface of Photosensitive Drum and Surface of Developing Roller in First Region]

In the contact developing method, the amount of heat generated by friction between the photosensitive drum 21 and the developing roller 31 is large particularly in the first region. That is, the amount of heat generated by friction is larger in the first region than in the second region. This is because the toner acts as a lubricant between the photosensitive drum 21 and the developing roller 31, and it is thus more difficult for the developing roller 31 to slide in the first region, which is the toner non-coated region, than in the second region, which is the toner coated region, and the frictional force is higher in the first region. Therefore, there is a possibility that various image defects, such as breakage of the end portion of the developing roller 31 or fusion of the toner that arises from an increase in temperature due to friction in the end portion of the developing roller 31 by an image forming operation and a decrease in image density that arises from toner deterioration, may be caused.

In order to solve this problem, convex shapes or grooves are formed on the surface of the photosensitive drum 21 in the first region, whereby the contact area with the developing roller 31 can be reduced, and the frictional force between the photosensitive drum 21 and the developing roller 31 in the first region is reduced. This makes it possible to suppress an increase in the temperature at the end portion of the developing roller 31.

In addition, as a result of the present inventors' intensive studies, it was found that when the maximum height difference Rz on the surface of the photosensitive drum 21 is increased, the frictional force between the photosensitive drum 21 and the developing roller 31 becomes small, and an increase in the temperature at the end portion of the developing roller 31 can be suppressed.

On the other hand, when excessively large convex shapes or grooves are formed across the entire longitudinal region on the surface of the photosensitive drum 21 to suppress an increase in the temperature at the end portion of the developing roller 31, an image defect or the like may be caused. Specifically, when the surface of the photosensitive drum 21 is irradiated with a laser beam during image formation, an electrostatic latent image is disturbed by the excessively large convex shapes or grooves formed in the second region, and it is thus not possible to output an appropriate image or the like. Particularly, along with the extended service life or speeding up of process cartridges, an increase in the temperature at the end portion of the developing roller 31 becomes more significant, and it is thus desired to set Rz on the surface of the photosensitive drum 21 to be large, but there is a possibility of causing an image defect as described above.

Therefore, in the present invention, the shapes on the surface of the photosensitive drum 21 in the first region and in the second region are changed to suppress an increase in the temperature at the end portion of the developing roller 31 and to suppress the influence on the image to output an appropriate image. Specifically, the relationship between the maximum height difference Rz1 on the surface of the photosensitive drum 21 in the first region and the maximum height difference Rz2 on the surface of the photosensitive drum 21 in the second region is made to satisfy Rz1>Rz2, thereby suppressing the generation of the various problems described above.

[Features of Photosensitive Drum]

In the photosensitive drum 21 that is used in the present invention, the support, the conductive layer, the undercoating layer, the photosensitive layer, and the surface layer are laminated together.

<Support>

In the present invention, the photosensitive drum 21 preferably has a support. In the present invention, the support is preferably a conductive support having conductivity. In addition, examples of the shape of the support include a cylindrical shape, a belt shape, a sheet shape, and the like. Among these, a cylindrical support is preferable. In addition, an electrochemical treatment such as anodic oxidation, a blast treatment, a cutting treatment, or the like may be performed on the surface of the support.

As the material of the support, a metal, a resin, glass, or the like is preferable. Examples of the metal include aluminum, iron, nickel, copper, gold, stainless steel, alloys thereof, and the like. Among these, an aluminum support for which aluminum is used is preferable.

In addition, conductivity may be imparted to resins or glass by a treatment, such as mixing or coating with a conductive material.

<Conductive Layer>

In the present invention, a conductive layer may be provided on the support. When the conductive layer is provided, it is possible to conceal scratches or unevenness on the surface of the support or to control reflection of light on the surface of the support. The conductive layer preferably contains conductive particles and a resin.

Examples of the material of the conductive particles include a metal oxide, a metal, carbon black, and the like.

Examples of the metal oxide include zinc oxide, aluminum oxide, indium oxide, silicon oxide, zirconium oxide, tin oxide, titanium oxide, magnesium oxide, antimony oxide, bismuth oxide, and the like. Examples of the metal include aluminum, nickel, iron, nichrome, copper, zinc, silver, and the like.

Among these, as the conductive particles, a metal oxide is preferably used, and in particular, titanium oxide, tin oxide, or zinc oxide is more preferably used. In the case of using a metal oxide as the conductive particles, the surface of the metal oxide may be treated with a silane coupling agent or the like, or an element such as phosphorus or aluminum or an oxide thereof may be doped into the metal oxide.

In addition, the conductive particles may be provided with a laminated configuration in which pre-coated particles of titanium oxide, barium sulfate, zinc oxide, or the like are coated with a metal oxide having a different composition from the pre-coated particles. Examples of a coating include metal oxides such as tin oxide.

In addition, in the case of using a metal oxide as the conductive particles, the average primary particle diameter is preferably at least 1 nm and not more than 500 nm and more preferably at least 3 nm and not more than 400 nm.

Examples of the resin include a polyester resin, a polycarbonate resin, a polyvinyl acetal resin, an acrylic resin, a silicone resin, an epoxy resin, a melamine resin, a polyurethane resin, a phenolic resin, an alkyd resin, and the like.

The conductive layer may further contain a masking agent such as a silicone oil, resin particles, or titanium oxide.

The average film thickness of the conductive layer is preferably at least 1 μm and not more than 50 μm and particularly preferably at least 3 μm and not more than 40 μm.

The conductive layer can be formed by preparing a coating liquid for the conductive layer containing each of the above-described materials and a solvent, forming a coating film thereof, and drying the coating film. Examples of the solvent that is used in the coating liquid include an alcoholic solvent, a sulfoxide-based solvent, a ketone-based solvent, an ether-based solvent, an ester-based solvent, an aromatic hydrocarbon-based solvent, and the like. Examples of a dispersion method for dispersing the conductive particles in the coating liquid for the conductive layer include methods in which a paint shaker, a sand mill, a ball mill, or a liquid collision type high-speed disperser is used.

<Undercoating Layer>

In the present invention, an undercoating layer may be provided on the support or the conductive layer.

The average film thickness of the undercoating layer is preferably at least 0.1 m and not more than 50 μm, more preferably at least 0.2 μm and not more than 40 μm, and particularly preferably at least 0.3 μm and not more than 30 μm.

Examples of a resin in this undercoating layer include a polyacrylic acid resin, a polyvinyl alcohol resin, a polyvinyl acetal resin, a polyethylene oxide resin, a polypropylene oxide resin, an ethyl cellulose resin, a methyl cellulose resin, a polyamide resin, a polyamide acid resin, a polyurethane resin, a polyimide resin, a polyamide-imide resin, a polyvinyl phenolic resin, a melamine resin, a phenolic resin, an epoxy resin, and an alkyd resin.

In addition, the resin may have a structure in which a resin having a polymerizable functional group and a monomer having a polymerizable functional group are crosslinked with each other.

In addition, the undercoating layer may contain an inorganic compound or an organic compound aside from the resin.

Examples of the inorganic compound include a metal, an oxide, and a salt.

Examples of the metal include gold, silver, aluminum, and the like. Examples of the oxide include zinc oxide, lead white, aluminum oxide, indium oxide, silicon oxide, zirconium oxide, tin oxide, titanium oxide, magnesium oxide, antimony oxide, bismuth oxide, indium oxide, tin oxide, zirconium oxide, and the like. Examples of the salt include barium sulfate and strontium titanate.

These inorganic compounds may be present in the film in a particulate state.

The number average particle diameter of the particles is preferably at least 1 nm and not more than 500 nm and more preferably at least 3 nm and not more than 400 nm.

These inorganic compounds may be provided with a laminated configuration having core particles and coating layers that coat the particles.

The surfaces of these inorganic compounds may be treated with a silicone oil, a silane compound, a silane coupling agent, a different organic silicon compound, an organic titanium compound, or the like. In addition, an element such as tin, phosphorus, aluminum, or niobium may be doped thereinto.

Examples of the organic compound include an electron transport compound or a conductive polymer.

Examples of the conductive polymer include polythiophene, polyaniline, polyacetylene, polyphenylene, and polyethylene dioxythiophene.

Examples of an electron transport substance include a quinone compound, an imide compound, a benzimidazole compound, a cyclopentadienylidene compound, a fluorenone compound, a xanthone compound, a benzophenone compound, a cyanovinyl compound, an aryl halide compound, a silole compound, and a boron-containing compound.

The electron transport substance has a polymerizable functional group and may be crosslinked with a resin having a functional group capable of reacting with the functional group. Examples of the polymerizable functional group include a hydroxy group, a thiol group, an amino group, a carboxyl group, a vinyl group, an acryloyl group, a methacryloyl group, an epoxy group, and the like.

These organic compounds may be present in the film in a particulate state or may be surface-treated.

To the undercoating layer, a variety of additives such as a leveling agent such as a silicone oil, a plasticizer, and a thickener may be added.

The undercoating layer is obtained by preparing a coating liquid for the undercoating layer containing the above-described materials, applying the coating liquid on the support or the conductive layer, and then drying or curing the coating film.

Examples of a solvents used to prepare the coating liquid include an alcoholic solvent, a ketone-based solvent, an ether-based solvent, an ester-based solvent, an aromatic hydrocarbon-based solvent, and the like.

Examples of a dispersion method for dispersing the particles in the coating liquid include methods in which a paint shaker, a sand mill, a ball mill, or a liquid collision type high-speed disperser is used.

<Photosensitive Layer>

A photosensitive layer in the photosensitive drum 21 is mainly classified into (1) a stacked photosensitive layer and (2) a single-layer photosensitive layer.

(1) The stacked photosensitive layer is a photosensitive layer having a charge generation layer containing a charge generating substance and a charge transport layer containing a charge transport substance. (2) The single-layer photosensitive layer is a photosensitive layer containing both a charge generating substance and a charge transport substance.

(1) Stacked Photosensitive Layer

The stacked photosensitive layer has a charge generation layer and a charge transport layer.

(1-1) Charge Generation Layer

The charge generation layer preferably contains a charge generating substance and a resin.

Examples of the charge generating substance include azo pigments, perylene pigments, polycyclic quinone pigments, indigo pigments, phthalocyanine pigments, and the like. Among these, azo pigments and phthalocyanine pigments are preferable. Among the phthalocyanine pigments, an oxytitanium phthalocyanine pigment, a chlorogallium phthalocyanine pigment, and a hydroxygallium phthalocyanine pigment are preferable.

The content of the charge generating substance in the charge generation layer is preferably at least 40% by mass and not more than 85% by mass and more preferably at least 60% by mass and not more than 80% by mass relative to the total mass of the charge generation layer.

Examples of the resin include a polyester resin, a polycarbonate resin, a polyvinyl acetal resin, a polyvinyl butyral resin, an acrylic resin, a silicone resin, an epoxy resin, a melamine resin, a polyurethane resin, a phenolic resin, a polyvinyl alcohol resin, a cellulose resin, a polystyrene resin, a polyvinyl acetate resin, a polyvinyl chloride resin, and the like. Among these, a polyvinyl butyral resin is more preferable.

In addition, the charge generation layer may further contain an additive such as an antioxidant or an ultraviolet absorber. Specific examples thereof include a hindered phenolic compound, a hindered amine compound, a sulfur compound, a phosphorus compound, a benzophenone compound, and the like.

The charge generation layer can be formed by preparing a coating liquid for the charge generation layer containing each of the above-described materials and a solvent, forming a coating film thereof on the undercoating layer, and drying the coating film. Examples of the solvent that is used in the coating liquid include an alcoholic solvent, a sulfoxide-based solvent, a ketone-based solvent, an ether-based solvent, an ester-based solvent, an aromatic hydrocarbon-based solvent, and the like.

The film thickness of the charge generation layer is preferably at least 0.1 μm and not more than 1.5 μm and more preferably at least 0.15 μm and not more than 1.0 μm.

(1-2) Charge Transport Layer

The charge transport layer preferably contains a charge transport substance and a resin.

Examples of the charge transport substance include a polycyclic aromatic compound, a heterocyclic compound, a hydrazone compound, a styryl compound, an enamine compound, a benzidine compound, a triarylamine compound, resins having a group derived from these substances, and the like. Among these, a triarylamine compound and a benzidine compound are preferable.

The content of the charge transport substance in the charge transport layer is preferably at least 25% by mass and not more than 70% by mass and more preferably at least 30% by mass and not more than 55% by mass relative to the total mass of the charge transport layer.

Examples of the resin include a polyester resin, a polycarbonate resin, an acrylic resin, a polystyrene resin, and the like. Among these, a polycarbonate resin and a polyester resin are preferable. As the polyester resin, a polyarylate resin is particularly preferable.

The content ratio (mass ratio) between the charge transport substance and the resin is preferably 4:10 to 20:10 and more preferably 5:10 to 12:10.

In addition, the charge transport layer may also contain an additive such as an antioxidant, an ultraviolet absorber, a plasticizer, a leveling agent, a slip-imparting agent, or a wear resistance improver. Specific examples thereof include a hindered phenolic compound, a hindered amine compound, a sulfur compound, a phosphorus compound, a benzophenone compound, a siloxane-modified resin, a silicone oil, fluorine resin particles, polystyrene resin particles, polyethylene resin particles, silica particles, alumina particles, boron nitride particles, and the like.

The charge transport layer can be formed by preparing a coating liquid for the charge transport layer containing each of the above-described materials and a solvent, forming a coating film thereof on the charge generation layer, and drying the coating film. Examples of the solvent that is used in the coating liquid include an alcoholic solvent, a ketone-based solvent, an ether-based solvent, an ester-based solvent, and an aromatic hydrocarbon-based solvent. Among these solvents, an ether-based solvent or an aromatic hydrocarbon-based solvent is preferable.

The film thickness of the charge transport layer is preferably at least 3 μm and not more than 50 μm, more preferably at least 5 μm and not more than 40 μm, and particularly preferably at least 10 μm and not more than 30 μm.

(2) Single-Layer Photosensitive Layer

The single-layer photosensitive layer can be formed by preparing a coating liquid for the photosensitive layer containing a charge generating substance, a charge transport substance, a resin, and a solvent, forming a coating film thereof on the undercoating layer, and drying the coating film. The charge generating substance, the charge transport substance, and the resin are the same as the examples of the materials in the above-described "(1) stacked photosensitive layer."

The film thickness of the single-layer photosensitive layer is preferably at least m and not more than 45 μm and more preferably at least 25 μm and not more than m.

<Surface Layer>

A feature of the present invention is that the maximum height difference on the surface of the photosensitive drum 21 in the first region is large. In the present invention, a surface layer having a plurality of convex portions and recessed portion is provided on the surface of the photosensitive drum in the first region.

There are several means for providing roughness to the surface of the photosensitive drum. In the present invention, a configuration in which particles are provided on the surface layer as means for forming convex portions and a method for forming grooves in the circumferential direction by polishing the surface of the photosensitive drum as means for forming recessed portions will be described.

First, a configuration in which particles are provided in the surface layer as means for forming convex portions will be described.

Figure 18:
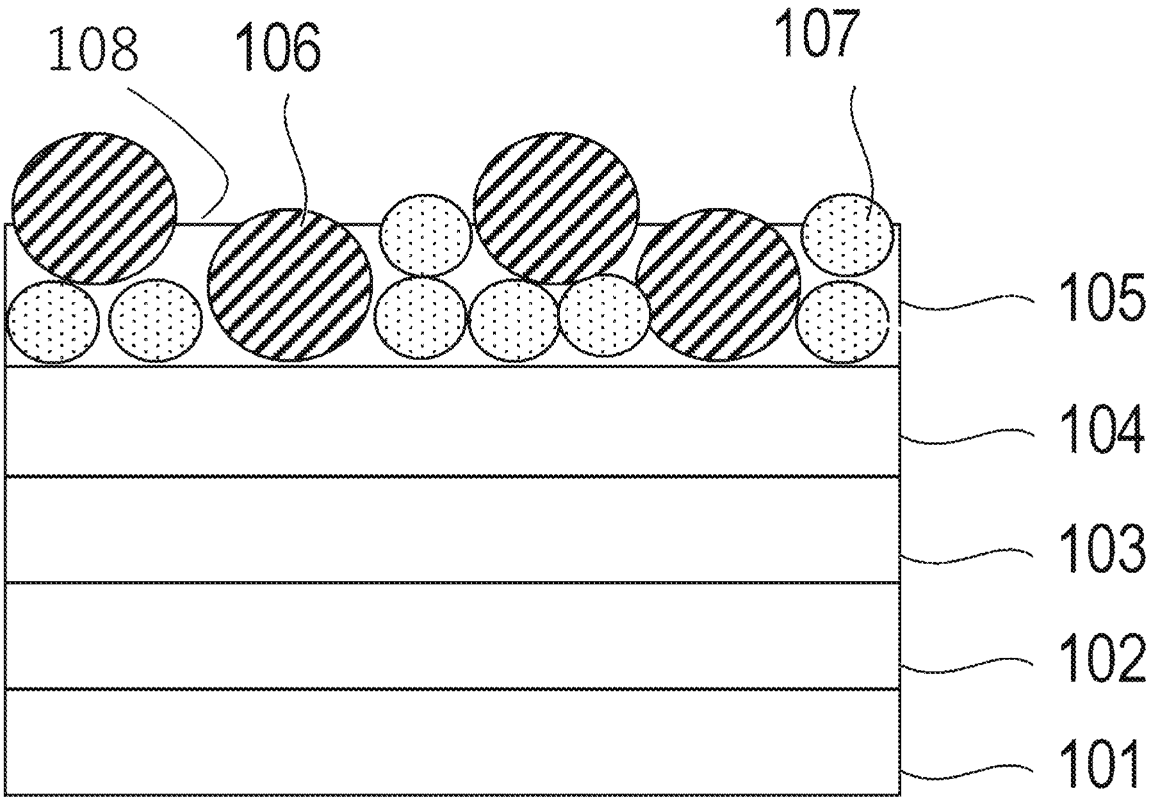
FIG. 18 is a schematic view showing the layer configuration of a photosensitive drum in the present example.
Figure 19:
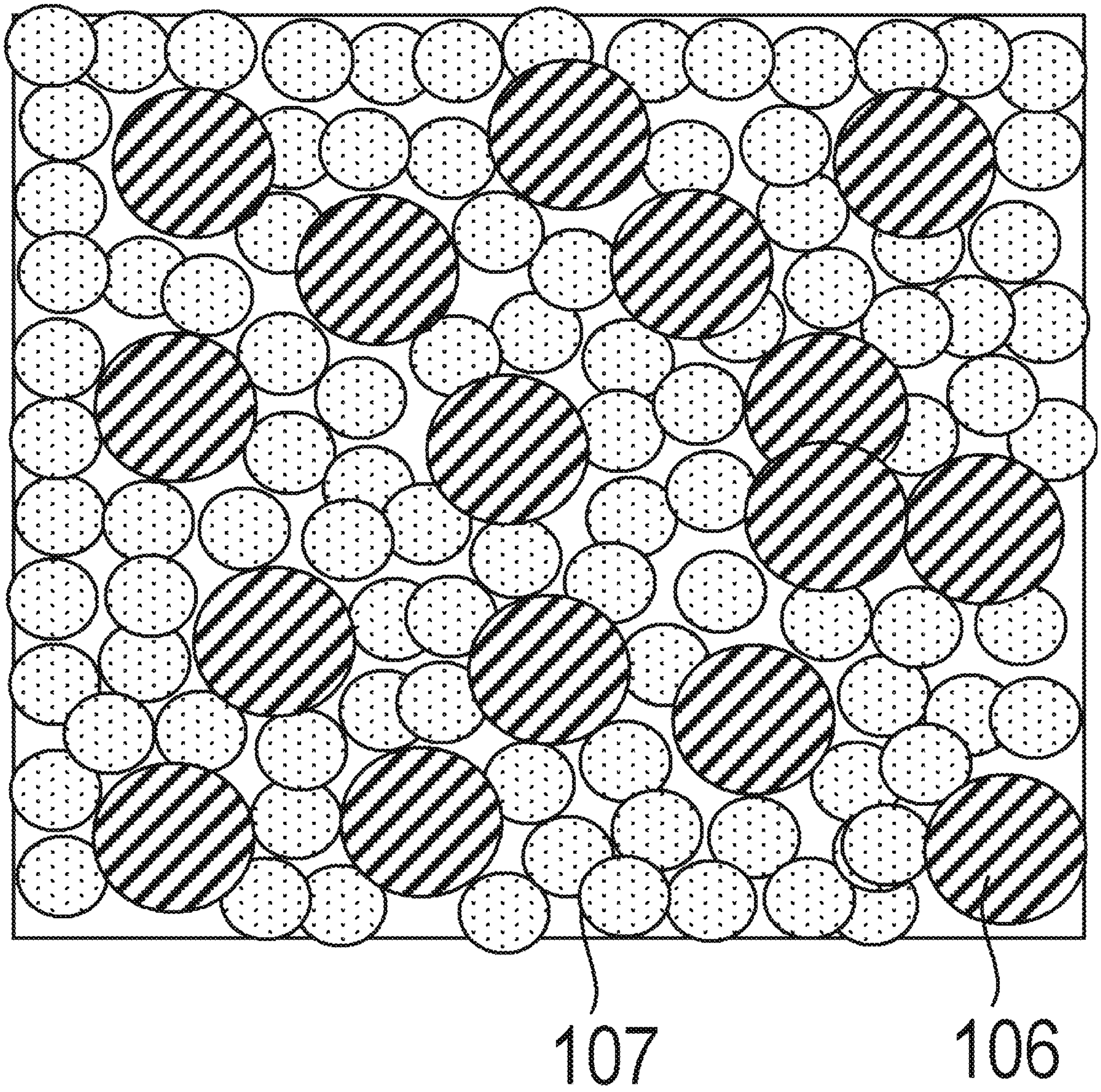
FIG. 19 is a schematic view showing the appearance of the photosensitive drum in the present example as viewed from above.

FIG. 18 and FIG. 19 are views showing one example of the layer configuration of the photosensitive drum 21 according to the present invention. In FIG. 18 and FIG. 19, reference sign 101 is the support, reference sign 102 is the undercoating layer, reference sign 103 is the charge generation layer, and reference sign 104 is the charge transport layer. Reference sign 105 is the surface layer according to the present invention, particles 107 other than particles PAA 106, which will be described below, and the particles PAA are present in the surface layer, and convex shapes are formed on the surface of the photosensitive drum.

Examples of a method for manufacturing the photosensitive drum 21 of the present invention include methods in which a coating liquid for each layer, which will be described below, is prepared, applied in a desired layer order, and dried. At this time, examples of a method for applying the coating liquid include dip coating, spray coating, inkjet coating, roll coating, die coating, blade coating, curtain coating, wire bar coating, ring coating, dispense coating, and the like. Among these, dip coating is preferable from the viewpoint of efficiency and productivity.

In order to form the surface layer of the photosensitive drum 21 of the present invention, a coating liquid for the surface layer containing particles A and particles B is used. Here, examples of suitable particles A and B include organic resin particles such as acrylic resin particles and inorganic particles such as silica.

An acrylic particle contains a polymer of an acrylate ester or a methacrylate ester. Among them, a styrene acrylic particle is more preferable. The degrees of polymerization of an acrylic resin and a styrene acrylic resin or whether the resin is thermoplastic or thermosetting is not particularly limited. Examples of the organic resin particles include crosslinked polystyrene, a crosslinked acrylic resin, a phenolic resin, a melamine resin, polyethylene, polypropylene, acrylic particles, polytetrafluoroethylene particles, and silicone particles.

Examples of the inorganic particles include silica particles, metal oxide particles, metal particles, and the like. As the particles that are contained in the surface layer 105 of the photosensitive drum 21 of the present invention, it is preferable to use inorganic particles having low elasticity and being advantageous in promoting point contact between the toner and the photosensitive member.

In the case of using the inorganic particles, silica particles are particularly preferable. Since the silica particles have a low elastic modulus and a large average circularity compared with other insulating particles, an effect of promoting point contact between the toner and the photosensitive member to reduce the adhesive force is expected.

Known silica fine particles can be used as the silica particles, and any of dry silica fine particles or wet silica fine particles may be used. Preferably, fine particles of wet silica obtained by a sol-gel method (hereinafter also referred to as sol-gel silica) are preferable.

The sol-gel silica that is used as the particles that are contained in the surface layer 105 of the photosensitive drum 21 of the present invention may be hydrophilic or may have hydrophobic surfaces.

Examples of a method for the hydrophobic treatment include a sol-gel method in which a solvent is removed from a silica sol suspension, and the silica sol suspension is dried and then treated with a hydrophobic treatment agent and a method in which a hydrophobic treatment agent is directly added to a silica sol suspension and the silica sol suspension is dried and treated at the same time. From the viewpoint of controlling the half width of the particle size distribution and controlling the saturated moisture adsorption amount, the method in which a hydrophobic treatment agent is directly added to a silica sol suspension is preferable.

Examples of the hydrophobic treatment agent include:

chlorosilanes such as methyltrichlorosilane, dimethyldichlorosilane, trimethylchlorosilane, phenyltrichlorosilane, diphenyldichlorosilane, t-butyldimethylchlorosilane, and vinyltrichlorosilane;

alkoxysilanes such as tetramethoxysilane, methyltrimethoxysilane, dimethyldimethoxysilane, phenyltrimethoxysilane, diphenyldimethoxysilane, o-methylphenyltrimethoxysilane, p-methylphenyltrimethoxysilane, n-butyltrimethoxysilane, i-butyltrimethoxysilane, hexyltrimethoxysilane, octyltrimethoxysilane, decyltrimethoxysilane, dodecyltrimethoxysilane, tetraethoxysilane, methyltriethoxysilane, dimethyldiethoxysilane, phenyltriethoxysilane, diphenyldiethoxysilane, i-butyltriethoxysilane, decyltriethoxysilane, vinyltriethoxysilane, γ-methacryloxypropyltrimethoxysilane, γ-glycidoxypropyltrimethoxysilane, γ-glycidoxypropylmethyldimethoxysilane, γ-mercaptopropyltrimethoxysilane, γ-chloropropyltrimethoxysilane, γ-aminopropyltrimethoxysilane, γ-aminopropyltriethoxysilane, 7-(2-aminoethyl)aminopropyltrimethoxysilane, and 7-(2-aminoethyl)aminopropylmethyldimethoxysilane;

silazanes such as hexamethyldisilazane, hexaethyldisilazane, hexapypropyldisilazane, hexabutyldisilazane, hexapentyldisilazane, hexahexyldisilazane, hexacyclohexyldisilazane, hexaphenyldisilazane, divinyltetramethyldisilazane, and dimethyltetravinyldisilazane;

silicone oils such as dimethyl silicone oil, methyl hydrogen silicone oil, methylphenyl silicone oil, alkyl-modified silicone oil, chloroalkyl-modified silicone oil, chlorophenyl-modified silicone oil, fatty acid-modified silicone oil, polyether-modified silicone oil, alkoxy-modified silicone oil, carbinol-modified silicone oil, amino-modified silicone oil, fluorine-modified silicone oil, and terminal reactive silicone oil;

siloxanes such as hexamethylcyclotrisiloxane, octamethylcyclotetrasiloxane, decamethylcyclopentasiloxane, hexamethyldisiloxane, and octamethyltrisiloxane;

As fatty acids and metal salts thereof, long chain fatty acids such as undecylic acid, lauric acid, tridecylic acid, dodecyl acid, myristic acid, palmitic acid, pentadecylic acid, stearic acid, heptadecylic acid, arachidic acid, montanic acid, oleic acid, linolic acid, and arachidonic acid and salts of the fatty acid and a metal such as zinc, iron, magnesium, aluminum, calcium, sodium, or lithium.

Among these, alkoxysilanes, silazanes, and silicone oils make the hydrophobic treatment easy to perform and are thus preferably used. These hydrophobic treatment agents may be used singly or two or more thereof may be jointly used.

The surface layer 105 in the present invention may contain an additive such as an antioxidant, an ultraviolet absorber, a plasticizer, a leveling agent, a slip-imparting agent, or a wear resistance improver. Specific examples thereof include a hindered phenolic compound, a hindered amine compound, a sulfur compound, a phosphorus compound, a benzophenone compound, a siloxane-modified resin, a silicone oil, and the like.

The surface layer 105 of the present invention can be formed by preparing a coating liquid for the surface layer containing each of the above-described materials and a solvent, forming a coating film thereof, and drying and/or curing the coating film. Examples of the solvent that is used in the coating liquid include an alcoholic solvent, a ketone-based solvent, an ether-based solvent, a sulfoxide-based solvent, an ester-based solvent, an aromatic hydrocarbon-based solvent.

The binder resin according to the present invention includes the following forms. Here, the surface layer 105 preferably contains a charge transport substance.

Examples of the binder resin include a polyester resin, an acrylic resin, a phenoxy resin, a polycarbonate resin, a polystyrene resin, a phenolic resin, a melamine resin, an epoxy resin, and the like. Among these, a polycarbonate resin, a polyester resin, and an acrylic resin are preferable.

The surface layer 105 of the present invention may be formed as a cured film by polymerizing a composition containing a monomer having a polymerizable functional group. Examples of a reaction at that time include a thermal polymerization reaction, a photopolymerization reaction, a radiation polymerization reaction, and the like. Examples of the polymerizable functional group in the monomer having a polymerizable functional group include an acrylic group, a methacrylic group, and the like. As the monomer having a polymerizable functional group, a material having a charge transport capability may be used.

A compound having a polymerizable functional group may have a charge-transporting structure and a chain-polymerizable functional group at the same time. As the charge-transporting structure, a triarylamine structure is preferable from the viewpoint of charge transport. As the chain-polymerizable functional group, an acryloyl group or a methacryloyl group is preferable. The number of the functional groups may be one or more. In particular, when a cured film containing a compound having a plurality of functional groups and a compound having one functional group is formed, it is easy to eliminate strain generated by the polymerization of the plurality of functional groups, which is particularly preferable.

Examples of the compound having one functional group will be shown in (2-1) to (2-6).

[Chem. 1]

(2-1)

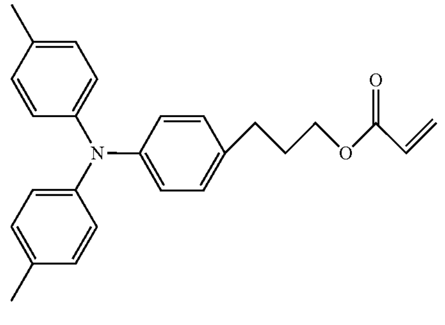

-continued
(2-2)
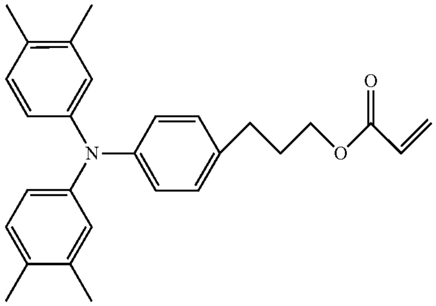
(2-3)
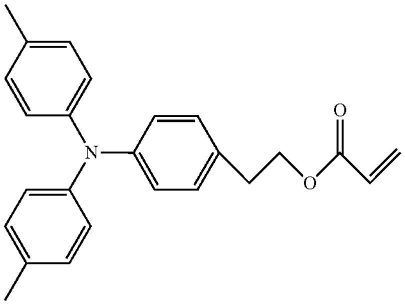
(2-4)
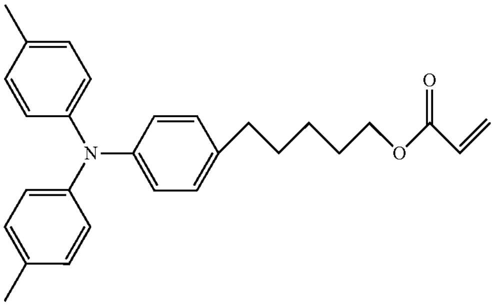
(2-5)
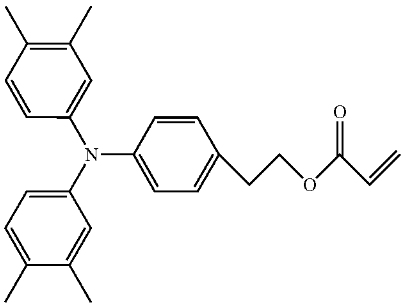
(2-6)
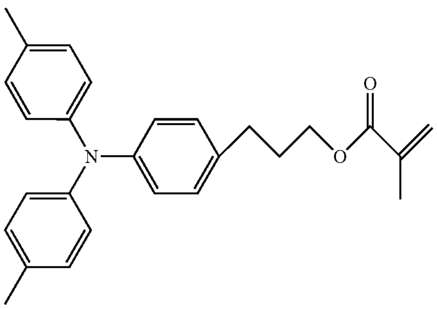
Examples of the compound having a plurality of functional groups will be shown in (3-1) to (3-6).
[Chem. 5]
(3-1)
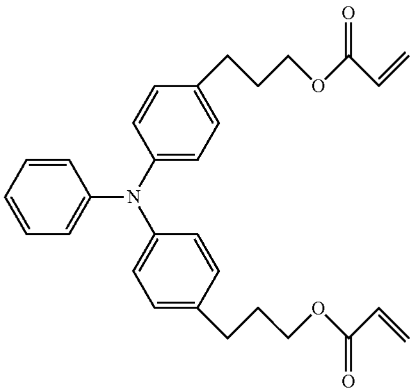
(3-2)
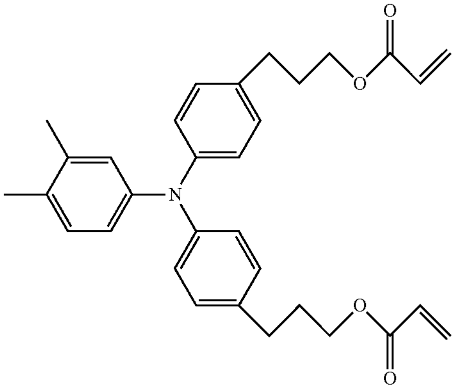
(3-3)
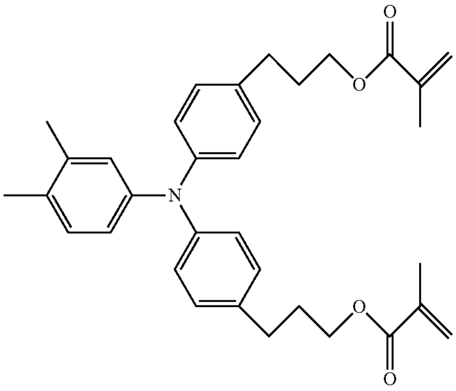
(3-4)
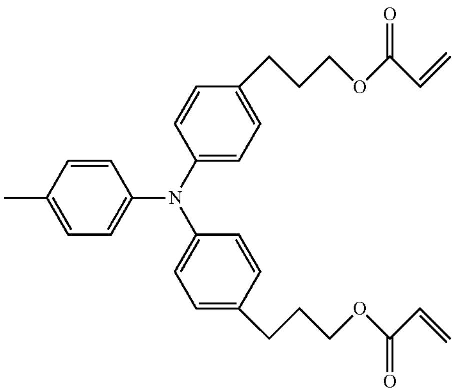

-continued (3-5)

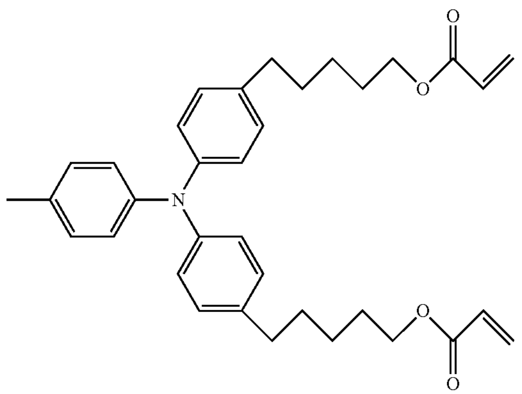

(3-6)

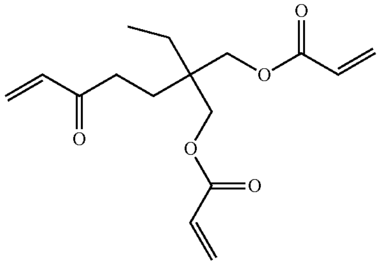

Hereinafter, a method for measuring each physical property of the photosensitive drum 21 or each particle according to the present invention will be described.

<Measurement of Physical Properties of Photosensitive Drum>

<Method for Measuring Number-Based Average Particle Diameter of Particles of Present Invention>

The number average particle diameter is measured using a ZETASIZER Nano-ZS (manufactured by Malvern Panalytical). The device is capable of measuring particle diameters by a dynamic light scattering method. First, a sample of a measurement object is diluted so that the solid-liquid ratio is adjusted to 0.10% by mass (±0.02% by mass), collected in a quartz cell, and put into a measuring unit. As a dispersion medium, water or a methyl ethyl ketone/methanol mixed solvent is used in a case where the sample is inorganic fine particles, and water is used in a case where the sample is resin particles or an external additive for the toner. As measurement conditions, the index of refraction of the sample, the index of refraction, viscosity, and temperature of a dispersion solvent are input, and the number average particle diameter is measured with control software Zetasizer software 6.30. Dn is employed as the number average particle diameter.

The index of refraction of the particles is employed from "index of refraction of solids" described in Page 517 of Handbook of Chemistry: Pure Chemistry, Vol. II, 4th Edition (The Chemical Society of Japan, Maruzen Publishing Co., Ltd.). As the index of reflection of the resin particles, the index of reflection that is stored in the control software as the index of reflection of a resin that is used for the resin particles is employed. However, in a case where there is no stored index of refraction, a value described in the polymer database of National Institute for Materials Science is used. The index of refraction of the external additive for the toner is calculated by taking the weight average from the index of refraction of the inorganic fine particles and the index of refraction of the resin that is used for the resin particles. As the index of refraction, viscosity, and temperature of the dispersion solvent, the numerical values stored in the control software are selected. In the case of the mixed solvent, the weight average of the dispersion media mixed is taken.

<Method for Measuring Maximum Height Difference Rz on Photosensitive Drum Surface>

In the photosensitive drum 21 of the present example, the maximum height difference on the surface of the photosensitive drum 21 can be measured as described below.

As samples on which the surface observation was performed, 5 mm square sample pieces were cut out from the photosensitive member every 1200 in the circumferential direction in the longitudinal center of the first region/the longitudinal center of the second region at both end portions. The sample pieces were fixed to a sample holder so that it was possible to observe the surface layer of the electrophotographic photosensitive member. For the sample pieces fixed to the sample holder, a 3 μm square surface shape on the surface of the surface layer of the electrophotographic photosensitive member was measured at one site of each sample using a scanning probe microscope SPM. This measurement was performed at 9 points in the sample pieces, respectively, and the average value of the maximum height differences Rz at these 9 sites was regarded as the maximum height difference Rz of the electrophotographic photosensitive member of the present invention.

As SPM, it is possible to use a scanning probe microscope "JSPM-5200" (manufactured by JEOL Ltd.), a scanning probe microscope "E-sweep" (manufactured by Hitachi High-Tech Corporation), and a medium-sized probe microscope system AFM5500M (manufactured by Hitachi High-Tech Corporation).

A measurement method in which the scanning probe microscope "JSPM-5200" (manufactured by JEOL Ltd.) is used is performed as described below. A scan operation was performed through WinSPM Scanning, and a data analysis image of the surface shape was output. The maximum height difference Rz on the surface of the surface layer of the photosensitive drum of the present invention was measured under the following "JSPM-5200" observation conditions.

(JSPM-5200" Observation Conditions)

Scanner: 4
SPM scan: All SPM mode
Cantilever: SI-DF3P2 (manufactured by Hitachi High-Tech Fielding Corporation)
Resonance frequency detection:
(START) 1.00 kHz
(Stop) 100 kHz (in the case of f=67 kHz, depending on cantilever type)
Cantilever autotune: Normal approach
Acquisition: 2 Inputs (512)
Scan mode: Normal
STM/AFM: AC-AFM
Clock: 833.33 μs
Scan size: 3000 nm
Offset: 0
Bias [V]: 0
References/V: Unaltered (calibration value input)
Filter: 1.4 Hz
Loop gain: 16

The image of the surface shape and the surface height data attached to the image were analyzed through WinSPM Scanning, and the difference between the maximum value Zmax and the minimum value Zmin of the height z for the flattened image was obtained as the maximum height difference Rz.

In addition, a measurement method in which the scanning probe microscope “E-sweep” (manufactured by Hitachi High-Tech Corporation) is used is performed as described below. A data analysis image of the surface shape of the electrophotographic photosensitive member can be output by performing the scanning operation.

“E-Sweep” Observation Conditions

- Cantilever: SI-DF20 (with back AL) K-A102002771 (manufactured by Hitachi High-Tech Fielding Corporation)
- Scanning probe microscope: Manufactured by Hitachi High-Tech Science Corporation
- Measurement unit: E-sweep
- Measurement mode: DFM (resonance mode) shape image
- Resolution: The number of X data: 512, the number of Y data: 512
- Measurement frequency: 127 Hz:

Q curve measurement magnification, excitation voltage, low-pass filter, high-pass filter, and the like are adjusted so that the resonance state of the cantilever can be optimized.

The image of the surface shape and the surface height data attached to the image are analyzed using attached software, whereby the difference between the maximum value Zmax and the minimum value Zmin of the height z can be obtained as the maximum height difference (maximum height) Rz based on JIS B0601:2001 for the flattened image.

Figure 21:
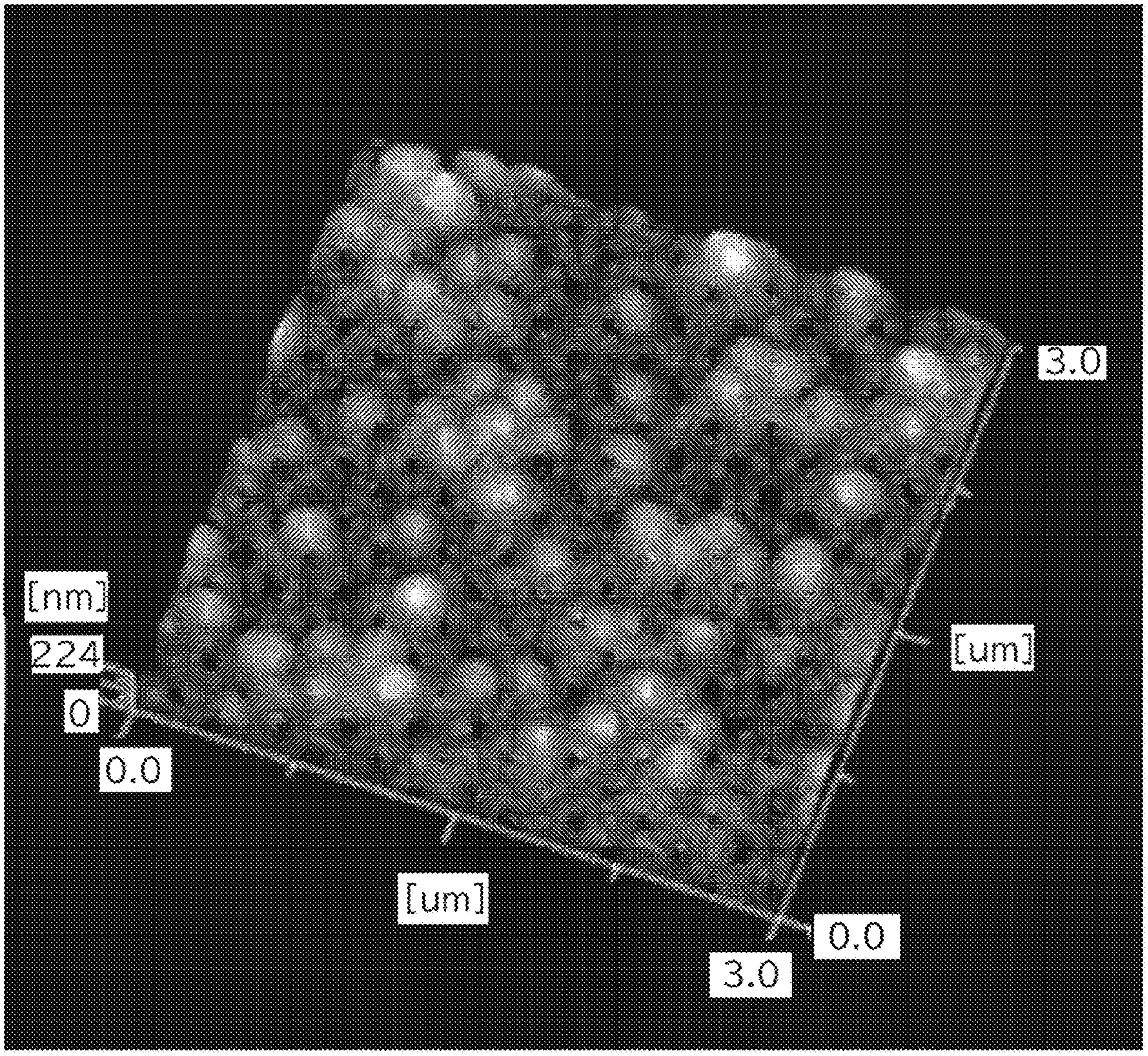
FIG. 21 is an SPM image of the surface of the photosensitive drum in the present example.

FIG. 21 shows one example of the results of SPM observation. FIG. 21 shows the surface shape.

After the measurement, the measurement position in the sample was marked, and the measurement of <Observation of Lamination State of Particles Contained in Surface Layer of Photosensitive Drum and Calculation of Proportion of Volume of Particles in Total Volume of Surface Layer, Particle Size Distribution of Particles, and Height of Convex Portion CA>, which will be described below, was performed for each sample.

<Observation of Lamination State of Particles Contained in Surface Layer of Photosensitive Drum and Calculation of Proportion of Volume of Particles in Total Volume of Surface Layer, Particle Size Distribution of Particles, and Height of Convex Portion CA>

The proportion of the volume of the particles in the total volume of the surface layer 105 was calculated from the amounts added, densities, and true specific gravity of the monomer having a polymerizable functional group and the particles that were used in the coating liquid for the surface layer. Regarding the specific gravity of the monomer having a polymerizable functional group and the particles, values published by the manufacturer of each material can be referred to.

In the case of being obtained from the photosensitive drum 21, for example, the following method is used.

A cross section of the photosensitive drum 21 prepared in the example was observed. It was determined whether the particles were laminated in a single layer in the surface layer as in FIG. 22 or the particles were laminated in a plurality of layers as in FIG. 18 or FIG. 23. Samples on which cross-sectional observation was performed were collected from the longitudinal centers of the first regions and the longitudinal centers of the second regions in both end portions by shifting the photosensitive drum by 120° in the circumferential direction. 5 mm square sample pieces were cut out from the photosensitive drum 21, respectively, and the surface layer 105 was transformed into a 2 μm×2 μm×2 μm three dimensional structure with Slice & View of FIB-SEM.

Slice & View conditions were set as described below.

- Analytical specimen processing: FIB method
- Processing and observation device: NVision 40 manufactured by SII/Zeiss
- Slice interval: 10 nm
- (Observation Conditions)
- Accelerating voltage: 1.0 kV
- Specimen slope: 54°
- WD: 5 mm
- Detector: BSE detector
- Aperture: 60 μm, high current
- ABC: ON
- Image resolution: 1.25 nm/pixel The measurement environment is a temperature of 23° C. and a pressure of $1\times10^{-4}$ Pa. As the processing and observation device, it is also possible to use Strata 400S (specimen slope: 52°) manufactured by FEI.

Analysis is performed on an analysis region that is 2 μm in length and 2 μm in width, information of each cross section is integrated, and a volume V per 2 μm in length, 2 μm in width, and 2 μm in thickness (8 $\mu m^3$) on the surface of the surface layer 105 is obtained. In addition, image analysis was performed on each cross section using image processing software: Image-Pro Plus manufactured by Media Cybernetics, Inc.

From a difference in contrast of Slice & View of FIB-SEM, the content of the particles in the total volume of the surface layer 105 was calculated. In addition, based on information obtained from the image analysis, in each of the four sample pieces, the volume V of the particles of the invention in a volume of 2 μm×2 μm×2 μm (unit volume: 8 $\mu m^3$) is obtained, and the content [% by volume] of the particles (=V $\mu m^3$/8 $m^3$×100) of the particles was calculated. The average value of the value of the content of the particles in each sample piece was regarded as the content [% by volume] of each particle of the present invention in the surface layer relative to the total volume of the surface layer 105. The composition of the particle was determined using a SEM-EDX function.

It is confirmed whether or not there are a plurality of peaks in a particle size distribution D in which the horizontal axis represents the particle diameters of the particles contained in the surface of the surface layer 105 and the vertical axis represents the number-based frequency of each particle diameter.

In the particle size distribution D, a peak having the maximum peak top frequency is defined as a first peak. Next, a peak having the second maximum peak top frequency is defined as a second peak. Furthermore, the first peak and the second peak were compared with each other, and the peak having a larger value of particle diameter for the peak top was defined as a peak PEA.

Figure 22:
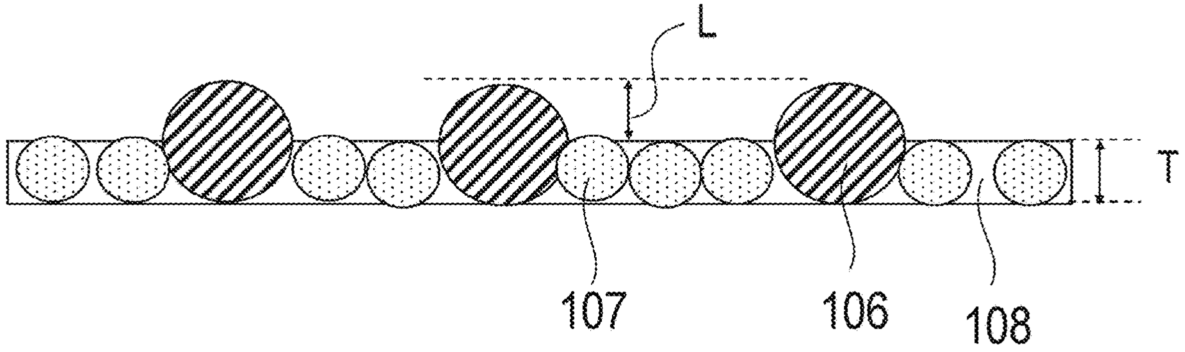
FIG. 22 is a schematic view showing the convex height on the surface of the photosensitive drum in the present example.
Figure 23:
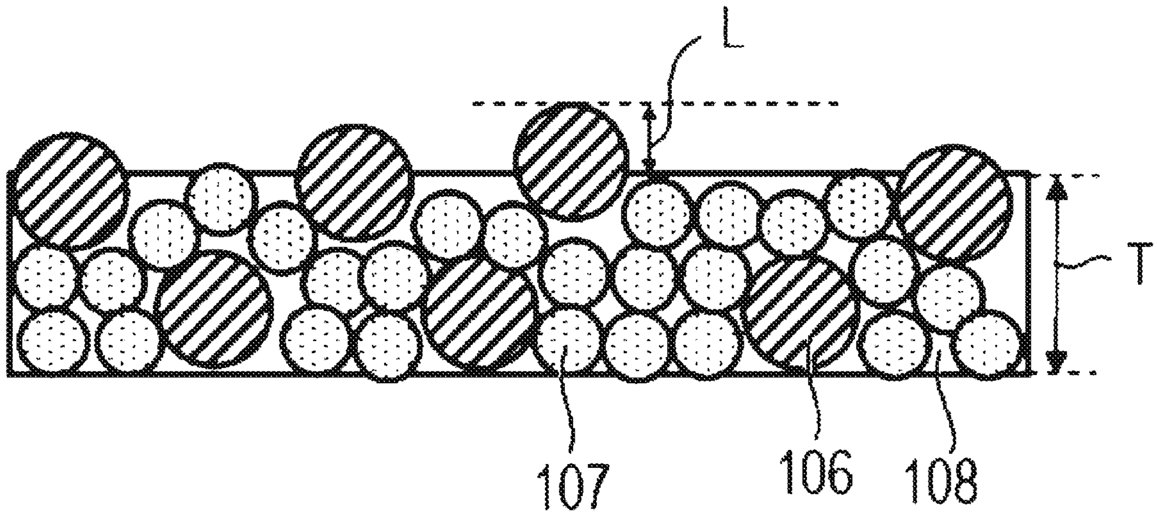
FIG. 23 is a schematic view showing the convex height on the surface of the photosensitive drum in the present example.

In addition, the particle diameter for the peak top of the peak PEA in the particle size distribution D is represented by DA. Particles having a particle diameter in a range of DA±20 nm among all of the particles that are contained in the surface layer 105 are defined as particles PAA. Convex portions that are derived from the particles PAA and have a height of at least 10 nm and not more than 350 nm are defined as convex portions CA. At this time, a height L of the convex portion CA is shown in FIG. 22 and FIG. 23. In a case where there were particles with different compositions, the particles were determined in a mapping image by EDS. Furthermore, 100 convex portions were measured, and the proportion of convex portions CA derived from the particles PAA in all of the convex portions was calculated. In addition, regarding the heights L, an average value LV was calculated.

Next, in the particle size distribution D, the peak having the maximum peak top frequency is defined as the first peak, the peak having the second maximum peak top frequency is defined as the second peak, the first peak and the second peak were compared with each other, and the peak having a smaller value of particle diameter for the peak top was defined as a peak PEB. A particle diameter DB for the peak top of the peak PEB is calculated.

In addition, in a cross-sectional image of the surface layer 105, the average value T of the film thickness of the surface layer 105 not including the convex portion CA was measured as shown in FIG. 22 and FIG. 23.

Figure 27A:
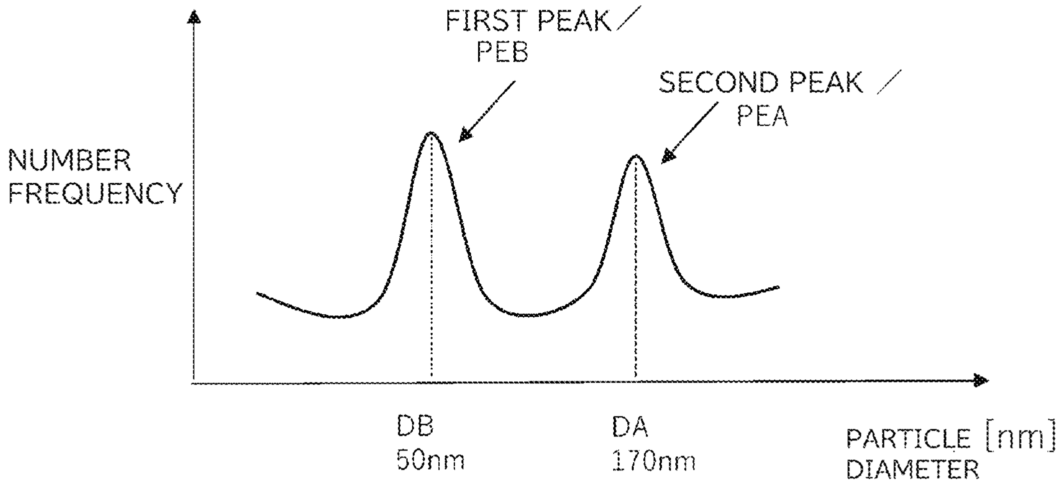
FIGS. 27A and 27B are views for describing the particle size distribution of particles in a surface layer.

The first peak and the second peak are preferably selected from a particle size range of 20 nm or more, in which the particle size corresponds to the peak top. That is, it is preferable that, among the peaks having a peak top of 20 nm or more out of the plurality of peaks, the peak having the maximum peak top frequency is defined as the first peak, and the peak having the second maximum peak top frequency is defined as the second peak. FIG. 27A shows one example of the number-based particle size distribution of particles, where the first peak is present at a particle size of 50 nm and the second peak is present at a particle size of 170 nm. In this case, the second peak having a larger particle diameter becomes the peak PEA, and the particle diameter DA thereof is 170 nm. Therefore, the condition of 80 nm≤DA is satisfied. In addition, since the particle diameter of the first peak is 50 nm, the condition of the particle diameter for the peak top being 20 nm or more is satisfied.

Figure 27B:
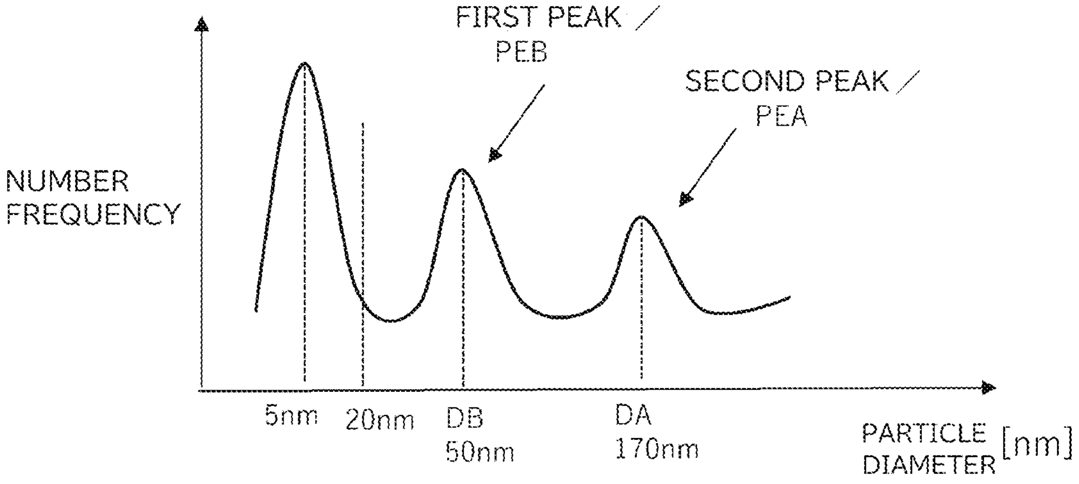

FIG. 27B shows another example of the particle size distribution. Although there is a peak at a particle diameter of 5 nm, this peak is not included in the first peak and the second peak because the particle diameter at the peak top is less than 20 nm. Therefore, as in FIG. 27A, the peak at a particle diameter of 50 nm becomes the first peak and the peak at a particle diameter of 170 becomes the second peak. The reason for the peaks being selected as described above will be described. Here, even from the electrophotographic photosensitive member 1 containing a large number of extremely small particles in the surface layer, it is possible to obtain the effects of the present invention to be described below. Therefore, it is possible to stably obtain the effect of the present invention by selecting the first peak and the second peak from the peaks having a particle diameter of 20 nm or more as described with reference to FIGS. 27A and 27B.

<Method for Measuring Average Value and Standard Deviation of Distances Between Centers of Gravity of Convex Portions CA on Photosensitive Drum Surface>

The average value and standard deviation of the distances between the centers of gravity of the convex portions CA derived from the particles PAA in the photosensitive drum 21 of the present example can be calculated as described below.

The surface of the surface layer 105 of the photosensitive drum 21 was photographed using a scanning electron microscope (SEM) ("S-4800," manufactured by JEOL Ltd.) at an accelerating voltage of 10 kV. As objects, 30000-fold photographic images of the surface layer 105 of the photosensitive drum 21 were captured with a scanner at four sites at intervals of 900 in the circumferential direction in the places of the longitudinal centers of the first regions/the longitudinal centers of the second regions at both end portions in the photosensitive drum 21 of the present invention. The particles PAA in the photographic images were binarized using an image processing analyzer ("LUZEX AP," manufactured by NIRECO Corporation).

Figure 20:
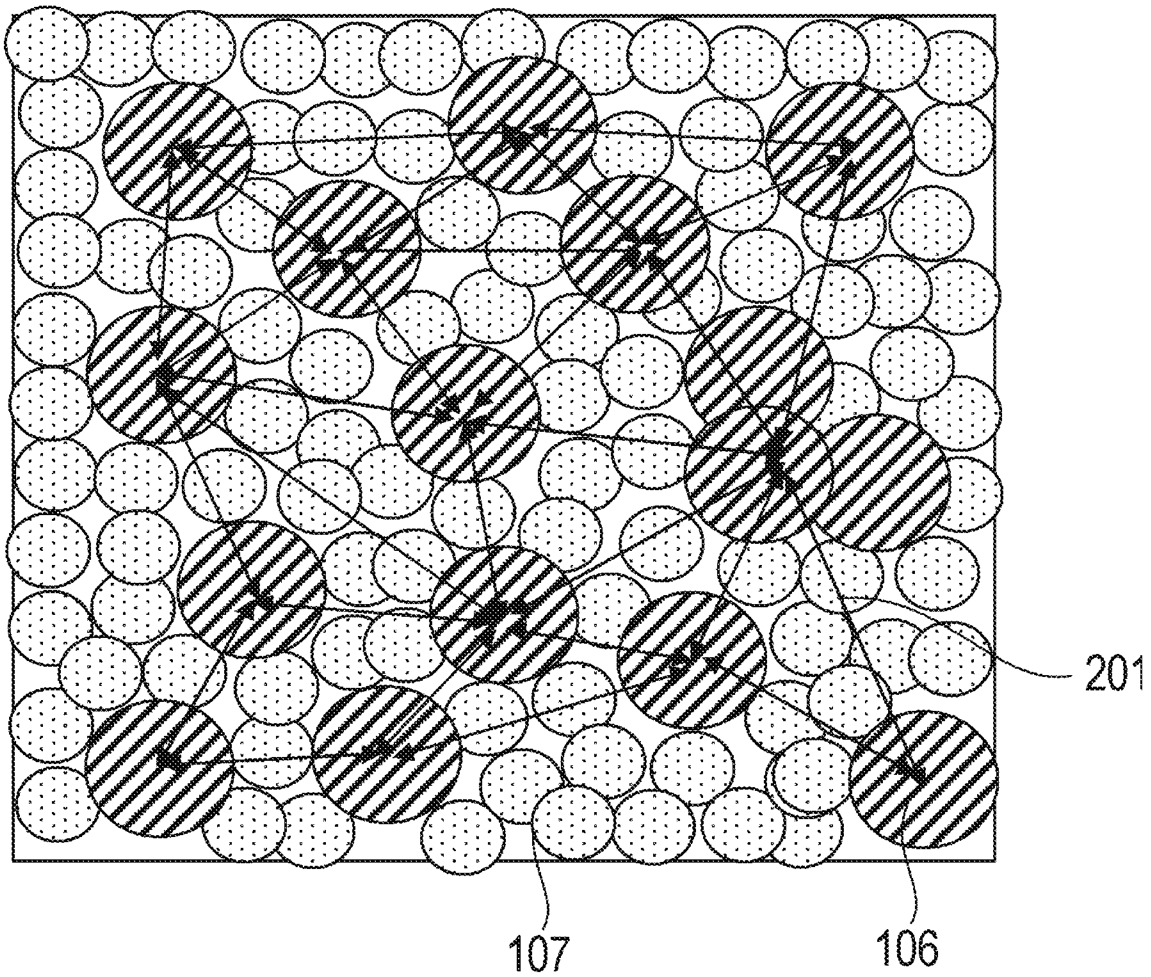
FIG. 20 is a schematic view showing the distances between the centers of gravity of convex portions CA on the surface of the photosensitive drum in the present example.

The distances between the centers of gravity 201 of the particles PAA adjacent to each other as shown in FIG. 20 are measured in a mode of the distance between adjacent centers of gravity of the particles PAA, and the average value of the distances between the centers of gravity is calculated. At this time, the distance between the centers of gravity is calculated from each center of gravity of the particle PAA by Voronoi tessellation. The distances between the centers of gravity and the standard deviations are calculated for a total of 10 fields of view, and the resultant average value and standard deviation of the distances between the centers of gravity are regarded as the average value and standard deviation of the distances between the centers of gravity of the particles on the surface layer 105 of the photosensitive drum 21.

In the present invention, the plurality of convex portions are provided on the surface of the photosensitive drum, whereby the contact area between the photosensitive drum 21 and the developing roller is reduced, and the amount of heat generated from the end portion of the developing roller is suppressed. Here, as a result of the present inventors' intensive studies, it was found that the amount of heat generated from the end portion of the developing roller cannot be sufficiently suppressed depending on the shape of the convex portion. Specifically, in a case where the heights of the convex portions are low or a case where the number of the convex portions is small, since regions other than the convex portions on the surface of the photosensitive drum come into contact with the developing roller, it is not possible to sufficiently reduce the contact area.

The maximum height difference Rz1 of the surface roughness of the photosensitive drum in the first region of the present invention is preferably 100 to 700 nm. In a case where Rz1 is 100 nm or less, the contact area between the surface of the photosensitive drum and the surface of the developing roller cannot be sufficiently reduced, and it is thus not possible to sufficiently suppress the amount of heat generated from the end portion of the developing roller. In addition, in the case of the photosensitive drum 21 containing particles provided on the surface layer 105, when Rz1 is 700 nm or more, the particles may be detached from the surface layer 105 due to friction between the photosensitive drum 21 and the developing roller.

The average value L1 of the distances between the centers of gravity of the convex portions CA on the surface of the photosensitive drum in the first region of the present invention is preferably 100 to 700 nm. In a case where L1 is 100 nm or less, a large amount of particles are present on the surface of the photosensitive drum, and the thickness of the resin between the particles becomes thin or the particles directly come into contact with each other. In such a case, the binding force of the particles to the surface layer 105 becomes weak, and the particles may be detached from the surface layer 105 due to friction between the photosensitive drum 21 and the developing roller. In addition, in a case where L1 is 700 nm or more, since the number of convex portions on the surface of the photosensitive drum is small, it is not possible to sufficiently reduce the contact area between the surface of the photosensitive drum and the surface of the developing roller, and the amount of heat generated from the end portion of the developing roller cannot be sufficiently suppressed. In addition, it is preferable that L1<L2 is satisfied, where L1 is the average value of the distances between the centers of gravity of the convex portions in the first region on the surface of the photosensitive drum and L2 is the average value of the distances between the centers of gravity of the convex portions in the second region.

In addition, the smaller the standard deviation of the distances between the centers of gravity of the convex portion CA, the smaller the unevenness in the distance between the centers of gravity of the convex portion CA, and the convex portions are thus more uniformly present between the photosensitive drum 21 and the developing roller. Therefore, the contact area between the surface of the photosensitive drum and the surface of the developing roller can be sufficiently reduced due to the small distances between the centers of gravity of the convex portions CA. As a result, detachment of the particles from the surface layer 105 due to friction between the photosensitive drum 21 and the developing roller can be suppressed. Particularly, in a case where the average value of the distances between the centers of gravity of the convex portions CA is 500 nm, the standard deviation of the distances between the centers of gravity is preferably 250 nm or less.

In the present invention, in the case of using the photosensitive drum 21 including convex portions formed by providing particles on the surface layer 105, the volume average particle diameter of the particles on the surface of the photosensitive drum in the first region is more preferably 50 to 350 nm. In a case where the volume average particle diameter is 50 nm or less, it is not possible to sufficiently increase the heights of the convex portions, the contact area between the surface of the photosensitive drum and the surface of the developing roller cannot be sufficiently reduced, and it is thus not possible to sufficiently suppress the amount of heat generated from the end portion of the developing roller. In a case where the volume average particle diameter is 350 nm, the particles may be detached from the surface layer 105 due to friction between the photosensitive drum 21 and the developing roller.

<Manufacture of Photosensitive Drum>

The support, the conductive layer, the undercoating layer, the charge generation layer, the charge transport layer, and the surface layer were produced by the following method.

<Preparation of Coating Liquid 1 for Conductive Layer>

Anatase-type titanium oxide having an average primary particle diameter of 200 nm was used as a substrate, and a titanium niobium sulfate solution containing 33.7 parts of titanium in terms of $TiO_2$ and 2.9 parts of niobium in terms of $Nb_2O_5$ was prepared. 100 parts of the substrate was dispersed in pure water to produce 1000 parts of a suspension, and the suspension was heated to 60° C. The titanium niobium sulfate solution and 10 mol/L sodium hydroxide were added dropwise for three hours so that the pH of the suspension reached 2 to 3. After the total amount was added dropwise, the pH was adjusted to near neutral, and a polyacrylamide-based coagulant was added thereto to precipitate the solid content. The supernatant was removed, and the solid content was filtered, washed, and dried at 110° C., thereby obtaining an intermediate containing 0.1 wt % of an organic substance derived from the coagulant in terms of C. This intermediate was fired at 750° C. in nitrogen for one hour and then fired at 450° C. in the air, thereby producing titanium oxide particles. The resultant particles had an average primary particle diameter of 220 nm, which was measured by the above-described particle diameter measurement method in which a scanning electron microscope was used.

Subsequently, 50 parts of a phenolic resin (monomer/oligomer of a phenolic resin) as a binding material (trade name: Plyophen J-325, manufactured by DIC Corporation, resin solid content: 60%, density after curing: 1.3 g/$cm^2$) was dissolved in 35 parts of 1-methoxy-2-propanol as a solvent to obtain a solution.

60 Parts of titanium oxide particles 1 were added to this solution, the mixture was put into a vertical sand mill in which 120 parts of glass beads having a number-average primary particle diameter of 1.0 mm were used as a dispersion medium, and a dispersion treatment was performed for four hours under conditions of a dispersion liquid temperature of 23±3° C. and a rotation speed of 1500 rpm (circumferential speed of 5.5 m/s), thereby obtaining a dispersion. The glass beads were removed from this dispersion with a mesh. 0.01 parts of a silicone oil (trade name: SH28 PAINT ADDITIVE, manufactured by Dow Corning Toray Co., Ltd.) as a leveling agent, and 8 parts of silicone resin particles (trade name: KMP-590, manufactured by Shin-Etsu Chemical Co., Ltd., average primary particle diameter: 2 μm, density: 1.3 g/$cm^3$) as a surface roughness-imparting agent were added to the dispersion from which the glass beads had been removed, stirred, and pressure-filtered using PTFE filter paper (trade name: PF060, manufactured by Advantec Toyo Kaisha, Ltd.), thereby preparing a coating liquid 1 for the conductive layer.

<Preparation of Coating Liquid 1 for Undercoating Layer>

100 Parts of rutile-type titanium oxide particles (average primary particle diameter: 50 nm, manufactured by TAYCA Co., Ltd.) were stirred and mixed with 500 parts of toluene, 3.5 parts of vinyltrimethoxysilane (trade name: KBM-1003, manufactured by Shin-Etsu Chemical Co., Ltd.) were added thereto, and the mixture was dispersed for eight hours in a vertical sand mill in which glass beads having a diameter of 1.0 mm were used. After the glass beads were removed, the toluene was distilled away by vacuum distillation, and the remaining components were dried for three hours at 120° C., thereby obtaining rutile-type titanium oxide particles surface-treated with an organic silicon compound. When the volume of the resultant titanium oxide particles was represented by a, and the average primary particle diameter of the titanium oxide particles was represented by b [μm], a/b was 15.6. The value of a was obtained from a microscope image of a cross section of the photosensitive drum 21 photographed using a field emission scanning electron microscope (FE-SEM, trade name: S-4800, manufactured by Hitachi High-Tech Corporation) after the production of the photosensitive drum.

18.0 Parts of the rutile-type titanium oxide particles surface-treated with an organosilicon compound, 4.5 parts of N-methoxymethylated nylon (trade name: TORESIN EF-30T, Nagase ChemteX Corporation), 1.5 parts of a copolymerized nylon resin (trade name: AMILAN CM8000, manufactured by Toray Industries, Inc.) were added to a mixed solvent of 90 parts of methanol and 60 parts of 1-butanol to prepare a dispersion.

This dispersion was dispersed for five hours in a vertical sand mill using glass beads having a diameter of 1.0 mm, and the glass beads were removed, thereby preparing a coating liquid 1 for the undercoating layer.

<Synthesis of Phthalocyanine Pigment>

Synthesis Example 1

100 g of gallium trichloride and 291 g of ortho-phthalonitrile were added to 1000 mL of α-chloronaphthalene under an atmosphere of a nitrogen flow and reacted at 200° C. for 24 hours, and the product was then filtered. The resultant wet cake was heated and stirred at a temperature of 150° C. for 30 min using N,N-dimethylformamide and then filtered. The resultant filtrate was washed with methanol and then dried, thereby obtaining a chlorogallium phthalocyanine pigment with a yield of 83%.

20 g of the chlorogallium phthalocyanine pigment obtained by the above-described method was dissolved in 500 mL of concentrated sulfuric acid, stirred for two hours, then, added dropwise to a mixed solution of 1700 mL of distilled water and 660 mL of concentrated aqueous ammonia that had been ice-cooled, and precipitated again. The precipitate was sufficiently washed with distilled water and dried, thereby obtaining a hydroxygallium phthalocyanine pigment.

<Preparation of Coating Liquid 1 for Charge Generation Layer>

0.5 parts of the hydroxygallium phthalocyanine pigment obtained in Synthesis Example 1, 7.5 parts of N,N-dimethylformamide (product code: D0722, manufactured by Tokyo Chemical Industry Co., Ltd.), and 29 parts of glass beads having a diameter of 0.9 mm were subjected to a milling treatment using a sand mill (BSG-20, manufactured by AIMEX Co., Ltd.) at a temperature of 25° C. for 24 hours. At this time, the disc was rotated 1500 times per minute as a condition. The liquid thus treated was filtered with a filter (product No.: N-NO.125T, pore diameter: 133 μm, manufactured by NBC Meshtec Inc.) to remove the glass beads. 30 Parts of N,N-dimethylformamide was added to this liquid, the liquid was then filtered, and the filtrate on the filter was sufficiently washed with n-butyl acetate. In addition, the washed filtrate was then dried in a vacuum to obtain 0.45 parts of the hydroxygallium phthalocyanine pigment. The resultant pigment contained N,N-dimethylformamide.

Subsequently, 20 parts of the hydroxygallium phthalocyanine pigment obtained by the milling treatment, 10 parts of polyvinyl butyral (trade name: S-LEC BX-1, manufactured by Sekisui Chemical Co., Ltd.), 190 parts of cyclohexanone, and 482 parts of glass beads having a diameter of 0.9 mm were dispersed for four hours under a cooling water temperature of 18° C. using a sand mill (K-800, manufactured by the former Igarashi Machine Production Co., Ltd. (AIMEX Co., Ltd.), disc diameter: 70 mm, the number of discs: five). At this time, the disc was rotated 1800 times per minute as a condition. The glass beads were removed from this dispersion, and 444 parts of cyclohexanone and 634 parts of ethyl acetate were added thereto, thereby preparing a coating liquid 1 for the charge generation layer.

<Preparation of Coating Liquid 1 for Charge Transport Layer>

Production Example of Charge Transport Layer 1

Next, the following materials were prepared to produce a mixed solvent.

Ortho-xylene: 25 parts by mass
Methyl benzoate: 25 parts by mass
Dimethoxymethane: 25 parts by mass Furthermore, the following materials were dissolved in the mixed solvent to prepare a coating liquid 1 for the charge transport layer.

Charge transport substance represented by the following structural formula (C-1) (hole transporting substance): 5 parts by mass
Charge transport substance represented by the following structural formula (C-2) (hole transporting substance): 5 parts by mass
Polycarbonate (trade name: IUPILON Z400, manufactured by Mitsubishi Engineering-Plastics Corporation): 10 parts by mass A coating film was formed by dip coating of this coating liquid 1 for the charge transport layer on the charge generation layer 1, and the coating film was dried at a drying temperature of 40° C. for five minutes, thereby forming a charge transport layer 1 having a film thickness of 15 μm.

[Chem. 6]

[C-1]

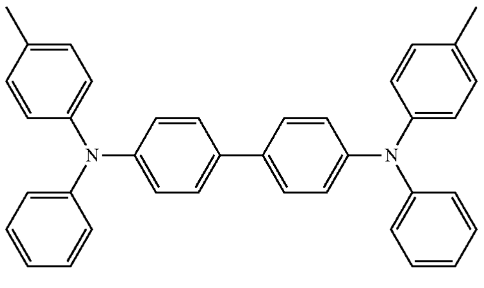

(CTM-1)

[C-2]

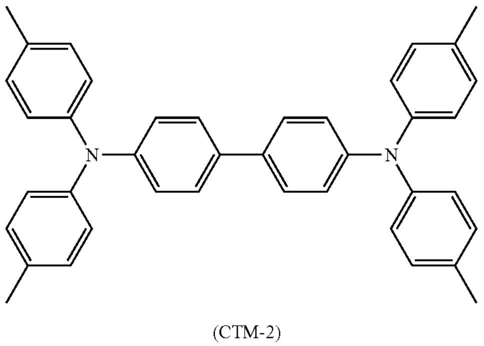

(CTM-2)

Production Example 1 of Surface Layer Containing Particles

The materials in Table 8 that served as particles A and particles B were prepared.

TABLE 8

| Particle | Product name | Manufacturer | Average primary particle size [nm] |
|---|---|---|---|
| 1 | QSG-170 | Shin-Etsu Chemical Co., Ltd. | 170 |
| 2 | QSG-80 | Shin-Etsu Chemical Co., Ltd. | 80 |
| 3 | QSG-10 | Shin-Etsu Chemical Co., Ltd. | 10 |
| 4 | KE-P30 | NIPPON SHOKUBAI CO., LTD. | 300 |

<Preparation of Coating Liquid 1 for Surface Layer>

Particles A: Silica particles ("QSG-170," manufactured by Shin-Etsu Chemical Co., Ltd.): 4.2 parts by mass,
Particles B: Silica particles ("QSG-80," manufactured by Shin-Etsu Chemical Co., Ltd.): 0.8 parts by mass,
A monomer 1 having a polymerizable functional group (structural formula (2-1)): 0.75 parts by mass,
A monomer 2 having a polymerizable functional group (structural formula (3-1)): 0.75 parts by mass,
A siloxane-modified acrylic compound (trade name: SYMAC US270, manufactured by Toagosei Co., Ltd.): 0.1 parts by mass, 1-propanol: 100.0 parts by mass, and
Cyclohexane: 100.0 parts by mass
were mixed together and stirred for six hours with a stirring device to prepare a coating liquid 1 for the surface layer.

<Preparation of Coating Liquid 2 for Surface Layer>

A coating liquid 2 for the surface layer was adjusted in the same manner as in the preparation of the coating liquid 1 for the surface layer except that the types and amounts added of the particles A, the particles B, and other particles were changed as shown in Table 9.

TABLE 9

| | Monomer 1 | Monomer 2 | Particle A | | | Particle B | | | Other particles | | |
|---|---|---|---|---|---|---|---|---|---|---|---|
| Coating liquid | Amount added | Amount added | Kind of particle | Specific gravity | Amount added | Kind of particle | Specific gravity | Amount added | Kind of particle | Specific gravity | Amount added |
| 1 | 0.75 | 0.75 | 1 | 1.8 | 4.20 | 2 | 1.8 | 0.80 | — | — | — |
| 2 | 1.50 | 1.50 | 4 | 1.8 | 5.00 | 3 | 1.8 | 5.00 | — | — | — |

In the table, "Coating liquid" means "Coating liquid for surface layer". "Monomer 1/2" means "Monomer 1/Monomer 2 having polymerizable functional group".

Production Example of Photosensitive Drum 1

A feature of a photosensitive drum 1 is that particles are present on the surface facing the first regions and particles are not present on the surface facing the second region. The photosensitive drum 1 was produced by the following procedure.

<Support>

An aluminum cylinder having a diameter of 24 mm and a length of 257 mm was used as a support (cylindrical support).

<Conductive Layer>

A coating film was formed by dip coating of the coating liquid 1 for the conductive layer on the above-described support, and the coating film was heated and cured at 150° C. for 30 minutes, thereby forming a conductive layer having a film thickness of 22 μm.

<Undercoating Layer>

A coating film was formed by dip coating of the coating liquid 1 for the undercoating layer on the above-described conductive layer, and the coating film was heated and cured at 100° C. for 10 minutes, thereby forming an undercoating layer having a film thickness of 1.8 μm.

<Charge Generation Layer>

A coating film was formed by dip coating of the coating liquid 1 for the charge generation layer on the above-described undercoating layer, and the coating film was heated and dried at a temperature of 100° C. for 10 minutes, thereby forming a charge generation layer having a film thickness of 0.20 μm.

<Charge Transport Layer>

A coating film was formed by dip coating of the coating liquid 1 for the charge transport layer on the above-described charge generation layer, and the coating film was heated and dried at a temperature of 120° C. for 30 minutes, thereby forming a charge transport layer having a film thickness of 21 μm.

<Surface Layer>

The surface layer 105 was formed as described below.

First, the surface layer 105 is formed only at one end portion of the photosensitive drum. After the photosensitive drum on which the charge transport layer had been formed was installed so that the longitudinal direction thereof became parallel to the gravity direction, a coating film was formed by dip coating of the coating liquid 1 for the surface layer in the first region on the lower side in the gravity direction, and the coating film was warmed at a temperature of 50° C. for five minutes. The coating film was then irradiated with an electron beam for 2.0 seconds while the support (object to be irradiated) was rotated at a speed of 300 rpm under a nitrogen atmosphere under conditions of an accelerating voltage of 65 kV and a beam current of 5.0 mA. The dose was 15 kGy. After that, the temperature of the coating film was raised to 120° C. under a nitrogen atmosphere. The oxygen concentration from the electron beam irradiation to the subsequent heating treatment was 10 ppm.

Next, the coating film was naturally cooled in the atmosphere until the temperature reached 25° C. and then heated for 30 minutes under a condition that the temperature of the coating film reached 120° C. to form the surface layer 105 having a film thickness of 1.0 μm in the first region at one end portion of the photosensitive drum.

After that, the longitudinal direction of the photosensitive drum is reversed in the gravity direction, and the surface layer 105 is formed at the other end portion of the photosensitive drum in the same manner.

The photosensitive drum 1 in which the surface layer 105 containing particles was present in the first region and particles were not present in the second region was produced by the above-described method.

Production Example of Photosensitive Drum 2

A feature of a photosensitive drum 2 is that particles are present on the surface layers 105 facing the first region and the second region, respectively, but the number of the particles present is larger and Rz on the surface is larger in the first region. A production example of the photosensitive drum 2 will be described.

First, masking is performed on the first regions at both end portions of the photosensitive drum on which the charge transport layer has been formed, a coating film is formed by dip coating of the coating liquid 1 for the surface layer in the second region, and the surface layer 105 is formed in the second region in the same manner as in the method for preparing the surface layer 105 of the photosensitive drum 1. For the masking, a polyester adhesive tape No. 5511 manufactured by Nitto Denko Corporation was used.

Next, the mask on the first region is peeled off, the photosensitive drum is installed so that the longitudinal direction thereof becomes parallel to the gravity direction, a coating film is formed by dip coating of the coating liquid 2 for the surface layer in the first region on the lower side in the gravity direction, and the surface layer 105 is formed in the first region at one end portion in the same manner as in the above-described method for producing the surface layer 105.

Next, the longitudinal direction of the photosensitive drum is reversed in the gravity direction, and the surface layer 105 is formed at the other end portion of the photosensitive drum in the same manner by dip coating of the coating liquid 2 for the surface layer in the first region.

The photosensitive drum 2 in which more particles were contained in the surface layer 105 of the photosensitive drum in the first region than in the second region was produced by the above-described method.

Production Example of Photosensitive Drum 3

A feature of a photosensitive drum 3 is that particles are not present on the surface facing each of the first region and the second region, that is, the surface is smooth. As a production example of the photosensitive drum 3, a photosensitive drum is prepared in the same manner as the photosensitive drum 1 until the formation of <charge transport layer> so that the surface layer 105 is not provided. That is, the outermost layer is the charge transport layer.

Production Example of Photosensitive Drum 4

A feature of a photosensitive drum 4 is that the same number of particles are present on the surfaces facing the first region and the second region, respectively, and Rz's on the surfaces are the same as each other. As a production example of the photosensitive drum 4, coating films were formed by dip coating of the coating liquid for the surface layer both in the first regions and in the second region in the same manner, and the photosensitive drum 4 was produced in the same manner as in the production of the photosensitive drum 1.

Production Example of Photosensitive Drum 5

Figure 24:
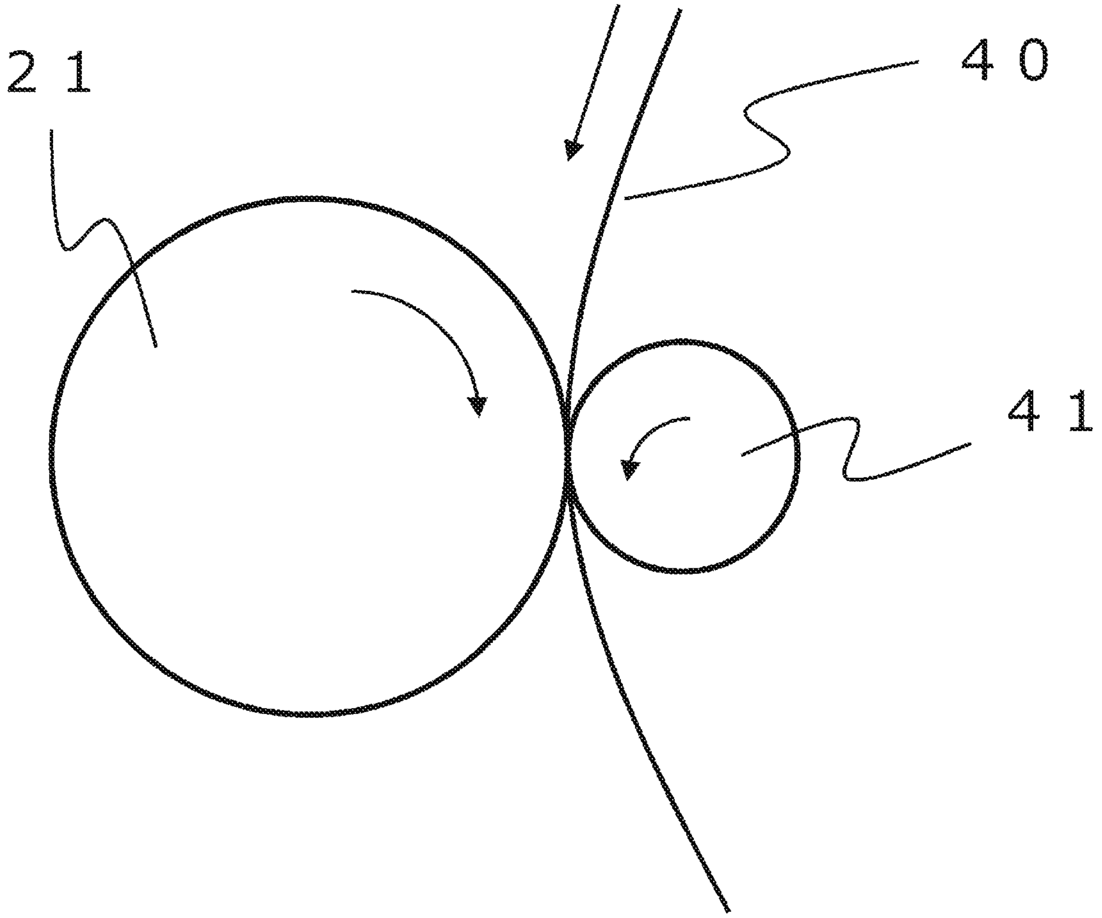
FIG. 24 is a schematic view of a polishing device for polishing the surface of the photosensitive drum in the present example.

A feature of a photosensitive drum 5 is that grooves are formed on the surfaces facing the first regions and the surface facing the second region is smooth. As a production example of the photosensitive drum 5, grooves are formed on the surfaces facing the first regions in a drum produced in the same manner as for the photosensitive drum 3. FIG. 24 is a schematic view of a polishing device for polishing the surface of the photosensitive drum 21. A polishing sheet 40 and a backup roller 41 are each disposed so that the polishing sheet 40 is held between the first regions of the photosensitive drum 21 and the backup roller 41 so that the polishing surface of the polishing sheet 40 is pressed against the surfaces of the first regions of the photosensitive drum 21. In this disposition, the photosensitive drum 21 and the backup roller 41 are rotated in opposite directions so that the photosensitive drum and the backup roller move in the same direction in the nip portion where the polishing sheet 40 is held therebetween. In addition, the polishing sheet 40 is wound with a winding mechanism, not shown, so that the polishing sheet moves in the same direction as the moving direction of the photosensitive drum 21 and the backup roller 41 in the above-described nip portion.

As the polishing conditions, a polishing sheet (trade name: GC #3000, base layer sheet thickness: 75 μm) manufactured by Riken Corundum Co., Ltd. was used as the polishing sheet 40. A urethane roller (outer diameter: 50 mm) having a hardness of 200 was used as the backup roller 41. The amount of the backup roller 41 entering the photosensitive drum 21 through the polishing sheet 40 was set to 2.5 mm, the amount of sheet fed was set to 400 mm/s, the feed direction of the polishing sheet 40 and the rotating direction of the photosensitive drum 21 are made to be the same as each other, and polishing was performed for 30 seconds.

The surface roughness of the polished photosensitive drum 21 was measured using a surface roughness measuring instrument (trade name: SE700, SMB-9, manufactured by Kosaka Laboratory Ltd.) under the following conditions.

Measurement was performed at a total of three points in the first region of the photosensitive drum 21 while the photosensitive drum 21 was rotated by 120°, and the average value thereof was Rz=750 nm in terms of JIS B0601-2001 standard. As the measurement conditions, the measurement length was set to 2.5 mm, the cut-off value was set to 0.8 mm, the feed rate was set to 0.1 mm/s, the filter characteristics were set to 2CR, and the leveling was set to a straight line (entire region).

In addition, in the present invention, the widths of the grooves formed on the surface of the photosensitive drum and the number of the grooves per 1000 μm width in the longitudinal direction were measured as described below using a non-contact three-dimensional surface measuring instrument MICROMAP 557N manufactured by Ryoka Systems Inc.

First, a five-fold two-beam interference objective lens is mounted in the optical microscope unit of MICROMAP, the photosensitive drum is fixed under the lens, and an interference image of the surface shape image is vertically scanned using a CCD camera in the Wave mode to obtain a three-dimensional image. The range of the resultant image is 1.6 mm×1.2 mm.

Next, the resultant three-dimensional image is analyzed, and the number of the grooves per unit length of 1000 μm and the widths of the grooves are obtained as data. Analysis of the widths of the grooves and the number of the grooves become possible based on this data.

In the present invention, when grooves having a width of 0.5 μm or more out of the grooves formed on the surface of the photosensitive drum were counted, the number of grooves having a width in a range of at least 0.5 μm and not more than 40 μm was 400 per 1000 μm width of the photosensitive drum in the longitudinal direction.

In the present invention, in the case of using a photosensitive drum having recessed portions formed by providing grooves on the surface layer 105, the average width W1 of the grooves formed on the surface of the photosensitive drum in the first region is preferably 0.5 to 40 μm. In a case where the average width of the grooves is 0.5 μm or less, the contact area between the surface of the photosensitive drum and the surface of the developing roller cannot be sufficiently reduced, and it is thus not possible to sufficiently suppress the amount of heat generated from the end portion of the developing roller. Even in a case where the average width of the grooves is 40 μm or more, since there is a case where the recessed portions formed on the surface of the photosensitive drum come into contact with the surface of the developing roller, it is not possible to sufficiently reduce the contact area, and the amount of heat generated from the end portion of the developing roller cannot be thus sufficiently suppressed.

Here, in the case of forming a plurality of grooves in a substantially circumferential direction of the circumferential surface of the surface layer 105 of the photosensitive drum as described above, it is also possible to employ a configuration in which grooves are formed in the first region and in the second region at different pitches. In that case, when the average width of the grooves in the first region is indicated by W1, and the average width of the grooves in the second region are indicated by W2, the relationship between both is preferably W1>W2.

In the present invention, in the case of using a photosensitive drum having recessed portions formed by providing grooves on the surface layer 105, the number of the grooves per 1000 μm width in the longitudinal direction on the surface of the photosensitive drum in the first region is preferably 20 to 1000. In a case where the number of grooves is 20 or less, the contact area between the surface of the photosensitive drum and the surface of the developing roller cannot be sufficiently reduced, and it is thus not possible to sufficiently suppress the amount of heat generated from the end portion of the developing roller. When the number of grooves is 1000 or more, the average width of the grooves becomes excessively narrow, and it is thus not possible to sufficiently reduce the contact area between the surface of the photosensitive drum and the surface of the developing roller. Therefore, the amount of heat generated from the end portion of the developing roller cannot be sufficiently suppressed.

Here, when the average number of the grooves per 1000 μm width in the longitudinal direction on the circumferential surface in the first region of the photosensitive drum is indicated by H1, and the average number of the grooves per 1000 μm width in the longitudinal direction on the circumferential surface in the second region is indicated by H2, the relationship between both is more preferably H1>H2.

The photosensitive drums prepared in the present example are described in Table 10.

Figure 25:
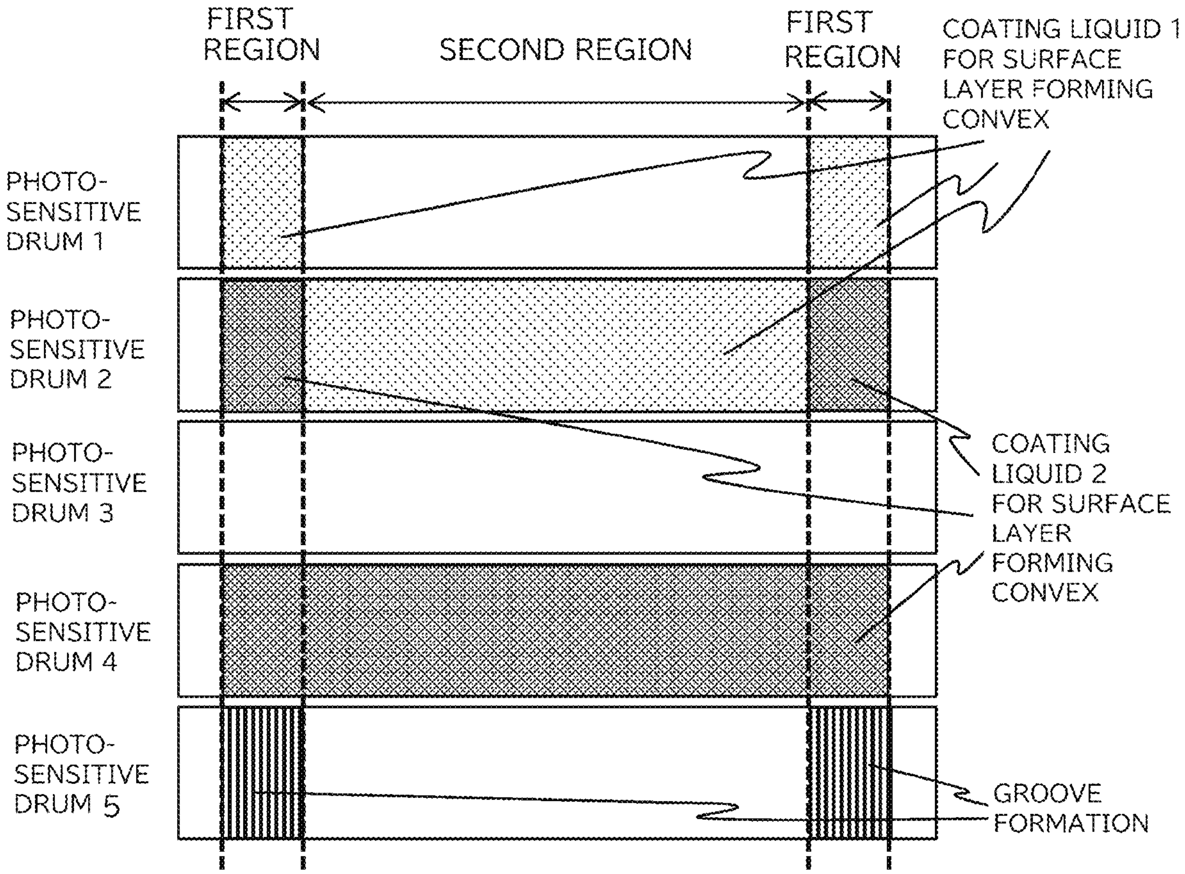
FIG. 25 is a schematic view showing differences in the configurations of the photosensitive drums in the present example.

A longitudinal view of the photosensitive drums prepared in the present example is shown in FIG. 25.

TABLE 10

| PD No. | Area | Coating liquid | DA [nm] | Average distance [nm] | Standard deviation [nm] | DB [nm] | Rz [nm] | Content rate [% by volume] |
|---|---|---|---|---|---|---|---|---|
| 1 | first | 1 | 170 | 170 | 85 | 80 | 261 | 65% |
| | second | — | — | — | — | — | 55 | — |
| 2 | first | 2 | 300 | 350 | 175 | 10 | 445 | 65% |
| | second | 1 | 170 | 170 | 85 | 80 | 261 | 65% |
| 3 | first | — | — | — | — | — | 55 | — |
| | second | — | — | — | — | — | 55 | — |
| 4 | first | 2 | 300 | 350 | 175 | 10 | 445 | 65% |
| | second | 2 | 300 | 350 | 175 | 10 | 445 | 65% |
| 5 | first | — | — | — | — | — | 750 | — |
| | second | — | — | — | — | — | 55 | — |

In the table, "PD No." means "Photosensitive drum". "Coating liquid" means "Surface layer coating liquid used for production". "DA" means "Particle diameter DA for peak top of PAA". "Average distance" means "Average value of distances between centers of convex portions CA". "Standard deviation" means "Standard deviation of distances between centers of convex portions CA". "DB" means "Particle diameter DB for peak top of PAB". "Rz" means "Maximum height difference Rz on surface". "Content rate" means "Content rate of particles in surface layer [% by volume]".

[Developing Roller]

Hereinafter, the developing roller 31 according to one aspect of the present aspect will be described in detail using drawings.

Figure 26A:
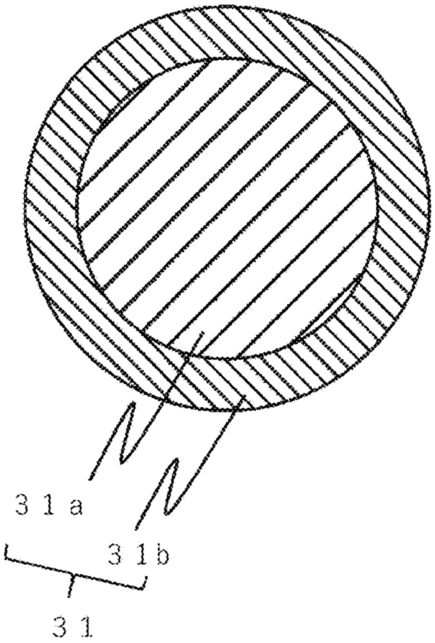
FIGS. 26A and 26B are schematic views of a cross section of a developing roller in the present example.
Figure 26B:
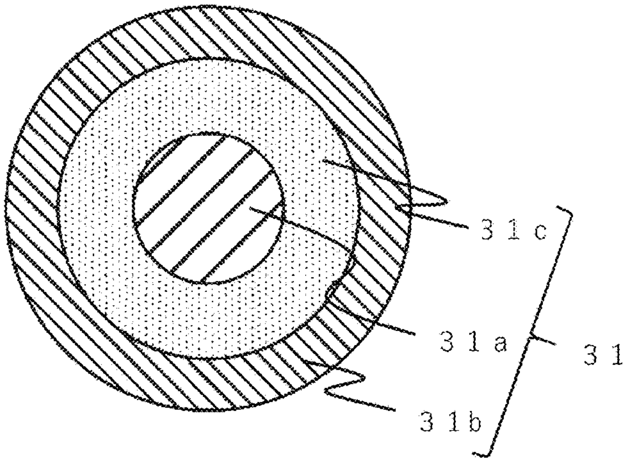

As shown in FIG. 26A and FIG. 26B, the developing roller according to the present invention has a conductive substrate 31*a* and an elastic layer that is a single layer as a surface layer 31*b* on the substrate. The surface layer 31*b* may be directly provided on the conductive substrate as shown in FIG. 26A. Alternatively, an intermediate layer 31*c* may be provided between the substrate 31*a* and the surface layer 31*b*, if necessary, as shown in FIG. 26B. The intermediate layer 31*c* may be one layer or a plurality of layers.

<Substrate>

As the conductive substrate 31*a*, a cylindrical or tubular conductive substrate can be used. A known surface treatment may be performed or an adhesive layer may be provided on the surface of the substrate for the purpose of improving the adhesion to the intermediate layer or the surface layer provided on the outer circumference thereof. As the material, the conductive substrate can be composed of the following conductive materials.

Metals or alloys such as aluminum, copper alloys, and stainless steel; iron plated with chromium or nickel;

Conductive synthetic resins

<Intermediate Layer>

The intermediate layer 31*c* is preferably formed of a molded body of a rubber material. Examples of the rubber materials include the following materials. Ethylene-propylene-diene copolymer rubber (EPDM), acrylonitrile-butadiene rubber (NBR), chloroprene rubber (CR), natural rubber (NR), isoprene rubber (IR), styrene-butadiene rubber (SBR), fluororubber, silicone rubber, epichlorohydrin rubber, hydrogenated NBR, urethane rubber. These can be used singly or two or more can be used in combination. Among these, particularly, silicone rubber is preferable which is less likely to cause compression set in the conductive intermediate layer even in a case where a different member (such as the developer regulating member or the like) is in contact with the intermediate layer for a long period of time. Specific examples of the silicone rubber include cured products of an addition curing liquid silicone rubber.

As the intermediate layer, a conductive intermediate layer can be produced by blending a conductivity-imparting agent such as an electron conductive substance or an ion conductive substance into the rubber material. The volume resistivity of the conductive intermediate layer is preferably adjusted to at least $10^3$ Ωcm and not more than $10^{18}$ Ωcm and more preferably adjusted to at least $10^4$ Ωcm and not more than $10^{16}$ Ωcm.

Examples of the electron conductive substance include the following substances. Examples thereof include conductive carbon black such as conductive carbon, carbon for rubber, and carbon for color (ink), metal, and metal oxide thereof. For example, highly conductive carbon such as Ketjen black EC and acetylene black; carbon for rubber such as SAF, ISAF, HAF, FEF, GPF, SRF, FT, and MT; carbon for color (ink) obtained by oxidizing a carbon black powder; metals such as copper, silver, and germanium and metal oxides thereof. Among these, conductive carbon black [conductive carbon, carbon for rubber, and carbon for color (ink) carbon] is preferable since it is easy to control conductivity with a small amount.

Examples of the ion conductive substance includes the following substances: inorganic ion conductive substances such as sodium perchlorate, lithium perchlorate, calcium perchlorate, and lithium chloride; and organic ion conductive substances such as modified aliphatic dimethyl ammonium ethosulfate and stearyl ammonium acetate.

These conductivity-imparting agents are used in an amount necessary to adjust the intermediate layer to have an appropriate volume resistivity as described above and are used in a range of at least 0.5 parts by mass and not more than 50 parts by mass relative to 100 parts by mass of the rubber material that configures the intermediate layer.

In addition, the intermediate layer may further contain various additives such as a plasticizer, a filler, a bulking agent, a vulcanizing agent, a vulcanizing aid, a cross-linking aid, a curing inhibitor, an antioxidant, an anti-aging agent, and a processing aid, if necessary. Examples of the filler include silica, a quartz powder, calcium carbonate, and the like. These arbitrary components are blended to an extent that function of the intermediate layer is not impaired.

The intermediate layer has elasticity required for the developing member, preferably has an Asker C hardness of at least 20 degrees and not more than 100 degrees, and preferably has a thickness of at least 0.3 mm and not more than 6.0 mm.

The individual materials for the intermediate layer can be mixed using a dynamic mixing device such as a single-screw continuous kneader, a double-screw continuous kneader, a double-roll, a kneader mixer, or a trimix or a static mixing device such as a static mixer.

A method for forming the intermediate layer on the substrate is not particularly limited, and examples thereof include a die molding method, an extrusion molding method, an injection molding method, and a coating molding method. In the die molding method, for example, first, pieces for holding a shaft core body in a cylindrical mold are fixed to both ends of the mold and inlets are formed in the pieces. Next, the shaft core body is disposed in the mold, the materials for the intermediate layer are injected through the inlets, the mold is then heated at a temperature at which the materials cure, and the mold is removed.

In the extrusion molding method, for example, the materials of a shaft core body and the intermediate layer are extruded together using a cross-head type extruder, and the materials are cured to form the intermediate layer around the shaft core body. The surface of the intermediate layer can also be modified by surface polishing or a surface modification method such as a corona treatment, a flame treatment, or an excimer treatment for improvement in adhesion to the surface layer.

<Surface Layer>

[Material Configuration]

The surface layer 31*b* contains a crosslinked urethane resin. The crosslinked urethane resin is obtained by reacting a polyol having a hydroxyl group and an isocyanate compound to form a urethane group. The meaning of crosslinking mentioned herein means that one or both selected from the group consisting of a polyol and an isocyanate compound that are raw materials of the urethane resin have three or more reactive functional groups and thereby have a three-dimensional network structure. Such a crosslinked urethane resin has excellent flexibility and high strength.

A urethane resin can be obtained from a polyol and an isocyanate compound, and a chain extender, if necessary. Examples of the polyol, which is a raw material of the urethane resin, include a polyether polyol, a polyester polyol, a polycarbonate polyol, a polyolefin polyol, an acrylic polyol, and mixtures thereof. Examples of the isocyanate compound, which is a raw material of the urethane resin, include the following compounds.

Tolylene diisocyanate (TDI), diphenyl methane diisocyanate (MDI), naphthalene diisocyanate (NDI), tolidinediisocyanate (TODI), hexamethylene diisocyanate (HDI), isophorone diisocyanate (IPDI), phenylene diisocyanate (PPDI), xylylene diisocyanate (XDI), tetramethylxylylene diisocyanate (TMXDI), cyclohexane diisocyanate, and mixtures thereof.

Examples of the chain extender, which is an arbitrary component, include bifunctional low molecular diols such as ethylene glycol, 1,4-butanediol, and 3-methylpentanediol, trifunctional low molecular triols such as trimethylolpropane, and mixtures thereof. In addition, a prepolymer-type isocyanate compound having an isocyanate group at the terminal may also be used, which is obtained by reacting the various isocyanate compounds and various polyols in a state where isocyanate groups are excessive to a hydroxyl group in advance. In addition, as these isocyanate compounds, materials obtained by blocking isocyanate groups with various blocking agents such as methyl ethyl ketone (MEK) oxime may also be used.

Regardless of materials used, the urethane resin can be obtained by reacting a polyol and an isocyanate compound by heating. Preferably, when either or both of the polyol and the isocyanate compound have a branched structure and have three or more functional groups, the resultant urethane resin becomes a crosslinked urethane resin.

The surface layer 31*b* may contain, in addition to what has been described above, a conductive substance, a crosslinking agent, a plasticizer, a filler, a bulking agent, a vulcanizing agent, a vulcanizing aid, a crosslinking aid, an antioxidant, an anti-aging agent, a processing aid, and a leveling agent to an extent that the function of the surface layer is not impaired. In addition, in a case where surface roughness is required on the surface layer, fine particles for imparting roughness may be contained in the surface layer. Specifically, the fine particles of a polyurethane resin, a polyester resin, a polyether resin, a polyamide resin, an acrylic resin, or a polycarbonate resin can be used. The volume average particle diameter of the fine particles is preferably at least 1.0 μm and not more than 30 μm, and the surface roughness (ten-point average roughness) Rzjis that is formed by the fine particles is preferably at least 0.1 μm and not more than 20 μm. Rzjis is a value that is measured on the basis of JIS B0601 (1994).

[Method for Manufacturing Surface Layer]

A method for forming a resin layer is not particularly limited, but a coating molding method of a liquid paint is preferable. For example, the resin layer can be formed by dispersing and mixing each material for the resin layer in a solvent to produce a paint, applying the paint onto a conductive substrate, and performing dry solidification or heat curing.

As the solvent, a polar solvent is preferable from the viewpoint of compatibility with polyols or isocyanate compounds, which are raw materials of the crosslinked urethane. For example, from alcohols such as methanol, ethanol, and n-propanol, ketones such as acetone, methyl ethyl ketone, and methyl isobutyl ketone, esters such as methyl acetate and ethyl acetate, and the like, one or two or more solvents having favorable compatibility with other materials can be mixed together and used.

In addition, the solid content at the time of producing a paint can be freely adjusted by the amount of the solvent mixed, but is preferably adjusted to at least 20% by mass and not more than 40% by mass from the viewpoint of uniformly dispersing carbon black. For the dispersion and mixing, it is possible to use known dispersers in which beads are used, such as a sand mill, a paint shaker, a dyno-mill, and a pearl mill. In addition, as a coating method, dip coating, ring coating, spray coating, or roll coating can be used.

The dry solidification or heat curing is not particularly limited as long as the crosslinking of the urethane resin progresses, but the temperatures is preferably 50° C. or higher and more preferably 70° C. or higher.

The film thickness of the surface layer thus obtained is preferably at least 2.0 m and not more than 150.0 μm from the viewpoint of film strength and flexibility.

<Manufacture of Developing Roller>

The developing roller was produced by the following method.

[Production of Elastic Roller 1]

As a conductive substrate, a substrate was prepared by applying a primer (trade name: DY35-051, manufactured by Dow Corning Toray Co., Ltd.) to a SUS304 core metal having an outer diameter of 6 mm and a length of 264 mm and heating the primer at a temperature of 150° C. for 20 minutes. This conductive substrate was installed concentrically with a cylindrical mold having an inner diameter of 11.5 mm.

As a material for an intermediate layer, an addition type silicone rubber composition obtained by mixing materials shown in Table 11 below with TRIMIX (trade name: TX-15, manufactured by Inoue Mfg., Inc.) was injected into a mold heated to a temperature of 115° C. After being injected, the material was heated and molded at a temperature of 120° C. for 10 minutes, cooled to room temperature, and then released from the mold to obtain an elastic roller 1 having an intermediate layer having a thickness of 2.71 mm formed on the outer circumference of the conductive base material.

TABLE 11

| Material | Parts by mass |
|---|---|
| Liquid-form dimethylpolysiloxane having two or more silicon atom-bonded alkenyl groups in one molecule (trade name: SF3000E, viscosity 10000 cP, vinyl group equivalent 0.05 mmol/g, manufactured by KCC Corporation) | 100 |
| Platinum-based catalyst (trade name: SIP6832.2, manufactured by Gelest Inc.) | 0.048 |
| Dimethylpolysiloxane having two or more silicon atom-bonded hydrogen atoms in one molecule (trade name: SP6000P, Si—H group equivalent 15.5 mmol/g, manufactured by KCC Corporation) | 0.5 |
| Carbon black (trade name: TOKABLACK #7360SB, manufactured by Tokai Carbon Co., Ltd.) | 6 |

[Production of Developing Roller 1]

As a paint for forming a surface layer, materials other than roughness-forming particles in the table of Table 12 below were stirred and mixed. After that, the materials were dissolved in methyl ethyl ketone (manufactured by Kishida Chemical Co., Ltd.) so that the solid content concentration reached 30% by mass, mixed, and then uniformly dispersed with a sand mill. Methyl ethyl ketone was added to this liquid mixture so that the solid content concentration was adjusted to 25% by mass, the roughness-forming particles in Table 12 were added thereto and stirred and dispersed with a ball mill, thereby obtaining a paint 1 for forming a surface layer. The elastic roller 1 was dipped into and coated with this paint so that the surface layer had a film thickness of about 15 μm. After that, the coating film was dried and cured by being heated at a temperature of 130° C. for 60 minutes, thereby obtaining a developing roller 1.

TABLE 12

| | |
|---|---|
| Polyether polyol (trade name: PTG1000, manufactured by Hodogaya Chemical Co., Ltd.) | 100 |
| Polymeric MDI (trade name: MR-400, manufactured by Tosoh Corporation) | 37.2 |
| Carbon black (trade name: MA100, manufactured by Mitsubishi Chemical Corporation) | 29.3 |
| Modified silicone oil (trade name: TSF4460, manufactured by Momentive Performance Materials Japan) | 0.6 |
| Roughness-forming particle (trade name: ART PEARL C-400T, manufactured by Negami Chemical Industrial Co., Ltd.) | 5 |

[Production of Developing Roller 2]

For a developing roller 2, the production method is the same as for the developing roller 1 except that the amount of the roughness-forming particles used to form the surface layer was set to 15.0 parts by mass.

<Method for Calculating Contact Rate>

A glass slide was pressed against the surface of the developing roller at a pressure of 100 g and observed with a microscope. Furthermore, the area of a portion that was in contact with the glass slide in the field of view was divided by the area of the entire field of view, thereby calculating the contact rate. That is, when glass is pressed with a load of 100 g, the area of a region where the glass surface and the developing roller are in contact with each other is indicated by A1, and the area of a region other than the region where the glass surface and the developer carrier are in contact with each other is indicated by A2, A1/(A1+A2) becomes the contact rate. The contact rates of the developing rollers 1 and 2 are as shown in Table 13. Here, the contact rate is preferably 15% or less.

TABLE 13

| Developing roller No. | Contact rate | Ra [μm] |
|---|---|---|
| 1 | 15% | 0.9 |
| 2 | 8% | 1.7 |

Regarding this matter, the configurations of Examples 1 to 4 will be described as configurations from which the effect can be obtained. In addition, the configurations of Comparative Examples 1 and 2 will be described as configurations for comparing the superiority of the examples.

Example 1

The photosensitive drum 1 and the developing roller 1 are combined together.

Example 2

The photosensitive drum 2 and the developing roller 1 are combined together.

Example 3

The photosensitive drum 5 and the developing roller 1 are combined together.

Example 4

The photosensitive drum 2 and the developing roller 2 are combined together.

Comparative Example 1

The photosensitive drum 3 and the developing roller 1 are combined together.

Comparative Example 2

The photosensitive drum 4 and the developing roller 1 are combined together.

Superiority of Examples to Comparative Examples

<Durability Comparative Evaluation>

The results of durability evaluation performed using the image forming apparatuses and process cartridges are shown in Table 14.

TABLE 14

| | Durability result | | | | | |
|---|---|---|---|---|---|---|
| | Developing roller end portion | | | | | |
| | | | Image quality | | | |
| Example | End portion temperature | Surface layer rubber | Solid density | Halftone | Photosensitive drum | Developing roller |
| E1 | 45° C. | ○ | 1.38 | ○ | 1 | 1 |
| E2 | 43.1° C. | ○ | 1.42 | ○ | 2 | 1 |
| E3 | 44.8° C. | ○ | 1.39 | ○ | 5 | 1 |
| E4 | 42.0° C. | ○ | 1.46 | ○ | 2 | 2 |
| CE1 | 47° C. | Peeling occurs | 1.29 | ○ | 3 | 1 |
| CE2 | 43.1 | ○ | 1.42 | Δ Uneven | 4 | 1 |

In the table, "E1" to "E4" means "Example 1" to "Example 4". "CE 1/2" means "Comparative Example 1/2".

<Durability Evaluation>

Environment: 30° C. 80%

Print speed: 45 sheets/minute

Toner amount: 60 g

Print mode: Coverage rate: 2%, two pages per sheets

Image sample: A solid black and halftone image sample is printed every 200 sheets Number of sheets printed: 1000

Paper type: Xerox Vitality (75 g)

Temperature at developing roller end portion: The temperature at the developing roller end portion is measured using small-sized thermal imaging camera CPA-E75 W (manufactured by CHINO Corporation) after 1000 sheets are passed. The measurement is performed after the process cartridge is removed the image forming apparatus.

Density measurement: Measurement is performed using X-Rite Exact advance (manufactured by X-Rite, Incorporated). The higher the numerical value, the higher the image density and the better the durability.

Comparative Example 1

In Comparative Example 1, when the number of sheets printed was about 700, the surface layer rubber peeled off from the end portion of the developing roller, and the toner leaked. This is assumed that the contact area between the photosensitive drum 3 and the developing roller 1 in the first region was large, the frictional force was large, and damage was thus accumulated in the developing roller due to durable use, and the rubber on the surface peeled off. In addition, in image samples, the solid density reached 1.29, and the density dropped. This is considered that the temperature at the end portion of the developing roller reached 47° C., and this heat thus damaged the toner inside of the developing roller, resulting in deterioration of the toner.

Example 1

In Example 1, both the solid density and the image quality were favorable after durable use of 1000 sheets. This is because it was possible to suppress an increase in the temperature at the end portion of the developing roller by about 2° C. as compared with Comparative Example 1. In Example 1, since particles were contained in the surface layer of the photosensitive drum 1 in the first region, the contact area between the photosensitive drum and the developing roller became small compared with that in Comparative Example 1, and it was possible to suppress an increase in the temperature at the end portion of the developing roller. In addition, the frictional force in the contact region 1 decreases, and the surface layer rubber does not peel off from the end portion of the developing roller.

Example 2

In Example 2, both the solid density and the image quality were favorable after durable use of 1000 sheets. This is because it was possible to suppress an increase in the temperature at the end portion of the developing roller by about 3.9° C. compared with that in Comparative Example 1, and about 1.9° C. compared with that in Example 1. This is because the number of particles contained in the surface layer of the photosensitive drum 2 in the first region is large in Example 2 compared with that in Example 1, and the contact area between the photosensitive drum and the developing roller becomes small compared with that in Example 1. In addition, since particles were also contained in the surface layer of the photosensitive drum 2 in the second region, it was possible to decrease the contact area between the toner and the photosensitive drum, and the transfer property improved, and the solid density thus became high.

Example 3

In Example 3, both the solid density and the image quality were favorable after durable use of 1000 sheets. This is because it was possible to suppress an increase in the temperature at the end portion of the developing roller by about 2.2° C. compared with that in Comparative Example 1. In Example 3, since grooves were formed on the surface of the photosensitive drum 5 in the first region, the contact area between the photosensitive drum and the developing roller became small compared with that in Example 1, and it was possible to suppress an increase in the temperature at the end portion of the developing roller.

Comparative Example 2

In Comparative Example 2, the solid density was favorable after durable use of 1000 sheets, but halftone unevenness (density unevenness) was noticed throughout durable use. This is considered to be because the maximum height difference on the surface of the photosensitive drum 4 in the second region is large, and the toner was thus not evenly placed in the image forming region of the photosensitive drum 4. Probably, it is assumed that unevenness was caused in the electrostatic latent image when the photosensitive drum 4 having an excessively large maximum height difference on the surface in the image forming region was irradiated with a laser. As described above, it was found that when the maximum height difference on the surface of the photosensitive drum in the second region, which is the image forming region, is excessively large, the image quality deteriorates. Here, when the balance between an increase in the temperature at the end portion of the developing roller and the image quality is taken into account, it is preferable that the maximum height difference Rz2 on the surface of the photosensitive drum in the second region is preferably 400 nm or less and more preferably 300 nm or less. On the other hand, in the first region, the maximum height difference Rz1 of the surface roughness of the photosensitive drum may increase up to 700 nm since there is no influence on the image quality.

Example 4

In Example 4, both the solid density and the image quality were favorable after durable use of 1000 sheets. An increase in the temperature at the end portion of the developing roller could be suppressed most among the examples, and the solid density was also the largest.

This is assumed that, compared with Example 2, the contact rate (15% to 8%) of the surface layer became smaller when the developing roller 2 presses the glass plate than the developing roller 1 does, and the microscopic contact area between the photosensitive drum and the developing roller decreased, and the generation of heat due to friction was further suppressed.

In addition, it is preferable that the order of the maximum height difference on the surface of the photosensitive drum is several hundred nanometers and the maximum height difference on the surface of the developing roller is sufficiently different therefrom by about 10 μm. This is because when the order of the maximum height difference of the surface roughness of the photosensitive drum and is not sufficiently different from the order of the maximum height difference of the surface of the developing roller, the contact area becomes large, and the frictional force may become large.

Hereinafter, suitable examples of the present invention will be illustratively described in detail with reference to the accompanying drawings. Here, the dimensions, materials, and shapes of components to be described in the following examples, relative disposition thereof, and the like should be changed as appropriate depending on the configurations of devices to which the present invention is applied or a variety of conditions. Therefore, unless particularly specified, the dimensions, materials, and shapes of components to be described in the following examples, relative disposition thereof, and the like are not intended to limit the scope of the present invention. A plurality of features will be described in examples, but all of the plurality of features are not necessarily essential to the invention, and the plurality of features may be optionally combined.

Example 1

(Image Forming Apparatus)

The present invention is what is applied to an electrophotographic image forming apparatus, and is particularly suitable for an image forming apparatus in which cleaning means for an image bearing member is not provided, that is, a so-called drum cleaner-free method is used.

Figure 28:
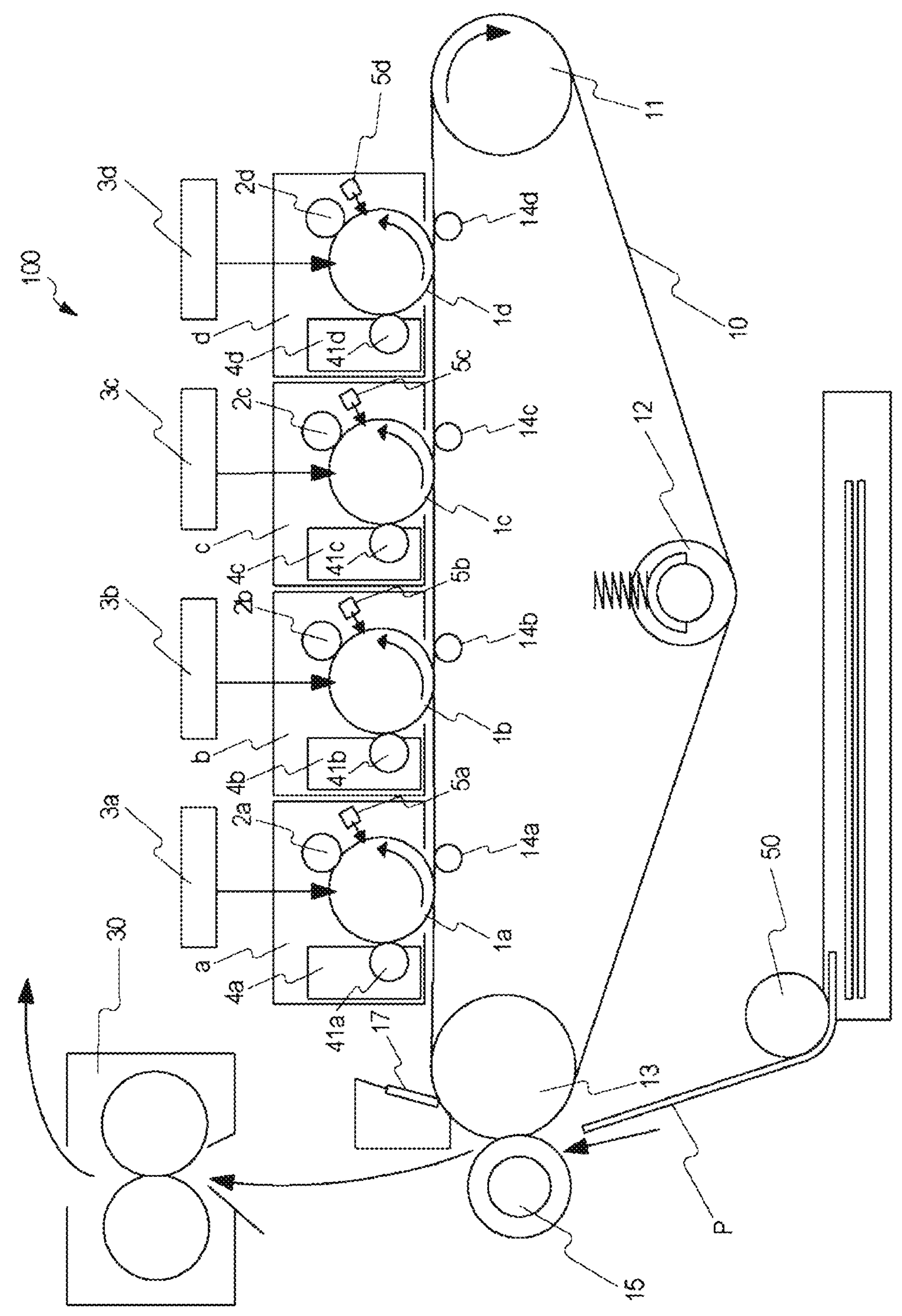
FIG. 28 is a cross-sectional view of an image forming apparatus in Example 1.
Figure 29:
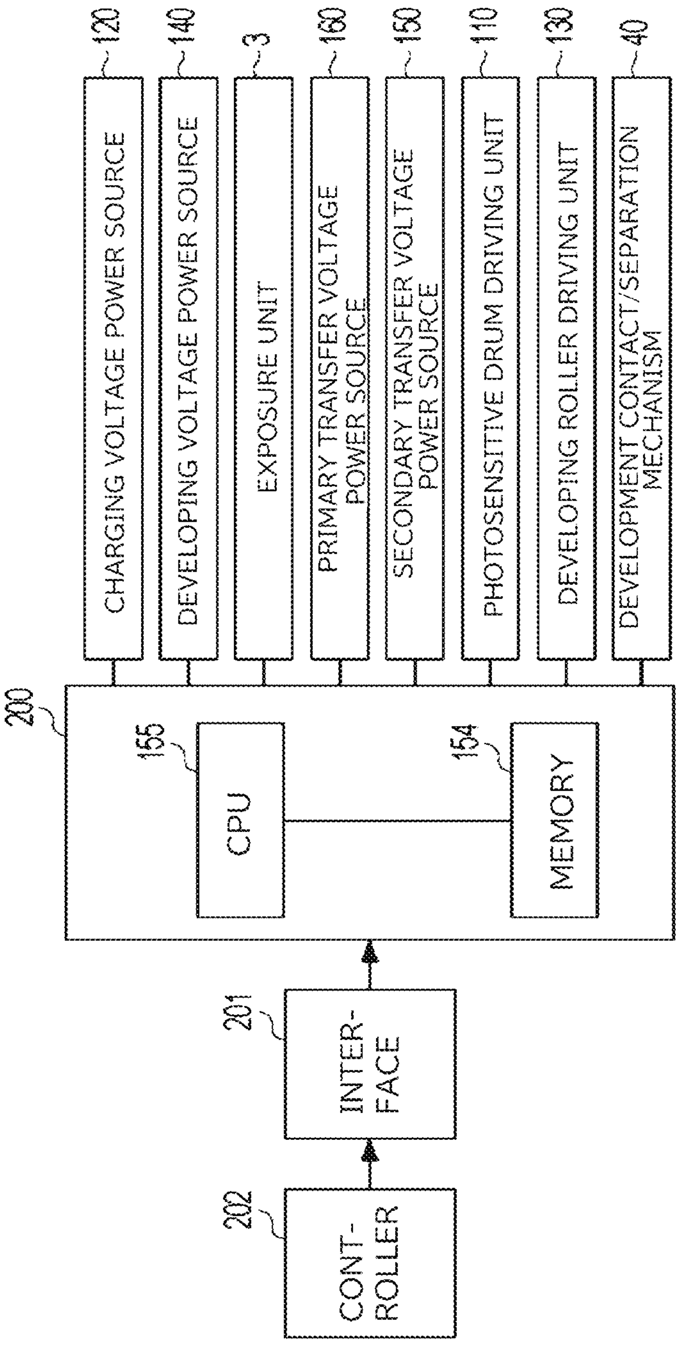
FIG. 29 is a control block diagram in Example 1.

FIG. 28 is a schematic cross-sectional view showing one example of an image forming apparatus 100 of the present example, and FIG. 29 is a block diagram showing the functional configuration of the image forming apparatus 100. Hereinafter, the configuration and the operation of the image forming apparatus 100 will be described using the drawings. The image forming apparatus of the present example is a so-called tandem type printer provided with a plurality of image forming stations a to d. The first image forming station a forms a yellow (Y) image, the second image forming station b forms a magenta (M) image, the third image forming station c forms a cyan (C) image, and the fourth image forming station d forms a black (Bk) image, respectively. The construction of each image forming station is the same except for the color of a toner to be contained and will be described below using the first image forming station a. In addition, hereinafter, collective description will be provided unless distinction is particularly required by omitting a to d in Y, M, C, and K.

The first image forming station a includes a drum-like electrophotographic photosensitive member (photosensitive drum) la, a charging roller 2*a* that is charging means, an exposure unit 3*a*, and a developing device 4*a*. The photosensitive drum 1*a* is an image bearing member that is driven by a photosensitive drum driving unit 110 to rotate at a circumferential speed (process speed) of 150 mm/sec in the arrow direction and carries a toner image. The photosensitive drum 1*a* has a photosensitive member layer and a surface layer provided on an aluminum raw pipe having a diameter of φ20 mm, and a thin film layer having a film thickness of 20 μm that is formed of a polyarylate is used as the surface layer.

When a control unit 200 of a controller 202 receives an image signal, an image forming operation is started, and the photosensitive drum 1*a* is driven to rotate. The photosensitive drum 1*a* is uniformly charged to a predetermined potential in a predetermined polarity (the normal polarity is a negative polarity in the present example) with the charging roller 2*a* in the rotating process, and is exposed by the exposure unit 3*a* according to the image signal. This forms an electrostatic latent image corresponding to a yellow color component image of a target color image. Next, the electrostatic latent image is developed by the developing device (yellow developing device) 4*a* at a developing position and is visualized as a yellow toner image.

The charging roller 2*a* as a charging member comes into contact with the surface of the photosensitive drum 1*a* by a predetermined pressure force and forms a charging unit. The charging roller 2*a* rotates following the photosensitive drum 1*a* by friction with the surface of the photosensitive drum 1*a*. A predetermined DC voltage is applied to the rotating shaft of the charging roller 2*a* from a charging voltage power source 120 in accordance with the image forming operation. In the present example, as the charging roller 2*a*, a roller having an elastic layer made of a conductive elastic body having a thickness of 1.5 mm and a volume intrinsic resistance of about $1\times10^{6}$ Ωcm provided on a metal shaft having a diameter of φ5.5 mm is used. In addition, according to the image forming operation, the control unit 200 applies a DC voltage of −1050 V as a charging voltage to the rotating shaft of the charging roller 2*a* to charge the surface of the photosensitive drum 1*a* to −500 V, which is a predetermined potential. The surface potential of the photosensitive drum 1*a* was measured with a surface electrometer Model 344 manufactured by Trek Inc. At this time, −500 V, which is the surface potential of the photosensitive drum 1*a*, is the surface potential of the photosensitive drum 1 at the time of not forming an image and is a dark part potential (Vd) of the toner image which is not developed.

In addition, a large number of convex portions are provided on the surface layer of the charging roller 2*a*, and the average height of the convex portions is about 10 μm. The convex portions provided on the surface layer of the charging roller 2*a* play a role of a spacer between the charging roller 2*a* and the photosensitive drum 1*a* in the charging unit. When a transfer residual toner, which is the toner that is not transferred but remains on the photosensitive drum 1*a* in a primary transfer portion to be described below, enters the charging unit, portions other than the convex portions are touched by the transfer residual toner, which suppresses the charging roller 2*a* being contaminated by the transfer residual toner.

As the exposure unit 3*a*, a laser driver, a laser diode, a polygon mirror, an optical lens system, or the like is provided. As shown in FIG. 29, a time-series electric digital pixel signal of the image-processed image information is input to the control unit 200 through an interface 201 from the controller 202 and input to the exposure unit 3. In the present example, the exposure is adjusted so that the image forming potential Vl of the photosensitive drum 1 in the electrostatic latent image part that has been exposed by the exposure unit 3*a* reaches −100 V. The image forming potential is also referred to as a bright part potential.

The developing device 4*a* includes a developing roller 41*a* as a developing member (developer carrier) and a non-magnetic one-component developer composed of a toner and transfer accelerating particles to be described below. The developing device 4*a* is developing means for performing a developing action on the photosensitive drum 1 to develop the electrostatic latent image as a toner image and is a developer containing portion that contains the developer. The developing device 4*a* and the main body of the image forming apparatus 100 include a development contact/separation mechanism 40 that controls the contact/separation (development separation) state of the developing roller 41*a* and the photosensitive drum 1*a* as shown in FIG. 29. The control unit 200 brings the developing roller 41*a* and the photosensitive drum 1*a* into contact with each other and separates them from each other according to the image forming operation or the like. While the developing roller 41*a* and the photosensitive drum 1*a* are in contact with each other, the developing roller 41*a* is in contact by a pressing force of 200 gf. Regarding the width of a developing nip portion that is the contact portion between the developing roller 41*a* and the photosensitive drum 1*a*, the width is 2 mm in the rotating direction of the photosensitive drum 1 and is 220 mm in the longitudinal direction of the photosensitive drum. The developing roller 41*a* is driven by a developing roller driving unit 130 to rotate in the same direction as the surface moving direction of the photosensitive drum 1*a* so that the surface moving speed (hereinafter, circumferential speed) becomes equal to the circumferential speed of the photosensitive drum 1*a* in the developing nip portion.

A pre-exposure unit 5*a* as neutralization means neutralizes the surface of the photosensitive drum 1*a* by exposing the surface of the photosensitive drum 1*a* before the surface of the photosensitive drum 1*a* is charged with the charging roller 2*a*. Neutralization of the surface of the photosensitive drum 1*a* plays a role of equalizing the surface potential formed on the photosensitive drum 1 or a role of controlling the discharge amount due to discharging occurring in the charging unit.

In addition, the control unit 200 controls to apply a DC voltage of −300 V to the core metal of the developing roller 41*a* as a developing voltage Vdc from a developing voltage power source 140 when the developing roller 41*a* and the photosensitive drum 1*a* come into contact with each other during the image forming operation. During image formation, the toner carried on the developing roller 41*a* is developed to an image forming potential Vl portion of the photosensitive drum 1*a* by an electrostatic force that is generated by a potential difference between the developing voltage Vdc=−300 V and the image forming potential Vl=−100 V of the photosensitive drum 1*a*.

Here, in the following description, regarding potentials or applied voltages, when the absolute value is large toward the negative polarity side (for example −1000 V compared with −500 V), the potential is said to be high, and when the absolute value is small toward the negative polarity side (for example −300 V compared with −500 V), the potential is said to be low. This is because a negatively charged toner is considered as a reference in the present example.

In addition, voltages in the present example will be expressed as potential differences from the ground potential (0 V). Therefore, a developing voltage Vdc=−300 V is interpreted to have a potential difference of −300 V from the ground potential by the developing voltage applied to the core metal of the developing roller 41*a*. This is also true for charging voltages, transfer voltages, and the like.

Subsequently, the control unit 200 will be described. As described above, FIG. 29 is a control block diagram showing a schematic control aspect of the main portion of the image forming apparatus 100 in the present example. The controller 202 exchanges various electrical information with a host device, and collectively controls the image forming operation of the image forming apparatus 100 with the control unit 200 through the interface 201 according to a predetermined control program or a reference table. The control unit 200 includes a CPU 155 which is a central element for performing various arithmetic processing, a memory 154 such as ROM or RAM, which is a storage element, and the like. RAM stores the detection result of a sensor, the count result of a counter, calculation results, and the like, and ROM stores a control program, data tables obtained in advance by experiments, and the like.

The control unit 200 is connected to each control object, sensors, counters, and the like in the image forming apparatus 100. The control unit 200 controls the exchange of various electrical information signals, the driving timing of each unit, and the like to control a predetermined image forming sequence and the like. For example, the control unit 200 controls voltages and exposures that are applied by the charging voltage power source 120, the developing voltage power source 140, the exposure unit 3, a primary transfer voltage power source 160, and a secondary transfer voltage power source 150. In addition, the control unit also controls the photosensitive drum driving unit 110, the developing roller driving unit 130, and the development contact/separation mechanism 40. In addition, this image forming apparatus 100 forms an image on the recording material P based on an electrical image signal that is input to the controller 202 from the host device. Examples of the host device include an image reader, a personal computer, a facsimile machine, a smartphone, and the like.

The toner in the present example is a non-magnetic toner having negative chargeability manufactured by a suspension polymerization method, has a volume average particle diameter of 5.5 μm, and is negatively charged when carried on the developing roller 41*a*. The volume average particle diameter of the toner was measured with a laser diffraction particle size distribution measuring instrument LS-230 manufactured by Beckman Coulter, Inc. The toner will be described below in detail.

An intermediate transfer belt 10 as an intermediate transfer body is stretched by a plurality of stretching members 11, 12, and 13 and is driven to rotate at the same circumferential speed as that of the photosensitive drum 1*a* in a direction of moving in the circumferential direction in facing portions in contact with the photosensitive drum 1*a*. A DC voltage of 200 V is applied to a primary transfer roller 14*a* as a primary transfer member from the primary transfer voltage power source 160 at the time of primary transfer during the image forming operation. The yellow toner image formed on the photosensitive drum 1*a* is electrostatically transferred onto the intermediate transfer belt 10 in a process of passing through the primary transfer portion, which is the contact portion with the primary transfer roller 14*a* through the photosensitive drum 1*a* and the intermediate transfer belt 10.

The primary transfer roller 14*a* is a cylindrical metal roller having φ6 mm, and nickel-plated SUS is used as a material. The primary transfer roller 14*a* is disposed at a position 8 mm offset downstream in the moving direction of the intermediate transfer belt 10 with respect to the center position of the photosensitive drum 1*a*, and the intermediate transfer belt 10 is wound around the photosensitive drum 1*a*. The primary transfer roller 14*a* is disposed at a position raised by 1 mm with respect to a horizontal plane that is formed by the photosensitive drum 1*a* and the intermediate transfer belt 10 so that the amount of the intermediate transfer belt 10 wound around the photosensitive drum 1*a* can be secured. In addition, the intermediate transfer belt 10 is pressed with a force of about 200 gf. The primary transfer roller 14*a* rotates following the rotation of the intermediate transfer belt 10. In addition, a primary transfer roller 14*b* disposed in the second image forming station b, a primary transfer roller 14*c* arranged in the third image forming station c, and a primary transfer roller 14*d* disposed in the fourth image forming station d also have the same configuration as that of the primary transfer roller 14*a*.

Thereafter, a magenta (second color) toner image, a cyan (third color) toner image, and a black (fourth color) toner image are formed in the same manner by the second, third, and fourth image forming stations b, c, and d and sequentially transferred onto the intermediate transfer belt 10 in an overlapping manner. In addition, a composite color image corresponding to the target color image is obtained.

The four-color toner images on the intermediate transfer belt 10 are collectively transferred to the surface of the recording material P fed by paper feeding means 50 in a process of a secondary transfer step of passing through a secondary transfer nip portion that is formed by the intermediate transfer belt 10 and a secondary transfer roller 15 as a secondary transfer member. The secondary transfer roller 15 comes into contact with the intermediate transfer belt 10 with a pressure force of 50 N to form the secondary transfer nip portion. The secondary transfer roller 15 rotates following the intermediate transfer belt 10, and when the toner on the intermediate transfer belt 10 is secondarily transferred to the recording material P such as paper, a voltage of 1500 V is applied from the secondary transfer voltage power source 150.

After that, the recording material P carrying the four color toner images is introduced into the fixing unit 30. The four color toners are melted and mixed by being heated and pressurized by the fixing unit 30 and are fixed to the recording material P. The toner remaining on the intermediate transfer belt 10 after the secondary transfer is cleaned and removed by a cleaning device 17.

The cleaning device 17 has a cleaning blade or the like that comes into contact with the outer circumferential surface of the intermediate transfer belt 10 to scrape off the toner remaining on the intermediate transfer belt 10 and collects the toner into the cleaning device 17 of the intermediate transfer belt 10. The cleaning device 17 of the intermediate transfer belt 10 is disposed downstream of the secondary transfer portion in the rotating direction of the intermediate transfer belt 10 in the intermediate transfer belt 10 so as to collect the toner attached onto the intermediate transfer belt 10.

A full-color print image is formed by the above-described operation. The electrophotographic photosensitive member (photosensitive drum 1) may be provided in a process cartridge that integrally supports a member that executes at least one selected from the group consisting of a charging step, a developing step, and a transfer step. The process cartridge is attachable to and detachable from the main body of the image forming apparatus.

(Electrophotographic Photosensitive Member)

The electrophotographic photosensitive member (photosensitive drum 1) of the present invention has a surface layer. Here, the surface layer refers to a layer positioned on the outermost surface of the photosensitive member and means a layer that comes into contact with a charging member or a toner.

Figure 30:
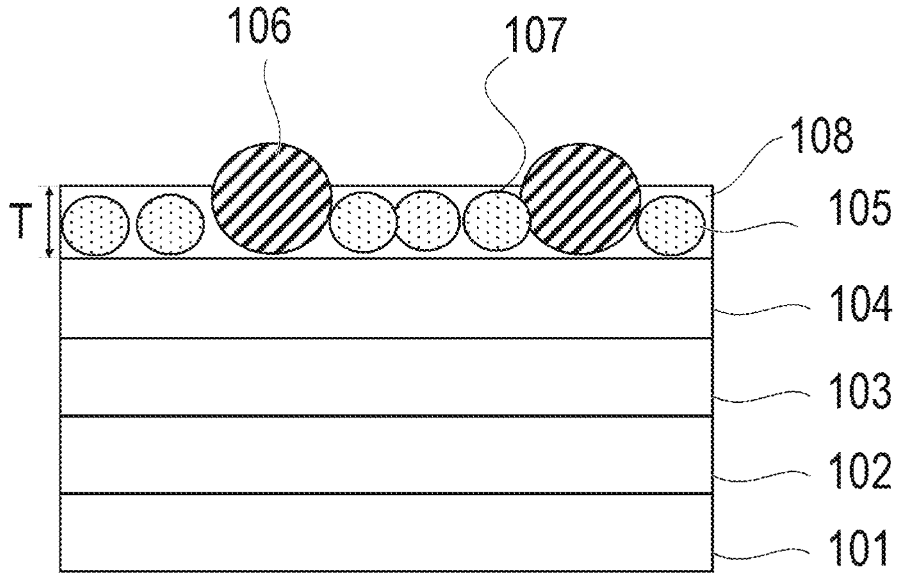
FIG. 30 is one example of the layer configuration of an electrophotographic photosensitive member in Example 1.
Figure 31:
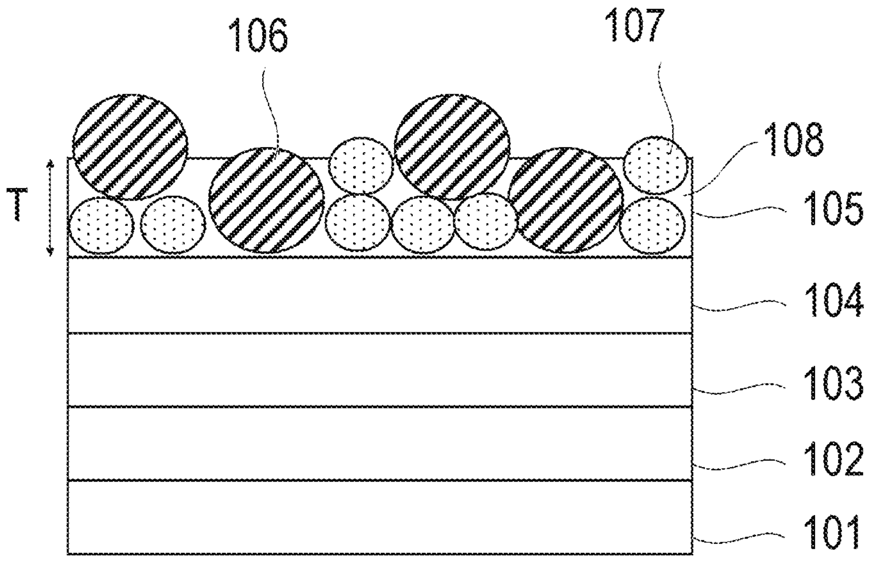
FIG. 31 is one example of the layer configuration of the electrophotographic photosensitive member in Example 1.

FIG. 30 and FIG. 31 are views showing one example of the layer configuration of the photosensitive drum 1. In FIG. 30 and FIG. 31, reference sign 101 is the support, reference sign 102 is the undercoating layer, reference sign 103 is the charge generation layer, and reference sign 104 is the charge transport layer. Reference sign 105 is the surface layer according to the present invention, reference sign 106 is the particle PAA (first particle) according to the present invention, and reference sign 107 is a particle other than the particle PAA (second particle) according to the present invention. Reference sign 108 is the binder resin. The average film thickness of the surface layer 105 at a portion in the surface layer 105 that does not contain particles is indicated by T.

Examples of a method for manufacturing the photosensitive drum 1 of the present invention include methods in which a coating liquid for each layer, which will be described below, is prepared, applied in a desired layer order, and dried. At this time, examples of a method for applying the coating liquid include dip coating, spray coating, inkjet coating, roll coating, die coating, blade coating, curtain coating, wire bar coating, ring coating, dispense coating, and the like. Among these, dip coating is preferable from the viewpoint of efficiency and productivity.

Hereinafter, the surface layer 105 of the photosensitive drum 1 of the present invention will be described.

(Surface Layer 105 of Photosensitive Drum 1)

As a result of the present inventors' studies, the photosensitive drum 1 of the present invention is an electrophotographic photosensitive member having the surface layer 105 containing particles and a binder resin, in which a plurality of peaks are present in the number-based particle size distribution of the particles, when a peak having the maximum peak top frequency is defined as a first peak, a peak having the second maximum peak top frequency is defined as a second peak, the first peak and the second peak are compared with each other, and a peak having a larger value of particle diameter for the peak top is defined as a peak PEA, the particle diameter DA for the peak top of the peak PEA is within a range of 80 nm to 300 nm, when particles having a particle diameter within a range of DA±20 nm among all of the particles that are contained in the surface layer 105 are defined as particles PAA, and convex portions that are derived from the particles PAA and having a height of at least 10 nm and not more than 300 nm are defined as convex portions CA, the convex portions CA are present on the surface of the surface layer 105, and when the surface layer 105 is viewed from above, the average value of the distances between the centers of gravity of the convex portions CA is at least 150 nm and not more than 500 nm, and the standard deviation of the distances between the centers of gravity of the convex portions CA is 250 nm or less.

According to the present inventors' studies, it is possible to exhibit an effect of improving the transfer property depending on the above-described conditions.

On the other hand, in order to improve the transfer property in the electrophotographic image forming apparatus, it is necessary to reduce the adhesive force of the toner that is developed on the photosensitive member. The adhesive force between the toner and the electrophotographic photosensitive member is roughly divided into an electrostatic adhesive force and a non-electrostatic adhesive force. The electrostatic adhesive force is significantly affected by the quantity of charges in the toner because the mirror image force is a main factor. The magnitude of the mirror image force is proportional to the quantity of charges in the toner and is inversely proportional to the square of the quantity of charges in the toner and the distance from the surface of the photosensitive member, which is the adhesion object. Therefore, the higher the heights of the convex portions derived from the particles on the surface of the photosensitive member, the larger the distance between the photosensitive member and the toner can be, and the mirror image force thus becomes smaller, and the transfer property of the toner to a transfer material further improves. Examples of a method for increasing the heights of the convex portions include an increase in the sizes of the particle to be introduced and an increase of the proportions of the particles in the surface layer 105 to push up the particles to the upper portion of the surface layer 105.

As described above, the photosensitive drum 1 of the present invention is an electrophotographic photosensitive member having the surface layer 105 containing the particles and a binder resin, and a plurality of peaks are present in the number-based particle size distribution of the particles. A peak having the maximum peak top frequency among the plurality of peaks is defined as a first peak. Furthermore, a peak having the second maximum peak top frequency is defined as a second peak. The first peak and the second peak are compared with each other, and the peak having a larger value of particle diameter for the peak top is defined as a peak PEA. In the present invention, the particle diameter DA for the peak top of the peak PEA needs to be in a range of at least 80 nm and not more than 300 nm. The particle diameter DA is more preferably within a range of 90 nm to 250 nm. The particle diameter DA is still more preferably within a range of 100 nm to 250 nm. Within this range, it becomes easy to obtain the above-described effect in the transfer step.

At this time, the particle diameter DA for the peak top of PEA represents the particle diameter of the particle having the maximum particle diameter frequency in the surface layer 105. When the particle diameter DA is less than 80 nm, the heights of the convex portions that contribute to the point contacts between the toner and the convex portions derived from the particles contained in the surface layer 105 of the photosensitive drum 1 become low, and the contact points increase to degrade the adhesion of the toner, which makes the transfer property deteriorate.

When the particle diameter DA exceeds 300 nm, the curvature of the convex portion derived from the particle decreases (the curvature radius increases), whereby the area of the adhesion portion between the toner and the surface layer 105 increases. As a result, the adhesive force between the toner and the surface of the photosensitive drum 1 increases, which makes the transfer property deteriorate.

Figure 47A:
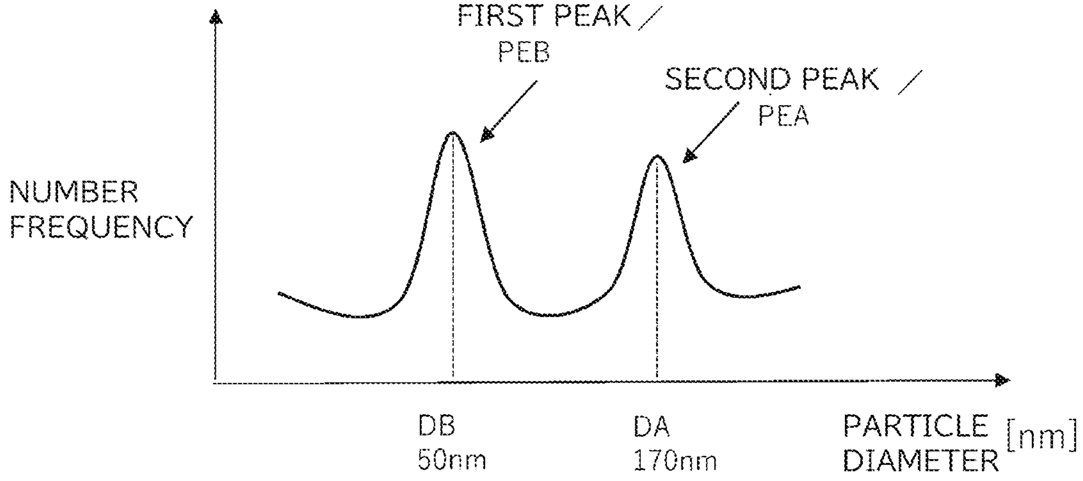
FIGS. 47A and 47B are views for describing the particle size distribution of particles in the surface layer.

In addition, the first peak and the second peak are preferably selected from a range of particle sizes corresponding to the peak tops of 20 nm or more. That is, it is preferable that, among the peaks having a peak top of 20 nm or more out of the plurality of peaks, the peak having the maximum peak top frequency is defined as the first peak, and the peak having the second maximum peak top frequency is defined as the second peak. FIG. 47A shows one example of the number-based particle size distribution of the particles, the first peak is present at a particle diameter of 50 nm, and the second peak is present at a particle diameter of 170 nm. In this case, the second peak having a larger particle diameter becomes the peak PEA, and the particle diameter DA thereof is 170 nm. Therefore, the condition of 80 nm≤DA is satisfied. In addition, since the particle diameter of the first peak is 50 nm, the condition of the particle diameter for the peak top being 20 nm or more is satisfied.

Figure 47B:
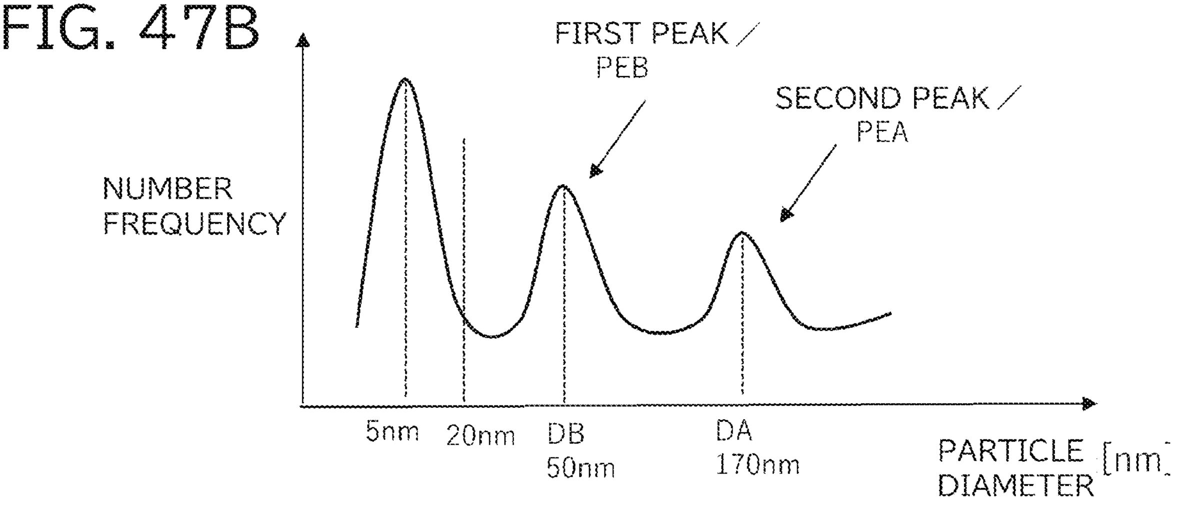

FIG. 47B shows another example of the particle size distribution. There is a peak at a particle diameter of 5 nm, but the particle diameter for the peak top is less than 20 nm, and this peak is thus not included in the first peak and the second peak. Therefore, as in FIG. 47A, the peak at a particle diameter of 50 nm becomes the first peak, and the peak at a particle diameter of 170 nm becomes the second peak. The reason for the peaks being selected as described above will be described. Here, even from the electrophotographic photosensitive member 1 containing a large number of extremely small particles in the surface layer 105, it is possible to obtain the effects of the present invention to be described below. Therefore, it is possible to stably obtain the effect of the present invention by selecting the first peak and the second peak from the peaks having a particle diameter of 20 nm or more as described with reference to FIGS. 47A and 47B.

Next, particles having a particle diameter in a range of DA±20 nm that are contained in the surface layer 105 of the photosensitive drum 1 of the present invention are defined as particles PAA. In addition, in the present invention, when convex portions that are derived from the particle PAA and have a height of at least 10 nm and not more than 300 nm are defined as the convex portion CA, the convex portions CA need to be present on the surface of the surface layer 105. When the heights of the convex portions CA becomes less than 10 nm, since the heights of the convex portions CA become too low, the rotation of the toner is not promoted during the contact between the photosensitive drum 1 and the toner, the electrostatic adhesive force between the toner and the surface layer 105 of the photosensitive drum 1 does not decrease, and the transfer property deteriorates. In a case where the heights of the convex portions CA exceed 300 nm, the recessed portions become large on the surface layer 105 of the photosensitive drum 1, deposition of an external additive for the toner progresses, the adhesion of the toner increases, developability deteriorates.

Next, when the surface layer 105 of the photosensitive drum 1 of the present invention is viewed from above, the average value of the distances between the centers of gravity of the convex portions CA needs to be at least 150 nm and not more than 500 nm.

In a case where there are a small number of the convex portions CA derived from the particles on the surface of the photosensitive member, the distances between the centers of gravity of the convex portions CA are large, and the toner base particles and the surface layer 105 of the photosensitive drum 1 come into contact with each other. Therefore, it is not possible to secure the distance between the toner base particles and the surface layer 105 of the photosensitive drum 1, the Coulomb force cannot be reduced, and it is not possible to improve the transfer property. When the average value of the distances between the centers of gravity of the convex portions CA exceeds 500 nm, since the intervals between the convex portions CA becomes too wide relative to the curvatures of the toner base particles, the toner base particles are likely to come into contact with the recessed portions on the surface layer 105, the electrostatic adhesive force increase, and the transfer property deteriorates.

On the other hand, in a case where the distances between the centers of gravity of the convex portions CA on the surface layer 105 are too small, the surface layer 105 is filled up with the convex portions CA, and as a result, the number of contact points between the toner base particles and the surface layer 105 increases. When the average value of the distances between the centers of gravity of the convex portions CA is less than 150 nm, since the intervals between the convex portions CA are too narrow relative to the curvature of the toner particle, the number of contact points increases, the reflection power increases, and the transfer property deteriorates.

The distance between the centers of gravity in the present invention is more preferably at least 150 nm and not more than 450 nm and still more preferably at least 150 nm and not more than 400 nm.

Furthermore, in the photosensitive drum 1 of the present invention, the standard deviation of the distances between the centers of gravity of the convex portions CA needs to be 250 nm or less. When the standard deviation of the distances between the centers of gravity of the convex portions CA exceeds 250 nm, the distribution of the convex portions CA on the surface layer 105 is uneven, and adhesion between the toner and the photosensitive drum 1 becomes uneven. As a result, the transfer property becomes uneven, and in a halftone image on which the toner is somewhat dispersed, developed, and transferred, unevenness is observed.

In addition, on the surface of the surface layer 105 of the electrophotographic photosensitive member of the present invention, when the area occupied by the particles is indicated by S1, and the area not occupied by the particles is indicated by S2, S1/(S1+S2) needs to be 0.70 or more. When S1/(S1+S2) is less than 0.70, it becomes impossible for portions containing no particles to form the convex portions.

As a result of the present inventors' studies, it has been found that when a plurality of particles having different particle diameters are present in the surface layer in a mixed manner, it becomes easy to control the heights of the convex portions CA. In addition, it is considered that when spaces between the particles PAA are filled with more of the particles in a state of being almost densest in the surface direction of the drum, tightness between the particles increases. This is because when the particles are impacted in the tangential direction of the drum surface, the distances between the particles are controlled as described above, whereby the restraints between the particles by the binder resin and the movement of the particles in the drum surface direction are confined by other particles, which suppresses the movement of the particles. This makes it possible to obtain an effect of suppressing detachment of the particles from the surface layer 105 of the electrophotographic photosensitive member which results even from rubbing with the charging member or the developing member and the transfer member that comes into contact with the electrophotographic photosensitive member.

Theoretically, the upper limit of S1/(S1+S2) is 1.00. S1/(S1+S2) is more preferably at least 0.80 and not more than 1.00 and still more preferably at least 0.85 and not more than 0.95.

When the average film thickness of the surface layer 105 at a portion not including the convex portions CA in a cross section of the surface layer 105 in the electrophotographic photosensitive member of the present invention is indicated by T, T preferably satisfies the following formula (1).

$$DA > T \quad (1)$$

When DA becomes smaller than the average film thickness T, it becomes difficult to form the convex portions CA as described above, the adhesion between the toner base particles and the electrophotographic photosensitive member is not sufficiently reduced, and there is an increasing possibility that the transfer property may deteriorate. The average film thickness T is preferably 50 nm to 500 nm if the particles are laminated as shown in FIG. 30 or FIG. 31 in a form of satisfying the formula (1). The average film thickness is more preferably 70 nm to 450 nm and still more preferably 80 nm to 400 nm.

In addition, in a cross section of the surface layer in the electrophotographic photosensitive member of the present invention, a peak having the maximum peak top frequency is defined as a first peak, and a peak having the second maximum peak top frequency is defined as a second peak. Furthermore, when the first peak and the second peak are compared with each other, and a peak having a smaller value of particle diameter for the peak top is defined as a peak PEB, the particle diameter DB for the peak top of the peak PEB preferably satisfies the following formula (2).

$$DB < T \quad (2)$$

When particles having a particle diameter in a range of DB±20 nm among all of the particles that are contained in the surface layer 105 are defined as the particles PAB, in a case where DB becomes the average film thickness T or less, the tightness between the particles PAA that form the convex portions CA and the particles PAB that are arranged between the convex portions CA increases, and clear recessed portions are formed on the surface layer 105, whereby detachment of the particles is suppressed. When DB becomes the average film thickness T or more, the particles PAB are likely to be exposed on the surface layer 105, and detachment of the particles is likely to progress.

Furthermore, in a cross section of the surface layer 105 in the electrophotographic photosensitive member of the present invention, the DA and the DB preferably satisfy the following formula (3).

$$DB/DA > 1/10 \quad (3)$$

The particles PAA form the convex portions CA, and the particles PAB fill the spaces between the particles PAA, whereby it becomes possible to control the average value and standard deviation of the distances between centers of gravity of the convex portions CA. In addition, when the magnitudes of the particle diameters of the particles PAA and the particles PAB satisfy the formula (3), it becomes possible to suppress detachment of the particles against rubbing in the tangential direction on the surface layer 105 of the electrophotographic photosensitive member while sufficiently maintaining the heights of the convex portions CA. More preferably, the right side of the formula (3) is preferably ⅓. That is, it is preferable to satisfy DB/DA>⅓. Furthermore, the right side is preferably ½. That is, it is preferable to satisfy DB/DA>½.

Next, the proportion of the number of the convex portions CA in the number of the convex portions present on the surface of the surface layer 105 in the electrophotographic photosensitive member of the present invention is preferably 90% by number or more. Here, it has been found that, when the developing unit in the image forming apparatus is rubbed, the convex portions not derived from the particles PAA have weak mechanical strengths and wear due to the rubbing in the tangential direction of the electrophotographic photosensitive member. Therefore, in a state where the proportion of the number of the convex portions CA is less than 90% by number, it becomes difficult to maintain the transfer property in a favorable state during a long-term use.

Furthermore, the half width of the peak PAA in the surface layer 105 of the electrophotographic photosensitive member of the present invention is preferably at least 20 nm and not more than 50 nm. Since the height of the convex portion CA is controlled depending on the magnitude of the particle diameter, the half width of the peak PAA is preferably in a certain range as much as possible. When the half width of PAA exceeds 50 nm, the unevenness in the height of the convex portion CA also increases, the state of point contact between the toner base particles and the surface of the surface layer 105 of the electrophotographic photosensitive member becomes uneven, the rotation of the toner is not promoted well, and it becomes difficult to reduce the electrostatic adhesive force between the surfaces. Promotion of the point contact between the toner and the photosensitive member reduces the adhesive force of the toner to the photosensitive member and thus enables the transfer property to be improved.

A maximum height difference Rz of the surface of the surface layer 105 in the electrophotographic photosensitive member of the present invention is preferably at least 100 nm and not more than 400 nm. When the maximum height difference Rz on the surface of the surface layer 105 becomes less than 100 nm, the rotation of the toner is not promoted well, and the transfer property does not improve. When the maximum height difference Rz on the surface of the surface layer 105 exceeds 400 nm, deposition of the external additive progresses in the recessed portions, which makes developability deteriorate. In addition, discharging is likely to occur in the transfer step, and there is a possibility that unevenness arising from uneven density may be caused in a halftone image. More preferably, the maximum height difference Rz is preferably at least 200 nm and not more than 375 nm and more preferably at least 225 nm and not more than 350 nm.

The circularity of the particle PAA that is contained in the surface layer 105 in the electrophotographic photosensitive member of the present invention is preferably 0.950 or more. When the circularity of the particle PAA is less than 0.950, the contact area between the toner base particles and the surface of the surface layer 105 of the electrophotographic photosensitive member increases. An increase in non-electrostatic adhesive force is shown, and the transfer property of the toner is likely to deteriorate over a long-term use.

The average circularity of the particles was obtained using a scanning electron microscope as described below. Particles that were a measurement object were observed using a scanning electron microscope ("JSM7800F," manufactured by JEOL Ltd.) and the particle diameters of 100 particles were each measured from an image obtained by observation. For each particle, the longest side a and the shortest side b of the primary particle were measured, and the circularity was defined as b/a. The circularities of the 100 particles were averaged to calculate the average circularity.

The surface layer 105 of the electrophotographic photosensitive member of the present invention contains at least the particles PAA and PAB as described above. Examples of the particles PAA that are used in the present invention include organic resin particles such as acrylic resin particles, inorganic particles of silica or the like, and organic/inorganic hybrid particles. The particles PAA and the particles PAB may be the same material or different materials.

An acrylic particle contains a polymer of an acrylate ester or a methacrylate ester. Among them, a styrene acrylic particle is more preferable. The degrees of polymerization of an acrylic resin and a styrene acrylic resin or whether the resin is thermoplastic or thermosetting is not particularly limited. Examples of the organic resin particles include crosslinked polystyrene, a crosslinked acrylic resin, a phenolic resin, a melamine resin, polyethylene, polypropylene, acrylic particles, polytetrafluoroethylene particles, and silicone particles.

Examples of the inorganic particles include silica particles, metal oxide particles, metal particles, and the like. As the particles that are contained in the surface layer 105 of the electrophotographic photosensitive member of the present invention, it is preferable to use inorganic particles having low elasticity and being advantageous in promoting point contact between the toner and the photosensitive member.

In the case of using the inorganic particles, silica particles are particularly preferable. Since the silica particles have a low elastic modulus and a large average circularity compared with other insulating particles, an effect of promoting point contact between the toner and the photosensitive member to reduce the adhesive force is expected.

Known silica fine particles can be used as the silica particles, and any of dry silica fine particles or wet silica fine particles may be used. Preferably, fine particles of wet silica obtained by a sol-gel method (hereinafter also referred to as sol-gel silica) are preferable.

The sol-gel silica that is used as the particles that are contained in the surface layer 105 of the electrophotographic photosensitive member of the present invention may be hydrophilic or may have hydrophobic surfaces. Examples of a method for the hydrophobic treatment include a sol-gel method in which a solvent is removed from a silica sol suspension, and the silica sol suspension is dried and then treated with a hydrophobic treatment agent and a method in which a hydrophobic treatment agent is directly added to a silica sol suspension and the silica sol suspension is dried and treated at the same time. From the viewpoint of controlling the half width of the particle size distribution and controlling the saturated moisture adsorption amount, the method in which a hydrophobic treatment agent is directly added to a silica sol suspension is preferable.

Examples of the hydrophobic treatment agent include:

chlorosilanes such as methyltrichlorosilane, dimethyldichlorosilane, trimethylchlorosilane, phenyltrichlorosilane, diphenyldichlorosilane, t-butyldimethylchlorosilane, and vinyltrichlorosilane;

alkoxysilanes such as tetramethoxysilane, methyltrimethoxysilane, dimethyldimethoxysilane, phenyltrimethoxysilane, diphenyldimethoxysilane, o-methylphenyltrimethoxysilane, p-methylphenyltrimethoxysilane, n-butyltrimethoxysilane, i-butyltrimethoxysilane, hexyltrimethoxysilane, octyltrimethoxysilane, decyltrimethoxysilane, dodecyltrimethoxysilane, tetraethoxysilane, methyltriethoxysilane, dimethyldiethoxysilane, phenyltriethoxysilane, diphenyldiethoxysilane, i-butyltriethoxysilane, decyltriethoxysilane, vinyltriethoxysilane, γ-methacryloxypropyltrimethoxysilane, γ-glycidoxypropyltrimethoxysilane, γ-glycidoxypropylmethyldimethoxysilane, γ-mercaptopropyltrimethoxysilane, γ-chloropropyltrimethoxysilane, γ-aminopropyltrimethoxysilane, γ-aminopropyltriethoxysilane, 7-(2-aminoethyl)aminopropyltrimethoxysilane, and 7-(2-aminoethyl)aminopropylmethyldimethoxysilane;

silazanes such as hexamethyldisilazane, hexaethyldisilazane, hexapypropyldisilazane, hexabutyldisilazane, hexapentyldisilazane, hexahexyldisilazane, hexacyclohexyldisilazane, hexaphenyldisilazane, divinyltetramethyldisilazane, and dimethyltetravinyldisilazane;

silicone oils such as dimethyl silicone oil, methyl hydrogen silicone oil, methylphenyl silicone oil, alkyl-modified silicone oil, chloroalkyl-modified silicone oil, chlorophenyl-modified silicone oil, fatty acid-modified silicone oil, polyether-modified silicone oil, alkoxy-modified silicone oil, carbinol-modified silicone oil, amino-modified silicone oil, fluorine-modified silicone oil, and terminal reactive silicone oil;

siloxanes such as hexamethylcyclotrisiloxane, octamethylcyclotetrasiloxane, decamethylcyclopentasiloxane, hexamethyldisiloxane, and octamethyltrisiloxane;

as fatty acids and metal salts thereof, long chain fatty acids such as undecylic acid, lauric acid, tridecylic acid, dodecyl acid, myristic acid, palmitic acid, pentadecylic acid, stearic acid, heptadecylic acid, arachidonic acid, montanic acid, oleic acid, linolic acid, and arachidic acid and salts of the fatty acid and a metal such as zinc, iron, magnesium, aluminum, calcium, sodium, or lithium.

Among these, alkoxysilanes, silazanes, and silicone oils make the hydrophobic treatment easy to perform and are thus preferably used. These hydrophobic treatment agents may be used singly or two or more thereof may be jointly used.

The surface layer 105 in the present invention may contain an additive such as an antioxidant, an ultraviolet absorber, a plasticizer, a leveling agent, a slip-imparting agent, or a wear resistance improver. Specific examples thereof include a hindered phenolic compound, a hindered amine compound, a sulfur compound, a phosphorus compound, a benzophenone compound, a siloxane-modified resin, a silicone oil, and the like.

The surface layer 105 of the present invention can be formed by preparing a coating liquid for the surface layer containing each of the above-described materials and a solvent, forming a coating film thereof, and drying and/or curing the coating film. Examples of the solvent that is used in the coating liquid include an alcoholic solvent, a ketone-based solvent, an ether-based solvent, a sulfoxide-based solvent, an ester-based solvent, an aromatic hydrocarbon-based solvent.

In the surface layer 105 of the present invention, the proportion of the volume of the particles is preferably 40% by volume to 90% by volume of the total volume of the surface layer 105. Furthermore, the proportion is more preferably 45% by volume to 85% by volume and still more preferably 50% by volume to 80% by volume. Within this range, it is possible to reliably form the above-described convex portions on the surface layer 105. When the proportion is 30% by volume or less, the height of the convex portion becomes low, and the transfer property thus does not improve. When the proportion becomes 90% by volume or more, since the particles vigorously detach, when a durability test is performed, the transfer property deteriorates, and the image density decreases.

In addition, a charge transport substance may be added to the coating liquid for the surface layer for the purpose of improving the charge transport capacity of the surface layer 105. In addition, additives can also be added for the purpose of improving various functions. Examples of the additives include conductive particles, an antioxidant, an ultraviolet absorber, a plasticizer, and a leveling agent.

The binder resin according to the present invention includes the following forms. Here, the surface layer 105 preferably contains a charge transport substance.

Examples of the binder resin include a polyester resin, an acrylic resin, a phenoxy resin, a polycarbonate resin, a polystyrene resin, a phenolic resin, a melamine resin, an epoxy resin, and the like. Among these, a polycarbonate resin, a polyester resin, and an acrylic resin are preferable.

The surface layer 105 of the present invention may be formed as a cured film by polymerizing a composition containing a monomer having a polymerizable functional group. Examples of a reaction at that time include a thermal polymerization reaction, a photopolymerization reaction, a radiation polymerization reaction, and the like. Examples of the polymerizable functional group in the monomer having a polymerizable functional group include an acrylic group, a methacrylic group, and the like. As the monomer having a polymerizable functional group, a material having a charge transport capability may be used.

A compound having a polymerizable functional group may have a charge-transporting structure and a chain-polymerizable functional group at the same time. As the charge-transporting structure, a triarylamine structure is preferable from the viewpoint of charge transport. As the chain-polymerizable functional group, an acryloyl group or a methacryloyl group is preferable. The number of the functional groups may be one or more. In particular, when a cured film containing a compound having a plurality of functional groups and a compound having one functional group is formed, it is easy to eliminate strain generated by the polymerization of the plurality of functional groups, which is particularly preferable.

Examples of the compound having one functional group will be shown in (2-1) to (2-6).

[Chem. 7]

(2-1)

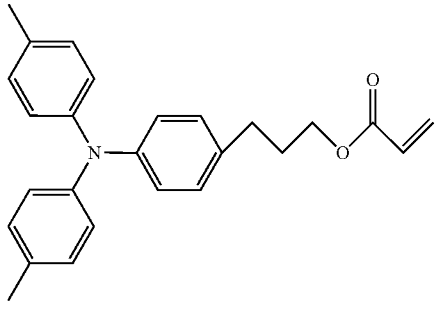

-continued
(2-2)
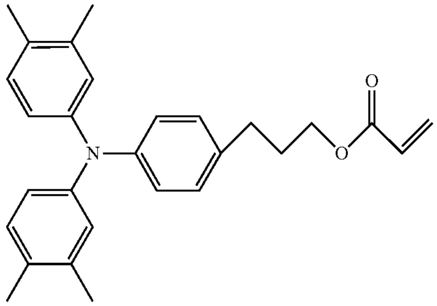
(2-3)
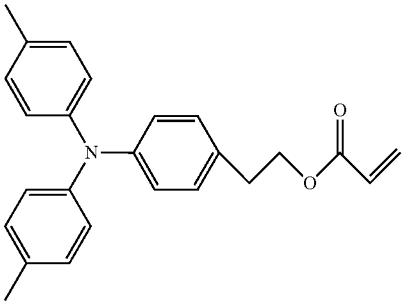
(2-4)
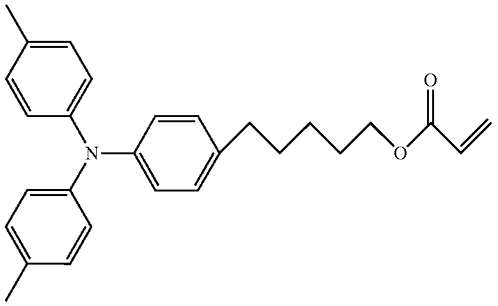
(2-5)
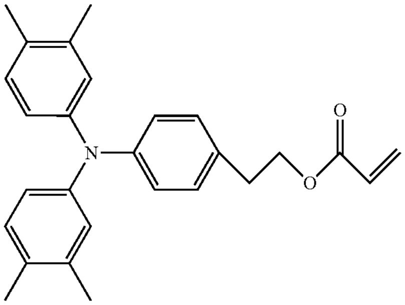
(2-6)
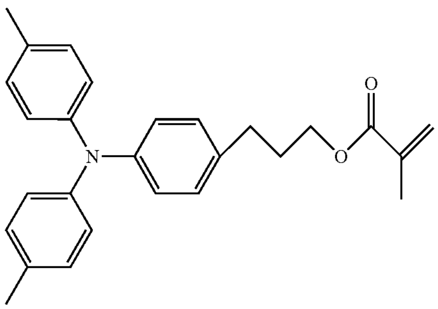
Examples of the compound having a plurality of functional groups will be shown in (3-1) to (3-6).
[Chem. 8]
(3-1)
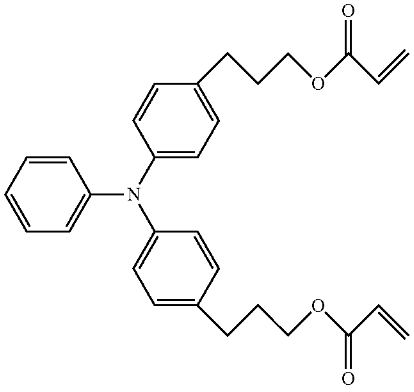
(3-2)
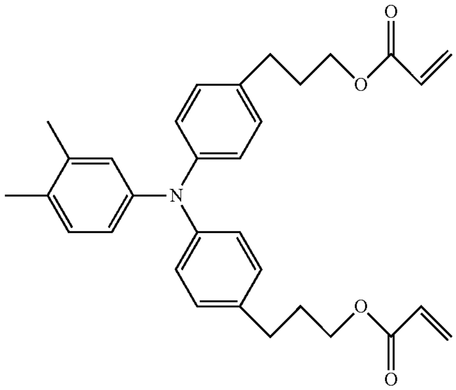
(3-3)
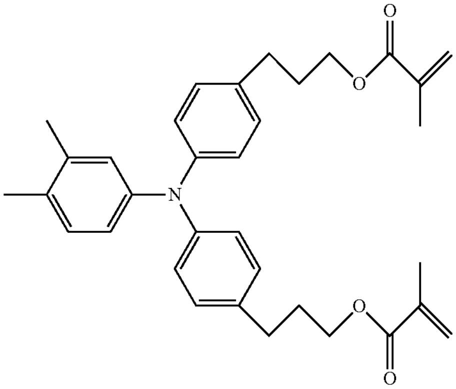
(3-4)
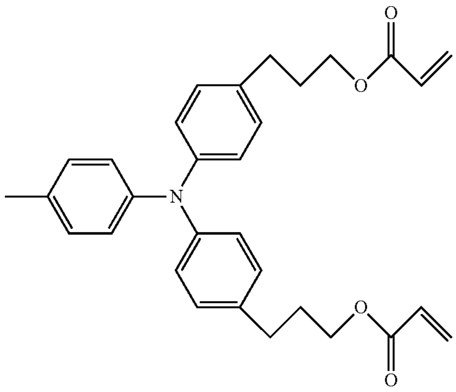

-continued (3-5)

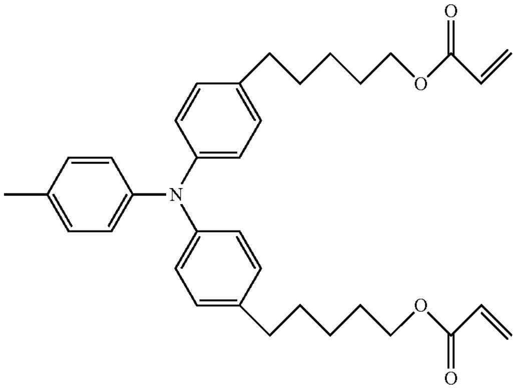

(3-6)

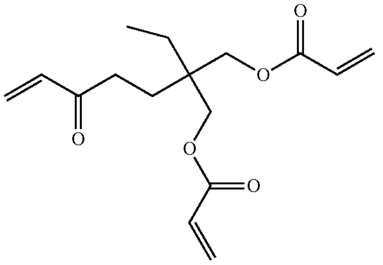

<Support>

In the present invention, the electrophotographic photosensitive member preferably has a support. In the present invention, the support is preferably a conductive support having conductivity. In addition, examples of the shape of the support include a cylindrical shape, a belt shape, a sheet shape, and the like. Among these, a cylindrical support is preferable. In addition, an electrochemical treatment such as anodic oxidation, a blast treatment, a cutting treatment, or the like may be performed on the surface of the support.

As the material of the support, a metal, a resin, glass, or the like is preferable. Examples of the metal include aluminum, iron, nickel, copper, gold, stainless steel, alloys thereof, and the like. Among these, an aluminum support for which aluminum is used is preferable.

In addition, conductivity may be imparted to resins or glass by a treatment, such as mixing or coating with a conductive material.

<Conductive Layer>

In the present invention, a conductive layer may be provided on the support. When the conductive layer is provided, it is possible to conceal scratches or unevenness on the surface of the support or to control reflection of light on the surface of the support. The conductive layer preferably contains conductive particles and a resin.

Examples of the material of the conductive particles include a metal oxide, a metal, carbon black, and the like.

Examples of the metal oxide include zinc oxide, aluminum oxide, indium oxide, silicon oxide, zirconium oxide, tin oxide, titanium oxide, magnesium oxide, antimony oxide, bismuth oxide, and the like. Examples of the metal include aluminum, nickel, iron, nichrome, copper, zinc, silver, and the like.

Among these, as the conductive particles, a metal oxide is preferably used, and in particular, titanium oxide, tin oxide, or zinc oxide is more preferably used. In the case of using a metal oxide as the conductive particles, the surface of the metal oxide may be treated with a silane coupling agent or the like, or an element such as phosphorus or aluminum or an oxide thereof may be doped into the metal oxide.

In addition, the conductive particles may be provided with a laminated configuration in which pre-coated particles of titanium oxide, barium sulfate, zinc oxide, or the like are coated with a metal oxide having a different composition from the pre-coated particles. Examples of a coating include metal oxides such as tin oxide.

In addition, in the case of using a metal oxide as the conductive particles, the average primary particle diameter is preferably at least 1 nm and not more than 500 nm and more preferably at least 3 nm and not more than 400 nm.

Examples of the resin include a polyester resin, a polycarbonate resin, a polyvinyl acetal resin, an acrylic resin, a silicone resin, an epoxy resin, a melamine resin, a polyurethane resin, a phenolic resin, an alkyd resin, and the like.

The conductive layer may further contain a masking agent such as a silicone oil, resin particles, or titanium oxide.

The average film thickness of the conductive layer is preferably at least 1 μm and not more than 50 μm and particularly preferably at least 3 μm and not more than 40 μm.

The conductive layer can be formed by preparing a coating liquid for the conductive layer containing each of the above-described materials and a solvent, forming a coating film thereof, and drying the coating film. Examples of the solvent that is used in the coating liquid include an alcoholic solvent, a sulfoxide-based solvent, a ketone-based solvent, an ether-based solvent, an ester-based solvent, an aromatic hydrocarbon-based solvent, and the like. Examples of a dispersion method for dispersing the conductive particles in the coating liquid for the conductive layer include methods in which a paint shaker, a sand mill, a ball mill, or a liquid collision type high-speed disperser is used.

<Undercoating Layer>

In the present invention, an undercoating layer may be provided on the support or the conductive layer.

The average film thickness of the undercoating layer is preferably at least 0.1 m and not more than 50 μm, more preferably at least 0.2 μm and not more than 40 μm, and particularly preferably at least 0.3 μm and not more than 30 μm.

Examples of a resin in this undercoating layer include a polyacrylic acid resin, a polyvinyl alcohol resin, a polyvinyl acetal resin, a polyethylene oxide resin, a polypropylene oxide resin, an ethyl cellulose resin, a methyl cellulose resin, a polyamide resin, a polyamide acid resin, a polyurethane resin, a polyimide resin, a polyamide-imide resin, a polyvinyl phenolic resin, a melamine resin, a phenolic resin, an epoxy resin, and an alkyd resin.

In addition, the resin may have a structure in which a resin having a polymerizable functional group and a monomer having a polymerizable functional group are crosslinked with each other.

In addition, the undercoating layer may contain an inorganic compound or an organic compound aside from the resin.

Examples of the inorganic compound include a metal, an oxide, and a salt.

Examples of the metal include gold, silver, aluminum, and the like. Examples of the oxide include zinc oxide, lead white, aluminum oxide, indium oxide, silicon oxide, zirconium oxide, tin oxide, titanium oxide, magnesium oxide, antimony oxide, bismuth oxide, indium oxide, tin oxide, zirconium oxide, and the like. Examples of the salt include barium sulfate and strontium titanate.

These inorganic compounds may be present in the film in a particulate state.

The number average particle diameter of the particles is preferably at least 1 nm and not more than 500 nm and more preferably at least 3 nm and not more than 400 nm.

These inorganic compounds may be provided with a laminated configuration having core particles and coating layers that coat the particles.

The surfaces of these inorganic compounds may be treated with a silicone oil, a silane compound, a silane coupling agent, a different organic silicon compound, an organic titanium compound, or the like. In addition, an element such as tin, phosphorus, aluminum, or niobium may be doped thereinto.

Examples of the organic compound include an electron transport compound or a conductive polymer.

Examples of the conductive polymer include polythiophene, polyaniline, polyacetylene, polyphenylene, and polyethylene dioxythiophene.

Examples of an electron transport substance include a quinone compound, an imide compound, a benzimidazole compound, a cyclopentadienylidene compound, a fluorenone compound, a xanthone compound, a benzophenone compound, a cyanovinyl compound, an aryl halide compound, a silole compound, and a boron-containing compound.

The electron transport substance has a polymerizable functional group and may be crosslinked with a resin having a functional group capable of reacting with the functional group. Examples of the polymerizable functional group include a hydroxy group, a thiol group, an amino group, a carboxyl group, a vinyl group, an acryloyl group, a methacryloyl group, an epoxy group, and the like.

These organic compounds may be present in the film in a particulate state or may be surface-treated.

To the undercoating layer, a variety of additives such as a leveling agent such as a silicone oil, a plasticizer, and a thickener may be added.

The undercoating layer is obtained by preparing a coating liquid for the undercoating layer containing the above-described materials, applying the coating liquid on the support or the conductive layer, and then drying or curing the coating film.

Examples of a solvents used to prepare the coating liquid include an alcoholic solvent, a ketone-based solvent, an ether-based solvent, an ester-based solvent, an aromatic hydrocarbon-based solvent, and the like.

Examples of a dispersion method for dispersing the particles in the coating liquid include methods in which a paint shaker, a sand mill, a ball mill, or a liquid collision type high-speed disperser is used.

<Photosensitive Layer>

A photosensitive layer in the electrophotographic photosensitive member is mainly classified into (1) a stacked photosensitive layer and (2) a single-layer photosensitive layer. (1) The stacked photosensitive layer is a photosensitive layer having a charge generation layer containing a charge generating substance and a charge transport layer containing a charge transport substance. (2) The single-layer photosensitive layer is a photosensitive layer containing both a charge generating substance and a charge transport substance.

(1) Stacked Photosensitive Layer

The stacked photosensitive layer has a charge generation layer and a charge transport layer.

(1-1) Charge Generation Layer

The charge generation layer preferably contains a charge generating substance and a resin.

Examples of the charge generating substance include azo pigments, perylene pigments, polycyclic quinone pigments, indigo pigments, phthalocyanine pigments, and the like. Among these, azo pigments and phthalocyanine pigments are preferable. Among the phthalocyanine pigments, an oxytitanium phthalocyanine pigment, a chlorogallium phthalocyanine pigment, and a hydroxygallium phthalocyanine pigment are preferable.

The content of the charge generating substance in the charge generation layer is preferably at least 40% by mass and not more than 85% by mass and more preferably at least 60% by mass and not more than 80% by mass relative to the total mass of the charge generation layer.

Examples of the resin include a polyester resin, a polycarbonate resin, a polyvinyl acetal resin, a polyvinyl butyral resin, an acrylic resin, a silicone resin, an epoxy resin, a melamine resin, a polyurethane resin, a phenolic resin, a polyvinyl alcohol resin, a cellulose resin, a polystyrene resin, a polyvinyl acetate resin, a polyvinyl chloride resin, and the like. Among these, a polyvinyl butyral resin is more preferable.

In addition, the charge generation layer may further contain an additive such as an antioxidant or an ultraviolet absorber. Specific examples thereof include a hindered phenolic compound, a hindered amine compound, a sulfur compound, a phosphorus compound, a benzophenone compound, and the like.

The charge generation layer can be formed by preparing a coating liquid for the charge generation layer containing each of the above-described materials and a solvent, forming a coating film thereof on the undercoating layer, and drying the coating film. Examples of the solvent that is used in the coating liquid include an alcoholic solvent, a sulfoxide-based solvent, a ketone-based solvent, an ether-based solvent, an ester-based solvent, an aromatic hydrocarbon-based solvent, and the like.

The film thickness of the charge generation layer is preferably at least 0.1 μm and not more than 1.5 μm and more preferably at least 0.15 μm and not more than 1.0 μm.

(1-2) Charge Transport Layer

The charge transport layer preferably contains a charge transport substance and a resin.

Examples of the charge transport substance include a polycyclic aromatic compound, a heterocyclic compound, a hydrazone compound, a styryl compound, an enamine compound, a benzidine compound, a triarylamine compound, resins having a group derived from these substances, and the like. Among these, a triarylamine compound and a benzidine compound are preferable.

The content of the charge transport substance in the charge transport layer is preferably at least 25% by mass and not more than 70% by mass and more preferably at least 30% by mass and not more than 55% by mass relative to the total mass of the charge transport layer.

Examples of the resin include a polyester resin, a polycarbonate resin, an acrylic resin, a polystyrene resin, and the like. Among these, a polycarbonate resin and a polyester resin are preferable. As the polyester resin, a polyarylate resin is particularly preferable.

The content ratio (mass ratio) between the charge transport substance and the resin is preferably 4:10 to 20:10 and more preferably 5:10 to 12:10.

In addition, the charge transport layer may also contain an additive such as an antioxidant, an ultraviolet absorber, a plasticizer, a leveling agent, a slip-imparting agent, or a wear resistance improver. Specific examples thereof include a hindered phenolic compound, a hindered amine compound, a sulfur compound, a phosphorus compound, a benzophenone compound, a siloxane-modified resin, a silicone oil, fluorine resin particles, polystyrene resin particles, polyethylene resin particles, silica particles, alumina particles, boron nitride particles, and the like.

The charge transport layer can be formed by preparing a coating liquid for the charge transport layer containing each of the above-described materials and a solvent, forming a coating film thereof on the charge generation layer, and drying the coating film. Examples of the solvent that is used in the coating liquid include an alcoholic solvent, a ketone-based solvent, an ether-based solvent, an ester-based solvent, and an aromatic hydrocarbon-based solvent. Among these solvents, an ether-based solvent or an aromatic hydrocarbon-based solvent is preferable.

The film thickness of the charge transport layer is preferably at least 3 μm and not more than 50 μm, more preferably at least 5 μm and not more than 40 μm, and particularly preferably at least 10 μm and not more than 30 μm.

(2) Single-Layer Photosensitive Layer

The single-layer photosensitive layer can be formed by preparing a coating liquid for the photosensitive layer containing a charge generating substance, a charge transport substance, a resin, and a solvent, forming a coating film thereof on the undercoating layer, and drying the coating film. The charge generating substance, the charge transport substance, and the resin are the same as the examples of the materials in the above-described "(1) stacked photosensitive layer."

The film thickness of the single-layer photosensitive layer is preferably at least m and not more than 45 μm and more preferably at least 25 μm and not more than m.

<Measurement of Physical Properties of Electrophotographic Photosensitive Member>

<Method for Observing Lamination State of Particles Contained in Surface Layer 105 of Electrophotographic Photosensitive Member and Measuring Particle Size Distribution>

A cross section of the electrophotographic photosensitive member prepared in the example was observed. It was determined whether the particles were laminated in a single layer in the surface layer as in FIG. 30 or the particles were laminated in a plurality of layers as in FIG. 31. Samples on which cross-sectional observation was performed were collected by equally dividing the photosensitive member into four portions in the longitudinal direction and shifting the photosensitive member by 120° in the circumferential direction at positions ¼, ½, and ¾ length apart from an end portion. 5 mm square sample pieces were cut out from the photosensitive member, respectively, and the surface layer 105 was transformed into a 2 μm×2 μm×2 μm three dimensional structure with Slice & View of FIB-SEM.

Slice & View conditions were set as described below.

Analytical specimen processing: FIB method

Processing and observation device: NVision 40 manufactured by SII/Zeiss

Slice interval: 10 nm (Observation Conditions)

Accelerating voltage: 1.0 kV

Specimen slope: 54°

WD: 5 mm

Detector: BSE detector

Aperture: 60 μm, high current

ABC: ON

Image resolution: 1.25 nm/pixel

The measurement environment is a temperature of 23° C. and a pressure of $1\times10^{-4}$ Pa. As the processing and observation device, it is also possible to use Strata 400S (specimen slope: 52°) manufactured by FEI.

Analysis is performed on an analysis region that is 2 μm in length and 2 μm in width, information of each cross section is integrated, and a volume V per 2 μm in length, 2 μm in width, and 2 μm in thickness (8 $\mu m^3$) on the surface of the surface layer 105 is obtained. In addition, image analysis was performed on each cross section using image processing software: Image-Pro Plus manufactured by Media Cybernetics, Inc.

From a difference in contrast of Slice & View of FIB-SEM, the content of the particles in the total volume of the surface layer 105 was calculated. In addition, based on information obtained from the image analysis, in each of the four sample pieces, the volume V of the particles of the invention in a volume of 2 μm×2 μm×2 μm (unit volume: 8 $\mu m^3$) is obtained, and the content [% by volume] of the particles (=V $\mu m^3$/8 $\mu m^3$×100) of the conductive particles was calculated. The average value of the value of the content of the particles in each sample piece was regarded as the content [% by volume] of each particle of the present invention in the surface layer relative to the total volume of the surface layer 105. The composition of the particle was determined using a SEM-EDX function.

It is confirmed whether or not there are a plurality of peaks in a particle size distribution in which the horizontal axis represents the particle diameters of the particles contained in the surface of the surface layer 105 and the vertical axis represents the number-based frequency of each particle diameter. In the particle size distribution, a peak having the maximum peak top frequency is defined as a first peak. Next, a peak having the second maximum peak top frequency is defined as a second peak. Furthermore, the first peak and the second peak were compared with each other, and the peak having a larger value of particle diameter for the peak top was defined as a peak PEA.

In addition, the particle diameter for the peak top of the peak PEA in the particle size distribution is represented by DA. Particles having a particle diameter within a range of DA±20 nm among all of the particles that are contained in the surface layer 105 are defined as the particles PAA, and the convex portions that are derived from the particles PAA are defined as convex portions CA. In a case where particles having different compositions were present, the particles were determined by a mapping image by EDS. Furthermore, 100 convex portions were measured, and the proportion of the convex portions CA derived from the particle PAA was calculated.

Next, in the particle size distribution A, the first peak and the second peak are compared with each other, and the peak having a smaller value of particle diameter for the peak top is defined as a peak PEB. A particle diameter DB for the peak top of the peak PEB is calculated.

In addition, in a cross-sectional image of the surface layer 105, the average film thickness T of the surface layer 105 was measured as shown in FIG. 30 and FIG. 31.

<Method for Measuring Average Value and Standard Deviation of Distances between Centers of Gravity of Particles on Surface Layer of Electrophotographic Photosensitive Member>

In the electrophotographic photosensitive member of the present invention, when the surface layer 105 is viewed from above, the average value and the standard deviation of the distances between the centers of gravity of the convex portions CA derived from the particles PAA can be calculated as described below.

The surface of the surface layer 105 of the electrophotographic photosensitive member was photographed using a scanning electron microscope (SEM) ("S-4800," manufactured by JEOL Ltd.) at an accelerating voltage of 10 kV. A photographic image of the surface layer 105 of the electrophotographic photosensitive member of the present invention, magnified 30000 times, was captured by a scanner at three locations 50 mm from each end of the photosensitive drum 21 in the longitudinal direction and in the center, and at four locations 90 degrees each in the circumferential direction, for a total of 12 locations. The particles PAA in the photographic images were binarized using an image processing analyzer ("LUZEX AP," manufactured by NIRECO Corporation).

Figure 32:
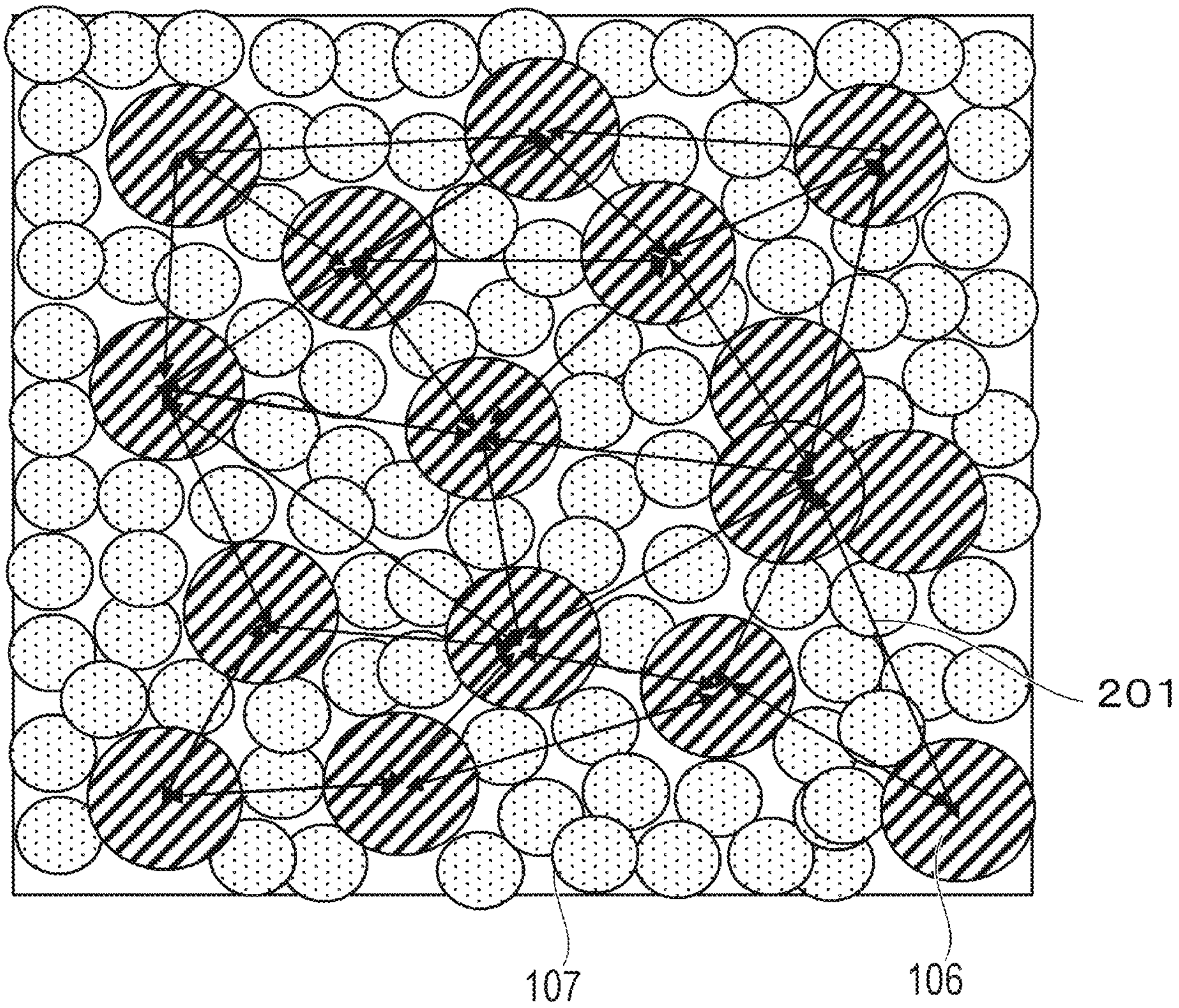
FIG. 32 is a conceptual view of a surface layer of the electrophotographic photosensitive member in Example 1.

The distances between the centers of gravity 201 of the particles PAA adjacent to each other as shown in FIG. 32 are measured in a mode of the distance between adjacent centers of gravity of the particles PAA, and the average value of the distances between the centers of gravity is calculated. At this time, the distance between the centers of gravity is calculated from each center of gravity of the particle PAA by Voronoi tessellation. The distances between the centers of gravity and the standard deviations are calculated for a total of 10 fields of view, and the resultant average value and standard deviation of the distances between the centers of gravity are regarded as the average value and standard deviation of the distances between the centers of gravity of the particles on the surface layer 105 of the photosensitive member.

<Method for Measuring Coverage S1/(S1+S2) of Particles on Surface Layer of Electrophotographic Photosensitive Member>

In the electrophotographic photosensitive member of the present invention, when the surface layer 105 is viewed from above, the coverage S1/(S1+S2), where S1 represents the area of the particles PAA and S2 represents the total of the areas other than the particles PAA, can be calculated as described below.

The surface of the surface layer 105 of the electrophotographic photosensitive member was photographed using a scanning electron microscope (SEM) ("S-4800," manufactured by JEOL Ltd.) at an accelerating voltage of 10 kV. A photographic image of the surface layer 105 of the electrophotographic photosensitive member of the present invention, magnified 30000 times, was captured by a scanner at three locations 50 mm from each end of the photosensitive drum 21 in the longitudinal direction and in the center, and at four locations 90 degrees each in the circumferential direction, for a total of 12 locations. The particles PAA in the photographic images were binarized using an image processing analyzer ("LUZEX AP," manufactured by NIRECO Corporation).

The area of the particles PAA is indicated by Si, the total of the areas other than the particles PAA is indicated by S2, and the coverage S1/(S1+S2) (%) is calculated. The coverage is calculated on 10 fields of view in total, and the average value of the resultant coverages is defined as the coverage of the particles on the surface layer 105 of the photosensitive member.

<Method for Measuring Circularity of Particles PAA of Particles on Surface Layer of Electrophotographic Photosensitive Member>

The surface of the surface layer 105 of the electrophotographic photosensitive member was photographed using a scanning electron microscope (SEM) ("S-4800," manufactured by JEOL Ltd.) at an accelerating voltage of 10 kV. A photographic image of the surface layer 105 of the electrophotographic photosensitive member of the present invention, magnified 30000 times, was captured by a scanner at three locations 50 mm from each end of the photosensitive drum 21 in the longitudinal direction and in the center, and at four locations 90 degrees each in the circumferential direction, for a total of 12 locations. Furthermore, image processing was performed on the particles PAA in the photographic images using an image processing analyzer ("LUZEX AP," manufactured by NIRECO Corporation), the average value of the circularities was calculated on 10 fields of view in total and defined as the circularity of the particles PAA.

<Measurement of Film Thickness of Each Layer>

The film thickness of each layer in the electrophotographic photosensitive members of the example and the comparative examples was obtained by a method in which an eddy current film thickness meter (Fischerscope, manufactured by Helmut Fischer GmbH) is used or a method in which the specific gravity is converted from the mass per unit area, except for the charge generation layer. The film thickness of the charge generation layer was measured by converting the Macbeth density value of the photosensitive member using a calibration curve acquired in advance from the Macbeth density value measured by pressing a spectrodensitometer (trade name: X-Rite 504/508, manufactured by X-Rite, Incorporated) against the surface of the photosensitive member and the film thickness value measured by cross-sectional SEM image observation.

<Manufacture of Electrophotographic Photosensitive Member>

The support, the conductive layer, the undercoating layer, the charge generation layer, the charge transport layer, and the surface layer 105 were produced by the following methods.

<Preparation of Coating Liquid 1 for Conductive Layer>

Anatase-type titanium oxide having an average primary particle diameter of 200 nm was used as a substrate, and a titanium niobium sulfate solution containing 33.7 parts of titanium in terms of $TiO_2$ and 2.9 parts of niobium in terms of $Nb_2O_5$ was prepared. 100 parts of the substrate was dispersed in pure water to produce 1000 parts of a suspension, and the suspension was heated to 60° C. The titanium niobium sulfate solution and 10 mol/L sodium hydroxide were added dropwise for three hours so that the pH of the suspension reached 2 to 3. After the total amount was added dropwise, the pH was adjusted to near neutral, and a polyacrylamide-based coagulant was added thereto to precipitate the solid content. The supernatant was removed, and the solid content was filtered, washed, and dried at 110° C., thereby obtaining an intermediate containing 0.1 wt % of an organic substance derived from the coagulant in terms of C. This intermediate was fired at 750° C. in nitrogen for one hour and then fired at 450° C. in the air, thereby producing titanium oxide particles. The resultant particles had an average primary particle diameter of 220 nm, which was measured by the above-described particle diameter measurement method in which a scanning electron microscope was used.

Subsequently, 50 parts of a phenolic resin (monomer/oligomer of a phenolic resin) as a binding material (trade name: Plyophen J-325, manufactured by DIC Corporation, resin solid content: 60%, density after curing: 1.3 g/$cm^2$) was dissolved in 35 parts of 1-methoxy-2-propanol as a solvent to obtain a solution.

60 Parts of titanium oxide particles 1 were added to this solution, the mixture was put into a vertical sand mill in which 120 parts of glass beads having a number-average primary particle diameter of 1.0 mm were used as a dispersion medium, and a dispersion treatment was performed for four hours under conditions of a dispersion liquid temperature of 23±3° C. and a rotation speed of 1500 rpm (circumferential speed of 5.5 m/s), thereby obtaining a dispersion. The glass beads were removed from this dispersion with a mesh. 0.01 parts of a silicone oil (trade name: SH28 PAINT ADDITIVE, manufactured by Dow Corning Toray Co., Ltd.) as a leveling agent, and 8 parts of silicone resin particles (trade name: KMP-590, manufactured by Shin-Etsu Chemical Co., Ltd., average primary particle diameter: 2 μm, density: 1.3 g/$cm^3$) as a surface roughness-imparting agent were added to the dispersion from which the glass beads had been removed, stirred, and pressure-filtered using PTFE filter paper (trade name: PF060, manufactured by Advantec Toyo Kaisha, Ltd.), thereby preparing a coating liquid 1 for the conductive layer.

<Preparation of Coating Liquid 1 for Undercoating Layer>

100 Parts of rutile-type titanium oxide particles (average primary particle diameter: 50 nm, manufactured by TAYCA Co., Ltd.) were stirred and mixed with 500 parts of toluene, 3.5 parts of vinyltrimethoxysilane (trade name: KBM-1003, manufactured by Shin-Etsu Chemical Co., Ltd.) were added thereto, and the mixture was dispersed for eight hours in a vertical sand mill in which glass beads having a diameter of 1.0 mm were used. After the glass beads were removed, the toluene was distilled away by vacuum distillation, and the remaining components were dried for three hours at 120° C., thereby obtaining rutile-type titanium oxide particles surface-treated with an organic silicon compound. When the volume of the resultant titanium oxide particles was represented by a, and the average primary particle diameter of the titanium oxide particles was represented by b [μm], a/b was 15.6. The value of a was obtained from a microscope image of a cross section of an electrophotographic photosensitive member photographed using a field emission scanning electron microscope (FE-SEM, trade name: S-4800, manufactured by Hitachi High-Tech Corporation) after the production of the electrophotographic photosensitive member.

18.0 Parts of the rutile-type titanium oxide particles surface-treated with an organosilicon compound, 4.5 parts of N-methoxymethylated nylon (trade name: TORESIN EF-30T, Nagase ChemteX Corporation), 1.5 parts of a copolymerized nylon resin (trade name: AMILAN CM8000, manufactured by Toray Industries, Inc.) were added to a mixed solvent of 90 parts of methanol and 60 parts of 1-butanol to prepare a dispersion.

This dispersion was dispersed for five hours in a vertical sand mill using glass beads having a diameter of 1.0 mm, and the glass beads were removed, thereby preparing a coating liquid 1 for the undercoating layer.

<Synthesis of Phthalocyanine Pigment>

Synthesis Example 1

100 g of gallium trichloride and 291 g of ortho-phthalonitrile were added to 1000 mL of α-chloronaphthalene under an atmosphere of a nitrogen flow and reacted at 200° C. for 24 hours, and the product was then filtered. The resultant wet cake was heated and stirred at a temperature of 150° C. for 30 min using N,N-dimethylformamide and then filtered. The resultant filtrate was washed with methanol and then dried, thereby obtaining a chlorogallium phthalocyanine pigment with a yield of 83%.

20 g of the chlorogallium phthalocyanine pigment obtained by the above-described method was dissolved in 500 mL of concentrated sulfuric acid, stirred for two hours, then, added dropwise to a mixed solution of 1700 mL of distilled water and 660 mL of concentrated aqueous ammonia that had been ice-cooled, and precipitated again. The precipitate was sufficiently washed with distilled water and dried, thereby obtaining a hydroxygallium phthalocyanine pigment.

<Preparation of Coating Liquid 1 for Charge Generation Layer>

0.5 parts of the hydroxygallium phthalocyanine pigment obtained in Synthesis Example 1, 7.5 parts of N,N-dimethylformamide (product code: D0722, manufactured by Tokyo Chemical Industry Co., Ltd.), and 29 parts of glass beads having a diameter of 0.9 mm were subjected to a milling treatment using a sand mill (BSG-20, manufactured by AIMEX Co., Ltd.) at a temperature of 25° C. for 24 hours. At this time, the disc was rotated 1500 times per minute as a condition. The liquid thus treated was filtered with a filter (product No.: N-NO.125T, pore diameter: 133 μm, manufactured by NBC Meshtec Inc.) to remove the glass beads. 30 Parts of N,N-dimethylformamide was added to this liquid, the liquid was then filtered, and the filtrate on the filter was sufficiently washed with n-butyl acetate. In addition, the washed filtrate was then dried in a vacuum to obtain 0.45 parts of the hydroxygallium phthalocyanine pigment. The resultant pigment contained N,N-dimethylformamide.

Subsequently, 20 parts of the hydroxygallium phthalocyanine pigment obtained by the milling treatment, 10 parts of polyvinyl butyral (trade name: S-LEC BX-1, manufactured by Sekisui Chemical Co., Ltd.), 190 parts of cyclohexanone, and 482 parts of glass beads having a diameter of 0.9 mm were dispersed for four hours under a cooling water temperature of 18° C. using a sand mill (K-800, manufactured by the former Igarashi Machine Production Co., Ltd. (AIMEX Co., Ltd.), disc diameter: 70 mm, the number of discs: five). At this time, the disc was rotated 1800 times per minute as a condition. The glass beads were removed from this dispersion, and 444 parts of cyclohexanone and 634 parts of ethyl acetate were added thereto, thereby preparing a coating liquid 1 for the charge generation layer.

<Preparation of Coating Liquid 1 for Charge Transport Layer>

Production Example of Charge Transport Layer 1

Next, the following materials were prepared to produce a mixed solvent.

Ortho-xylene: 25 parts by mass

Methyl benzoate: 25 parts by mass

Dimethoxymethane: 25 parts by mass

Furthermore, the following materials were dissolved in the mixed solvent to prepare a coating liquid 1 for the charge transport layer.

Charge transport substance represented by the following structural formula (C-1) (hole transporting substance): 5 parts by mass Charge transport substance represented by the following structural formula (C-2) (hole transporting substance): 5 parts by mass Polycarbonate (trade name: IUPILON Z400, manufactured by Mitsubishi Engineering-Plastics Corporation): 10 parts by mass A coating film was formed by dip coating of this coating liquid 1 for the charge transport layer on the charge generation layer 1, and the coating film was dried at a drying temperature of 40° C. for five minutes, thereby forming a charge transport layer 1 having a film thickness of 15 μm.

[Chem. 9]

[C-1]

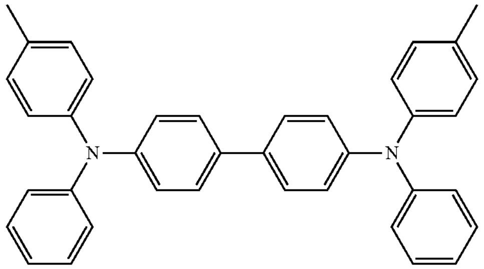

(CTM-1)

[C-2]

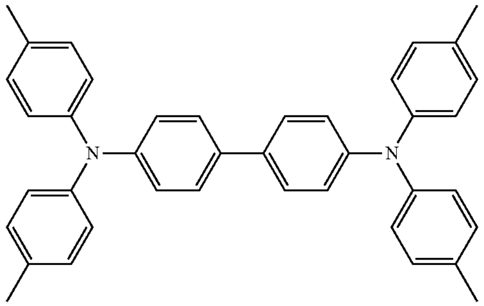

(CTM-2)

Production Example 1 of Surface Layer Containing Particles

The materials in Table 15 that served as particles PAA and particles PAB were prepared.

TABLE 15

| Particle | Product name | Manufacturer | Average primary particle size [nm] |
|---|---|---|---|
| 1 | QSG-170 | Shin-Etsu Chemical Co., Ltd. | 170 |
| 2 | QSG-80 | Shin-Etsu Chemical Co., Ltd. | 80 |
| 3 | QSG-30 | Shin-Etsu Chemical Co., Ltd. | 30 |
| 4 | QSG-100 | Shin-Etsu Chemical Co., Ltd. | 100 |
| 5 | QSG-10 | Shin-Etsu Chemical Co., Ltd. | 10 |
| 6 | KE-P50 | NIPPON SHOKUBAI CO., LTD. | 500 |
| 7 | Hydrotalcite | Kyowa Chemical Ind. Co., Ltd. | 250 |

<Preparation of Coating Liquid 1 for Surface Layer>

Particles PAA: Silica particles ("QSG-170," manufactured by Shin-Etsu Chemical Co., Ltd.): 2.5 parts by mass, particles PAB: Silica particles ("QSG-80," manufactured by Shin-Etsu Chemical Co., Ltd.): 2.5 parts by mass, a monomer 1 having a polymerizable functional group (structural formula (2-1)): 0.75 parts by mass, a monomer 2 having a polymerizable functional group (structural formula (3-1)): 0.75 parts by mass, a siloxane-modified acrylic compound (trade name: SYMAC US270, manufactured by Toagosei Co., Ltd.): 0.1 parts by mass, 1-propanol: 100.0 parts by mass, and cyclohexane: 100.0 parts by mass were mixed together and stirred for six hours with a stirring device to prepare a coating liquid 1 for the surface layer.

<Preparation of Coating Liquids 2 to 25 for Surface Layer>

Coating liquids 2 to 25 for the surface layer were adjusted in the same manner as in the preparation of the coating liquid 1 for the surface layer except that the types and amounts added of the particles PAA, the particles PAB, and other particles were changed as shown in Table 16.

TABLE 16

| | Monomer 1 | Monomer 2 | Particle PAA | | | Particle PAB | | | Other particles | | |
|---|---|---|---|---|---|---|---|---|---|---|---|
| Coating liquid | Amount added | Amount added | Kind | Specific gravity | Amount added | Kind | Specific gravity | Amount added | Kind | Specific gravity | Amount added |
| 1 | 0.75 | 0.75 | 1 | 1.8 | 2.5 | 2 | 1.8 | 2.5 | — | — | — |
| 2 | 0.75 | 0.75 | 1 | 1.8 | 4.2 | 2 | 1.8 | 0.8 | — | — | — |
| 3 | 0.75 | 0.75 | 1 | 1.8 | 0.8 | 2 | 1.8 | 4.2 | — | — | — |
| 4 | 0.75 | 0.75 | 1 | 1.8 | 1.5 | 2 | 1.8 | 1.5 | — | — | — |
| 5 | 1.25 | 1.25 | 1 | 1.8 | 2.5 | 2 | 1.8 | 2.5 | — | — | — |
| 6 | 0.75 | 0.75 | 1 | 1.8 | 2.5 | 2 | 1.8 | 2.5 | 7 | 1.8 | 0.2 |
| 7 | 0.75 | 0.75 | 8 | 2.0 | 5.0 | 2 | 1.8 | 2.5 | — | — | — |
| 8 | 0.75 | 0.75 | 4 | 1.8 | 2.5 | 3 | 1.8 | 2.5 | — | — | — |
| 9 | 0.75 | 0.75 | 6 | 1.8 | 2.5 | 5 | 1.8 | 2.5 | — | — | — |
| 10 | 0.75 | 0.75 | 1 | 1.8 | 2.5 | 2 | 1.8 | 2.5 | — | — | — |
| 11 | 0.75 | 0.75 | 1 | 1.8 | 4.2 | 2 | 1.8 | 0.8 | — | — | — |
| 12 | 0.75 | 0.75 | 1 | 1.8 | 0.8 | 2 | 1.8 | 4.2 | — | — | — |
| 13 | 2.50 | 2.50 | 1 | 1.8 | 5.0 | 2 | 1.8 | 5.0 | — | — | — |
| 14 | 1.50 | 1.50 | 1 | 1.8 | 5.0 | 5 | 1.8 | 5.0 | — | — | — |
| 15 | 1.50 | 1.50 | 8 | 2.0 | 10.0 | 2 | 1.8 | 5.0 | — | — | — |
| 16 | 1.50 | 1.50 | 4 | 1.8 | 10.0 | 3 | 1.8 | 5.0 | — | — | — |
| 17 | 1.50 | 1.50 | 6 | 1.8 | 5.0 | 5 | 1.8 | 5.0 | — | — | — |

TABLE 16-continued

| | Monomer 1 | Monomer 2 | Particle PAA | | | Particle PAB | | | Other particles | | |
|---|---|---|---|---|---|---|---|---|---|---|---|
| Coating liquid | Amount added | Amount added | Kind | Specific gravity | Amount added | Kind | Specific gravity | Amount added | Kind | Specific gravity | Amount added |
| 18 | 0.75 | 0.75 | 1 | 1.8 | 4.0 | 2 | 1.8 | 4.6 | — | — | — |
| 19 | 0.75 | 0.75 | 1 | 1.8 | 10.0 | 2 | 1.8 | 1.2 | — | — | — |
| 20 | 1.50 | 1.50 | 1 | 1.8 | 8.0 | 2 | 1.8 | 8.0 | — | — | — |
| 21 | 0.75 | 0.75 | 1 | 1.8 | 2.5 | 2 | 1.8 | 2.5 | 7 | 1.8 | 5.0 |
| 22 | 0.75 | 0.75 | 3 | 1.8 | 3.8 | 5 | 1.8 | 5.0 | — | — | — |
| 23 | 0.75 | 0.75 | 1 | 1.8 | 1.0 | 2 | 1.8 | 1.0 | — | — | — |
| 24 | 1.50 | 1.50 | 1 | 1.8 | 2.5 | 2 | 1.8 | 2.5 | 7 | 1.8 | 2.5 |
| 25 | 1.50 | 1.50 | 1 | 1.8 | 2.5 | 2 | 1.8 | 2.5 | — | — | — |

In the table, "Coating liquid" means "Coating liquid for surface layer". "Monomer 1/2" means "Monomer 1/2 having polymerizable functional group". "Kind" means "Kind of particle".

Production Example of Photosensitive Drum 1

<Support>

An aluminum cylinder having a diameter of 24 mm and a length of 257 mm was used as a support (cylindrical support).

<Conductive Layer>

A coating film was formed by dip coating of the coating liquid 1 for the conductive layer on the above-described support, and the coating film was heated and cured at 150° C. for 30 minutes, thereby forming a conductive layer having a film thickness of 22 μm.

<Undercoating Layer>

A coating film was formed by dip coating of the coating liquid 1 for the undercoating layer on the above-described conductive layer, and the coating film was heated and cured at 100° C. for 10 minutes, thereby forming an undercoating layer having a film thickness of 1.8 μm.

<Charge Generation Layer>

A coating film was formed by dip coating of the coating liquid 1 for the charge generation layer on the above-described undercoating layer, and the coating film was heated and dried at a temperature of 100° C. for 10 minutes, thereby forming a charge generation layer having a film thickness of 0.20 μm.

<Charge Transport Layer>

A coating film was formed by dip coating of the coating liquid 1 for the charge transport layer on the above-described charge generation layer, and the coating film was heated and dried at a temperature of 120° C. for 30 minutes, thereby forming a charge transport layer having a film thickness of 21 μm.

<Surface Layer>

A coating film was formed by dip coating of the coating liquid 1 for the surface layer on the charge transport layer, and the coating film was warmed at a temperature of 50° C. for five minutes. The coating film was then irradiated with an electron beam for 2.0 seconds while the support (object to be irradiated) was rotated at a speed of 300 rpm under a nitrogen atmosphere under conditions of an accelerating voltage of 65 kV and a beam current of 5.0 mA. The dose was 15 kGy. After that, the temperature of the coating film was raised to 120° C. under a nitrogen atmosphere. The oxygen concentration from the electron beam irradiation to the subsequent heating treatment was 10 ppm.

Next, the coating film was naturally cooled in the atmosphere until the temperature reached 25° C. and then heated for 30 minutes under a condition that the temperature of the coating film reached 120° C. to form a surface layer 105 having a film thickness of 1.0 μm. The physical properties of the resultant electrophotographic photosensitive member are shown in Table 17.

Production Examples of Electrophotographic Photosensitive Members 2 to 25

Electrophotographic photosensitive members 2 to 25 were produced in the same manner as in the production of the electrophotographic photosensitive member 1 except that the coating liquid 1 for the surface layer was changed as shown in Table 16 in the production of the electrophotographic photosensitive member 1. The physical properties of the resultant electrophotographic photosensitive members 2 to 25 are shown in Table 17.

TABLE 17

| PD No. | Coating liquid | Lamination state | DA [nm] | Average distance [nm] | Standard deviation [nm] | S1/ (S1 + S2) | Thickness T [nm] | DB/ DA | DB [nm] | Proportion of number | Half width | Circularity | Content rate [% by volume] |
|---|---|---|---|---|---|---|---|---|---|---|---|---|---|
| 1 | 1 | S | 170 | 200 | 100 | 0.90 | 100 | 0.47 | 80 | 96 | 30 | 0.98 | 65% |
| 2 | 2 | S | 170 | 170 | 85 | 0.90 | 100 | 0.47 | 80 | 95 | 30 | 0.98 | 65% |
| 3 | 3 | S | 170 | 480 | 240 | 0.90 | 100 | 0.47 | 80 | 95 | 30 | 0.98 | 65% |
| 1 | 4 | S | 170 | 320 | 160 | 0.73 | 100 | 0.47 | 80 | 95 | 30 | 0.98 | 53% |
| 5 | 5 | S | 170 | 250 | 125 | 0.73 | 167 | 0.47 | 80 | 95 | 30 | 0.98 | 53% |
| 6 | 6 | S | 170 | 350 | 175 | 0.90 | 100 | 0.47 | 80 | 94 | 30 | 0.98 | 65% |
| 7 | 7 | S | 170 | 450 | 225 | 1.00 | 100 | 0.32 | 80 | 95 | 60 | 0.85 | 72% |
| 8 | 8 | S | 100 | 250 | 125 | 0.90 | 100 | 0.06 | 10 | 96 | 30 | 0.98 | 65% |
| 9 | 9 | S | 320 | 250 | 125 | 0.90 | 100 | 0.47 | 80 | 94 | 30 | 0.98 | 65% |
| 10 | 10 | M | 170 | 200 | 100 | 1.00 | 100 | 0.47 | 80 | 95 | 30 | 0.98 | 65% |
| 11 | 11 | M | 170 | 170 | 85 | 1.00 | 100 | 0.47 | 80 | 96 | 30 | 0.98 | 65% |
| 12 | 12 | M | 170 | 480 | 240 | 1.00 | 100 | 0.47 | 80 | 94 | 30 | 0.98 | 65% |

TABLE 17-continued

| PD No. | Coating liquid | Lamination state | DA [nm] | Average distance [nm] | Standard deviation [nm] | S1/ (S1 + S2) | Thickness T [nm] | DB/ DA | DB [nm] | Proportion of number | Half width | Circularity | Content rate [% by volume] |
|---|---|---|---|---|---|---|---|---|---|---|---|---|---|
| 13 | 13 | M | 170 | 250 | 125 | 1.00 | 333 | 0.47 | 80 | 94 | 30 | 0.98 | 53% |
| 14 | 14 | M | 170 | 200 | 100 | 1.00 | 200 | 0.06 | 10 | 95 | 30 | 0.98 | 65% |
| 15 | 15 | M | 170 | 450 | 225 | 1.00 | 200 | 0.32 | 80 | 95 | 60 | 0.85 | 72% |
| 16 | 16 | M | 100 | 250 | 125 | 1.00 | 200 | 0.59 | 100 | 95 | 30 | 0.98 | 74% |
| 17 | 17 | M | 320 | 250 | 125 | 1.00 | 200 | 0.47 | 80 | 95 | 30 | 0.98 | 65% |
| 18 | 18 | S | 170 | 550 | 165 | 0.85 | 100 | 0.16 | 80 | 95 | 88 | 0.98 | 79% |
| 19 | 19 | S | 170 | 350 | 175 | 0.59 | 100 | 0.47 | 80 | 94 | 30 | 0.98 | 66% |
| 20 | 20 | M | 100 | 550 | 275 | 1.00 | 200 | 0.47 | 80 | 95 | 30 | 0.98 | 48% |
| 21 | 21 | S | 500 | 550 | 165 | 0.91 | 100 | 0.33 | 10 | 94 | 5 | 0.98 | 66% |
| 22 | 22 | S | 30 | 100 | 50 | 0.85 | 100 | 0.30 | 30 | 95 | 18 | 0.98 | 79% |
| 23 | 23 | S | 170 | 600 | 300 | 0.59 | 100 | 0.47 | 80 | 80 | 30 | 0.98 | 43% |
| 24 | 24 | M | 500 | 550 | 165 | 1.00 | 200 | 0.16 | 80 | 95 | 88 | 0.98 | 65% |
| 25 | 25 | M | 30 | 100 | 50 | 1.00 | 200 | 0.30 | 30 | 95 | 18 | 0.98 | 79% |

In the table, "PD No." means "Electrophotographic photosensitive member". "Coating liquid" means "Surface layer coating liquid used for production". "Lamination state" means "Lamination state upon cross-sectional observation". "S/M" means "Single layer/Multiple layers". "DA" means "Particle diameter DA for peak top of PAA". "Average distance" means "Average value of distances between centers of convex portions CA". "Standard deviation" means "Standard deviation of distances between centers of convex portions CA". "Thickness T" means "Average film thickness T". "DB" means "Particle diameter DB for peak top of PAB". "Proportion of number" means "Proportion of number of convex portions derived from particles PAA in convex portions CA". "Half width" means "Half width of distribution of PAA". "Circularity" means "Circularity of particle PAA". "Content rate" means "Content rate of particles in surface layer [% by volume]".

Next, a developer, a toner, and transfer accelerating particles used in the present examples will be described in detail.

(Developer)

In the present example, a mixture of a toner and an external additive A, which is transfer accelerating particles, was used as a developer. The transfer accelerating particle refers to a particle that is interposed between the toner and other members and has a role of reducing the adhesive force.

The number average particle diameter R of the primary particles of the external additive A is preferably at least 30 nm and not more than 1000 nm. When R is 30 nm or more, it is easy to develop a spacer effect between the developer and other members. On the other hand, when R is too large, the transfer accelerating particles are likely to be affected by an electrostatic force that is generated by the potential difference between a developing roller 41 and the photosensitive drum 1. Therefore, in a case where the transfer accelerating particles have been negatively charged, the transfer accelerating particles are attracted to the developing roller 41 by an electrostatic force, and it becomes difficult to supply the transfer accelerating particles from the toner on the developing roller 41 to the photosensitive drum 1. Therefore, the particle diameters of the transfer accelerating particles are preferably 1000 nm or less at which the transfer accelerating particles are less likely to be affected by an electrostatic force. The particle diameters are more preferably at least 40 nm and not more than 400 nm. The particle diameters are still more preferably at least 50 nm and not more than 200 nm.

The external additive A is not particularly limited as long as the number average particle diameter R of the primary particles is at least 30 nm and not more than 1000 nm, and various organic fine particles or inorganic fine particles can be used. The external additive A preferably contains silica fine particles since the external additive A is easily imparted with fluidity and is easily negatively charged like the toner base particles. The content of the silica fine particles in the external additive A is preferably 50% by mass or more, and the external additive A is more preferably silica fine particles.

Examples of the organic fine particles or inorganic fine particles other than silica fine particles include the following particles.

(1) Fluidity-imparting agent: Alumina fine particles, titanium oxide fine particles, carbon black, and carbon fluoride.

(2) Abrasive: Fine particles of a metal oxide (fine particles of strontium titanate, cerium oxide, alumina, magnesium oxide, chromium oxide, or the like), fine particles of a nitride (fine particles of silicon nitride or the like), fine particles of a carbide (fine particles of silicon carbide or the like), and fine particles of a metal salt (fine particles of calcium sulfate, barium sulfate, calcium carbonate, or the like).

(3) Lubricants: Fine particles of a fluororesin (fine particles of vinylidene fluoride, polytetrafluoroethylene, or the like) and fine particles of a fatty acid metal salt (fine particles of zinc stearate, calcium stearate, or the like).

(4) Charge-controllable fine particles: Fine particles of a metal oxide (fine particles of tin oxide, titanium oxide, zinc oxide, alumina, or the like) and carbon black.

The silica fine particles and the organic fine particles or the inorganic fine particles may be used after a hydrophobic treatment in order for improvement in toner fluidity and uniform charging of the toner particle.

Examples of a treatment agent for the hydrophobic treatment include unmodified silicone varnishes, various modified silicone varnishes, unmodified silicone oils, various modified silicone oils, silane compounds, silane coupling agents, other organic silicon compounds, and organic titanium compounds. These treatment agents may be used singly or jointly used.

Known silica fine particles can be used as the silica fine particles, and any of dry silica fine particles or wet silica fine particles may be used. Preferably, fine particles of wet silica obtained by a sol-gel method (hereinafter also referred to as sol-gel silica) are preferable.

Figure 33:
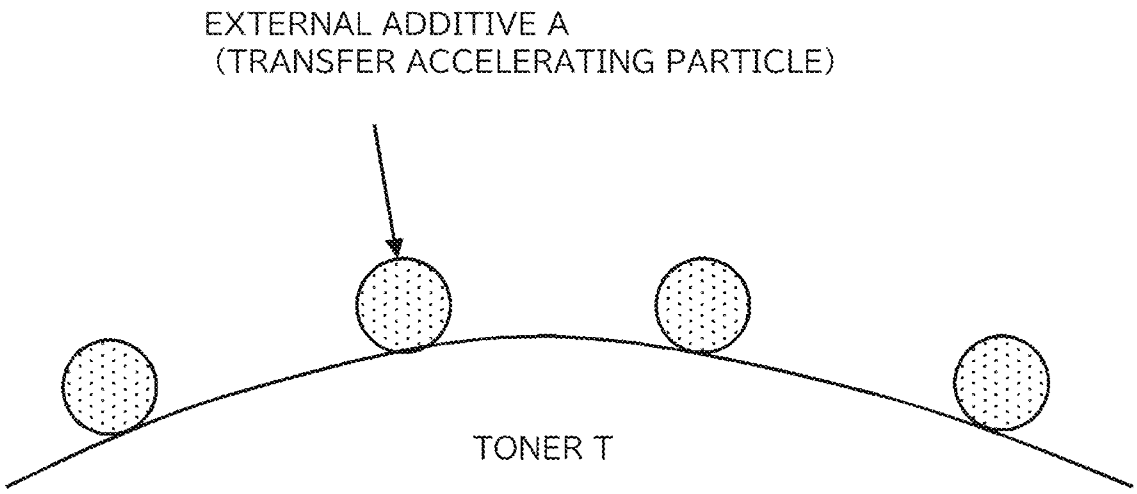
FIG. 33 is a schematic diagram of a toner and transfer accelerating particles in Example 1.

FIG. 33 is an enlarged view of the developer used in the present example. As shown in FIG. 33, the developer of the present example contains the external additive A, which is the transfer accelerating particles, disposed on the surface of the toner T.

The number of the transfer accelerating particles that coat the toner is preferably large from the viewpoint of reducing the adhesive force. However, when the amount of the transfer accelerating particles added is too large, the risk of contamination of members in the image forming apparatus

100 is increased, and the amount is thus preferably adjusted in accordance with the configuration.

(Method for Measuring Number Average Particle Diameter R of Primary Particles of External Additive)

The toner is observed in a field of view enlarged to a maximum of 50,000 times using a scanning electron microscope "Hitachi ultra-high resolution field emission scanning electron microscope S-4800" (Hitachi High-Tech Corporation), and the external additive particles are photographed. 100 external additive particles are randomly selected from the photographed image, the major axes of the primary particles of the target external additive particles are measured, and the arithmetic average value thereof is regarded as the number average particle diameter R. The observation magnification is suitably adjusted depending on the size of the external additive particles.

Manufacture Example of Toner Particle 1

<Preparation of Aqueous Medium 1>

650.0 parts of ion exchanged water and 14.0 parts of sodium phosphate (manufactured by RASA Industries, Ltd., dodecahydrate) were injected into a reaction vessel equipped with a stirrer, a thermometer, and a return tube and kept warm at 65° C. for 1.0 hour under nitrogen purge.

A calcium chloride aqueous solution containing 9.2 parts of calcium chloride (dihydrate) dissolved in 10.0 parts of ion exchanged water was collectively injected while being stirred at 15000 rpm using a T.K.homomixer (manufactured by Tokushu Kika Kogyo Co., Ltd.), and an aqueous medium containing a dispersion stabilizer was prepared. Furthermore, 10% by mass of hydrochloric acid was injected into the aqueous medium, and the pH was adjusted to 5.0, thereby obtaining an aqueous medium 1.

<Preparation of Polymerizable Monomer Composition>

Styrene: 60.0 parts

C.I. pigment Blue 15:3:6.5 parts by mass

The materials were injected into an attritor (manufactured by Mitsui Miike Machinery Company, Limited) and further dispersed at 220 rpm for 5.0 hours using zirconia particles having a diameter of 1.7 mm, and the zirconia particles were then removed, thereby preparing a colorant dispersion.

Incidentally,

Styrene: 20.0 parts by mass n-butyl acrylate: 20.0 parts by mass

Cross-linking agent (divinylbenzene): 0.3 parts by mass

Saturated polyester resin: 5.0 parts by mass (a polycondensate of propylene oxide-modified bisphenol A (2 mol adduct) and terephthalic acid (molar ratio=10:12), the glass transition temperature (Tg) was 68° C., the weight-average molecular weight (Mw) was 10,000, and the molecular weight distribution (Mw/Mn) was 5.12)

Fischer-Tropsch wax (melting point 78° C.): 7.0 parts by mass

The materials were added to the colorant dispersion, heated at 65° C., and then uniformly dissolved and dispersed at 500 rpm using a T.K.homomixer (manufactured by Tokushu Kika Kogyo Co., Ltd.) to prepare a polymerizable monomer composition.

<Granulation Step>

The polymerizable monomer composition was injected into the aqueous medium 1 while the temperature of the aqueous medium 1 was adjusted to 70° C. and the rotation speed of the T.K.homomixer was maintained at 15000 rpm, and 10.0 parts by mass of t-butyl peroxypivalate as a polymerization initiator were added thereto. While the rotation speed was maintained as it was at 15000 rpm in the stirring device, the polymerizable monomer composition was granulated for 10 minutes.

<Polymerization Step and Distillation Step>

After the granulation step, the stirrer was replaced with a propeller stirring blade, the polymerizable monomer composition was held at 70° C. while being stirred at 150 rpm, polymerized for 5.0 hours, and further held for 2.0 hours at a temperature raised to 85° C., thereby performing polymerization. After that, the return tube of the reaction vessel was replaced with a cooling tube, and the resultant slurry was heated up to 100° C., whereby distillation was performed for six hours to distill away an unreacted polymerizable monomer, and a resin particle dispersion was obtained.

(Washing Step and Drying Step)

The resin particle dispersion was cooled, hydrochloric acid was added to the resin particle dispersion to adjust the pH to 1.5 or lower, and left to stand for 1.0 hour while being stirred. After that, the resin particle dispersion was separated into solid and liquid with a pressure filter, and a toner cake was obtained. The resultant toner cake was reslurried with ion exchanged water to produce a dispersion again, and the dispersion was then separated into solid and liquid with the filter to obtain a toner cake. The resultant toner cake was moved to a constant temperature bath (40° C.), and dried and classified for 72 hours, thereby obtaining a toner particle.

Manufacture Example of External Additive A

The external additive A was manufactured as described below. 150 parts of 5% ammonia water was put into a 1.5 L glass reaction vessel equipped with a stirrer, a dripping nozzle, and a thermometer to produce an alkali catalyst solution. After the alkali catalyst solution was adjusted to 50° C., 100 parts of tetraethoxysilane and 50 parts of 5% ammonia water were simultaneously added dropwise under stirring, and reacted for eight hours to obtain a silica fine particle dispersion. After that, the resultant silica fine particle dispersion was dried by spray drying and broken with a pin mill to obtain silica fine particles having a number average particle size of primary particles of 100 nm as the external additive A. Here, the external additives A (R=100 nm) and an external additive B (R=10 nm) having different number average particles R of the primary particles were obtained by changing the manufacturing conditions as appropriate.

Manufacture Example of Developer 100.00 parts of the toner particle 1 and 1.00 parts of the external additive A and the external additive B were injected into a Henschel mixer (FM10C type, manufactured by Nippon Coke & Engineering Co., Ltd.) having 7° C. water passed through in the jacket. Next, the water temperature in the jacket was stabilized at 7° C.±1° C., and the components were mixed together for 10 minutes at the circumferential speed of the rotating blade set to 38 m/sec. During the mixing, the amount of water passed through in the jacket was adjusted as appropriate so that the temperature in the bath of the Henschel mixer did not exceed 25° C. The resultant mixture was sieved with a mesh having an opening of 75 μm to obtain a developer.

The physical properties of the developer are shown in Table 18.

TABLE 18

| Developer | Number average particle diameter D1 | Number average particle diameter R of primary particles of external additive |
|---|---|---|
| 1 | 5.5 μm | 10 nm (External additive B) |
| 2 | 5.5 μm | 100 nm (External additive A) + 10 nm (External additive B) |

The external additive B is externally added for the purpose of improving the fluidity of the developer.

As a result of observing the manufactured developer using SEM, it was possible to confirm that the external additive was disposed as transfer accelerating particles on the toner particle. The average coating numbers of the external additives per toner particle were about 500 for the external additive B in the developer 1 and about 500 for the external additive A and about 500 for the external additive B in the developer 2.

(Verification Experiment)

Next, the results of comparison between the amount of the developer adhering to the charging roller and the influence on the image in the comparative example and the present example, which was performed to verify the effect of the present example, will be described. The verified configurations are shown in Table 19.

TABLE 19

| | Toner particle | External additive |
|---|---|---|
| Comparative Example (Developer 1) | 1 | External additive B |
| Present Example (Developer 2) | 1 | External additive A + External additive |

What is different between the comparative example and the present example is the particle diameter of the external additive. In the comparative example, an image is formed using the developer 1 in which only the external additive B (R=10 nm) has been externally added to the toner particle 1, and in the present example, an image is formed using the developer 2 in which the external additive A (R=100 nm) and the external additive B (R=10 nm) have been externally added to the toner particle 1.

Figure 34:
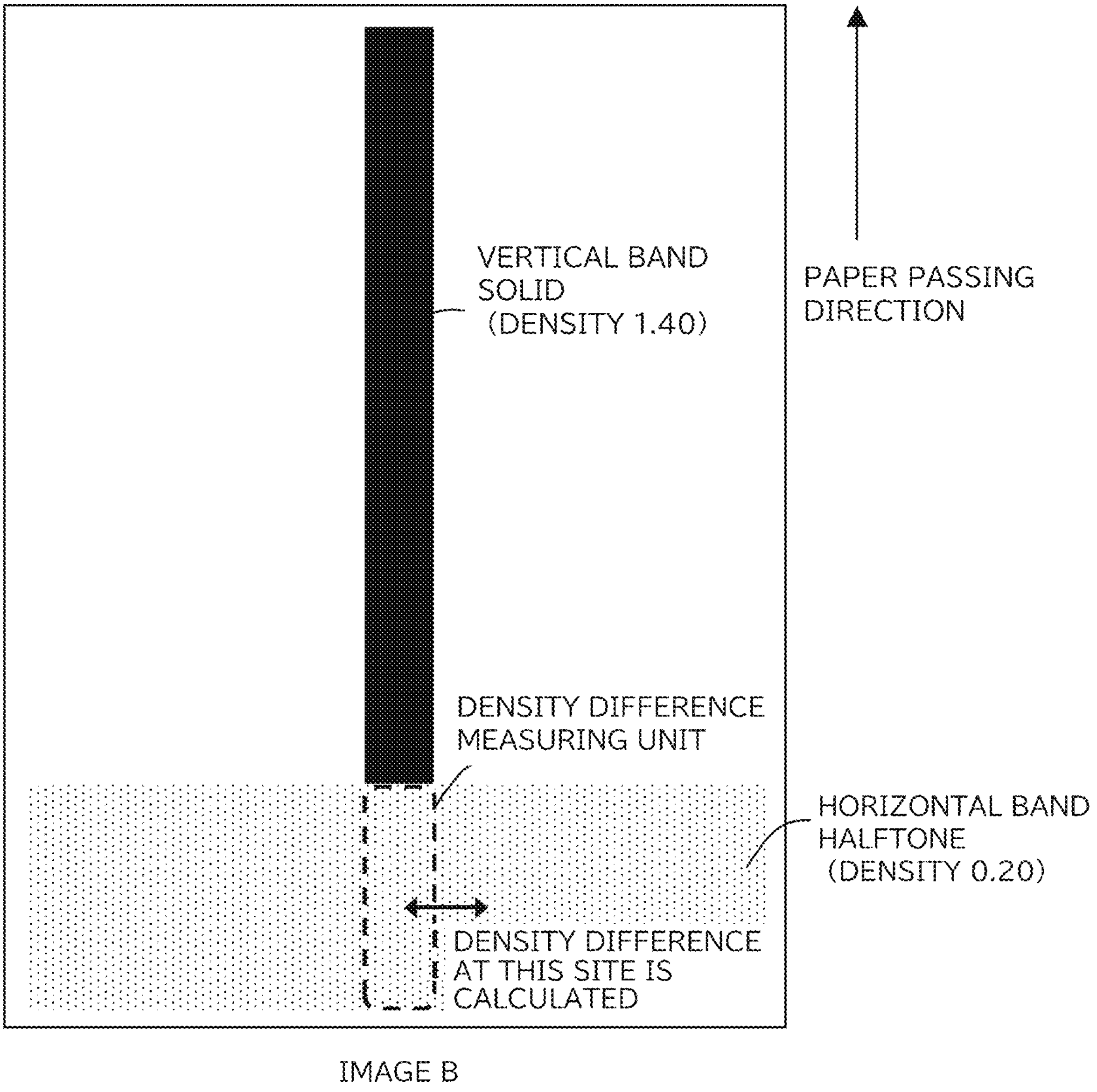
FIG. 34 is an image used for effect verification in Example 1.

An image B that passes through paper is shown in FIG. 34. The image is a combination of a vertical band solid image (density 1.40) of cyan (C) and a horizontal band halftone image (density 0.20). As a densitometer, X-Rite 504A (X-Rite, Incorporated) is used. The measurement color mode is all, and the density measurement status is A.

In the portion where the vertical band solid image is formed, the transfer residual toner adheres to the charging roller 2. As a result, the charging performance of the charging roller 2 changes stepwise. In a first stage where the transfer residual toner begins to adhere to the charging roller 2, charges (discharge) concentrate in a portion of the charging roller 2 visible through the gap of the portion to which the transfer residual toner adheres, and the potential of the photosensitive drum 1 becomes high. Subsequently, in a second stage where the amount of the residual transfer toner adhering to the charging roller 2 increases and the charging roller 2 is covered with the residual transfer toner, the charging performance deteriorates, and the potential of the photosensitive drum 1 thus becomes low. In the case of a test of feeding about 50 sheets of paper as described below in the present example, the test continues in a state where the amount of the transfer residual toner is small, and the photosensitive drum remains in a state where the potential has become high as in the first stage and does not reach the second stage. When the potential of the photosensitive drum 1 is higher than normal at the time of forming an electrostatic latent image with the exposure unit 3 as described above, since the potential of the electrostatic latent image also becomes higher than normal, the amount of the image that is developed by the developer decreases, and the density of the image thus becomes light. It is needless to say that what has described above also depends on the conditions, and the test may continue from the first stage to the second stage.

In particular, a halftone image is easily affected by a change in image density arising from a change in potential. In the present example, the horizontal band halftone image was formed after the vertical band solid image. In addition, the densities of a vertical band solid part (a part surrounded by the broken line) where the transfer residual toner adhered to the charging roller 2 and a horizontal band halftone part where the transfer residual toner does not adhere were measured. In addition, a difference therebetween was picked up, whereby the influence of transfer residue adhering to the charging roller 2 on the density was confirmed.

This image B was continuously passed through 50 sheets of A4 paper (GF-C081, Canon Marketing Japan Inc.) and changes in density difference were compared between the comparative example and the present example. In addition, after the image was passed through the paper, a photograph of a vertical band solid forming part of the charging roller 2 was photographed, and the adhesion states of the developer were compared. In such an example, the amount of the transfer residual toner is relatively small, and for example, the fog density is about 5%. One example of a method for measuring the fog density will be described. First, the image forming apparatus is stopped after the vertical band solid image of FIG. 34 passes through the primary transfer portion. In addition, the vertical band solid image remaining on the photosensitive drum 1 is taped with polyester tape No. 5511 (Nichiban Co., Ltd.) and pasted onto A4 paper (GF-C081, Canon Marketing Japan Inc.). Next, the vertical band solid image portion on the polyester tape No. 5511 pasted onto GF-C081 is measured with an amber filter of a reflectometer TC-6DS/A30 (Tokyo Denshoku Co., Ltd.) to obtain a first reflection density value. Next, new polyester tape No. 5511 is pasted to GF-C081, and the vertical band solid image portion is measured with the reflectometer TC-6DS/A30 to obtain a normal reflection density value (second reflection density value) of the polyester tape No. 5511. Finally, the first reflection density value is subtracted from the second reflection density value, thereby obtaining the fog density.

Figure 35:
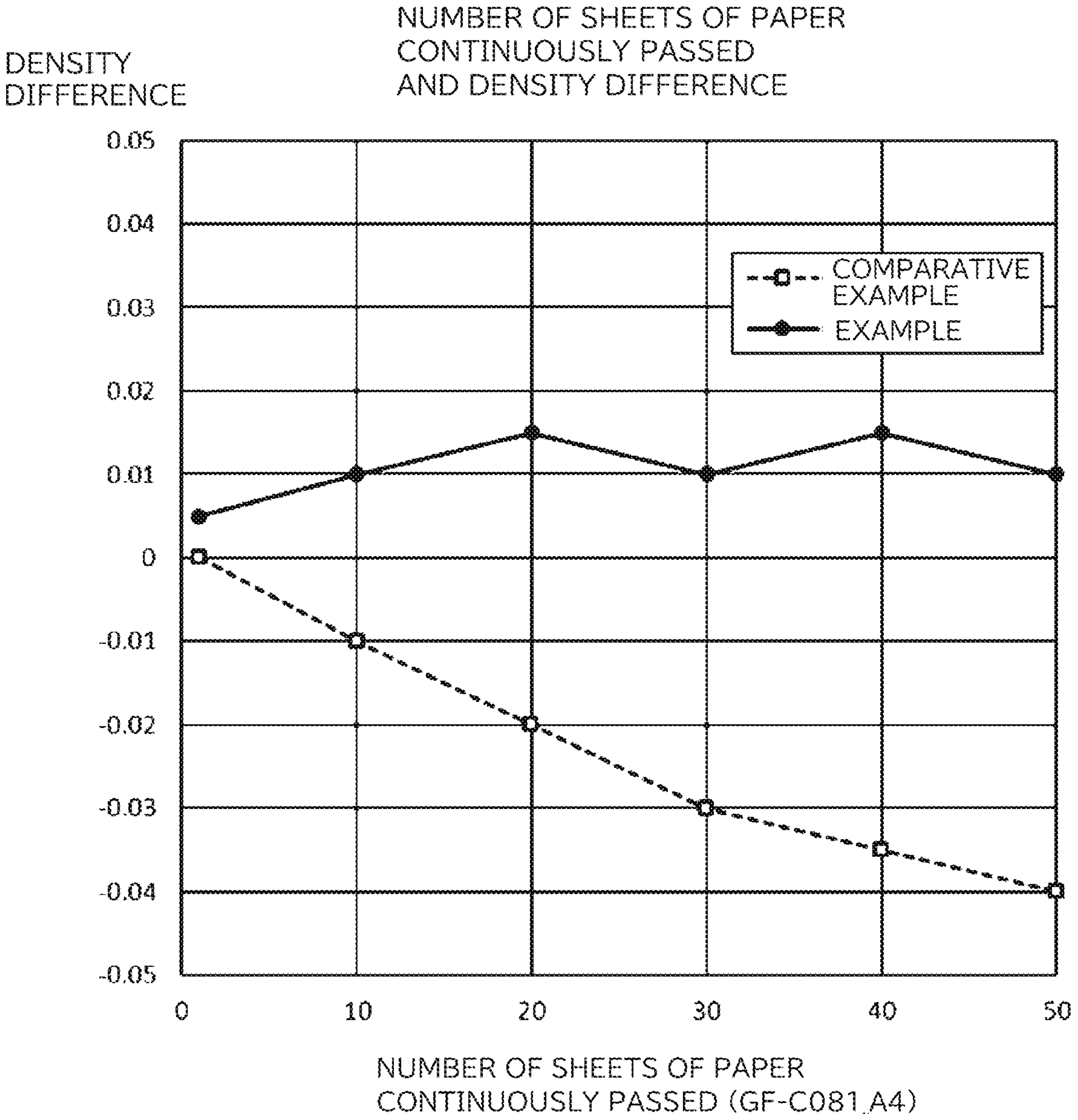
FIG. 35 is the results of effect verification of concentration changes in Example 1.

FIG. 35 shows the measurement results of the density difference between the vertical band solid part and a part other than the vertical band solid part when 50 sheets of paper are continuously passed. The density difference is the result of subtracting the density of the part other than the vertical band solid part from the density of the vertical band solid part. For example, when the density of the horizontal band halftone of the vertical band solid part where the developer adheres to the charging roller 2 becomes lighter than that of the horizontal band halftone of the part other than the vertical band solid part, the density difference becomes negative. The dotted line represents the comparative example, and the solid line represents the present example. In the comparative example, it is found that the density difference negatively increases as the paper is continuously passed. In the present example, it is found that the density difference does not become negative as the paper is continuously passed but becomes slightly positive. Here, according the inventors' studies, it has been found that when the density difference between the vertical band solid part and the part other than the vertical band solid is within ±0.02, a defect is rarely recognized on the printed image. Therefore, it is found that, unlike in the case of the comparative example, an image defect can be suppressed by the configuration of the present example.

Figure 36A:
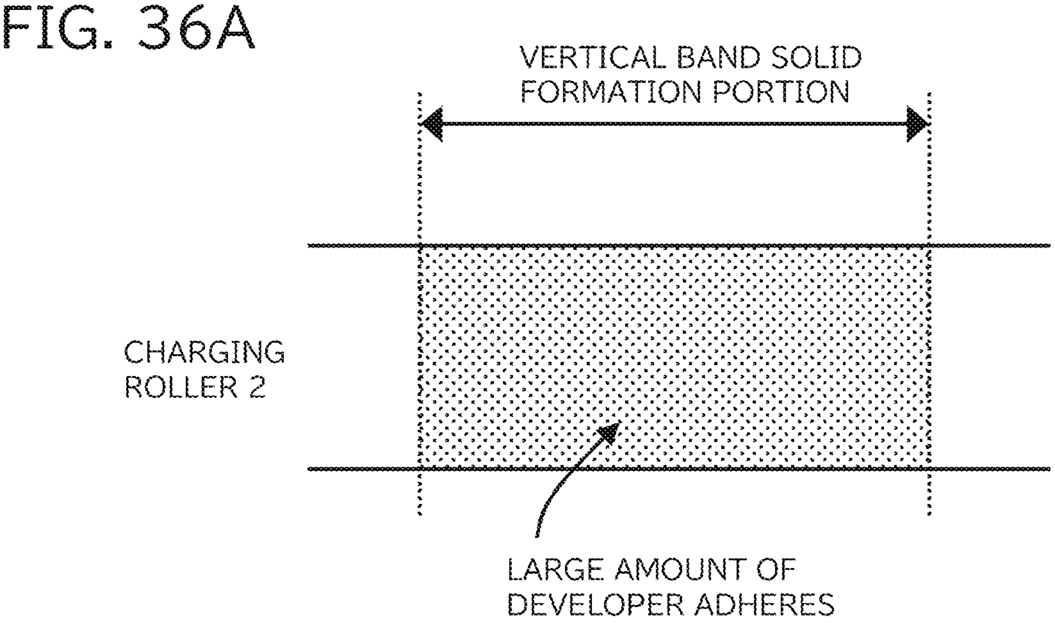
FIGS. 36A and 36B are views showing the amount of a developer adhering to a charging roller 2 in Example 1.
Figure 36B:
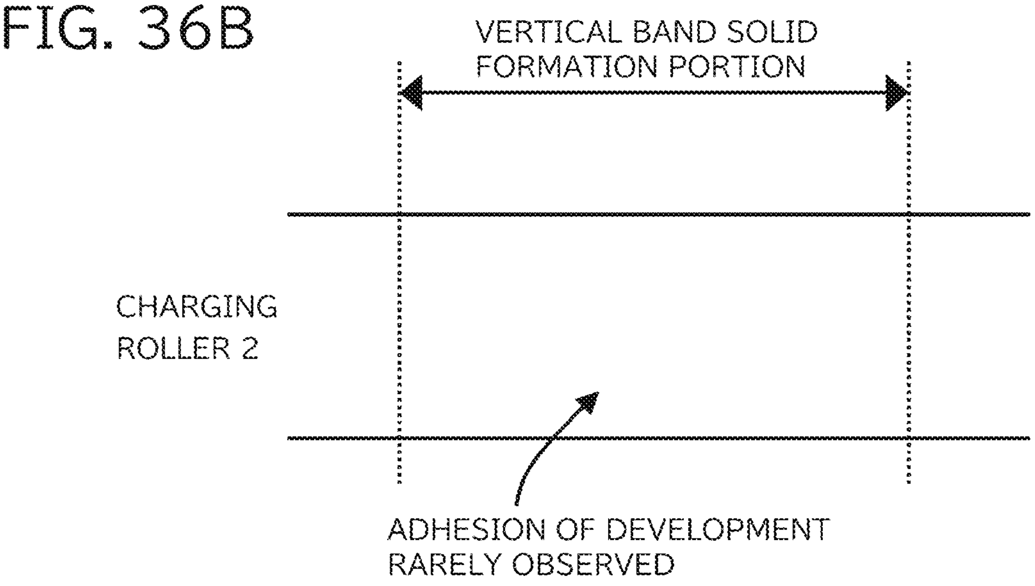

FIGS. 36A and 36B shows a schematic diagram of the results of photographing photographs in the vicinity of the vertical band solid part of the charging roller 2 in the comparative example (FIG. 36A) and the example (FIG. 36B) after 50 sheets of paper are continuously passed. In the comparative example, the cyan (C) developer of the transfer residual toner adheres to the vertical band solid part of the charging roller 2, whereas in the present example, the developer of the transfer residual toner rarely adheres thereto.

The reason for obtaining the above-described results is assumed as described below.

In the comparative example, the adhesive force between the photosensitive drum 1 and the developer 1 is reduced by the effect of the particles on the surface layer 105 of the photosensitive drum 1. However, since the external additive B has a particle diameter of as small as 10 nm and is hidden in the unevenness on the surface of the toner particle 1, the area where the surface of the toner particle 1 and the surface of the charging roller 2 come into contact with each other increases, the adhesive force between the charging roller 2 and the developer 1 is not reduced, and the developer 1 adheres to the charging roller 2 as the paper passes through. Therefore, the density difference negatively increases as the paper passes through. In contrast, in the present example, the external additive A has a particle diameter of 100 nm and is thus not hidden in the unevenness on the surface of the toner particle 1, and not only the adhesive force between the photosensitive drum 1 and the developer 2 but also the adhesive force between the charging roller 2 and the developer 2 are reduced. Since the external additive A is interposed between the developer 2 and the charging roller 2, the adhesion of the developer 2 to the charging roller 2 is suppressed. Therefore, the density difference does not become negative as the paper passes through. Instead, the transfer residual toner that could not be collected by the developing roller 41 is transferred to the horizontal band halftone, and the density difference thus becomes slightly positive.

The calculation results of the adhesive force with reference to when the above-described assumption was reached will be described below.

Examples of representative forces acting on the developer, which is particles, include an electrostatic force, gravity, the van der Waals (intermolecular) force, a liquid cross-linking force, and the like. Since it is extremely difficult to quantitatively measure and calculate these forces, here, the Coulombic force and the van der Waals (intermolecular) force are qualitatively calculated as an electrostatic force and a non-electrostatic force, respectively, and referred to for mechanism assumption.

Figure 37A:
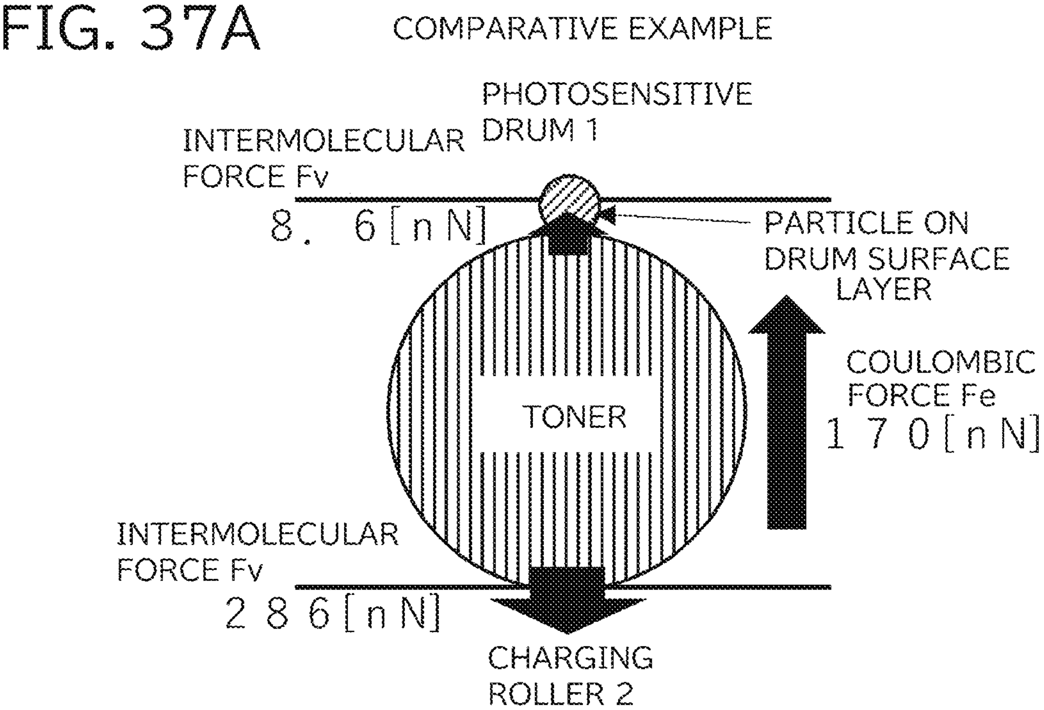
FIGS. 37A and 37B are views for describing the mechanism of verification results in Example 1.
Figure 37B:
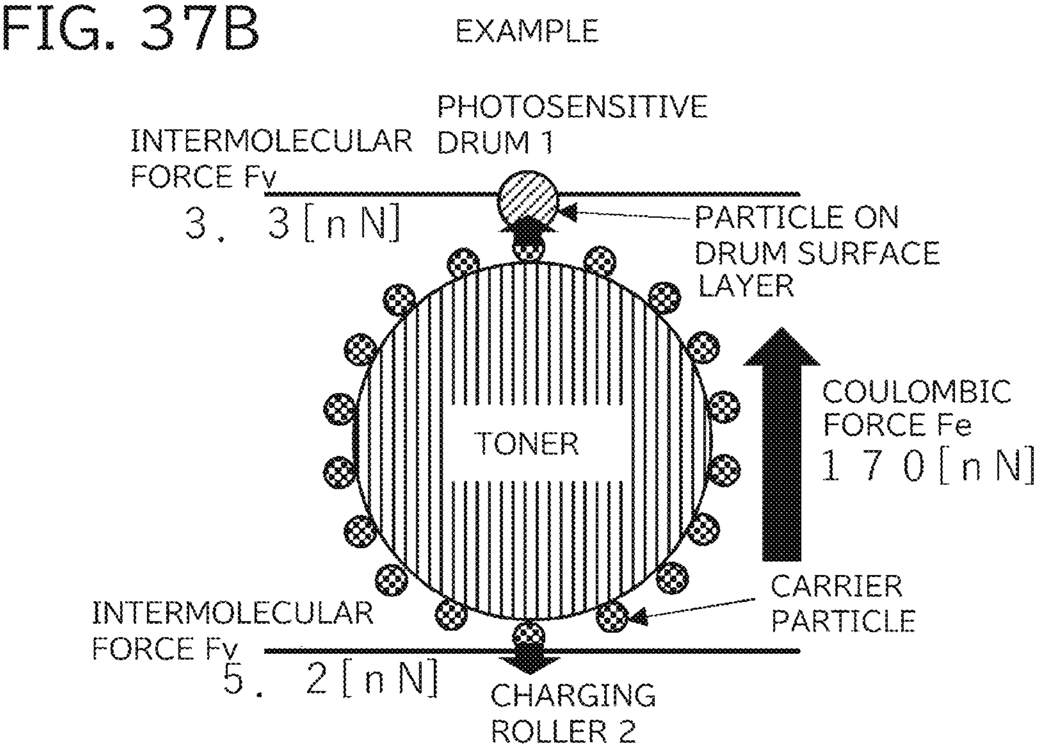

The calculation is performed with an assumption of a model in which the developer of the transfer residual toner is nipped by the photosensitive drum 1 and the charging roller 2. The calculation results are shown in FIGS. 37A and 37B. The details of the calculation will be described below.

The Coulomb force Fe [N] is generally represented by the following formula (7):

$$Fe = qE \tag{7}$$

q is the quantity of charges [C], and E is the electric field [V/m].

For example, when the quantity of charges in the developer of the transfer residual toner is −10 [μC/g], the particle diameter of the developer is 5.5 [μm], and the specific gravity of the developer is 1, the quantity of charges q of the developer 1 reaches $8.7\times10^{-16}$ [C].

Next, when the potential difference between the photosensitive drum 1 and the charging roller 2 is set to 1050 [V] and the distance between the photosensitive drum 1 and the charging roller 2 is set to 5.5 [μm], which is the same as the particle diameter of the developer, the electric field E reaches $1.9\times10^{8}$ [V/m].

Therefore, the Coulomb force Fe that is applied to the developer 1 is 170 [nN]. The Coulomb force Fe acts as a force of peeling off the developer from the charging roller 2.

The van derr Wales (intermolecular) force Fv is generally represented by the following formula (8):

$$Fv = Ad/(12z^2) \tag{8}$$

A is the Hamaker constant ($A=1\times10^{-19}$), d is the reduced particle diameter [m], and z is the separation distance [m] between particles (0.4 nm is used when the surface of the particle is smooth).

$$d = Dp1 \times Dp2/(Dp1 + Dp2) \tag{9}$$

Dp1 is the diameter of a particle 1, and Dp2 is the diameter of a particle 2. In addition, if Dp2 is infinite, $$d = Dp1 \tag{10}$$

which can be regarded as the force between the particle 1 and the flat plate.

First, with an assumption of a comparative example, the van der Waals (intermolecular) force Fv that is generated between the developer or the photosensitive drum 1 and the charging roller 2 is calculated.

For example, when the particle diameter of the developer is 5.5 [μm], and the particle diameter on the surface layer of the photosensitive drum 1 is 170 [nm], the van der Waals (intermolecular) force Fv that is generated between the developer 1 and the particles on the surface layer of the photosensitive drum 1 reaches 8.6 [nN] based on the formulae (8) and (9).

When the charging roller 2 is considered as a flat plate, the van der Waals (intermolecular) force Fv that is generated between the developer 1 and the charging roller 2 reaches 286 [nN]based on the formulae (8) and (10).

In the comparative example, the van der Waals (intermolecular) force (286 [nN]) that is generated between the developer and the charging roller 2 is extremely larger (the particle diameter of the external additive B is small, and the toner particle 1 and the charging roller 2 are assumed to be in contact with each other) than the van der Waals (intermolecular) force (8.6 [nN]) that is generated between the developer and the particles on the surface layer of the photosensitive drum 1. In addition, even when the influence of the Coulomb force Fe (170 [nN]) is added thereto, the van der Waals (intermolecular) force that is generated between the developer and the charging roller 2 is large, and most of the developer adheres to the charging roller 2 when the developer is nipped between the photosensitive drum 1 and the charging roller 2.

Next, the van der Waals (intermolecular) force Fv will be calculated with an assumption of a developer containing transfer accelerating particles on the surface of the toner particle, which is a feature of the present example.

When the particle diameters of the transfer accelerating particles on the surface of the developer are 100 [nm], the van der Waals (intermolecular) force Fv that is generated between the transfer accelerating particles on the surface of the developer and the particles on the surface layer of the photosensitive drum 1 reaches 3.3 [nN]. The van der Waals (intermolecular) force Fv that is generated between the transfer accelerating particles on the surface of the developer and the charging roller 2 reaches 5.2 [nN].

In the present example, the van der Waals (intermolecular) force Fv (5.2 [nN]) that is generated between the transfer accelerating particles on the surface of the developer and the charging rollers 2 becomes extremely small compared with that in the comparative example. The van der Waals (intermolecular) force is about the same as the van der Waals (intermolecular) force (3.3 [nN]) that is generated between the transfer accelerating particles on the surface of the developer and the particles on the surface layer of the photosensitive drum 1. Furthermore, since the developer is peeled off from the charging roller 2 by the Coulomb force Fe (170 [nN]) and adheres to the photosensitive drum 1, most of the developer adheres to the photosensitive drum 1 when the developer has been nipped between the photosensitive drum 1 and the charging roller 2.

Figure 38:
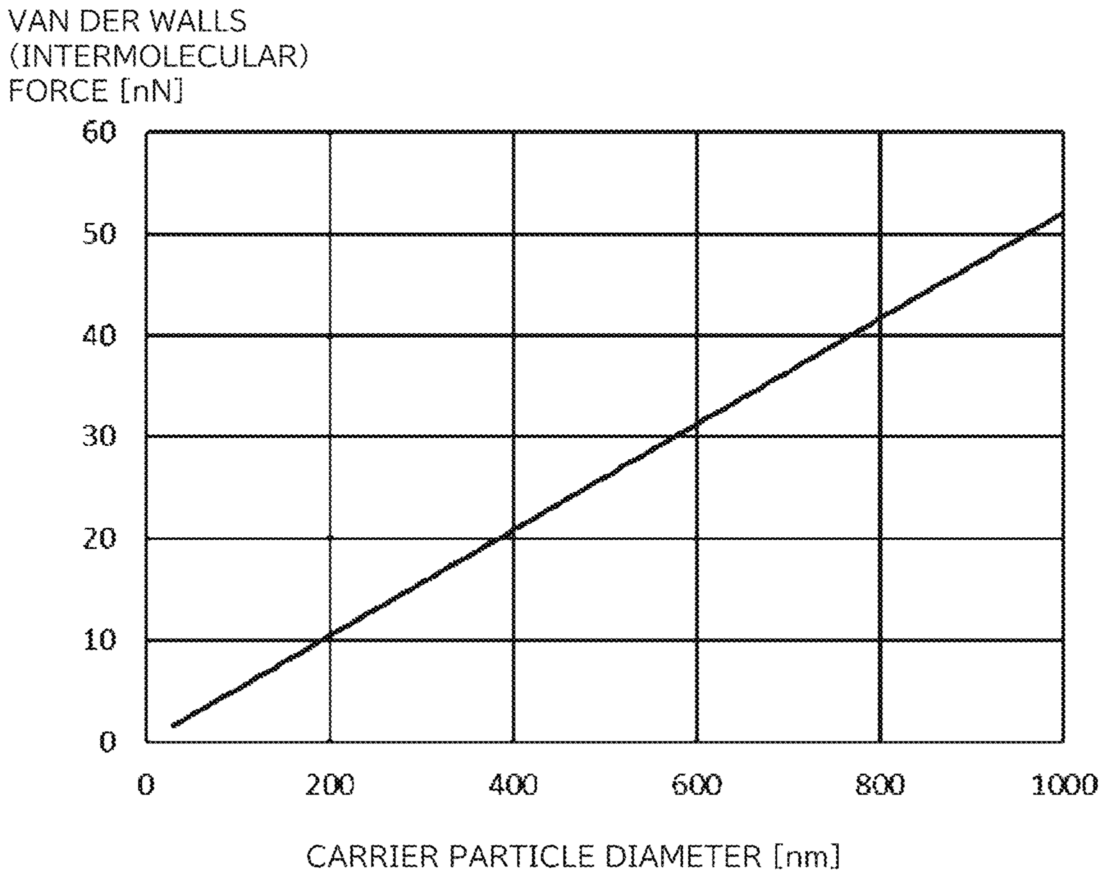
FIG. 38 is a relationship diagram between the transfer accelerating particle diameter and the intermolecular force in Example 1.

FIG. 38 shows the van der Waals (intermolecular) force Fv that is generated between the transfer accelerating particles on the surface of the developer and the charging rollers 2 when the particle diameter of the transfer accelerating particles is varied from 30 to 1000 [nm]. Since the larger the particle diameter, the larger the van der Waals (intermolecular) force Fv, it is considered that the larger the particle diameters of the transfer accelerating particles, the weaker the effect of suppressing the adhesion of the developer to the charging roller 2. However, even when the particle diameters of the transfer accelerating particles are 1000 [nm], the van der Waals (intermolecular) force Fv is 52 [nN], which is not extremely large compared with the van der Waals (intermolecular) force Fv that is generated between the developer and the particles on the surface layer of the photosensitive drum 1 and the Coulomb force Fe, and the effect of suppressing the adhesion of the developer to the charging roller 2 is thus exhibited.

Since it is possible to control the amount of the developer adhering to the charging roller 2 to some extent with the particle diameters of the transfer accelerating particles, the particle diameters of the transfer accelerating particles are preferably determined depending on the configuration of the image forming apparatus. As shown in FIG. 35, in a case where the transfer residue adheres to the charging roller 2, the transfer residual toner appears in a light density on the subsequent image, and in a case where the transfer residue does not adhere to the charging roller 2, when the developer is not completely collected by the developing roller 41, the transfer residual toner appears on the subsequent image. Since the developer adhering to the charging roller 2 can be peeled off by setting the charging roller 2 to a positive potential after the end of image formation or between sheets of paper, the particle diameters of the transfer accelerating particles may be determined depending on which to be prioritized.

In addition, it is also possible to obtain the optimum particle diameter of the developer A from the particle diameter DA and the average value of the distances between the centers of gravity of the convex portions derived from the particles in a range of DA±20 nm on the surface layer 105 of the photosensitive drum 1. Previously, it has been described that when the particle diameter of the developer A is too small, the contact area between the surface of the toner particle 1 and the surface of the charging roller 2 increases, and it becomes impossible to play the role of a spacer between the charging roller 2 and the developer. Furthermore, when the particle diameter of the developer A is too large relative to the particle diameter DA and the average value of the distances between the centers of gravity of the convex portions derived from the particles in a range of DA±20 nm on the surface layer 105 of the photosensitive drum 1, the contact area with the photosensitive drum 1 increases, and the developer A is likely to detach from the toner surface. Therefore, the particle diameter of the developer A is preferably smaller than the average value of the distances between the centers of gravity of the convex portions derived from the particles having a particle diameter within a range of DA±20 nm on the surface layer 105 of the photosensitive drum 1.

Example 2

Example 2 of the present invention will be described. In Example 2 of the present invention, the configuration of the developer is different from that in Example 1, and an organosilicon polymer forms convex portions on the surfaces of the toner base particles.

In a general toner to which fine particles of silica or the like are externally added as described in Example 1, the adhesive force between the toner and the fine particles is large, and a large number of the fine particles remain on the toner surface. The effect of suppressing adhesion of the toner to other members by the fine particles interposed on the toner surface has been described in Example 1. In Example 2, a method for suppressing toner adhesion by actively detaching the fine particles adhering to the toner from the toner and attaching the fine particles to other members themselves will be described. A matter that is not specifically explained in Example 2 is the same as that in Example 1 and will be thus not described again.

(Developer, Toner, and Transfer Accelerating Particles)

In the present example, a mixture of a toner as the developer and the external additive A, which is transfer accelerating particles, was used. The toner is a toner particle containing a toner base particle containing a release agent and an organosilicon polymer on the surface of the toner base particle.

The organosilicon polymer has a T3 unit structure represented by R—Si(O1/2)3, where R represents an alkyl group or phenyl group having at least 1 and not more than 6 carbon atoms, and the organosilicon polymer forms convex portions on the surface of the toner base particle.

The convex portions are in surface contact with the surface of the toner base particle, and the surface contact makes it possible to significantly expect an effect of suppressing the movement, detachment, and embedding of the convex portions.

Figure 39:
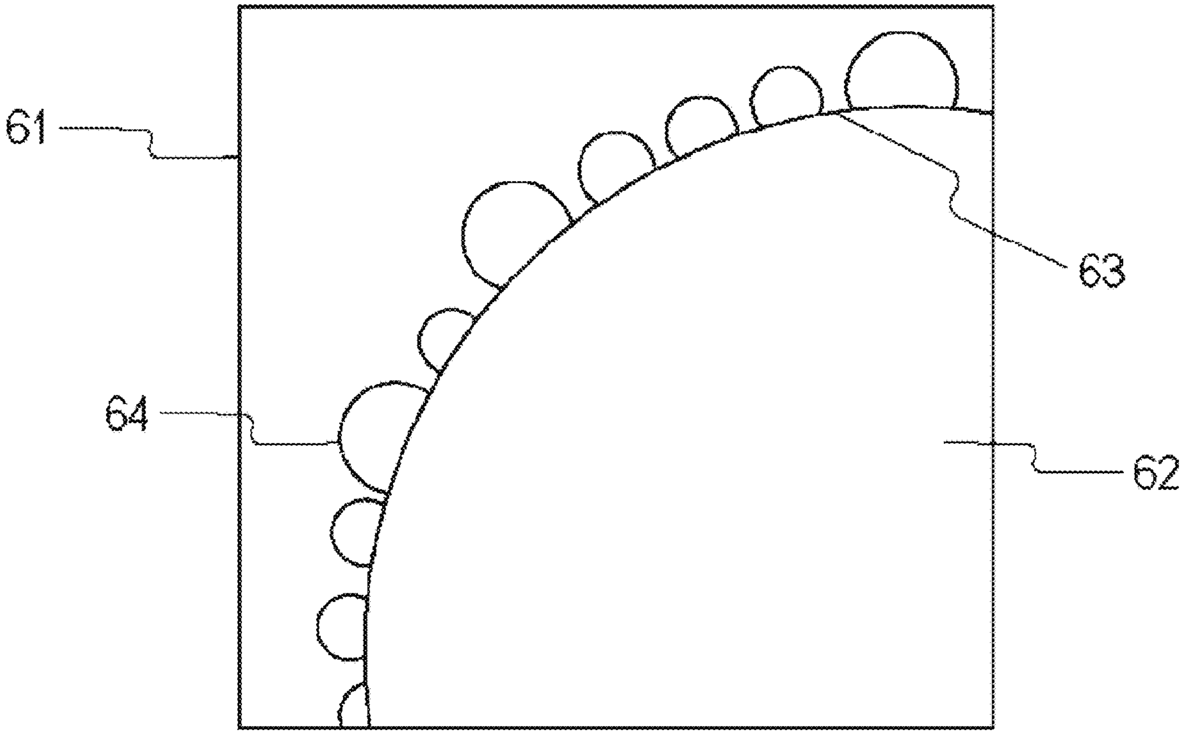
FIG. 39 is a schematic diagram of a toner surface in Example 2.

The degree of the surface contact will be described with the schematic views of the convex portions shown in FIG. 39, FIG. 40, FIG. 41, and FIG. 42. Reference sign 61 shown in FIG. 39 is a cross-sectional image of the toner particle in which about a quarter of the toner particle is shown, reference sign 62 is the toner particle, reference sign 63 is the surface of the toner base particle, and reference sign 64 is the convex portion. The cross-section of the toner particle can be observed using a scanning transmission electron microscope (hereinafter also referred to as STEM) to be described below.

A cross-sectional image of the toner is observed and a line along the circumference of the surface of the toner base particle is drawn. The image is converted to a horizontal image based on the line along the circumference. In the horizontal image, the length of the line along the circumference in a portion where the convex portion and the toner base particle form a continuous interface is defined as a convex width w. In addition, the maximum length of the convex portion in the normal direction to the convex width w is defined as the convex diameter D, and the length from the apex of the convex portion to the line along the circumference in a line segment that forms the convex diameter D is defined as the convex height H.

Figure 40:
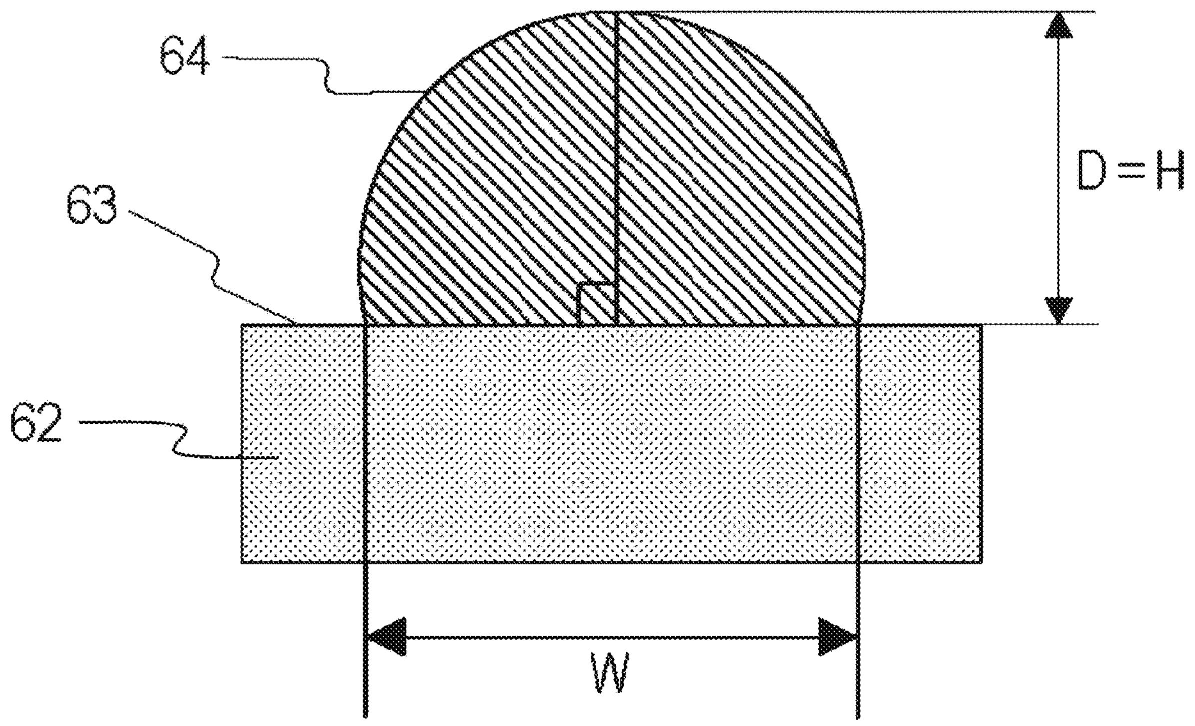
FIG. 40 is a schematic diagram of the convex shape on the toner surface in Example 2.
Figure 41:
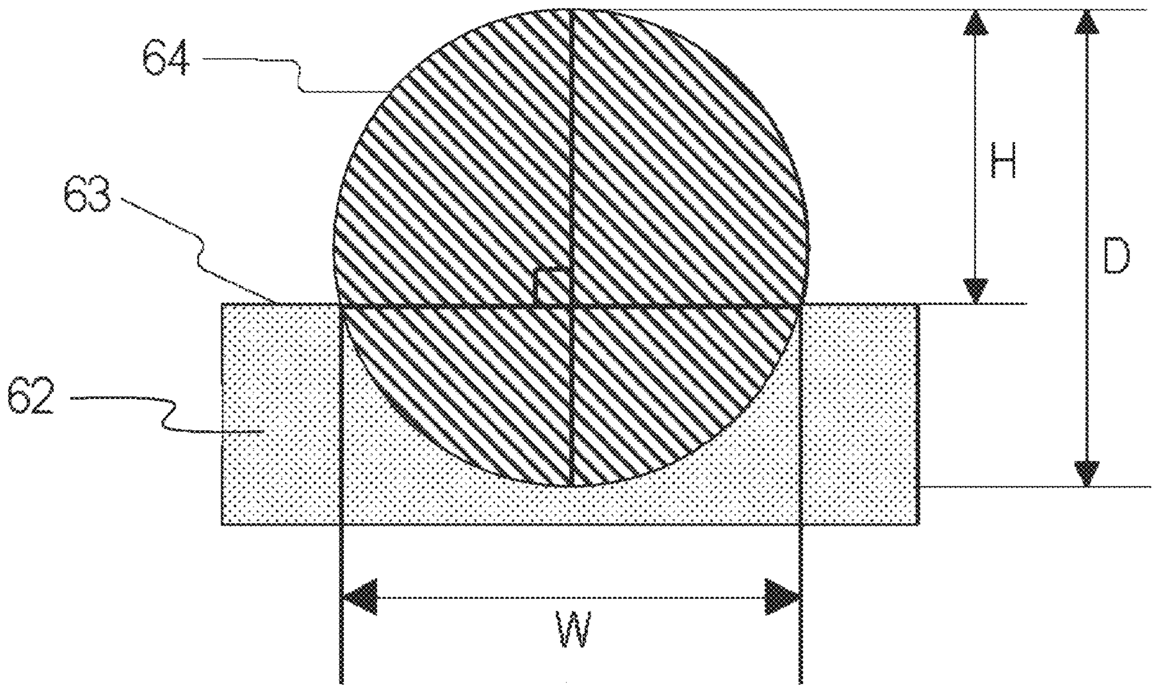
FIG. 41 is a schematic diagram of the convex shape on the toner surface in Example 2.
Figure 42:
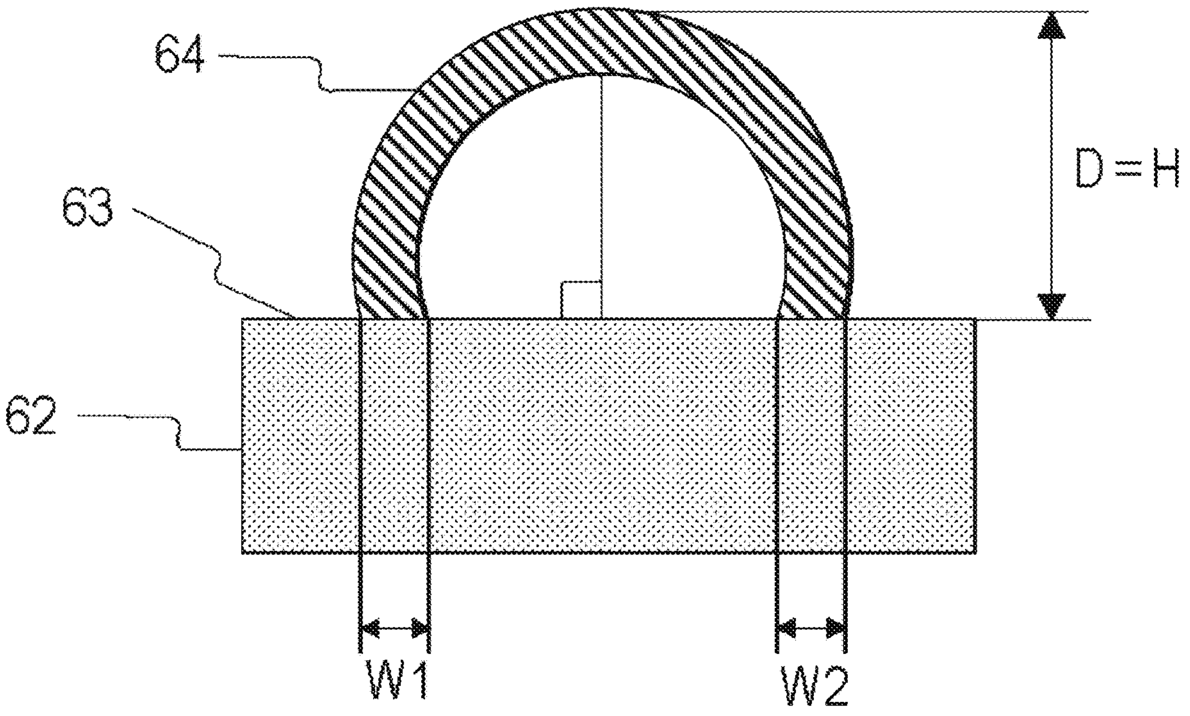
FIG. 42 is a schematic diagram of the convex shape on the toner surface in Example 2.

In FIG. 40 and FIG. 42, the convex diameter D and the convex height H are the same as each other, and in FIG. 41, the convex diameter D is larger than the convex height H.

In addition, FIG. 42 schematically shows the fixed state of a particle similar to a bowl-shaped particle, in which the central portion of a semi-spherical particle is recessed, obtained by crushing, dividing, or the like a hollow particle.

In FIG. 42, the convex width W is the total of the lengths of the organosilicon polymer in contact with the surface of the toner base particle. That is, the convex width W in FIG. 42 is the total of W1 and W2.

The number average value of the convex heights H is at least 30 nm and not more than 300 nm and preferably at least 30 nm and not more than 200 nm. In a case where the number average value of the convex heights H is 30 nm or more, a spacer effect is generated between the surface of the toner base particle and the transfer member, and the transfer property significantly improves. On the other hand, when the number average value of the convex heights H is 300 nm or less, the effect of suppressing movement, detachment, and embedding is significant, and a high transfer property is maintained during long-term use. The cumulative distribution of the convex heights H is obtained for the convex portions having a convex height H of at least 30 nm and not more than 300 nm. When the convex height at a cumulative value of the convex height H of 80% by number from the small value side is indicated by H80, the H80 is preferably at least 65 nm and not more than 120 nm and more preferably at least 75 nm and not more than 100 nm. When H80 is in the above-described range, it is possible to further improve the transfer property.

The number average particle diameter R of the primary particles of the external additive A is preferably at least 30 nm and not more than 1200 nm. When R is 30 nm or more, the spacer effect is developed between the transfer member and the developer, and a high transfer property is exhibited. In addition, there is a tendency that the larger R, the more the transfer performance improves. On the other hand, in a case where R exceeds 1200 nm, the fluidity of the toner decreases, and image unevenness is likely to be generated.

The ratio of the number average particle diameter R of the primary particles of the external additive A to the number average value of the convex heights H is preferably at least 1.00 and not more than 4.00. When the ratio [(the number average particle diameter R of the primary particles of the external additive A)/(the number average value of the convex heights H)] is in the above-described range, it is possible to satisfy both an excellent transfer property and an excellent low-temperature fixing property capable of enduring the extended service life.

In a case where the number average value of the convex heights H is 30 nm, which is the minimum value, when R is 30 nm or more, the spacer effect is developed between the transfer member and the developer, and it is possible to improve the transfer property. This is considered that a place where no convex portions are present due to the influence of detachment or the like is substituted with the external additive A and the spacer effect is developed. That is, when R is less than 30 nm, it is difficult to develop the spacer effect.

The adhesion rate of the external additive A to the surface of the toner particle is preferably at least 0% and not more than 20%, and more preferably at least 0% and not more than 10%. When the adhesion rate is in the above-described range, it becomes easy for the external additive A to move on the surface of the toner particle, and it is possible to further improve the transfer property by a convex portion replacing action. In a fixing step of fixing the toner to a fixing member, an appropriate amount of the release agent oozes out from the toner base particles, whereby the separation performance between the fixing member and paper is improved.

A 1.5 μm square reflected electron image of the toner surface is acquired by the surface observation of the toner with a scanning electron microscope. When an image binarized so that an organosilicon polymer portion in the reflected electron image becomes a bright portion is obtained, the area proportion of the bright portion area of the image in the total area of the image (hereinafter also simply referred to as the area proportion of the bright portion area) is at least 30.0% and not more than 75.0%. In addition, the area proportion of the bright portion area of the image is preferably at least 35.0% and not more than 70.0%. It shows that the higher the area proportion of the bright portion area, the higher the abundance ratio of the organosilicon polymer on the surfaces of the toner base particles. In a case where the area proportion of the bright portion area is higher than 75.0%, the abundance ratio of a component derived from the toner base particles on the surfaces of the toner base particles is small, the release agent is less likely to ooze from the toner base particles, and thin paper is likely to be wound around the fixing unit at the time of low-temperature fixing. On the other hand, in a case where the area proportion of the bright portion area of the image is less than 30.0%, the abundance ratio of the component derived from the toner base particles on the surfaces of the toner base particles is large. That is, the exposed area of the component derived from the toner base particles on the surfaces of the toner base particles is large, and the transfer property at the initial stage of use deteriorates. The area proportion of the bright portion area of the image will also be referred to as the coverage of the organosilicon polymer on the surfaces of the toner base particles.

The external additive A is not particularly limited as long as the number average particle diameter R of the primary particles is at least 30 nm and not more than 1000 nm, and various organic fine particles or inorganic fine particles can be used. The external additive A preferably contains silica fine particles since the external additive A is easily imparted with fluidity and is easily negatively charged like the toner base particles. The content of the silica fine particles in the external additive A is preferably 50% by mass or more, and the external additive A is more preferably silica fine particles. The content of the external additive Ain the toner is preferably at least 0.02% by mass and not more than 5.00% by mass and more preferably at least 0.05% by mass and not more than 3.00% by mass.

Figure 43:
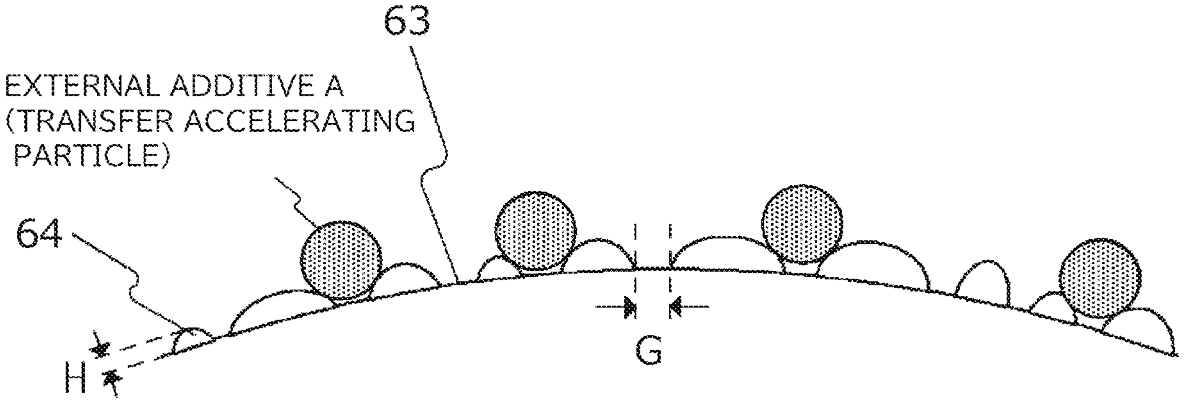
FIG. 43 is a schematic diagram of a toner and transfer accelerating particles in Example 2.

FIG. 43 is an enlarged view of the developer used in the present example. As shown in FIG. 43, the developer of the present example contains the external additive A, which is transfer accelerating particles, disposed on the toner surface on which a large number of convex portions of the organosilicon polymer have been formed.

A convex gap G and a convex height H on the toner surface shown in FIG. 43 can be measured using a scanning transmission electron microscope (hereinafter also referred to as STEM) to be described below. In addition, the convex gap G and the convex height H can also be measured with a scanning probe microscope (hereinafter SPM). The SPM includes a probe, a cantilever that supports the probe, and a displacement measuring system that detects the bending of the cantilever, and detects the interatomic force (attractive force or repulsive force) between the probe and a specimen to observe the shape of the specimen surface.

When the convex gap G is larger than the transfer accelerating particle, the transfer accelerating particle comes into contact with the toner base body in the case of being disposed between the convex portions, the adhesive force Ft between the transfer accelerating particle and the toner becomes large, and it becomes difficult for the transfer accelerating particle to transfer from the toner to the charging roller 2. Therefore, the number average value of the convex gaps G is preferably smaller than the number average particle diameter of the transfer accelerating particles.

In addition, when the convex height H is higher than the particle diameter of the transfer accelerating particle, the convex portion comes into contact with the charging roller 2 earlier than the transfer accelerating particle, it becomes difficult for the transfer accelerating particle to come into contact with the charging roller 2, and it becomes difficult for the transfer accelerating particle to transfer from the toner to the charging roller 2. Therefore, the number average value of the convex heights H is preferably smaller than the number average particle diameter of the transfer accelerating particles.

However, as described above, the adhesive force Ft between the transfer accelerating particle and the toner is preferably smaller than the adhesive force Fc between the transfer accelerating particle and the charging roller 2. Therefore, it is preferable to select a material for which the adhesive force Ft of the transfer accelerating particle to the toner is small as the material of the transfer accelerating particle. For example, in a case where the convex portions on the toner surface are formed of a silica-based material such as an organic silica polymer as in the present example, it is preferable to select a silica-based material having a material configuration similar to that of the convex portion as the material for the transfer accelerating particles since this reduces the adhesive force between the convex portion and the transfer accelerating particle.

(Method for Measuring Physical Properties of Developer)

Hereinafter, various measurement methods will be described.

<Method for Observing Cross Section of Toner in Scanning Transmission Electron Microscope (STEM)>

A cross section of the toner that is observed with a scanning transmission electron microscope (STEM) is produced as described below. Hereinafter, a procedure for producing the cross section of the toner will be described. In a case where organic fine particles or inorganic fine particles are externally added to the toner, the toner from which the organic fine particle or the inorganic fine particles have been removed by the following method or the like is used as a specimen.

160 g of sucrose (manufactured by Kishida Chemical Co., Ltd.) is added to 100 mL of ion exchanged water and dissolved in hot water to prepare a sucrose concentrate. 31 g of the sucrose concentrate and 6 mL of CONTAMINON N (a 10% by mass aqueous solution of a neutral detergent for washing a precision measuring instrument having a pH of 7 composed of a nonionic surfactant, an anionic surfactant, and an organic builder, manufactured by Wako Pure Chemical Industries, Ltd.) are put into a centrifuge tube (capacity: 50 mL). 1.0 g of the toner is added thereto, and massing of the toner is loosened with a spatula or the like. The centrifuge tube is shaken with a shaker (AS-1N, put on sale by AS ONE Corporation) at 300 spm (strokes per min.) for 20 minutes. After the shaking, the solution is put into a different glass tube for a swing rotor (50 mL) and separated with a centrifuge (H-9R manufactured by Kokusan Co., Ltd.) under conditions of 3500 rpm and 30 minutes. The toner particle and the external additive are separated from each other by this operation. Sufficient separation of the toner particle and the aqueous solution is visually confirmed, and the toner particle separated into the uppermost layer is collected with the spatula or the like. The collected toner particle is filtered with a vacuum filter and then dried with a drier for one hour or longer, thereby obtaining a measurement specimen. This operation is performed a plurality of times to secure a necessary amount.

In addition, whether or not the convex portion contains the organosilicon polymer is confirmed in combination with elemental analysis by energy dispersive X-ray spectroscopy (EDS).

A single layer of the toner is sprayed onto a cover glass (Matsunami Glass Ind., Ltd., square cover glass, square No. 1), and an Os film (5 nm) and a naphthalene film (20 nm) are applied to the toner as protective films using an osmium (Os) plasma coater (Filgen, Inc., OPC80T). Next, a PTFE tube (outer diameter 3 mm (inner diameter 1.5 mm)×3 mm) is filled with a photocurable resin D800 (JEOL Ltd.), and the cover glass is quietly placed on the tube so that the toner comes into contact with the photocurable resin D800. The resin is cured by irradiation with light in this state, and the cover glass and the tube are then removed, thereby forming a cylindrical resin with the toner embedded on the outermost surface. The cylindrical resin was cut from the outermost surface as long as half the diameter of the toner (for example 4.0 μm in a case where the weight average particle diameter (D4) is 8.0 μm) with an ultrasonic ultra-microtome (Leica Microsystems, UC7) at a cutting speed of 0.6 mm/s to make the cross section of the central part of the toner appear.

Next, the resin is cut so that the film thickness reaches 100 nm to produce a thin sample of the cross section of the toner. The cross section of the central part of the toner can be obtained by cutting the resin by such a method.

As the scanning transmission electron microscope (STEM), JEM-2800 manufactured by JEOL Ltd. was used. The probe size of STEM is 1 nm, and an image is acquired in an image size of 1024×1024 pixels. In addition, for a bright field image, the Contrast is adjusted to 1425, and the Brightness is adjusted to 3750 in the Detector Control panel, and the Contrast is adjusted to 0.0, the Brightness is adjusted to 0.5, and the Gamma is adjusted to 1.00 in the Image Control panel, and an image is acquired. The image magnification is 100,000 times, and the image is acquired such that about ¼ to ½ of the circumference in the cross section in one toner particle is included as shown in FIG. 39.

Image analysis is performed on the resultant STEM image using image processing software (ImageJ (available at https://imagej.nih.gov/ij/), and the convex portions containing the organosilicon polymer are measured. The measurement is performed on 30 convex portions arbitrarily selected from the STEM image. Whether or not the convex portions contain the organosilicon polymer is confirmed in combination with elemental analysis with a scanning electron microscope (SEM) and by energy dispersive X-ray spectroscopy (EDS). First, a line is drawn along the circumference of the toner base particle with a line drawing tool ("Segmented line" in the Straght tab is selected). For parts where the convex portions of the organosilicon polymer are embedded in the toner base particle, the line is smoothly connected as if the convex portions are not embedded. The image is converted into a horizontal image based on the line ("Selection" in the Edit tab is selected, the line width is changed to 500 pixels in the properties, "Selection" in the Edit tab is then selected, and Straghtener is performed). The following measurement is performed on one of the convex portions containing the organosilicon polymer in the horizontal image. The length of the line along the circumference in a portion where the convex portion and the toner base particle form a continuous interface is defined as a convex width w. The maximum length of the convex portion in the normal direction to the convex width w is defined as the convex diameter D, and the length from the apex of the convex portion to the line along the circumference in a line segment that forms the convex diameter D is defined as the convex height H. The measurement is performed on 30 arbitrarily selected convex portions, and the arithmetic average value of the individual measurement values is defined as the number average value of the convex heights H.

<Method for Calculating H80>

The cumulative distribution of the convex heights H is obtained for the convex portions having a convex height H of at least 30 nm and not more than 300 nm in the STEM image of the cross section of the toner for which the scanning transmission electron microscope (STEM) is used. The convex height at a cumulative value of the convex height H of 80% by number from the small value side is defined as H80 (unit: nm).

<Method for Calculating Area Proportion of Bright Portion Area in 1.5 μm Square Reflected Electron Image of Toner Surface>

For the area proportion of the bright portion area, the toner surface is observed using a scanning electron microscope. In addition, a 1.5 μm square reflected electron image of the toner surface is acquired. In addition, an image binarized so that an organosilicon polymer portion in the reflected electron image becomes a bright portion is obtained, and the proportion of the bright portion area of the image in the total area of the image is obtained. When organic fine particles or inorganic fine particles have been externally added to the toner, the toner from which the organic fine particle or the inorganic fine particles have been removed by the following method or the like is used as a specimen.

160 g of sucrose (manufactured by Kishida Chemical Co., Ltd.) is added to 100 mL of ion exchanged water and dissolved in hot water to prepare a sucrose concentrate. 31 g of the sucrose concentrate and 6 mL of CONTAMINON N (a 10% by mass aqueous solution of a neutral detergent for washing a precision measuring instrument having a pH of 7 composed of a nonionic surfactant, an anionic surfactant, and an organic builder, manufactured by Wako Pure Chemical Industries, Ltd.) are put into a centrifuge tube (capacity: 50 mL). 1.0 g of the toner is added thereto, and massing of the toner is loosened with a spatula or the like. The centrifuge tube is shaken with a shaker (AS-1N, put on sale by AS ONE Corporation) at 300 spm (strokes per min.) for 20 minutes. After the shaking, the solution is put into a different glass tube for a swing rotor (50 mL) and separated with a centrifuge (H-9R manufactured by Kokusan Co., Ltd.) under conditions of 3500 rpm and 30 minutes. The toner particle and the external additive are separated from each other by this operation. Sufficient separation of the toner particle and the aqueous solution is visually confirmed, and the toner particle separated into the uppermost layer is collected with the spatula or the like. The collected toner particle is filtered with a vacuum filter and then dried with a drier for one hour or longer, thereby obtaining a measurement specimen. This operation is performed a plurality of times to secure a necessary amount.

In addition, whether or not the convex portions contain the organosilicon polymer is confirmed in combination with elemental analysis by energy dispersive X-ray spectroscopy (EDS) to be described below.

The SEM device and the observation conditions are as described below.

- Device used: ULTRA PLUS manufactured by Carl Zeiss Microscopy
- Accelerating voltage: 1.0 kV
- WD: 2.0 mm
- Aperture size: 30.0 μm
- Detection signal: EsB (energy selective backscattered electron)
- EsB grid: 800V
- Observation magnification: 50,000 times
- Contrast: 63.0±5.0% (reference value)
- Brightness: 38.0±5.0% (reference value)
- Resolution: 1024×768
- Pretreatment: The toner particle is sprayed onto carbon tape (but not vapor-deposited)

The accelerating voltage and the EsB grid are set to achieve items such as acquisition of the structural information of the outermost surface of the toner particle, prevention of an undeposited specimen from being charged up, and selective detection of reflected electrons with high energy. The observation field of view is selected from near the apex where the curvature of the toner particle becomes the smallest. The bright portion in the reflected electron image being derived from the organosilicon polymer was confirmed by superimposing an element mapping image by energy dispersive X-ray spectroscopy (EDS) that can be acquired with a scanning electron microscope (SEM) and the reflected electron image.

The SEM/EDS device and the observation conditions are as described below.

- Device used (SEM) ULTRA PLUS from Carl Zeiss Microscopy
- Device used (EDS) NORAN System 7, Ultra Dry EDS Detecter, manufactured by
- Thermo Fisher Scientific
- Accelerating voltage: 5.0 kV
- WD: 7.0 mm
- Aperture size: 30.0 μm
- Detection signal: SE2 (secondary electron)
- Observation magnification: 50,000 times
- Mode: Spectral imaging Pretreatment: The toner particle is sprayed onto carbon tape and sputtered with platinum The mapping image of the silicon element acquired by the present method and the reflected electron image are superimposed, and it is confirmed that the silicon atom part in the mapping image and the bright portion in the reflected electron image match each other.

The calculation of the area rate of the bright portion area relative to the total area of the reflected electron image was acquired by analyzing the reflected electron image of the surface of the toner particle obtained by the above-described method using image processing soft ImageJ (developed by Wayne Rashand). The procedure will be described below.

First, the reflected electron image is converted into 8-bit from "Type" in the Image menu. Next, the Median diameter is set to 2.0 pixels from "Filters" in the Process menu, and the image noise is reduced. The image center is estimated with the observation condition display portion that is displayed in the lower part of the reflected electron image excluded, and a 1.5 μm square range is selected from the image center of the reflected electron image using a rectangular tool (Rectangle Tool) of a tool bar. Next, "Threshold" is selected from "Adjust" in the image menu. After "Default" is selected, and "Auto" is clicked, "Apply" is clicked to obtain a binarized image. This operation makes the bright portion in the reflected electron image displayed white. Again, the image center is estimated with the observation condition display portion that is displayed in the lower part of the reflected electron image excluded, and a 1.5 μm square range is selected from the image center of the reflected electron image using the rectangular tool (Rectangle Tool) of the tool bar. Next, "Histogram" is selected from the "Analyze" menu. A Count value is read (corresponding to the total area of the reflected electron image) from the newly opened "Histogram" window. In addition, "List" is clicked, and the Count value at the time of a brightness of 0 is read (corresponding to the bright portion area of the reflected electron image). The area rate of the bright portion area to the total area of the reflected electron image is calculated from the above-described value. The above-described procedure is performed on 10 visual fields for the toner particle, which is the evaluation object, and the number average value is calculated and regarded as the area proportion (%) of the bright portion area of the image to the total area of the image binarized so that the organosilicon polymer portion in the reflected electron image becomes the bright portion.

<Method for Identifying Organosilicon Polymer>

A method for identifying the organosilicon polymer is performed in combination with observation with a scanning electron microscope (SEM) and elemental analysis by energy dispersive X-ray spectroscopy (EDS).

The toner is observed in a field of view enlarged to a maximum of 50,000 times using a scanning electron microscope "Hitachi ultra-high resolution field emission scanning electron microscope S-4800" (Hitachi High-Tech Corporation). The surface of the toner particle is brought into focus, and the surface is observed. EDS analysis is performed on particles or the like present on the surface, and whether or not the analyzed particles or the like are the organosilicon polymer is determined from the presence or absence of a Si element peak. In a case where both the organosilicon polymer and silica fine particles are contained on the surface of the toner particle, the ratio (Si/O ratio) between the element contents (atomic %) of Si and O is compared with a sample to identify the organosilicon polymer. EDS analysis is performed on the sample of each of the organosilicon polymer and the silica fine particles under the same conditions to obtain the element content (atomic %) of each of Si and O. The Si/O ratio of the organosilicon polymer is indicated by A, and the Si/O ratio of the silica fine particles is indicated by B. A measurement condition under which A becomes significantly large relative to B is selected. Specifically, the sample is measured 10 times under the same conditions, and the additive mean values of A and B are obtained, respectively. A measurement condition under which the resultant average value becomes $A/B>1.1$ is selected. In a case where the Si/O ratio of the particles or the like, which are a determination object, is closer to the A side than $[(A+B)/2]$, the particles or the like are determined to be the organosilicon polymer.

TOSPEARL 120A (Momentive Performance Materials) is used as the sample of the organosilicon polymer particles, and HDK V15 (Asahi Kasei Corporation) is used as the sample of the silica fine particles.

<Method for Measuring Number Average Particle Diameter R of Primary Particles of External Additive>

The number average particle diameter R of the primary particles of the external additive is measured in combination with elemental analysis with the scanning electron microscope "Hitachi ultra-high resolution field emission scanning electron microscope S-4800" (Hitachi High-Tech Corporation) and by energy dispersive X-ray spectroscopy (EDS).

The above-described elemental analysis method by EDS is jointly used in a field of view enlarged to a maximum of 50,000 times, and external additive particles are randomly photographed. 100 external additive particles are randomly selected from the photographed image, the major axes of the primary particles of the target external additive particles are measured, and the arithmetic average value thereof is regarded as the number average particle diameter R. The observation magnification is adjusted as appropriate depending on the size of the external additive particle.

<Method for Identifying Compositions and Ratio of Constituent Compounds of Organosilicon Polymer>

NMR is used to identify the compositions and ratio of the constituent compounds of the organosilicon polymer that is contained in the toner. In a case where the toner contains an external additive such as silica fine particles in addition to the organosilicon polymer, the following operation is performed.

1 g of the toner is put into a vial bottle, dissolved in 31 g of chloroform, and dispersed. For the dispersion, the toner is treated for 30 minutes using an ultrasonic homogenizer to produce a dispersion.

Ultrasound treatment device: Ultrasound homogenizer VP-050 (manufactured by TAITEC Corporation)

Microchip: Stepped microchip, tip diameter φ2 mm

Tip position of microchip: The central portion of the glass vial at a height of 5 mm from the bottom surface of the vial Ultrasound conditions: Intensity 30%, 30 min.

At this time, ultrasonic waves are applied while the vial is cooled with ice water so that the temperature of the dispersion does not increase. The dispersion is put into a glass tube (50 mL) for a swing rotor, and centrifugation is performed with a centrifuge (H-9R; manufactured by Kokusan Co., Ltd.) under conditions of 58.33S-1 and 30 minutes. In the glass tube after the centrifugation, particles having a heavy specific gravity, for example, silica fine particles, are contained in the lower layer. A chloroform solution containing the organosilicon polymer in the upper layer is collected, and chloroform is removed by vacuum drying (40° C./24 hours) to produce a sample. The abundance ratio of the constituent compounds of the organosilicon polymer and the proportion of the T3 unit structure represented by R—Si (O1/2)3 in the organosilicon polymer are measured and calculated by solid 29 Si-NMR using the sample or the organosilicon polymer.

First, a hydrocarbon group represented by R above is confirmed by 13C-NMR.

<<Measurement Conditions of 13 C-NMR (solid)>>

Device: JNM-ECX50011 manufactured by JEOL RESONANCE

Specimen tube: 3.2 mmφ

Specimen: Sample or organosilicon polymer

Measurement temperature: Room temperature

Pulse mode: CP/MAS

Measured nuclear frequency: 123.25 MHz (13C)

Reference material: Adamantane (external standard: 29.5 ppm)

Specimen rotation speed: 20 kHz:

Contact time: 2 ms

Delay time: 2 s

Accumulation count: 1024 times

The hydrocarbon group represented by R is confirmed by the method from the presence or absence of a signal resulting from a methyl group (Si—CH3), an ethyl group (Si—C2H5), a propyl group (Si—C3H7), a butyl group (Si—C4H9), a pentyl group (Si—C5H11), a hexyl group (Si—C6H13), a phenyl group (Si-C6H5-), or the like that is bonded to a silicon atom. Incidentally, in the solid 29Si-NMR, peaks are detected in different shift regions due to the structure of a functional group that is bonded to Si of the constituent compound of the organosilicon polymer. A structure that is bonded to Si can be specified by specifying each peak position using a standard sample. In addition, the abundance ratio of each constituent compound can be calculated from the resultant peak area. The proportion of the peak area of the T3 unit structure in the total peak area can be obtained by calculation.

The measurement conditions for the solid 29Si-NMR are specifically as described below.

Device: JNM-ECX5002 (JEOL RESONANCE)

Measurement temperature: Room temperature

Measurement method: DDMAS method 29Si 45°

Specimen tube: Zirconia 3.2 mmφ

Specimen: Loaded into a test tube in a powder form

Specimen rotation speed: 10 kHz

Relaxation delay: 180 s

Scan: 2000

After the measurement, the peaks of a plurality of silane components of the sample or the organosilicon polymer having different substituents and bonding groups are separated into the following X1 structure, X2 structure, X3 structure, and X4 structures by curve filling, and peak areas are calculated, respectively.

The following X3 structure is the T3 unit structure.

X1 Structure: (Ri)(Rj)(Rk)SiO1/2 (A1)

X2 Structure: (Rg)(Rh)Si(O1/2)2 (A2)

X3 Structure: RmSi(O1/2)3 (A3)

X4 Structure: Si(O1/2)4 (A4)

[Chem. 10]

STRUCTURE X1

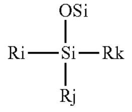

(2)

-continued

STRUCTURE X2

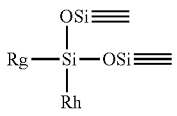

(3)

STRUCTURE X3

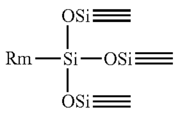

(4)

STRUCTURE X4

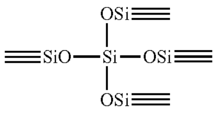

(5)

Ri, Rj, Rk, Rg, Rh, and Rm in the formulae (A1), (A2), and (A3) represent an organic group such as a hydrocarbon group having 1 to 6 carbon atoms, a halogen atom, a hydroxy group, an acetoxy group, or an alkoxy group that is bonded to silicon. In a case where it is necessary to confirm the structure in more detail, the structure may be identified by the measurement result of 1H-NMR along with the measurement results of the 13C-NMR and 29Si-NMR.

<Method for Quantifying Organosilicon Polymer or Silica Fine Particles in Toner>

The toner is dispersed in chloroform as described above, the external additives, such as the organosilicon polymer and the silica fine particles, are then separated using centrifugation by the difference in specific gravity to obtain each sample, the content of the external additive such as the organosilicon polymer or the silica fine particles is obtained.

Hereinafter, a case where the external additive is silica fine particles will be described. Even different fine particles can also be quantified by the same method.

First, the pressed toner is measured with fluorescent X-rays, and the content of silicon in the toner is obtained by performing an analysis treatment such as a calibration curve method or an FP method. Next, for each constituent compound that forms the organosilicon polymer and the silica fine particles, the structure is specified using solid 29Si-NMR, pyrolysis GC/MS, and the like to obtain the contents of silicon in the organosilicon polymer and in the silica fine particles. The content of the organosilicon polymer and the silica fine particles in the toner is obtained by calculation from the relationship between the content of silicon in the toner obtained by fluorescent X-rays and the contents of silicon in the organosilicon polymer and in the silica fine particles obtained by solid 29Si-NMR and pyrolysis GC/MS.

<Method for Measuring Adhesion Rate of External Additive such as Organosilicon Polymer, Silica Fine Particles, or the Like to Toner Base Particles or Toner Particle by Water Washing Method>

(Water Washing Step)

20 g of CONTAMINON N (a 30% by mass aqueous solution of a neutral detergent for washing a precision measuring instrument having a pH of 7 composed of a nonionic surfactant, an anionic surfactant, and an organic builder is weighed in a vial having a capacity of 50 mL and mixed with 1 g of the toner. The mixture is set in “KM Shaker" (model: V.SX) manufactured by Iwaki Industry Co., Ltd., the speed is set to 50, and the mixture is shaken for 120 seconds. This makes the external additive such as the organosilicon polymer or the silica fine particles migrate to a dispersion from the surfaces of the toner base particles or the toner particle depending on the fixed state of the organosilicon polymer or the silica fine particles. After that, the toner and the external additive such as the organosilicon polymer or the silica fine particles that has migrated to the supernatant are separated with a centrifuge (H-9R, manufactured by Kokusan Co., Ltd.) (for five minutes with 16.67S-1) are separated from each other. The precipitated toner is dried by vacuum drying (40° C./24 hours) and made into a water-washed toner.

Next, the toner that is not subjected to the water washing step (toner before water washing) and the toner obtained by the water washing step (water-washed toner) are photographed using Hitachi ultra-high resolution field emission scanning electron microscope S-4800 (Hitachi High-Tech Corporation).

In addition, the measurement object is identified by elemental analysis using energy dispersive X-ray spectroscopy (EDS).

In addition, the photographed image of the toner surface is analyzed using image analysis software Image-Pro Plus ver. 5.0 (Nippon Roper K.K.), and the coverage is calculated.

The image photographing conditions of S-4800 are as described below.

(1) Specimen Production

A conductive paste is thinly applied to a specimen stage (aluminum specimen stage 15 mm×6 mm), and the toner is sprayed thereon. Furthermore, excess toner is removed from the specimen table by blowing air thereto, and the paste and the toner are sufficiently dried. The specimen stage is set in a specimen holder, and the height of the specimen stage is adjusted to 36 mm with a specimen height gauge.

(2) Setting of S-4800 Observation Conditions

Upon the measurement of the coverage, the above-described elemental analysis by energy dispersive X-ray spectroscopy (EDS) is performed in advance, the external additive such as the organosilicon polymer or the silica fine particles on the toner surface is distinguished, and the measurement is then performed. Liquid nitrogen is injected into an anti-contamination trap attached to the housing of S-4800 until the liquid nitrogen overflows and left to stand for 30 minutes. The "PC-SEM" of S-4800 is activated, and flushing (cleaning of an FE chip, which is an electron source) is performed. The accelerating voltage display portion of the control panel on the screen is clicked, and the [flushing] button is pressed to open the flushing execution dialog. It is confirmed that the flushing intensity is 2, and flushing is executed. It is confirmed that the emission current due to flushing is 20 to 40 μA. The specimen holder is inserted into the specimen chamber of the S-4800 housing. The [origin] on the control panel is pressed to move the specimen holder to the observation position.

The accelerating voltage display portion is clicked to open the HV setting dialog, the accelerating voltage is set to [1.1 kV], and the emission current is set to [20 μA]. In the [basic] tab of the operation panel, the signal selection is installed at [SE], and the SE detector is put into the mode of observing a reflected electron image by selecting [up (U)] and [+BSE] and selecting [L.A.100] in the right selection box of [+BSE]. Similarly, in the [basic] tab of the operation panel, the probe current of the electro-optical system condition block is set to [Normal], the focus mode is set to [UHR], and the WD is set to [4.5 mm]. The [ON] button in the accelerating voltage display portion of the control panel is pressed to apply the accelerating voltage.

(3) Calculation of Number Average Particle Diameter (D1) of Toner

The inside of the magnification display portion of the control panel is dragged to set the magnification to 5000 (5 k) times. The focus knob [COARSE] of the operation panel is rotated to adjust the aperture alignment to a place where the S-4800 is somewhat in focus. The [Align] in the control panel is clicked, the alignment dialog is displayed, and the [beam] is selected. The STIGMA/ALIGNMENT knob (X, Y) of the operation panel is rotated to move the beam to be displayed to the center of the concentric circle. Next, the [aperture] is selected, and the STIGMA/ALIGNMENT knob (X, Y) is rotated one by one so that the movement of the image is stopped or minimized. The aperture dialog is closed, and the S-4800 is brought into focus by auto-focus. This operation is further repeated twice to bring the S-4800 into focus.

After that, the particle diameters of 300 toner particles are measured to obtain the number average particle diameter (D1). The particle diameter of each particle is the maximum diameter at the time of observing the particles of the toner.

(4) Focus Adjustment

For the particles of the number average particle diameter (D1) obtained in the (3) of ±0.1 μm, the inside of the magnification display portion of the control panel is dragged in a state where the middle point of the maximum diameter is aligned with the center of the measurement screen to set the magnification to 10,000 (10 k) times.

The focus knob [COARSE] of the operation panel is rotated to adjust the aperture alignment to a place where the S-4800 is somewhat in focus. The [Align] in the control panel is clicked, the alignment dialog is displayed, and the [beam] is selected. The STIGMA/ALIGNMENT knob (X, Y) of the operation panel is rotated to move the beam to be displayed to the center of the concentric circle. Next, the [aperture] is selected, and the STIGMA/ALIGNMENT knob (X, Y) is rotated one by one so that the movement of the image is stopped or minimized. The aperture dialog is closed, and the S-4800 is brought into focus by auto-focus. After that, the magnification is set to 50,000 (50 k) times, the focus is adjusted using the focus knob, the STIGMA/ALIGNMENT knob, in the same manner as described above, and the S-4800 is brought into focus again by auto-focus. This operation is repeated again to bring the S-4800 into focus. Here, when the inclination angle of the observation surface is large, since the measurement accuracy of the coverage is likely to become low, the observation surface having no surface inclination as much as possible is selected and analyzed by selecting the observation surface so that the entire observation surface is in focus at the same time at the time of focus adjustment.

(5) Image Storage

Brightness is adjusted in the ABC mode, and a photograph is photographed in size of 640×480 pixels and stored. The following analysis is performed using this image file. One photograph is photographed for one toner, and an image is obtained for the toner particle.

(6) Image Analysis

The image obtained by the above-described method is binarized using the following analysis software, thereby calculating the coverage. At this time, the above-described one screen is divided into 12 squares, and each square is analyzed. The analysis conditions for the image analysis software Image-Pro Plus ver. 5.0 are as described below.

However, in a case where the external additive such as the organosilicon polymer having a particle diameter of less than 30 nm and more than 300 nm or the silica fine particles having a particle diameter of less than 30 nm and more than 1200 nm enters a divided section, the coverage is not calculated in the section.

In the Image analysis software Image-Pro Plus 5.0, "count/size" and "option" are selected in order from "measurement" in the toolbar, and the binarization conditions are set. Among the object extraction options, "eight connection" is selected, and the smoothing is set to 0. Additionally, sorting, hole filling, and inclusion lines are not selected in advance, and "excluding boundary lines" is set to "none." "Measurement item" is selected from "measurement" in the toolbar, and 2 to 107 are entered as the area sorting range.

The coverage is calculated by surrounding a square region. At this time, the area (C) of the region is set to be 24,000 to 26,000 pixels. Automatic binarization is performed with "treatment" selected as binarization, and the sum (D) of the areas of regions containing no external additives such as the organosilicon polymer or the silica fine particles is calculated. The coverage is obtained from the area C of the square region and the sum D of the areas of the regions containing no external additives such as the organosilicon polymer or the silica fine particles by the following formula.

$$\text{Coverage}(\%)=100-(D/C\times 100)$$

The arithmetic average value of all of the resultant data is regarded as the coverage.

In addition, the coverage of each of the toner before water washing and the water-washed toner is calculated, and [coverage of water-washed toner]/[coverage of toner before water washing]×100 is defined as the "adhesion rate" of the present invention.

(Methods for Manufacturing Toner Particle, External Additive, and Developer)

Next, an example of manufacturing the toner particle, the external additive A, and the developer of the present example will be described.

Manufacture Example of Toner Particle 2

<Preparation of Aqueous Medium 2>

650.0 parts of ion exchanged water and 14.0 parts of sodium phosphate (manufactured by RASA Industries, Ltd., dodecahydrate) were injected into a reaction vessel equipped with a stirrer, a thermometer, and a return tube and kept warm at 65° C. for 1.0 hour under nitrogen purge.

A calcium chloride aqueous solution containing 9.2 parts of calcium chloride (dihydrate) dissolved in 10.0 parts of ion exchanged water was collectively injected while being stirred at 15000 rpm using a T.K.homomixer (manufactured by Tokushu Kika Kogyo Co., Ltd.), and an aqueous medium containing a dispersion stabilizer was prepared. Furthermore, 10% by mass of hydrochloric acid was injected into the aqueous medium, and the pH was adjusted to 5.0, thereby obtaining an aqueous medium 2.

<Preparation of Polymerizable Monomer Composition>

Styrene: 60.0 parts

C.I. pigment Blue 15:3:6.5 parts by mass

The materials were injected into an attritor (manufactured by Mitsui Miike Machinery Company, Limited) and further dispersed at 220 rpm for 5.0 hours using zirconia particles having a diameter of 1.7 mm, and the zirconia particles were then removed, thereby preparing a colorant dispersion.

Incidentally,

Styrene: 20.0 parts by mass n-butyl acrylate: 20.0 parts by mass

Cross-linking agent (divinylbenzene): 0.3 parts by mass

Saturated polyester resin: 5.0 parts by mass (a polycondensate of propylene oxide-modified bisphenol A (2 mol adduct) and terephthalic acid (molar ratio=10:12), the glass transition temperature (Tg) was 68° C., the weight-average molecular weight (Mw) was 10,000, and the molecular weight distribution (Mw/Mn) was 5.12)

Fischer-Tropsch wax (melting point 78° C.): 7.0 parts by mass

The materials were added to the colorant dispersion, heated at 65° C., and then uniformly dissolved and dispersed at 500 rpm using a T.K.homomixer (manufactured by Tokushu Kika Kogyo Co., Ltd.) to prepare a polymerizable monomer composition.

<Granulation Step>

The polymerizable monomer composition was injected into the aqueous medium 1 while the temperature of the aqueous medium 2 was adjusted to 70° C. and the rotation speed of the T.K.homomixer was maintained at 15000 rpm, and 10.0 parts by mass of t-butyl peroxypivalate as a polymerization initiator were added thereto. While the rotation speed was maintained as it was at 15000 rpm in the stirring device, the polymerizable monomer composition was granulated for 10 minutes.

<Polymerization Step and Distillation Step>

After the granulation step, the stirrer was replaced with a propeller stirring blade, the polymerizable monomer composition was held at 70° C. while being stirred at 150 rpm, polymerized for 5.0 hours, and further held for 2.0 hours at a temperature raised to 85° C., thereby performing polymerization. After that, the return tube of the reaction vessel was replaced with a cooling tube, and the resultant slurry was heated up to 100° C., whereby distillation was performed for six hours to distill away an unreacted polymerizable monomer, and a resin particle dispersion was obtained.

<Step of Forming Organosilicon Polymer>

In a reaction vessel equipped with a stirrer and a thermometer, 60.0 parts of ion exchanged water was weighed, and the pH was adjusted to 4.0 using 10% by mass of hydrochloric acid. The ion exchanged water was heated with being stirred, and the temperature was raised to 40° C. After that, 40.0 parts of methyltriethoxysilane, which is an organic silicon compound, was added thereto, and the resultant product was stirred for two hours or longer to hydrolyze the product. The end point of the hydrolysis was visually confirmed from the fact that the oil and water did not separate but formed a single layer, and the product was cooled to obtain a hydrolysis solution of the organic silicon compound.

After the temperature of the resin particle dispersion thus obtained was adjusted to 55° C., 25.0 parts (the amount of the organic silicon compound added was 10.0 parts) of the hydrolysis solution of the organic silicon compound was added thereto to start the polymerization of the organic silicon compound. After the system was held as it was for 0.25 hours, the pH was adjusted to 5.5 with a 3.0% sodium bicarbonate aqueous solution. After the system was held for 1.0 hour while being continuously stirred at 55° C. (condensation reaction 1), the pH was adjusted to 9.5 using a 3.0% sodium bicarbonate aqueous solution, and the system was further held for 4.0 hours (condensation reaction 2) to obtain a toner particle dispersion.

(Washing Step and Drying Step)

The resin particle dispersion was cooled, hydrochloric acid was added to the resin particle dispersion to adjust the pH to 1.5 or lower, and left to stand for 1.0 hour while being stirred. After that, the resin particle dispersion was separated into solid and liquid with a pressure filter, and a toner cake was obtained. The resultant toner cake was reslurried with ion exchanged water to produce a dispersion again, and the dispersion was then separated into solid and liquid with the filter to obtain a toner cake. The resultant toner cake was moved to a constant temperature bath (40° C.), and dried and classified for 72 hours, thereby obtaining a toner particle 2.

Manufacture Example of External Additive A

The external additive A was manufactured as described below. 150 parts of 5% ammonia water was put into a 1.5 L glass reaction vessel equipped with a stirrer, a dripping nozzle, and a thermometer to produce an alkali catalyst solution. After the alkali catalyst solution was adjusted to 50° C., 100 parts of tetraethoxysilane and 50 parts of 5% ammonia water were simultaneously added dropwise under stirring, and reacted for eight hours to obtain a silica fine particle dispersion.

After that, the resultant silica fine particle dispersion was dried by spray drying and broken with a pin mill to obtain silica fine particles having a number average particle size of primary particles of 100 nm as the external additive A.

Manufacture Example of Developer 3

100.00 parts of the toner particle 2 and 0.50 parts of the external additive A were injected into a Henschel mixer (FM10C type, manufactured by Nippon Coke & Engineering Co., Ltd.) having 7° C. water passed through in the jacket. Next, the water temperature in the jacket was stabilized at 7° C.±1° C., and the components were then mixed together for 10 minutes at the circumferential speed of the rotating blade set to 38 m/sec. During the mixing, the amount of water passed through in the jacket was adjusted as appropriate so that the temperature in the bath of the Henschel mixer did not exceed 25° C. The resultant mixture was sieved with a mesh having an opening of 75 m to obtain a developer 3.

The number of the transfer accelerating particles that coat the toner is preferably as large as possible from the viewpoint of reducing the adhesive force. However, when the amount of the transfer accelerating particles added is too large, the risk of contamination of the members in the image forming apparatus 100 increases, and the number is preferably adjusted depending on the configuration. In the present example 2, the amount of the external additive A relative to the toner particle was half the amount in Example 1.

In addition, in the developer 3 that is used in Example 2, the organosilicon polymer forms the convex portions on the surfaces of the toner base particles, and the fluidity of the developer improves, and the external additive B (R=10 nm) is thus not externally added.

The physical properties of the developer 3 are shown in Table 20.

TABLE 20

| (*)A | (*)B | H80 | (*)C | (*)D | (*)E | (*)F | X | (*)G |
|---|---|---|---|---|---|---|---|---|
| 50 nm | 30 nm | 75 nm | 60% | 99% | Silica | 100 nm | 2.0 | 7% |

In the table, (*)A means "Number average value of convex heights H", (*)B means "Number average value of distances between convex portions G", (*)C means "Area proportion of bright portion area", (*)D means "Adhesion rate of organosilicon polymer", (*)E means "Kind of external additive A", (*)F means "Number average particle diameter R of primary particles of external additive A", and, (*)G means "Adhesion rate of external additive A".

"X" in the table represents the ratio of the number average particle diameter R of the primary particles of the external additive A to the number average value of the convex heights H. As a result of observing the manufactured developer using SEM, it was possible to confirm that the external additive A was disposed as the transfer accelerating particles on the convex portions of the organosilicon polymer of the toner particle, and the average coating number of the external additive A per toner particle was about 250.

(Verification Experiment)

The effects of Example 2 were verified by the same procedure as in Example 1. The results of confirming the amount of the developer adhering to the charging roller and the influence on the image will be described.

The verified configurations are shown in Table 21.

TABLE 21

| | Toner particle | External additive |
|---|---|---|
| Example 1 (Developer 2) | 1 | External additive A + External additive B |
| Example 2 (Developer 3) | 2 | External additive A |

What is different between Example 1 and Example 2 is the toner particle. In the toner particle 2 of Example 2, since the organosilicon polymer forms the convex portions on the surface of the toner base particle and has a small adhesive force to the external additive A, the external additive A is likely to detach, and the external additive A is likely to adhere to the photosensitive drum 1 or the charging roller 2.

As in Example 1, an image B was continuously passed through 50 sheets of A4 paper (GF-C081, Canon Marketing Japan Inc.), and a change in density difference was confirmed. In addition, after the image was passed through the paper, photographs of a vertical band solid forming part of the charging roller 2 and the other parts were photographed, and the adhesion state of the developer and the adhesion state of the external additive A were confirmed.

Figure 44:
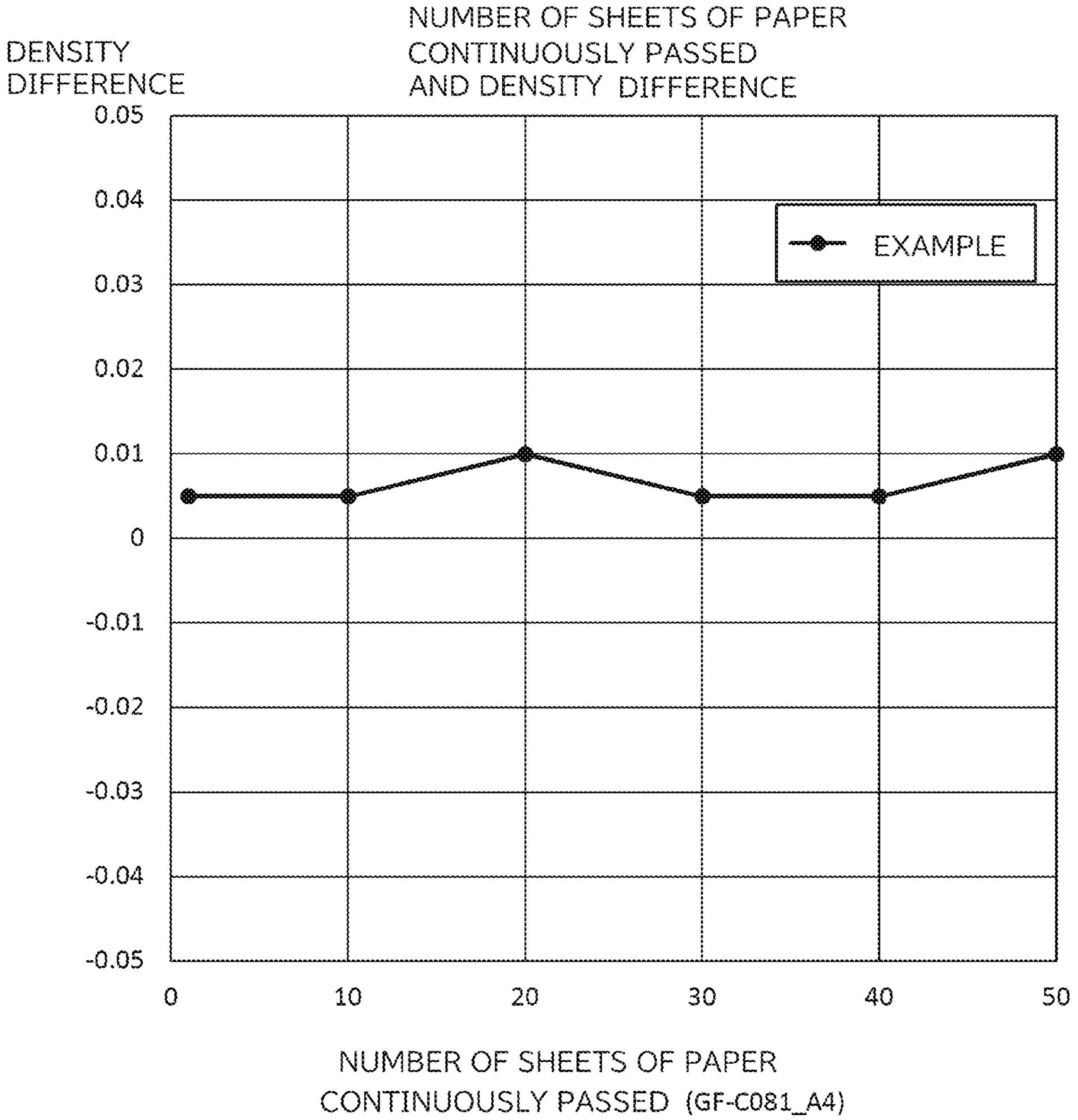
FIG. 44 is the results of effect verification of concentration changes in Example 2.

FIG. 44 shows the measurement results of the density difference between the vertical band solid part and a part other than the vertical band solid part when 50 sheets of paper are continuously passed. In Example 2, it is found that the density difference has become slightly positive as in Example 1.

Figure 45:
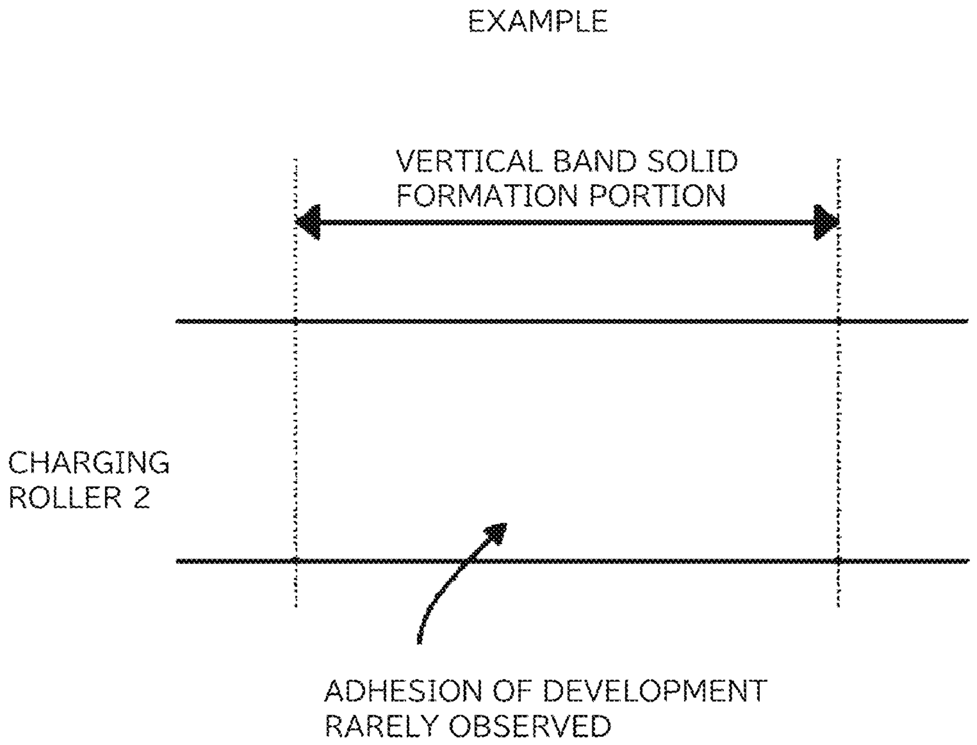
FIG. 45 is a view showing the transfer accelerating particles adhering to a charging roller 2 in Example 2.

FIG. 45 shows a schematic diagram of the result of photographing a photograph in the vicinity of the vertical band solid part of the charging roller 2 after 50 sheets of paper are continuously passed. It is found that the developer of the transfer residue rarely adheres.

Furthermore, the surface of the charging roller 2 was observed with a microscope, and the coverage of the transfer accelerating particles on the surface of the charging roller 2 is shown in Table 22. Specifically, the coverage was calculated by the following procedure from an observation image obtained by photographing the surface of the charging roller 2 at a magnification of 3000 times with a laser microscope (VK-X200 Keyence Corporation). A portion of the transfer accelerating particle and the other portion were binarized, and the total area rate of the transfer accelerating particles occupying the surface of the charging roller 2 was calculated as the coverage of the transfer accelerating particles on the surface of the charging roller 2. As a comparison, the coverage of Example 1 is also shown.

TABLE 22

| Example | Coverage of transfer carrier (%) |
|---|---|
| 1 | 9.2 |
| 2 | 9.5 |

From Table 22, it is found that in Example 2, although the amount of the external additive A relative to the toner particle is half the amount in Example 1, the charging roller 2 is coated with the transfer accelerating particles to about the same extent as in Example 1. The reason for the above-described result is assumed as described below.

In the present example, since the external additive A is likely to detach from the toner particle 2, when the developer 3 is nipped between the developing roller 41 and the photosensitive drum 1 in the developing portion, the external additive A adheres to the photosensitive drum 1. Even when not forming any toner images, if the developer 3 comes into contact with the photosensitive drum 1, the external additive A migrates to the photosensitive drum 1 from the toner particle 2. The external additive A adhering to the photosensitive drum 1 also adheres to the charging roller 2 that is in contact with the photosensitive drum 1, and the surface layer of the charging roller 2 is coated with the external additive A.

When the surface layer of the charging roller 2 is coated with the external additive A, not only the adhesive force between the photosensitive drum 1 and the developer 3 but also the adhesive force between the charging roller 2 and the developer 3 are reduced. Since the external additive A is interposed between the developer 3 and the charging roller 2, the adhesion of the developer 3 to the charging roller 2 is suppressed. On the other hand, the transfer residue that could not be collected by the developing roller 41 is transferred to the horizontal band halftone, and the density difference thus becomes slightly positive. Due to the effect of the external additive A adhering to the photosensitive drum 1, the transfer property increases, and the density difference becomes slightly smaller than that in Example 1.

Figure 46:
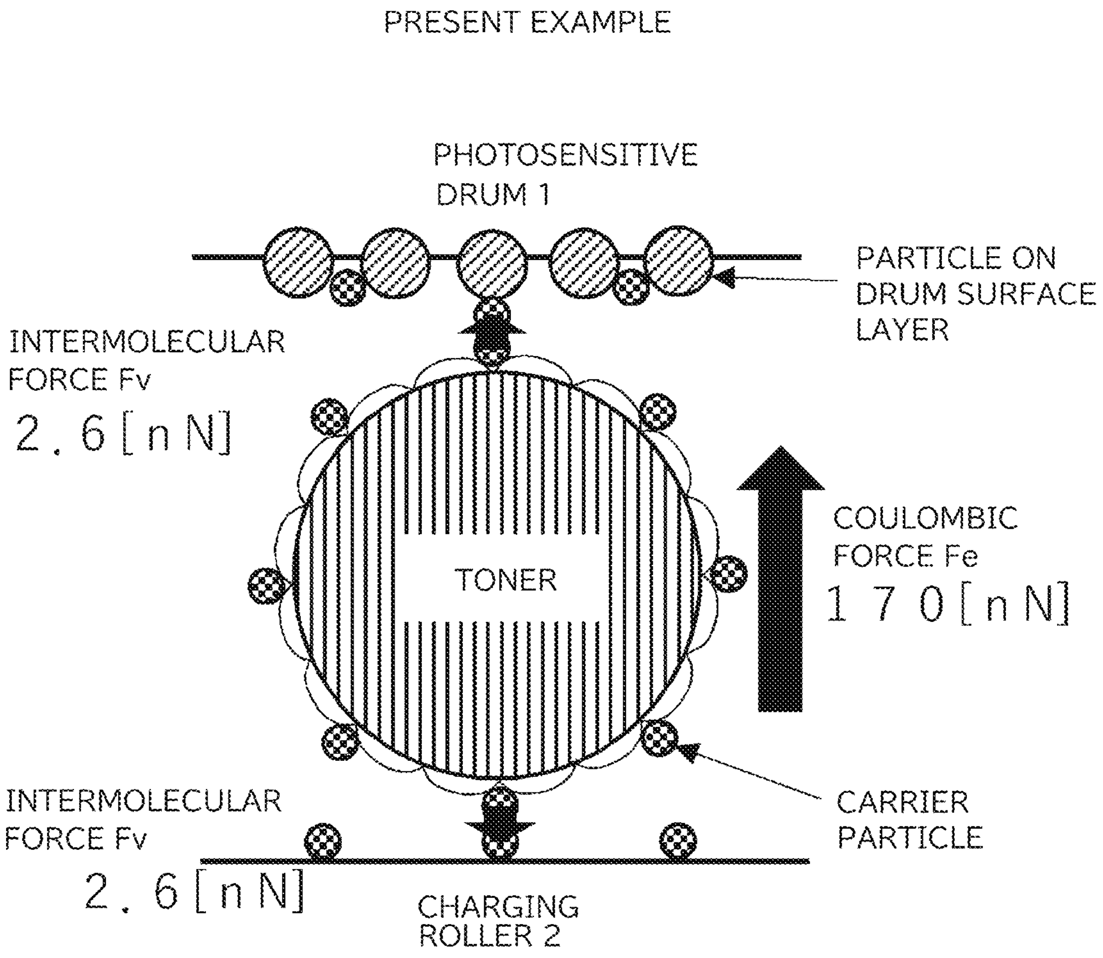
FIG. 46 is a view for describing the mechanism of verification results in Example 2.

Similar to Example 1, the calculation results of the adhesive force with reference to when the above-described assumption was reached will be described below. The calculation is performed with an assumption of a model in which the developer of the transfer residue is nipped by the photosensitive drum 1 and the charging roller 2. The calculation results are shown in FIG. 46. The details of the calculation will be described below.

A formula that is used for the calculation is the same as that in Example 1. In the present example, a large number of the transfer accelerating particles adhere not only to the surface of the toner particle but also to the particles on the drum surface layer of the photosensitive drum 1. In addition, a large number of the transfer accelerating particles also adhere to the surface layer of the charging roller 2. Therefore, the opportunity of the transfer accelerating particles coming into contact the with each other increases. In FIG. 46, the intermolecular force in a case where the transfer accelerating particles are in contact with each other is calculated. When the particle diameter of the transfer accelerating particle on the surface of the developer is 100 [nm], the van der Waals (intermolecular) force Fv that is generated between the transfer accelerating particles reaches 2.6 [nN]. Since the van der Waals force is smaller than the Coulomb force Fe (170 nN), it is possible to suppress the adhesion of the developer to the charging roller 2.

As described above, when the charging roller 2 is coated with the transfer accelerating particles to some extent, the newly supplied transfer accelerating particles come into contact not with the surface layer of the charging roller 2 but with the transfer accelerating particles on the surface layer of the charging roller 2. Since the intermolecular force between the transfer accelerating particles is small, the transfer accelerating particles do not easily adhere to the charging roller 2, are conveyed by the photosensitive drum 1 as they are, transferred onto the intermediate transfer belt 10, and consumed. In a case where the transfer accelerating particles on the surface layer of the charging roller 2 have detached, the newly supplied transfer accelerating particles come into contact with the surface layer of the charging roller 2 and adhere to the charging roller 2 again. Therefore, the amount of the transfer accelerating particles on the surface layer of the charging roller 2 is somewhat balanced.

In the configuration described in Example 1 in which the adhesion of the toner to other members is suppressed due to the external additive A interposed on the toner surface, the use of the image forming apparatus makes the deterioration of the developer progress, and in a case where the external additive A is embedded between the toner particles, there is a possibility that the expected adhesion suppressing effect cannot be exhibited. In the configuration described in the present example 2 in which the external additive A is disposed on the convex portions of the toner surface, since the convex portions suppress the external additive A being embedded between the toner particles, it is possible to stably supply the external additive A to the charging roller 2 for a long period of time. In addition, even when the external additive A detaches from the convex portions on the toner surface, since the adhesive force of the convex portions is smaller than the adhesive force on the toner surface, it is difficult for the toner to adhere to the charging roller 2, and it is possible to expect that the adhesion suppressing effect is stably exhibited for a long period of time.

In Example 1 and Example 2, the operations using the color image forming apparatus have been described, the present invention is not particularly limited, and a monochrome image forming apparatus may also be used.

According to the present invention, it is possible to provide an image forming apparatus and a process cartridge that are capable of suppressing the generation of an image defect due to insufficient charging of a toner.

According to the present invention, it is possible to provide a technique for suppressing an increase in temperature in an end portion of a developing roller in a developing apparatus while suppressing the influence on an image in a contact developing type image forming apparatus.

According to the present invention, it is possible to reduce the adhesive force between a photosensitive drum and a toner to improve transfer efficiency and suppress adhesion of the toner to other members that come into contact with the photosensitive drum in a cleaner-free image forming apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus, comprising:

an image bearing member in which an electrostatic latent image is formed on a surface; and a developer carrier that carries a developer and comes into contact with the image bearing member to supply the developer to develop the electrostatic latent image, wherein the developer contains a toner particle having a toner base particle and convex portions provided on a surface of the toner base particle, in an image obtained by cross-sectional observation of the toner particle with a scanning transmission electron microscope (STEM), a line is drawn along a circumference of the surface of the toner base particle, in a horizontal image converted on the basis of the line along the circumference, when a length of the line along the circumference in a portion where the convex portion is present on the line that is formed by the circumference of the surface of the toner base particle is defined as a convex width W, a maximum length of the convex portion in a normal direction to the convex width W is defined as a convex maximum length D, a length from an apex of the convex portion to the line along the circumference in a line segment that forms the convex maximum length D is defined as a convex height H, and the convex portion where the convex maximum length D and the convex height H are equal to each other and the convex height H is 20 nm or more is defined as a convex portion Y, a number-based average of the convex widths W in the convex portions Y is at least 40 nm and not more than 200 nm, when a width of the horizontal image based on the cross-sectional observation of the toner particle with the scanning transmission electron microscope (STEM) is defined as a circumferential length L, and a total of the convex widths W of the convex portions Y is indicated by ΣW, ΣW/L is 0.5 or more, the image bearing member has image bearing member convex portions, which are a plurality of convex portions, on a surface layer, and when among the image bearing member convex portions, a convex portion having a height of 10 nm or more is defined as a convex portion CA, and the surface layer of the image bearing member is viewed from above, an average value of distances between centers of gravity of the convex portions CA is at least 150 nm and not more than 500 nm, and a number-based average of the convex widths W of the convex portions Y on the surface of the toner particle in the developer is smaller than an average distance between the centers of gravity of the convex portions CA of the image bearing member.

2. The image forming apparatus according to claim 1, wherein the surface layer of the image bearing member contains particles and a binder resin, a plurality of peaks are present in a number-based particle size distribution of the particles in the surface layer, when a peak having a maximum peak top frequency is defined as a first peak, a peak having a second maximum peak top frequency after the first peak is defined as a second peak, the first peak and the second peak are compared with each other, and a peak having a larger value of particle diameter for the peak top is defined as a peak PEA, a particle diameter DA for the peak top of the peak PEA is within a range of 80 nm to 300 nm, and the convex portion CA is formed of a particle that configures the peak PEA.

3. The image forming apparatus according to claim 1, wherein a maximum height difference Rz on a surface of the surface layer of the image bearing member is at least 100 nm and not more than 400 nm.

4. The image forming apparatus according to claim 1, wherein a number average value of the convex heights H of the convex portions Y on the surface of the toner particle is 120 nm or less, and a number proportion P(D/W) of the convex portions Y for which a value (D/W) of a ratio of the convex maximum length D to the convex width W of the convex portion is at least 0.33 and not more than 0.60 is 70% by number or more.

5. The image forming apparatus according to claim 1, wherein the convex portion provided on the surface of the toner base particle is formed of an organosilicon polymer that is in surface contact with the surface of the toner base particle.

6. The image forming apparatus according to claim 1, wherein a region provided with the plurality of image bearing member convex portions is in contact with both a developer carrying region and a developer non-carrying region of the developer carrier.

7. The image forming apparatus according to claim 1, further comprising:

a scraping member that is in contact with the developer carrier so as to be capable of rolling, and the plurality of image bearing member convex portions are formed inside both ends of a region where the developer carrier comes into contact with the scraping member in a longitudinal direction of the developer carrier.

8. A process cartridge, comprising:

an image bearing member in which an electrostatic latent image is formed on a surface; and a developer carrier that carries a developer and comes into contact with the image bearing member to supply the developer to develop the electrostatic latent image, wherein the developer contains a toner particle having a toner base particle and convex portions provided on a surface of the toner base particle, in an image obtained by cross-sectional observation of the toner particle with a scanning transmission electron microscope (STEM), a line is drawn along a circumference of the surface of the toner base particle, in a horizontal image converted based on the line along the circumference, when a length of the line along the circumference in a portion where the convex portion is present on the line that is formed by the circumference of the surface of the toner base particle is defined as a convex width W, a maximum length of the convex portion in a normal direction to the convex width W is defined as a convex maximum length D, a length from an apex of the convex portion to the line along the circumference in a line segment that forms the convex maximum length D is defined as a convex height H, and the convex portion where the convex maximum length D and the convex height H are equal to each other and the convex height H is 20 nm or more is defined as a convex portion Y, a number-based average of the convex widths W in the convex portions Y is at least 40 nm and not more than 200 nm, when a width of the horizontal image based on the cross-sectional observation of the toner particle with the scanning transmission electron microscope (STEM) is defined as a circumferential length L, and a total of the convex widths W of the convex portions Y is indicated by ΣW, ΣW/L is 0.5 or more, the image bearing member has image bearing member convex portions, which are a plurality of convex portions, on a surface layer, and when among the image bearing member convex portions, a convex portion having a height of 10 nm or more is defined as a convex portion CA, and the surface layer of the image bearing member is viewed from above, an average value of distances between centers of gravity of the convex portions CA is at least 150 nm and not more than 500 nm, and a number-based average of the convex widths W of the convex portions Y on the surface of the toner base particle in the developer is smaller than an average distance between the centers of gravity of the convex portions CA of the image bearing member.

9. A process cartridge, comprising:

an image bearing member on which an electrostatic latent image is formed; and a developing apparatus having a developer carrier that has a core metal and an elastic layer that is provided on the core metal to carry a developer and supplies the developer to the image bearing member while coming into contact with the image bearing member to develop the electrostatic latent image, a frame body that supports an end portion of the core metal in a longitudinal direction so as to be capable of rotating, a developer container that contains the developer, and a seal member that seals the developer between an end portion of the elastic layer and the frame body, wherein a surface of the developer carrier includes a first region that are positioned on both end sides in the longitudinal direction and include a range in which the developer carrier is in contact with the seal member and a second region that is positioned inside of the first region in the longitudinal direction and is not in contact with the seal member, and a relationship between a maximum height difference Rz1 on the surface of the image bearing member facing the first region and a maximum height difference Rz2 on the surface of the image bearing member facing the second region is Rz1>Rz2.

10. The process cartridge according to claim 9, wherein the image bearing member has a plurality of convex portions on the surface, and the maximum height difference Rz1 on the surface of the image bearing member facing the first region is 100 to 700 nm.

11. The process cartridge according to claim 9, wherein the image bearing member has a plurality of convex portions on the surface, and a relationship between an average value L1 of distances between centers of gravity of the convex portions facing the first region and an average value L2 of distances between centers of gravity of the convex portions facing the second region is L1<L2.

12. The process cartridge according to claim 11, wherein the average value L1 of the distances between the centers of gravity of the convex portions facing the first region is 100 to 700 nm.

13. The process cartridge according to claim 9, wherein the image bearing member has a surface layer containing particles, and the particles are at least partially exposed.

14. The process cartridge according to claim 13, wherein a volume average particle diameter of the particles that are contained in the surface layer of the image bearing member is 50 to 350 nm.

15. The process cartridge according to claim 9, wherein a plurality of grooves are formed on a circumferential surface of the image bearing member in a substantially circumferential direction of the circumferential surface, and a relationship between an average width W1 of the grooves facing the first region and an average width W2 of the grooves facing the second region is W1>W2.

16. The process cartridge according to claim 15, wherein the average width W1 of the grooves facing the first region is 0.5 to 40 μm.

17. The process cartridge according to claim 9, wherein a plurality of grooves are formed on a circumferential surface of the image bearing member in a substantially circumferential direction of the circumferential surface, and a relationship between an average number H1 of the grooves per 1000 μm width in the longitudinal direction of the circumferential surface of the image bearing member facing the first region and an average number H2 of the grooves per 1000 μm width in the longitudinal direction of the circumferential surface of the image bearing member facing the second region is H1>H2.

18. The process cartridge according to claim 17, wherein the average number H1 of the grooves per 1000 μm width in the longitudinal direction of the circumferential surface of the image bearing member facing the first region is 20 to 1000.

19. The process cartridge according to claim 9, wherein when glass is pressed against the developer carrier at a load of 100 g, an area of a region where a glass surface of the glass and the developer carrier are in contact with each other is indicated by A1, and an area of a region other than the region where the glass surface and the developer carrier are in contact with each other is indicated by A2, A1/(A1+A2) is 15% or less.

20. An image forming apparatus to which a process cartridge can be attached, the image forming apparatus comprising:

an image bearing member on which an electrostatic latent image is formed; and a developing apparatus having a developer carrier that has a core metal and an elastic layer that is provided on the core metal to carry a developer and supplies the developer to the image bearing member while coming into contact with the image bearing member to develop the electrostatic latent image, a frame body that supports an end portion of the core metal in a longitudinal direction so as to be capable of rotating, a developer container that contains the developer, and a seal member that seals the developer between an end portion of the elastic layer and the frame body, wherein a surface of the developer carrier includes a first region that are positioned on both end sides in the longitudinal direction and include a range in which the developer carrier is in contact with the seal member and a second region that is positioned inside of the first region in the longitudinal direction and is not in contact with the seal member, and a relationship between a maximum height difference Rz1 on the surface of the image bearing member facing the first region and a maximum height difference Rz2 on the surface of the image bearing member facing the second region is Rz1>Rz2.

21. An image forming apparatus capable of containing a developer, the image forming apparatus comprising:

an image bearing member; and a charging member that comes into contact with the image bearing member and charges the image bearing member to a predetermined potential, wherein the developer is composed of a toner particle and transfer accelerating particles that adhere to a surface of the toner particle, the transfer accelerating particles have an average particle diameter of at least 30 nm and not more than 1000 nm, the image bearing member has a surface layer containing particles and a binder resin, the particles that are contained in the surface layer have a plurality of peaks in a number-based particle size distribution, when among peaks having a peak top of 20 nm or more in the particle size distribution out of the plurality of peaks, a peak having a maximum peak top frequency is defined as a first peak, and a peak having a second maximum peak top frequency after the first peak is defined as a second peak, a particle diameter DA for a peak top having a larger value of particle diameter for the peak top between the first peak and the second peak is at least 80 nm and not more than 300 nm, when among the particles that are contained in the surface layer, particles having a particle diameter within a range of DA±20 nm are defined as particles PAA, and convex portions that are derived from the particles PAA and have a height of at least 10 nm and not more than 300 nm are defined as convex portions CA, the convex portions CA are disposed on a surface of the surface layer, and when the surface layer is viewed from above, an average value of distances between centers of gravity of the convex portions CA is at least 150 nm and not more than 500 nm, and a standard deviation of the distances between the centers of gravity of the convex portions CA is 250 nm or less.

22. The image forming apparatus according to claim 21, wherein on the surface of the surface layer of the image bearing member, when an area occupied by the particles is indicated by S1, and an area not occupied by the particles is indicated by S2, S1/(S1+S2) is at least 0.70 and not more than 1.00.

23. The image forming apparatus according to claim 21, wherein in a cross section of the surface layer, when an average film thickness of the surface layer at a portion not containing particles having the particle diameter DA in a range of DA±20 nm is indicated by T, $$DA>T.$$

24. The image forming apparatus according to claim 23, wherein a particle diameter DB for a peak top of a peak having a smaller value of particle diameter for the peak top between the first peak and the second peak satisfies $$DB<T.$$

25. The image forming apparatus according to claim 24, wherein in the surface layer, $$DB/DA>1/10.$$

26. The image forming apparatus according to claim 21, wherein a proportion of the number of convex portions derived from particles having the particle diameter DA in a range of DA±20 nm in the number of convex portions present on the surface of the surface layer is 90% by number or more.

27. The image forming apparatus according to claim 21, wherein the first peak and the second peak are compared with each other, and a half width of a peak having a larger value of particle diameter for the peak top is at least 20 nm and not more than 50 nm.

28. The image forming apparatus according to claim 21, wherein a maximum height difference Rz on the surface of the surface layer of the image bearing member is at least 100 nm and not more than 400 nm.

29. The image forming apparatus according to claim 21, wherein a circularity of the particle having the particle diameter DA in a range of DA±20 nm is 0.950 or more.

30. The image forming apparatus according to claim 21, wherein the developer has convex portions formed of fine particles containing an organosilicon polymer having a structure represented by the following formula (1) that are present on a surface of the toner particle, and the transfer accelerating particles are disposed on the convex portions, $$R\text{-}Si(O\,1/2)3 \quad (1)$$

(R represents a hydrocarbon group having at least 1 and not more than 6 carbon atoms).

31. The image forming apparatus according to claim 21, wherein an average particle diameter of the transfer accelerating particles is smaller than an average value of distances between centers of gravity of the convex portions derived from particles having the particle diameter DA in a range of DA±20 nm.

32. A process cartridge capable of containing a developer, the process cartridge comprising:

an image bearing member; and a charging member that comes into contact with the image bearing member and charges the image bearing member to a predetermined potential, wherein the developer is composed of a toner particle and transfer accelerating particles that adhere to a surface of the toner particle, the transfer accelerating particles have an average particle diameter of at least 30 nm and not more than 1000 nm, the image bearing member has a surface layer containing particles and a binder resin, the particles that are contained in the surface layer have a plurality of peaks in a number-based particle size distribution, when among peaks having a peak top of 20 nm or more in the particle size distribution out of the plurality of peaks, a peak having a maximum peak top frequency is defined as a first peak, and a peak having a second maximum peak top frequency after the first peak is defined as a second peak, a particle diameter DA for a peak top having a larger value of particle diameter for the peak top between the first peak and the second peak is at least 80 nm and not more than 300 nm, when among the particles that are contained in the surface layer, particles having a particle diameter within a range of DA±20 nm are defined as particles PAA, and convex portions that are derived from the particles PAA and have a height of at least 10 nm and not more than 300 nm are defined as convex portions CA, the convex portions CA are disposed on a surface of the surface layer, and when the surface layer is viewed from above, an average value of distances between centers of gravity of the convex portions CA is at least 150 nm and not more than 500 nm, and a standard deviation of the distances between the centers of gravity of the convex portions CA is 250 nm or less.

33. The process cartridge according to claim 32, wherein on the surface of the surface layer of the image bearing member, when an area occupied by the particles is indicated by S1, and an area not occupied by the particles is indicated by S2, S1/(S1+S2) is at least 0.70 and not more than 1.00.

34. The process cartridge according to claim 32, wherein in a cross section of the surface layer, when an average film thickness of the surface layer at a portion not containing particles having the particle diameter DA in a range of DA±20 nm is indicated by T, $$DA > T.$$

35. The process cartridge according to claim 34, wherein the first peak and the second peak are compared with each other, a particle diameter DB for a peak top of a peak having a smaller value of particle diameter, $$DB < T.$$

36. The process cartridge according to claim 35, wherein in the surface layer, $$DB/DA > 1/10.$$

37. The process cartridge according to claim 32, wherein a proportion of the number of convex portions derived from particles having the particle diameter DA in a range of DA±20 nm in the number of convex portions present on the surface of the surface layer is 90% by number or more.

38. The process cartridge according to claim 32, wherein the first peak and the second peak are compared with each other, and a half width of a peak having a larger value of particle diameter for the peak top is at least 20 nm and not more than 50 nm.

39. The process cartridge according to claim 32, wherein a maximum height difference Rz on the surface of the surface layer of the image bearing member is at least 100 nm and not more than 400 nm.

40. The process cartridge according to claim 32, wherein a circularity of the particle having the particle diameter DA in a range of DA±20 nm is 0.950 or more.

41. The process cartridge according to claim 32, wherein the developer has convex portions formed of fine particles containing an organosilicon polymer having a structure represented by the following formula (1) that are present on a surface of the toner particle, and the transfer accelerating particles are disposed on the convex portions, $$R\text{-}Si(O\,1/2)3 \qquad (1)$$

(R represents a hydrocarbon group having at least 1 and not more than 6 carbon atoms).

42. The process cartridge according to claim 32, wherein an average particle diameter of the transfer accelerating particles is smaller than an average value of distances between centers of gravity of the convex portions derived from particles having the particle diameter DA in a range of DA±20 nm.

* * * * *